(12) United States Patent
Cosic

(10) Patent No.: US 10,573,348 B1
(45) Date of Patent: *Feb. 25, 2020

(54) METHODS, SYSTEMS AND APPARATUSES FOR MULTI-DIRECTIONAL STILL PICTURES AND/OR MULTI-DIRECTIONAL MOTION PICTURES

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/415,821

(22) Filed: Jan. 25, 2017

Related U.S. Application Data

(63) Continuation of application No. 14/967,350, filed on Dec. 13, 2015, now Pat. No. 9,595,294, which is a continuation of application No. 14/138,101, filed on Dec. 22, 2013, now Pat. No. 9,282,309.

(51) Int. Cl.
*G11B 27/036* (2006.01)
*G11B 31/00* (2006.01)
*G11B 27/28* (2006.01)
*H04N 1/21* (2006.01)

(52) U.S. Cl.
CPC .......... *G11B 27/036* (2013.01); *G11B 27/28* (2013.01); *G11B 31/006* (2013.01); *H04N 1/2104* (2013.01)

(58) Field of Classification Search
USPC ....................................................... 386/278
See application file for complete search history.

(56) References Cited

U.S. PATENT DOCUMENTS

| | | | |
|---|---|---|---|
| 4,988,981 A | 1/1991 | Zimmerman | |
| 5,491,743 A | 2/1996 | Shiio et al. | |
| 5,659,691 A | 8/1997 | Durward et al. | |
| 5,680,558 A | 10/1997 | Hatanaka et al. | |
| 5,704,837 A | 1/1998 | Iwasaki et al. | |
| 5,710,897 A | 1/1998 | Schneider | |
| 5,781,730 A | 7/1998 | Reimer et al. | |
| 5,808,613 A | 9/1998 | Marrin et al. | |
| 5,861,881 A | 1/1999 | Freeman et al. | |
| 5,907,178 A | 5/1999 | Baker et al. | |
| 6,043,805 A | 3/2000 | Hsieh | |
| 6,057,856 A | 5/2000 | Miyashita et al. | |
| 6,304,714 B1 | 10/2001 | Krause et al. | |
| 6,336,210 B1 | 1/2002 | Taima et al. | |
| 6,600,168 B1 | 7/2003 | Geng | |
| 6,727,887 B1 | 4/2004 | Levine et al. | |
| 6,954,906 B1 | 10/2005 | Kamachi et al. | |
| 7,113,946 B2 | 9/2006 | Cosic | |
| 7,117,225 B2 | 10/2006 | Cosic | |
| 7,151,564 B2 | 12/2006 | Kubo | |
| 7,174,033 B2 | 2/2007 | Yukhin et al. | |
| 7,639,878 B2 | 12/2009 | Ibrahim | |
| 7,692,707 B2 | 4/2010 | Kondo et al. | |
| 7,990,422 B2 | 8/2011 | Ahiska et al. | |
| 8,264,486 B2 | 9/2012 | Brown et al. | |
| 8,295,553 B2 | 10/2012 | Machida | |
| 8,300,121 B2 | 10/2012 | Yahata | |
| 8,300,977 B2 | 10/2012 | Morishita | |
| 8,335,805 B2 | 12/2012 | Cosic | |

(Continued)

OTHER PUBLICATIONS

Waze, retrieved from <URL: http://www.waze.com> on Jun. 22, 2015, 4 pages.

(Continued)

*Primary Examiner* — Loi H Tran

(57) ABSTRACT

The disclosure is generally directed to methods, systems and apparatuses for multi-directional still pictures and/or multi-directional motion pictures and their applications on mobile, embedded, and other computing devices and applications.

20 Claims, 36 Drawing Sheets

(56) References Cited

U.S. PATENT DOCUMENTS

| | | | |
|---|---|---|---|
| 8,417,740 | B2 | 4/2013 | Cosic |
| 8,572,035 | B2 | 10/2013 | Cosic |
| 8,606,458 | B2 | 12/2013 | Hu |
| 8,606,493 | B1 | 12/2013 | Gold et al. |
| 8,655,900 | B2 | 2/2014 | Cosic |
| 8,660,358 | B1 | 2/2014 | Bergboer et al. |
| 8,788,968 | B1 | 7/2014 | Filip et al. |
| 8,933,929 | B1 | 1/2015 | Filip et al. |
| 9,047,324 | B2 | 6/2015 | Cosic |
| 9,282,309 | B1 | 3/2016 | Cosic |
| 9,298,749 | B2 | 3/2016 | Cosic |
| 9,367,806 | B1 | 6/2016 | Cosic |
| 9,443,192 | B1 | 9/2016 | Cosic |
| 2002/0036649 | A1 | 3/2002 | Kim et al. |
| 2002/0124259 | A1 | 9/2002 | Chang et al. |
| 2003/0065662 | A1 | 4/2003 | Cosic |
| 2003/0078938 | A1 | 4/2003 | Noble |
| 2003/0107585 | A1 | 6/2003 | Samuelson |
| 2003/0122949 | A1 | 7/2003 | Kanematsu et al. |
| 2003/0133044 | A1 | 7/2003 | Akiyama et al. |
| 2004/0194017 | A1* | 9/2004 | Cosic .................. G06F 17/21 715/202 |
| 2005/0149517 | A1 | 7/2005 | Cosic |
| 2005/0149542 | A1 | 7/2005 | Cosic |
| 2005/0289105 | A1 | 12/2005 | Cosic |
| 2006/0078321 | A1 | 4/2006 | Osawa et al. |
| 2006/0271287 | A1 | 11/2006 | Gold et al. |
| 2007/0025614 | A1 | 2/2007 | Qian |
| 2007/0154070 | A1 | 7/2007 | Kondo |
| 2007/0211022 | A1 | 9/2007 | Boillot |
| 2008/0129580 | A1 | 6/2008 | McRae |
| 2008/0187688 | A1 | 8/2008 | Gunther |
| 2009/0067727 | A1 | 3/2009 | Hirohata |
| 2010/0023541 | A1 | 1/2010 | Cosic |
| 2010/0082536 | A1 | 4/2010 | Cosic |
| 2010/0231687 | A1 | 9/2010 | Amory et al. |
| 2010/0262924 | A1 | 10/2010 | Kalu |
| 2011/0112665 | A1 | 5/2011 | Roberts et al. |
| 2011/0141141 | A1 | 6/2011 | Kankainen |
| 2011/0161001 | A1 | 6/2011 | Fink |
| 2011/0286720 | A1 | 11/2011 | Obana et al. |
| 2012/0144408 | A1 | 6/2012 | Kim et al. |
| 2012/0257084 | A1 | 10/2012 | Kiyoshige |
| 2012/0299920 | A1 | 11/2012 | Coombe et al. |
| 2012/0306913 | A1 | 12/2012 | Fialho et al. |
| 2013/0218932 | A1 | 8/2013 | Cosic |
| 2013/0226974 | A1 | 8/2013 | Cosic |
| 2013/0335407 | A1* | 12/2013 | Reitan .................. G06F 3/011 345/419 |
| 2013/0339848 | A1 | 12/2013 | Patil et al. |
| 2014/0232819 | A1 | 8/2014 | Armstrong |
| 2014/0282260 | A1* | 9/2014 | Amacker .......... G06F 3/04842 715/838 |
| 2015/0055937 | A1* | 2/2015 | Van Hoff .......... H04N 13/243 386/285 |
| 2015/0138314 | A1 | 5/2015 | Vincent |
| 2015/0153933 | A1 | 6/2015 | Filip et al. |
| 2016/0005229 | A1 | 1/2016 | Lee et al. |
| 2016/0140999 | A1 | 5/2016 | Cosic |
| 2016/0142650 | A1 | 5/2016 | Cosic |
| 2016/0246819 | A1 | 8/2016 | Cosic |
| 2016/0246850 | A1 | 8/2016 | Cosic |
| 2016/0246868 | A1 | 8/2016 | Cosic |
| 2016/0292185 | A1 | 10/2016 | Cosic |
| 2017/0221244 | A1 | 8/2017 | Hiraga et al. |

OTHER PUBLICATIONS

Adobe Photoshop, retrieved from <URL: http://www.adobe.com/products/photoshop.html> on Jun. 22, 2015, 6 pages.
Paint.net, retrieved from <URL: http://www.getpaint.net/index.html> on Jun. 22, 2015, 2 pages.
IOS Maps, retrieved from <URL: http://www.apple.com/ios/maps> on Jun. 22, 2015, 5 pages.
Acorn, retrieved from <URL: http://www.flyingmeat.com/acorn> on Jun. 22, 2015, 3 pages.
Mapquest, retrieved from <URL: http://www.mapquest.com> on Jun. 22, 2015, 1 pages.
Google Maps, retrieved from <URL: http://www.google.com/maps/about> on Jun. 22, 2015, 16 pages.
GIMP, retrieved from <URL: http://www.gimp.org> on Jun. 22, 2015, 6 pages.
Bing Maps, retrieved from <URL: http://www.bing.com/maps> on Jun. 22, 2015, 1 pages.
PaintShop Pro, retrieved from <URL: http://www.paintshoppro.com/en/products/paintshop-pro> on Jun. 22, 2015, 2 pages.
Sygic, retrieved from <URL: http://www.sygic.com/company/about> on Jun. 22, 2015, 3 pages.
Apple Final Cut Pro, retrieved from <URL: http://www.apple.com/final-cut-pro/specs/> on Dec. 16, 2013, 8 pages.
Adobe Premiere Pro, retrieved from <URL: http://www.adobe.com/products/premiere/features.html> on Dec. 16, 2013, 4 pages.
Sony Vegas Pro, retrieved from <URL: http://www.sonycreativesoftware.com/vegaspro> on Dec. 16, 2013, 9 pages.
Avid Media Composer, retrieved from <URL: http://www.avid.com/US/products/media-composer#features> on Dec. 16, 2013, 9 pages.
Magix Video Pro, retrieved from <URL: http://pro.magix.com/en/video-pro-x/features.280.html> on Dec. 16, 2013, 3 pages.
Edius Pro, retrieved from <URL: http://www.grassvalley.com/products/edius_pro_7> on Dec. 16, 2013, 3 pages.
Roxio Creator NXT, retrieved from <URL: http://www.roxio.com/enu/products/creator/pro/video-movies.html> on Dec. 16, 2013, 3 pages.
Pinnacle Studio, retrieved from <URL: http://www.pinnaclesys.com/PublicSite/us/Products/studio/ultimate/> on Dec. 16, 2013, 3 pages.
TurboCAD Pro, retrieved from <URL: http://www.turbocad.com/TurboCAD/TurboCADWindows/TurboCADPro20/KeyFeatures/tabid/2351/Default.aspx> on Dec. 16, 2013, 7 pages.
SolidWorks Premium, retrieved from <URL: http://www.solidworks.com/sw/products/3d-cadicapabilities.htm> on Dec. 16, 2013, 3 page.
AutoCAD, retrieved from <URL: http://www.autodesk.com/products/autodesk-autocad/features/all/gallery-view> on Dec. 16, 2013, 4 pages.
Shark FX, retrieved from <URL: http://www.punchcad.com/p-2-shark-fx-v7.aspx> on Dec. 16, 2013, 7 pages.
DesignCAD 3D Max, retrieved from <URL: http://www.imsidesign.com/Products/DesignCAD/DesignCAD3DMax23/KeyFeatures/tabid/2483/Default.aspx> on Dec. 16, 2013, 5 pages.
Alibre Design Pro, retrieved from <URL: http://www.alibre.com/products/mainpage.asp> on Dec. 16, 2013, 4 pages.
ZWCAD+, retrieved from <URL: http://www.zwsoft.com/zwcad/zwcad_features/> on Dec. 16, 2013, 9 pages.
Anguelov, D., Dulong, C., Filip, D., Frueh, C., Lafon, S., Lyon, R., . . . & Weaver, J. (2010). Google street view: Capturing the world at street level. Computer, 43(6), 32-38, 7 pages.
Filip et al., Navigate Your Way Through User Photos in Street View, Feb. 26, 2010, accessed Aug. 1, 2017 at https://maps.googleblog.com/201 0/02/navigate-your-way-through-user-photos.html, 5 pages.
Stack Overflow, How can I quantify difference between two images?, various dates, accessed Aug. 2, 2017 at https://stackoverflow.com/questions/189943/how-can-i-quantify-difference-between-two-images, 8 pages.
Schonfeld, If You Could See Google Street View in Video, It Would Look like YellowBird, accessed Feb. 14, 2018 at https://techcrunch.com/2009/08/03/if-you-could-see-google-street-view-in-video-it-would-look-like-yellowbird/, 13 pages.
Facebook Spaces, accessed Jul. 25, 2019 at https://www.facebook.com/spaces, 4 pages.

\* cited by examiner

STEP2: USER MAKES A STEP FORWARD TOWARD THE BUILDING

STEP1: USER CLICKS FORWARD ARROW

STEP2: USER MAKES A STEP FORWARD TOWARD ANOTHER USER'S AVATAR

STEP1: USER CLICKS FORWARD ARROW

Step 1: incrementally downsize comparative picture

Step 2: compare the incrementally downsized comparative picture with all subsets of a reference picture starting at pixel [1,1]

METHODS, SYSTEMS AND APPARATUSES FOR MULTI-DIRECTIONAL STILL PICTURES AND/OR MULTI-DIRECTIONAL MOTION PICTURES

CROSS REFERENCE TO RELATED APPLICATION

This application is a continuation of, and claims priority under 35 U.S.C. § 120 from, nonprovisional U.S. patent application Ser. No. 14/967,350 entitled "METHODS, SYSTEMS AND APPARATUSES FOR MULTI-DIRECTIONAL STILL PICTURES AND/OR MULTI-DIRECTIONAL MOTION PICTURES", filed on Dec. 13, 2015, which is a continuation of, and claims priority under 35 U.S.C. § 120 from, nonprovisional U.S. patent application Ser. No. 14/138,101 entitled "METHODS, SYSTEMS AND APPARATUSES FOR MULTI-DIRECTIONAL STILL PICTURES AND/OR MULTI-DIRECTIONAL MOTION PICTURES", issued as U.S. Pat. No. 9,282,309, filed on Dec. 22, 2013. The disclosures of the foregoing documents are incorporated herein by reference.

FIELD

The disclosure generally relates to digital imaging. For example, the disclosure may include methods, systems and apparatuses for multi-directional still pictures and/or multi-directional motion pictures.

BACKGROUND

A still picture generally represents a photographer's choice of a fixed view of an object. Still pictures do not enable an intuitive portrayal of most objects, nor an interactive way in which a viewer may want to experience an object on today's mobile, embedded, and other computing devices.

Sequentially changing pictures (i.e. film, etc.) are merely a view of what the director of the film wanted viewers to see. Predefined sequence of changing pictures makes film inflexible from the viewer's standpoint. Usually, the only operations viewers can perform on a film are playing, pausing, forwarding and rewinding the sequence of pictures. These imaging and viewing options are limiting to the user, failing to enable the user with interactive viewing and flexible operating options.

SUMMARY OF THE INVENTION

In some aspects, the disclosure relates to a system for using multi-directional motion pictures. The system may include a processor and an interface, coupled to the processor, for receiving a collection of multi-directional motion pictures each multi-directional motion picture associated with a location of a represented object and including one or more differently directed streams of time stamped still pictures and one or more links to other one or more multi-directional motion pictures. The system may further include a display, coupled to the processor, for rendering a first stream of time stamped still pictures of a first multi-directional motion picture. The system may further include an input device, coupled to the processor, for receiving a selection of a first link of the first multi-directional motion picture, the first link associated with a second multi-directional motion picture. The system may further include a tracker, coupled to the processor, for determining a time stamp of a currently displayed still picture, wherein the processor may be programmed to cause the display to render a first stream of time stamped still pictures of the second multi-directional motion picture starting with a still picture having an incrementally subsequent time stamp from the time stamp of the currently displayed still picture.

In some embodiments, the represented object includes a physical object or a computer generated object. The computer generated object may include an object of a 3D game, an object of a CAD application, or an object of a CAM application. In further embodiments, the location of a represented object includes a location corresponding to a shape of the represented object.

In some embodiments, each of the one or more links to other one or more multi-directional motion pictures includes a differently directed link such as a forward link, a backward link, a right link, or a left link. In other embodiments, each of the one or more links to other one or more multi-directional motion pictures includes a link to an outside application or process. In further embodiments, each of the one or more differently directed streams of time stamped still pictures includes a differently directed view from a location of the represented object such as a forward view, a backward view, a right view, or a left view. In further embodiments, the still pictures of each of the one or more differently directed streams of time stamped still pictures include the still pictures ordered in a sequence. In further embodiments, each still picture of the one or more differently directed streams of time stamped still pictures includes an incremental time stamp indicating its position in a time continuum. In further embodiments, each of the one or more differently directed streams of time stamped still pictures includes a digital video file comprising a stream of time stamped still pictures or a stream of files each comprising a time stamped still picture. The digital video file comprising a stream of time stamped still pictures may include a MPEG, an AVI, a FLV, a MOV, a RM, a SWF, a WMV, a DivX, or other digital video file. The stream of files each comprising a time stamped still picture may include a digital picture file such as a BMP, a JPEG, a GIF, a TIFF, a PNG, a PDF, or other digital picture file.

In some embodiments, the input device includes a means for a user to input a selection of one or more of a forward, a backward, a right, and a left links to other one or more multi-directional motion pictures. In further embodiments, the input device includes a means for a user to input a selection of one or more of a forward, a backward, a right, and a left differently directed streams of time stamped still pictures.

In certain embodiments, the input device is further configured to receive a selection of a second stream of time stamped still pictures of the second multi-directional motion picture, wherein the tracker is configured to determine a time stamp of a currently displayed still picture, and the processor is further programmed to cause the display to render the second stream of time stamped still pictures of the second multi-directional motion picture starting with a still picture having an incrementally subsequent time stamp from the time stamp of the currently displayed still picture.

In some embodiments, the system further comprises a maze-like or sequence-like data structure for organizing the collection of multi-directional motion pictures.

In some aspects, the disclosure relates to a non-transitory computer readable medium storing a program causing a computer to execute an interface of a system for using multi-directional motion pictures. The program may comprise an interface of a system for using multi-directional motion pictures configured to receive a collection of multi-directional motion pictures each multi-directional motion picture associated with a location of a represented object and including one or more differently directed streams of time stamped still pictures and one or more links to other one or more multi-directional motion pictures. The interface may further be configured to display, on the computing device, a first stream of time stamped still pictures of a first multi-directional motion picture. The interface may further be configured to: receive a selection of a first link of the first multi-directional motion picture, the first link associated with a second multi-directional motion picture, determine a time stamp of a currently displayed still picture, and display, on the computing device, a first stream of time stamped still pictures of the second multi-directional motion picture starting with a still picture having an incrementally subsequent time stamp from the time stamp of the currently displayed still picture. The interface may further be configured to: receive a selection of a second stream of time stamped still pictures of the second multi-directional motion picture, determine a time stamp of a currently displayed still picture, and display, on the computing device, the second stream of time stamped still pictures of the second multi-directional motion picture starting with a still picture having an incrementally subsequent time stamp from the time stamp of the currently displayed still picture.

In some aspects, the disclosure relates to a non-transitory computer readable medium storing a program causing a computer to execute a system for using multi-directional motion pictures. The program may comprise a system for using multi-directional motion pictures configured to store a collection of multi-directional motion pictures each multi-directional motion picture associated with a location of a represented object and including one or more differently directed streams of time stamped still pictures and one or more links to other one or more multi-directional motion pictures. The system may further be configured to display, on the computing device, a first stream of time stamped still pictures of a first multi-directional motion picture. The system may further be configured to: receive a selection of a first link of the first multi-directional motion picture, the first link associated with a second multi-directional motion picture, determine a time stamp of a currently displayed still picture, and display, on the computing device, a first stream of time stamped still pictures of the second multi-directional motion picture starting with a still picture having an incrementally subsequent time stamp from the time stamp of the currently displayed still picture. The system may further be configured to: receive a selection of a second stream of time stamped still pictures of the second multi-directional motion picture, determine a time stamp of a currently displayed still picture, and display, on the computing device, the second stream of time stamped still pictures of the second multi-directional motion picture starting with a still picture having an incrementally subsequent time stamp from the time stamp of the currently displayed still picture.

In some embodiments, the processor is further programmed to combine the one or more differently directed streams of time stamped still pictures into a combined stream of time stamped still pictures. In further embodiments, each multi-directional motion picture includes one or more multi-directional motion picture angles, each multi-directional motion picture angle associated with a link to a multi-directional motion picture and indicating an angle to the multi-directional motion picture associated with the link. In certain embodiments, the processor is further programmed to combine the one or more differently directed streams of time stamped still pictures into a combined stream of time stamped still pictures and approximate a link to a multi-directional motion picture from an angle of view of the combined stream of time stamped still pictures. In further embodiments, each multi-directional motion picture includes one or more multi-directional motion picture distances, each multi-directional motion picture distance associated with a link to a multi-directional motion picture and indicating a distance to the multi-directional motion picture associated with the link. In further embodiments, each multi-directional motion picture includes an orientation. The orientation may include an absolute or a relative orientation.

In some embodiments, each multi-directional motion picture includes a coordinate of the associated location of the represented object. In certain embodiments, the interface is further configured to receive an automatic pattern of movement including a sequence of references to multi-directional motion pictures. The processor may further be programmed to sequentially process the multi-directional motion pictures referenced in the sequence and to cause the display to render a first stream of time stamped still pictures of each sequentially processed multi-directional motion picture starting with a still picture having an incrementally subsequent time stamp from the time stamp of a currently displayed still picture. The automatic pattern of movement may include a time period associated with each reference to a multi-directional motion picture in the sequence, the time period used to control a length of stay on each multi-directional motion picture before processing a next multi-directional motion picture in the sequence.

In some embodiments, the collection of multi-directional motion pictures includes the collection of multi-directional motion pictures residing on a remote computing device. The remote computing device may include an application server or a network service server communicating with the processor via a network. The remote computing device may include a computing device communicating with the processor via a peer-to-peer network.

In some embodiments, the input device includes a microphone for receiving an audio input, and speech recognizer for interpreting the audio input as selection of the one or more links to other one or more multi-directional motion pictures or selection of the one or more differently directed streams of time stamped still pictures. The speech recognizer may include a keyword spotting or a full lexicon speech recognition. In further embodiments, the input device includes a tactile device for receiving a tactile input, and an interpreter for interpreting the tactile input as selection of the one or more links to other one or more multi-directional motion pictures or selection of the one or more differently directed streams of time stamped still pictures.

In some embodiments, the processor is further programmed to detect a moving object or an action scene in the one or more differently directed streams of time stamped still pictures. The detecting of a moving object or an action scene in the one or more differently directed streams of time stamped still pictures may include associating the detected moving object or the action scene with a multi-directional motion picture. The detecting of a moving object or an action scene in the one or more differently directed streams of time stamped still pictures may include aligning the detected moving object or the action scene with one or more reference points of the represented object and determining a coordinate of the detected moving object or the action scene.

In some embodiments, the interface is further configured to receive a map of locations of the represented object, each location of the map associated with a multi-directional motion picture and selectable by a user.

The system may further include a speaker, coupled to the processor, for generating an audio output associated with the one or more differently directed streams of time stamped still pictures. The system may further include a tactile output device, coupled to the processor, for generating a tactile output associated with the one or more differently directed streams of time stamped still pictures.

In some embodiments, each of the one or more differently directed streams of time stamped still pictures includes a first-person view or a third-person view from a location of the represented object. In certain embodiments, the processor is further programmed to insert an avatar into the one or more differently directed streams of time stamped still pictures, each avatar representing a user of plurality users. The processor may further be programmed to control one or more of the avatar's movement, appearance, and behavior.

In some aspects, the disclosure relates to a system for using multi-directional motion pictures. The system may include an interface of a system for using multi-directional motion pictures operating on a computing device, the interface configured to receive a collection of multi-directional motion pictures each multi-directional motion picture associated with a location of a represented object and including one or more differently directed streams of time stamped still pictures and one or more links to other one or more multi-directional motion pictures. The interface may further be configured to display, on the computing device, a first stream of time stamped still pictures of a first multi-directional motion picture. The interface may further be configured to: receive a selection of a first link of the first multi-directional motion picture, the first link associated with a second multi-directional motion picture, determine a time stamp of a currently displayed still picture, and display, on the computing device, a first stream of time stamped still pictures of the second multi-directional motion picture starting with a still picture having an incrementally subsequent time stamp from the time stamp of the currently displayed still picture. The interface may further be configured to: receive a selection of a second stream of time stamped still pictures of the second multi-directional motion picture, determine a time stamp of the currently displayed still picture, and display, on the computing device, the second stream of time stamped still pictures of the second multi-directional motion picture starting with a still picture having an incrementally subsequent time stamp from the time stamp of the currently displayed still picture.

In some aspects, the disclosure relates to a system for inserting an avatar into streams of time stamped still pictures. The system may include a processor and an interface, coupled to the processor, for receiving a collection of multi-directional motion pictures each multi-directional motion picture associated with a location of a represented object and each including one or more differently directed streams of time stamped still pictures and one or more links to other one or more multi-directional motion pictures. The processor may be programmed to: associate a user's avatar with a first multi-directional motion picture and insert the avatar's picture into a first stream of time stamped still pictures of the first multi-directional motion picture. The system may further include a comparator, coupled to the processor, for identifying a region of the first stream of time stamped still pictures of the first multi-directional motion picture around a position where the avatar's picture is inserted, and incrementally resizing the identified region. The comparator may further be configured to compare subsets of a first stream of time stamped still pictures of a second multi-directional motion picture with the incrementally resized identified region, and determine that a subset of the first stream of time stamped still pictures of the second multi-directional motion picture is sufficiently similar to an incrementally resized identified region to indicate a line of sight. The processor may further be programmed to: resize the avatar's picture proportional to the incrementally resized identified region to portray the avatar in perspective, and insert the resized avatar's picture into the first stream of time stamped still pictures of the second multi-directional motion picture in a position where the subset sufficiently similar to the incrementally resized identified region is found.

In some aspects, the disclosure relates to a system for inserting an avatar into streams of time stamped still pictures. The system may include an interface of a system for inserting an avatar into streams of time stamped still pictures operating on a computing device, the interface configured to receive a collection of multi-directional motion pictures each multi-directional motion picture associated with a location of a represented object and each including one or more differently directed streams of time stamped still pictures and one or more links to other one or more multi-directional motion pictures. The interface may be configured to associate a user's avatar with a first multi-directional motion picture and insert the avatar's picture into a first stream of time stamped still pictures of the first multi-directional motion picture. The interface may further be configured to: identify a region of the first stream of time stamped still pictures of the first multi-directional motion picture around a position where the avatar's picture is inserted, incrementally resize the identified region, and compare subsets of a first stream of time stamped still pictures of a second multi-directional motion picture with the incrementally resized identified region. The interface may further be configured to: determine that a subset of the first stream of time stamped still pictures of the second multi-directional motion picture is sufficiently similar to an incrementally resized identified region to indicate a line of sight, resize the avatar's picture proportional to the incrementally resized identified region to portray the avatar in perspective, and insert the resized avatar's picture into the first stream of time stamped still pictures of the second multi-directional motion picture in a position where the subset sufficiently similar to the incrementally resized identified region is found.

In some aspects, the disclosure relates to a system for generating multi-directional motion pictures. The system may include a processor and an interface, coupled to the processor, for receiving one or more streams of time stamped still pictures each stream of time stamped still pictures depicting a differently directed view from a location of plurality locations of a represented object. The system may further include an assembler, coupled to the interface, for generating a first multi-directional motion picture to include the one or more streams of time stamped still pictures from a first location and a second multi-directional motion picture to include the one or more streams of time stamped still pictures from a second location, and adding a link with the second multi-directional motion picture to the first multi-directional motion picture and adding a link with the first multi-directional motion picture to the second multi-directional motion picture, the first location being adjacent to the second location.

In some embodiments, each still picture of the one or more streams of time stamped still pictures includes an incremental time stamp indicating its position in a time continuum. In further embodiments, the location of plurality locations of a represented object includes a location corresponding to a shape of the represented object.

The system may further include one or more motion picture taking equipment, coupled to the processor, for capturing the one or more streams of time stamped still pictures. The one or more motion picture taking equipment may include one or more motion picture cameras for simultaneous capturing of the one or more streams of time stamped still pictures. The one or more motion picture taking equipment may include one or more multi-directional motion picture taking devices for simultaneous capturing of the one or more streams of time stamped still pictures, each multi-directional motion picture taking device associated with a multi-directional motion picture. The one or more multi-directional motion picture taking devices may include one or more motion picture cameras such as forward motion picture camera, backward motion picture camera, right motion picture camera, and left motion picture camera. The one or more motion picture taking equipment may include a means to mount the one or more motion picture taking equipment onto an object or a surface. The one or more motion picture taking equipment may include a means to connect the one or more motion picture taking equipment with the processor.

In some embodiments, the one or more motion picture taking equipment includes a means for detecting a moving object or an action scene. In further embodiments, the one or more motion picture taking equipment includes a means for aligning the one or more motion picture taking equipment toward the detected moving object or an action scene. In further embodiments, the one or more motion picture taking equipment includes a means for focusing the one or more motion picture taking equipment on the detected moving object or an action scene.

In some embodiments, the processor is further programmed to detect the one or more streams of time stamped still pictures from the first location and the one or more streams of time stamped still pictures from the second location. In certain embodiments, the processor is further programmed to search for the one or more streams of time stamped still pictures of the represented object within a collection of streams of time stamped still pictures. In further embodiments, the processor is further programmed to detect a link between the first multi-directional motion picture and the second multi-directional motion picture.

The system may further include an input device for receiving a user's link addition request, wherein the assembler may further be configured to add a new link with another multi-directional motion picture to the first or the second multi-directional motion picture. The input device may further be configured to receive the user's link modification request, wherein the assembler may further be configured to modify a link of the first or the second multi-directional motion picture.

In some aspects, the disclosure relates to a non-transitory computer readable medium storing a program causing a computer to execute an interface of a system for generating multi-directional motion pictures. The program may include an interface of a system for generating multi-directional motion pictures configured to receive one or more streams of time stamped still pictures each stream of time stamped still pictures depicting a differently directed view from a location of plurality locations of a represented object. The interface may further be configured to: generate a first multi-directional motion picture to include the one or more streams of time stamped still pictures from a first location, generate a second multi-directional motion picture to include the one or more streams of time stamped still pictures from a second location, and add a link with the second multi-directional motion picture to the first multi-directional motion picture and add a link with the first multi-directional motion picture to the second multi-directional motion picture, the first location being adjacent to the second location. The interface may further be configured to receive a user's link addition request and add a new link with another multi-directional motion picture to the first or the second multi-directional motion picture. The interface may further be configured to receive a user's link modification request and modify a link of the first or the second multi-directional motion picture.

In some aspects, the disclosure relates to a non-transitory computer readable medium storing a program causing a computer to execute a system for generating multi-directional motion pictures. The program may include a system for generating multi-directional motion pictures configured to store one or more streams of time stamped still pictures each stream of time stamped still pictures depicting a differently directed view from a location of plurality locations of a represented object. The system may further be configured to: generate a first multi-directional motion picture to include the one or more streams of time stamped still pictures from a first location, generate a second multi-directional motion picture to include the one or more streams of time stamped still pictures from a second location, and add a link with the second multi-directional motion picture to the first multi-directional motion picture and add a link with the first multi-directional motion picture to the second multi-directional motion picture, the first location being adjacent to the second location. The system may further be configured to receive a user's link addition request and add a new link with another multi-directional motion picture to the first or the second multi-directional motion picture. The system may further be configured to receive a user's link modification request and modify a link of the first or the second multi-directional motion picture.

In some aspects, the disclosure relates to a system for generating multi-directional motion pictures. The system may include an interface of a system for generating multi-directional motion pictures operating on a computing device, the interface configured to receive one or more streams of time stamped still pictures each stream of time stamped still pictures depicting a differently directed view from a location of plurality locations of a represented object. The interface may further be configured to: generate a first multi-directional motion picture to include the one or more streams of time stamped still pictures from a first location, generate a second multi-directional motion picture to include the one or more streams of time stamped still pictures from a second location, and add a link with the second multi-directional motion picture to the first multi-directional motion picture and add a link with the first multi-directional motion picture to the second multi-directional motion picture, the first location being adjacent to the second location. The interface may further be configured to receive a user's link addition request and add a new link with another multi-directional motion picture to the first or the second multi-directional motion picture.

The interface may further be configured to receive a user's link modification request and modify a link of the first or the second multi-directional motion picture.

In some aspects, the disclosure relates to a system for detecting streams of time stamped still pictures. The system may include a processor and an interface, coupled to the processor, for receiving a collection of streams of time stamped still pictures. The system may further include a comparator, coupled to the processor, for comparing subsets of a first stream of time stamped still pictures and subsets of a second stream of time stamped still pictures, the compared subsets being near opposite edges of the first and the second streams of time stamped still pictures, and determining that a subset of the first stream of time stamped still pictures is sufficiently similar to a subset of the second stream of time stamped still pictures to indicate an overlapping field of view between the two streams of time stamped still pictures. The system may further include an assembler, coupled to the processor, for generating a first multi-directional motion picture to include the first and the second streams of time stamped still pictures, the first and the second streams of time stamped still pictures depicting a first and a second differently directed views from a first location of a represented object. The comparator may further be configured to: compare subsets of the first stream of time stamped still pictures and subsets of a third stream of time stamped still pictures, the compared subsets being near opposite edges of the first and the third streams of time stamped still pictures, and determine that a subset of the first stream of time stamped still pictures is sufficiently similar to a subset of the third stream of time stamped still pictures to indicate an overlapping field of view between the two streams of time stamped still pictures, wherein the assembler may further be configured to add the third stream of time stamped still pictures to the first multi-directional motion picture, the third stream of time stamped still pictures depicting a third differently directed view from the first location of the represented object.

In some aspects, the disclosure relates to a system for detecting streams of time stamped still pictures. The system may include an interface of a system for detecting streams of time stamped still pictures operating on a computing device, the interface configured to receive a collection of streams of time stamped still pictures. The interface may further be configured to: compare subsets of a first stream of time stamped still pictures and subsets of a second stream of time stamped still pictures, the subsets being near opposite edges of the first and the second streams of time stamped still pictures, determine that a subset of the first stream of time stamped still pictures is sufficiently similar to a subset of the second stream of time stamped still pictures to indicate an overlapping field of view between the two streams of time stamped still pictures, and generate a first multi-directional motion picture to include the first and the second streams of time stamped still pictures, the first and the second streams of time stamped still pictures depicting a first and a second differently directed views from a first location of a represented object. The interface may further be configured to: compare subsets of the first stream of time stamped still pictures and subsets of a third stream of time stamped still pictures, the subsets being near opposite edges of the first and the third streams of time stamped still pictures, determine that a subset of the first stream of time stamped still pictures is sufficiently similar to a subset of the third stream of time stamped still pictures to indicate an overlapping field of view between the two streams of time stamped still pictures, and add the third stream of time stamped still pictures to the first multi-directional motion picture, the third stream of time stamped still pictures depicting a third differently directed view from the first location of the represented object.

In some aspects, the disclosure relates to a system for detecting links among multi-directional motion pictures. The system may include a processor and an interface, coupled to the processor, for receiving a collection of multi-directional motion pictures each multi-directional motion picture associated with a location of a represented object and including one or more differently directed streams of time stamped still pictures. The system may further include a comparator, coupled to the processor, for incrementally resizing a first stream of time stamped still pictures of the first multi-directional motion picture, comparing subsets of a first stream of time stamped still pictures of a second multi-directional motion picture with the incrementally resized first stream of time stamped still pictures of the first multi-directional motion picture, and determining that a subset of the first stream of time stamped still pictures of the second multi-directional motion picture is sufficiently similar to an incrementally resized first stream of time stamped still pictures of the first multi-directional motion picture to indicate a line of sight. The system may further include an assembler, coupled to the processor, for adding a link with the second multi-directional motion picture to the first multi-directional motion picture and adding a link with the first multi-directional motion picture to the second multi-directional motion picture.

In some aspects, the disclosure relates to a system for detecting links among multi-directional motion pictures. The system may include an interface of a system for detecting links among multi-directional motion pictures operating on a computing device, the interface configured to receive a collection of multi-directional motion pictures each multi-directional motion picture associated with a location of a represented object and including one or more differently directed streams of time stamped still pictures. The interface may further be configured to: incrementally resize a first stream of time stamped still pictures of the first multi-directional motion picture. The interface may further be configured to: compare subsets of a first stream of time stamped still pictures of a second multi-directional motion picture with the incrementally resized first stream of time stamped still pictures of the first multi-directional motion picture, determine that a subset of the first stream of time stamped still pictures of the second multi-directional motion picture is sufficiently similar to an incrementally resized first stream of time stamped still pictures of the first multi-directional motion picture to indicate a line of sight, and add a link with the second multi-directional motion picture to the first multi-directional motion picture and add a link with the first multi-directional motion picture to the second multi-directional motion picture.

In some aspects, the disclosure relates to a system for using multi-directional still pictures. The system may include a processor and an interface, coupled to the processor, for receiving a collection of multi-directional still pictures each multi-directional still picture associated with a location of a represented object and including one or more differently directed still pictures and one or more links to other one or more multi-directional still pictures. The system may further include a display, coupled to the processor, for rendering a first still picture depicting a first view from a location associated with a first multi-directional still picture. The system may further include an input device, coupled to the processor, for receiving a selection of a first link of the first multi-directional still picture, the first link associated with a second multi-directional still picture, wherein the processor may be programmed to cause the display to render a first still picture depicting a first view from a location associated with the second multi-directional still picture.

In some embodiments, the represented object includes a physical object or a computer generated object. The computer generated object may include an object of a 3D game, an object of a CAD application, or an object of a CAM application. In further embodiments, the location of a represented object includes a location corresponding to a shape of the represented object.

In some embodiments, each of the one or more links to other one or more multi-directional still pictures includes a differently directed link such as a forward link, a backward link, a right link, or a left link. Each of the one or more links to other one or more multi-directional still pictures may include a link to an outside application or process. In further embodiments, each of the one or more differently directed still pictures includes a differently directed view from a location of the represented object such as a forward view, a backward view, a right view, or a left view. Each of the one or more differently directed still pictures may include a digital picture file such as a BMP, a JPEG, a GIF, a TIFF, a PNG, a PDF, or other still picture file.

In some embodiments, the input device includes a means for a user to input a selection of one or more of a forward, a backward, a right, and a left links to other one or more multi-directional still pictures. In further embodiments, the input device includes a means for a user to input a selection of one or more of a forward, a backward, a right, and a left differently directed still pictures. The input device may further be configured to receive a selection of a second still picture of the second multi-directional still picture, wherein the processor may further be programmed to cause the display to render the second still picture depicting a second view from the location associated with the second multi-directional still picture.

The system may further include a maze-like or sequence-like data structure for organizing the collection of multi-directional still pictures.

In some embodiments, the processor is further programmed to combine the one or more differently directed still pictures into a combined still picture. In further embodiments, each multi-directional still picture includes one or more multi-directional still picture angles, each multi-directional still picture angle associated with a link to a multi-directional still picture and indicating an angle to the multi-directional still picture associated with the link. The processor may further be programmed to combine the one or more differently directed still pictures into a combined still picture and approximate a link to a multi-directional still picture from an angle of view of the combined still picture. In further embodiments, each multi-directional still picture includes one or more multi-directional still picture distances, each multi-directional still picture distance associated with a link to a multi-directional still picture and indicating a distance to the multi-directional still picture associated with the link. In further embodiments, each multi-directional still picture includes an orientation. The orientation may include an absolute or a relative orientation.

In some embodiments, each multi-directional still picture includes a coordinate of the associated location of the represented object. In certain embodiments, the interface is further configured to receive an automatic pattern of movement including a sequence of references to multi-directional still pictures. The processor may further be programmed to sequentially process the multi-directional still pictures referenced in the sequence and to cause the display to render a first still picture of each sequentially processed multi-directional still picture. The automatic pattern of movement may include a time period associated with each reference to a multi-directional still picture in the sequence, the time period used to control a length of stay on each multi-directional still picture before processing a next multi-directional still picture in the sequence.

In some embodiments, the collection of multi-directional still pictures includes the collection of multi-directional still pictures residing on a remote computing device. The remote computing device may include an application server or a network service server communicating with the processor via a network. The remote computing device may include a computing device communicating with the processor via a peer-to-peer network.

In some embodiments, the input device includes a microphone for receiving an audio input, and speech recognizer for interpreting the audio input as selection of the one or more links to other one or more multi-directional still pictures or a selection of the one or more differently directed still pictures. The speech recognizer may include a keyword spotting or a full lexicon speech recognition. In further embodiments, the input device includes a tactile device for receiving a tactile input, and an interpreter for interpreting the tactile input as selection of the one or more links to other one or more multi-directional still pictures or a selection of the one or more differently directed still pictures.

In some embodiments, the interface is further configured to receive a map of locations of the represented object, each location of the map associated with a multi-directional still picture and selectable by a user.

The system may further include a speaker, coupled to the processor, for generating an audio output associated with the one or more differently directed still pictures. The system may further include a tactile output device, coupled to the processor, for generating a tactile output associated with the one or more differently directed still pictures.

In some embodiments, each of the one or more differently directed still pictures includes a first-person view or a third-person view from a location of the represented object. In certain embodiments, the processor is further programmed to insert an avatar into the one or more differently directed still pictures, each avatar representing a user of plurality users. The processor may further be programmed to control one or more of the avatar's movement, appearance, and behavior.

In some aspects, the disclosure relates to a non-transitory computer readable medium storing a program causing a computer to execute an interface of a system for using multi-directional still pictures. The program may include an interface of a system for using multi-directional still pictures configured to receive a collection of multi-directional still pictures each multi-directional still picture associated with a location of a represented object and including one or more differently directed still pictures and one or more links to other one or more multi-directional still pictures. The interface may further be configured to display, on the computing device, a first still picture depicting a first view from a location associated with a first multi-directional still picture. The interface may further be configured to: receive a selection of a first link of the first multi-directional still picture, the first link associated with a second multi-directional still picture, and display, on the computing device, a first still picture depicting a first view from a location associated with the second multi-directional still picture. The interface may further be configured to: receive a selection of a second still picture of the second multi-directional still picture, and display, on the computing device, the second still picture depicting a second view from the location associated with the second multi-directional still picture.

In some aspects, the disclosure relates to a non-transitory computer readable medium storing a program causing a computer to execute a system for using multi-directional still pictures. The program may include a system for using multi-directional still pictures configured to store a collection of multi-directional still pictures each multi-directional still picture associated with a location of a represented object and including one or more differently directed still pictures and one or more links to other one or more multi-directional still pictures. The system may further be configured to display, on the computing device, a first still picture depicting a first view from a location associated with a first multi-directional still picture. The system may further be configured to: receive a selection of a first link of the first multi-directional still picture, the first link associated with a second multi-directional still picture, and display, on the computing device, a first still picture depicting a first view from a location associated with the second multi-directional still picture. The system may further be configured to: receive a selection of a second still picture of the second multi-directional still picture, and display, on the computing device, the second still picture depicting a second view from the location associated with the second multi-directional still picture.

In some aspects, the disclosure relates to a system for using multi-directional still pictures. The system may include an interface of a system for using multi-directional still pictures operating on a computing device, the interface configured to receive a collection of multi-directional still pictures each multi-directional still picture associated with a location of a represented object and including one or more differently directed still pictures and one or more links to other one or more multi-directional still pictures. The interface may further be configured to display, on the computing device, a first still picture depicting a first view from a location associated with a first multi-directional still picture. The interface may further be configured to: receive a selection of a first link of the first multi-directional still picture, the first link associated with a second multi-directional still picture, and display, on the computing device, a first still picture depicting a first view from a location associated with the second multi-directional still picture. The interface may further be configured to: receive a selection of a second still picture of the second multi-directional still picture, and display, on the computing device, the second still picture depicting a second view from the location associated with the second multi-directional still picture.

In some aspects, the disclosure relates to a system for inserting an avatar into still pictures. The system may include a processor and an interface, coupled to the processor, for receiving a collection of multi-directional still pictures each multi-directional still picture associated with a location of a represented object and including one or more differently directed still pictures and one or more links to other one or more multi-directional still pictures. The processor may be programmed to: associate a user's avatar with a first multi-directional still picture and insert the avatar's picture into a first still picture of the first multi-directional still picture. The system may further include a comparator, coupled to the processor, for identifying a region of the first still picture of the first multi-directional still picture around a position where the avatar's picture is inserted, and incrementally resizing the identified region. The comparator may further be configured to compare subsets of a first still picture of a second multi-directional still picture with the incrementally resized identified region, and determine that a subset of the first still picture of the second multi-directional still picture is sufficiently similar to an incrementally resized identified region to indicate a line of sight. The processor may further be programmed to: resize the avatar's picture proportional to the incrementally resized identified region to portray the avatar in perspective, and insert the resized avatar's picture into the first still picture of the second multi-directional still picture in a position where the subset sufficiently similar to the incrementally resized identified region is found.

In some aspects, the disclosure relates to a system for inserting an avatar into still pictures. The system may include an interface of a system for inserting an avatar into still pictures operating on a computing device, the interface configured to receive a collection of multi-directional still pictures each multi-directional still picture associated with a location of a represented object and each including one or more differently directed still pictures and one or more links to other one or more multi-directional still pictures. The interface may further be configured to: associate a user's avatar with a first multi-directional still picture and insert the avatar's picture into a first still picture of the first multi-directional still picture, and identify a region of the first still picture of the first multi-directional still picture around a position where the avatar's picture is inserted. The interface may further be configured to: incrementally resize the identified region, compare subsets of a first still picture of a second multi-directional still picture with the incrementally resized identified region, and determine that a subset of the first still picture of the second multi-directional still picture is sufficiently similar to an incrementally resized identified region to indicate a line of sight. The interface may further be configured to: resize the avatar's picture proportional to the incrementally resized identified region to portray the avatar in perspective, and insert the resized avatar's picture into the first still picture of the second multi-directional still picture in a position where the subset sufficiently similar to the incrementally resized identified region is found.

In some aspects, the disclosure relates to a system for generating multi-directional still pictures. The system may include a processor and an interface, coupled to the processor, for receiving one or more still pictures each still picture depicting a differently directed view from a first location of plurality locations of a represented object. The system may further include an assembler, coupled to the processor, for generating a first multi-directional still picture to include the one or more still pictures from the first location. The interface may further be configured to receive one or more still pictures each depicting a differently directed view from a second location of the represented object, and the assembler may further be configured to: generate a second multi-directional still picture to include the one or more still pictures from the second location and to include a link with the first multi-directional still picture, the first location being adjacent to the second location, and add a link with the second multi-directional still picture to the first multi-directional still picture.

In some embodiments, the location of plurality locations of a represented object includes a location corresponding to a shape of the represented object.

The system may further include one or more picture taking equipment, coupled to the processor, for capturing the one or more still pictures. The one or more picture taking equipment may include one or more cameras for capturing of the one or more still pictures. The one or more picture taking equipment may include one or more multi-directional still picture taking devices for simultaneous capturing of the one or more still pictures, each multi-directional still picture taking device associated with a multi-directional still picture. The one or more multi-directional still picture taking devices may include one or more cameras such as forward camera, backward camera, right camera, and left camera. The one or more picture taking equipment may include a means to mount the one or more picture taking equipment onto an object or a surface. The one or more picture taking equipment may include a means to connect the one or more picture taking equipment with the processor.

In some embodiments, the one or more picture taking equipment includes a means for detecting a moving object or an action scene. The one or more picture taking equipment may include a means for aligning the one or more picture taking equipment toward the detected moving object or an action scene. The one or more picture taking equipment may include a means for focusing the one or more picture taking equipment on the detected moving object or an action scene.

In some embodiments, the interface is further configured to guide a user in generating multi-directional still pictures in straight or curved paths of the represented object. In certain embodiments, the processor is further programmed to detect the one or more still pictures from the first location and the one or more still pictures from the second location. The processor may further be programmed to search for the one or more still pictures of the represented object within a collection of still pictures. The processor may further be programmed to detect a link between the first multi-directional still picture and the second multi-directional still picture.

The system may further include an input device for receiving a user's link addition request, wherein the assembler may further be configured to add a new link with another multi-directional still picture to the first or the second multi-directional still picture. The input device may further be configured to receive the user's link modification request, wherein the assembler may further be configured to modify a link of the first or the second multi-directional still picture.

In some aspects, the disclosure relates to a non-transitory computer readable medium storing a program causing a computer to execute an interface of a system for generating multi-directional still pictures. The program may include an interface of a system for generating multi-directional still pictures configured to: receive one or more still pictures each still picture depicting a differently directed view from a first location of plurality locations of a represented object, and generate a first multi-directional still picture to include the one or more still pictures from the first location. The interface may further be configured to: receive one or more still pictures each depicting a differently directed view from a second location of the represented object, generate a second multi-directional still picture to include the one or more still pictures from the second location and to include a link with the first multi-directional still picture, the first location being adjacent to the second location, and add a link with the second multi-directional still picture to the first multi-directional still picture. The interface may further be configured to receive a user's link addition request and add a new link with another multi-directional still picture to the first or the second multi-directional still picture. The interface may further be configured to receive a user's link modification request and modify a link of the first or the second multi-directional still picture.

In some aspects, the disclosure relates to a non-transitory computer readable medium storing a program causing a computer to execute a system for generating multi-directional still pictures. The program may include a system for generating multi-directional still pictures configured to: receive one or more still pictures each still picture depicting a differently directed view from a first location of plurality locations of a represented object, and generate a first multi-directional still picture to include the one or more still pictures from the first location. The system may further be configured to: receive one or more still pictures each depicting a differently directed view from a second location of the represented object, generate a second multi-directional still picture to include the one or more still pictures from the second location and to include a link with the first multi-directional still picture, the first location being adjacent to the second location, and add a link with the second multi-directional still picture to the first multi-directional still picture. The system may further be configured to receive a user's link addition request and add a new link with another multi-directional still picture to the first or the second multi-directional still picture. The system may further be configured to receive a user's link modification request and modify a link of the first or the second multi-directional still picture.

In some aspects, the disclosure relates to a system for generating multi-directional still pictures. The system may include an interface of a system for generating multi-directional still pictures operating on a computing device, the interface configured to: receive one or more still pictures each still picture depicting a differently directed view from a first location of plurality locations of a represented object, and generate a first multi-directional still picture to include the one or more still pictures from the first location. The interface may further be configured to: receive one or more still pictures each depicting a differently directed view from a second location of the represented object, generate a second multi-directional still picture to include the one or more still pictures from the second location and to include a link with the first multi-directional still picture, the first location being adjacent to the second location, and add a link with the second multi-directional still picture to the first multi-directional still picture. The interface may further be configured to receive a user's link addition request and add a new link with another multi-directional still picture to the first or the second multi-directional still picture. The interface may further be configured to receive a user's link modification request and modify a link of the first or the second multi-directional still picture.

In some aspects, the disclosure relates to a system for detecting still pictures. The system may include a processor and an interface, coupled to the processor, for receiving a collection of still pictures. The system may further include a comparator, coupled to the processor, for comparing subsets of a first still picture and subsets of a second still picture, the compared subsets being near opposite edges of the first and the second still pictures, and determining that a subset of the first still picture is sufficiently similar to a subset of the second still picture to indicate an overlapping field of view between the two still pictures. The system may further include an assembler, coupled to the processor, for generating a first multi-directional still picture to include the first and the second still pictures, the first and the second still pictures depicting a first and a second differently directed views from a first location of a represented object. The comparator may further be configured to: compare subsets of the first still picture and subsets of a third still picture, the compared subsets being near opposite edges of the first and the third still pictures, and determine that a subset of the first still picture is sufficiently similar to a subset of the third still picture to indicate an overlapping field of view between the two still pictures, wherein the assembler may further be configured to add the third still picture to the first multi-directional still picture, the third still picture depicting a third differently directed view from the first location of the represented object.

In some aspects, the disclosure relates to a system for detecting still pictures. The system may include an interface of a system for detecting still pictures operating on a computing device, the interface configured to receive a collection of still pictures. The interface may further be configured to: compare subsets of a first still picture and subsets of a second still picture, the compared subsets being near opposite edges of the first and the second still pictures, determine that a subset of the first still picture is sufficiently similar to a subset of the second still picture to indicate an overlapping field of view between the two still pictures, and generate a first multi-directional still picture to include the first and the second still pictures, the first and the second still pictures depicting a first and a second differently directed views from a first location of a represented object. The interface may further be configured to: compare subsets of the first still picture and subsets of a third still picture, the compared subsets being near opposite edges of the first and the third still pictures, determine that a subset of the first still picture is sufficiently similar to a subset of the third still picture to indicate an overlapping field of view between the two still pictures, and add the third still picture to the first multi-directional still picture, the third still picture depicting a third differently directed view from the first location of the represented object.

In some aspects, the disclosure relates to a system for detecting links among multi-directional still pictures. The system may include a processor and an interface, coupled to the processor, for receiving a collection of multi-directional still pictures each multi-directional still picture associated with a location of a represented object and including one or more differently directed still pictures. The system may further include a comparator, coupled to the processor, for incrementally resizing a first still picture of the first multi-directional still picture, comparing subsets of a first still picture of a second multi-directional still picture with the incrementally resized first still picture of the first multi-directional still picture, and determining that a subset of the first still picture of the second multi-directional still picture is sufficiently similar to an incrementally resized first still picture of the first multi-directional still picture to indicate a line of sight. The system may further include an assembler, coupled to the processor, for adding a link with the second multi-directional still picture to the first multi-directional still picture and adding a link with the first multi-directional still picture to the second multi-directional still picture.

In some aspects, the disclosure relates to a system for detecting links among multi-directional still pictures. The system may include an interface of a system for detecting links among multi-directional still pictures operating on a computing device, the interface configured to receive a collection of multi-directional still pictures each multi-directional still picture associated with a location of a represented object and including one or more differently directed still pictures. The interface may further be configured to incrementally resize a first still picture of the first multi-directional still picture. The interface may further be configured to: compare subsets of a first still picture of a second multi-directional still picture with the incrementally resized first still picture of the first multi-directional still picture, determine that a subset of the first still picture of the second multi-directional still picture is sufficiently similar to an incrementally resized first still picture of the first multi-directional still picture to indicate a line of sight, and add a link with the second multi-directional still picture to the first multi-directional still picture and add a link with the first multi-directional still picture to the second multi-directional still picture.

Other features and advantages of the disclosure will become apparent from the following description, including the claims and drawings.

Figure 1:
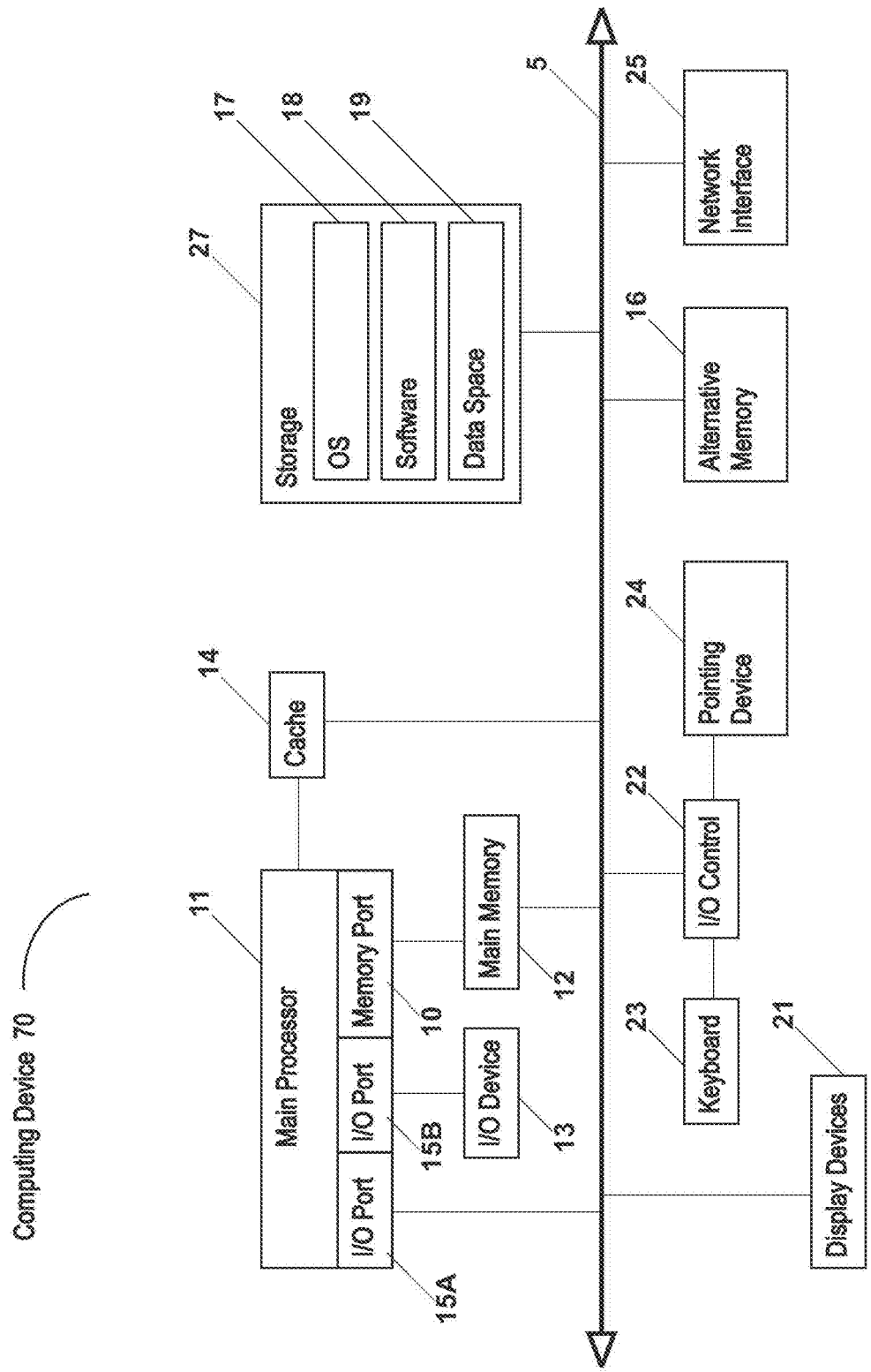
FIG. 1 illustrates a block diagram of an environment or architecture on which the features of the disclosure may be implemented.

Like reference numerals in different figures indicate like elements. Horizontal or vertical " . . . " and other such indicia may be used to indicate additional instances of the same type of element. n, m, n+m, n−m or other such indicia may represent any integers or sequential numbers that follow the sequence where they are indicated. Any of these indicia may be used interchangeably according to the context and space available.

DETAILED DESCRIPTION

The disclosed methods, systems and apparatuses for making, processing and using multi-directional still pictures and/or multi-directional motion pictures may include features, functionalities, embodiments, and applications of still and/or motion pictures for advanced interactive visual representation of objects. The disclosed methods, systems and apparatuses, any of their elements, any of their embodiments, or a combination thereof may generally be referred to as MDP Unit 100, as MDP application, or as other similar name or reference.

Referring now to FIG. 1, an embodiment of a Computing Device 70 (in some aspects referred to as Mobile Device 70) in which the features of the forthcoming disclosure may be implemented is illustrated. In some aspects, the disclosed methods, systems and apparatuses may include functions, algorithms, hardware or software, or a combination thereof that may be implemented or executed on any type and form of computing device, such as a computer, a mobile device, a server, a video gaming device, a television device, a GPS receiver, a media player, an embedded device, or any other type and form of a computing device capable of performing the operations described herein.

Computing Device 70 may include hardware, software or a combination of hardware and software providing the structure on which the embodiments of the disclosure may be practiced. Computing device 70 may include a central processing unit, which may also be referred to as a main processor 11, that may include one or more memory ports 10 and one or more input output ports, also referred to I/O ports 15, such as the I/O ports 15A and 15B. Computing device 70 may further include a main memory unit 12, which may be connected to the remainder of the components of the Computing Device 70 via a bus 5 and/or may be directly connected to the main processor 11 via memory port 10. The Computing Device 70 may also include a visual display device 21 such as a monitor, projector or glasses, a keyboard 23 and/or a pointing device 24, such as a mouse, interfaced with the remainder of the device via an I/O control 22. Each Computing Device 70 may also include additional optional elements, such as one or more input/output devices 13. Main processor 11 may comprise or be interfaced with a cache memory 14. Storage 27 may comprise memory, which provides an operating system, also referred to as OS 17, additional software 18 operating on the OS 17 and data space 19 in which additional data or information may be stored. Alternative memory device 16 may be connected to the remaining components of the computing environment via bus 5. A network interface 25 may also be interfaced with the bus 5 and be used to communicate with external computing devices via an external network. Any or all of the described elements of the Computing Device 70 may be directly or operatively connected with each other or with other additional elements as depicted on FIG. 1 or using any other connection means known in art in alternate embodiments.

Main processor 11 includes any logic circuitry that responds to and processes instructions fetched from the main memory unit 12. Main processor 11 may also include any combination of hardware and software for implementing and executing logic functions or algorithms. Main processor 11 may include a single core or a multi core processor. Main processor 11 may comprise any functionality for loading an operating system 17 and operating any software 18 thereon. In many embodiments, the central processing unit is provided by a microprocessing or a processing unit, such as for example Snapdragon processors produced by Qualcomm Inc., processors by Intel Corporation of Mountain View, Calif., those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Advanced Micro Devices of Sunnyvale, Calif., or any computing unit for performing similar functions. The Computing Device 70 may be based on any of these processors, or any other processor capable of operating as described herein, whether on a mobile or embedded device or a larger more conventional machine.

Main memory unit 12 may include one or more memory chips capable of storing data and allowing any storage location to be directly accessed by the microprocessor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 12 may be based on any of the above described memory chips, or any other available memory chips capable of operating as described herein. In some embodiments, the main processor 11 communicates with main memory 12 via a system bus 5. In some embodiments of a Computing Device 70, the processor may communicate directly with main memory 12 via a memory port 10.

Main processor 11 may communicate directly with cache memory 14 via a connection means, such as a secondary bus which may also sometimes be referred to as a backside bus. In other embodiments, main processor 11 may communicate with cache memory 14 using the system bus 5. Main memory 12, I/O device 13 or any other component of the Computing Device 70 may be connected with any other components of the computing environment via similar secondary bus, depending on the design. Cache memory 14 however may typically have a faster response time than main memory 12 and may include a type of memory which may be considered faster than main memory 12, such as for example SRAM, BSRAM, or EDRAM. Cache memory may include any structure such as multilevel caches. In some embodiments, the main processor 11 may communicate with one or more I/O devices 13 via a local system bus 5. Various busses may be used to connect the main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 21, the main processor 11 may use an Advanced Graphics Port (AGP) to communicate with the display 21. In some embodiments, main processor 11 may communicate directly with I/O device 13 via HyperTransport, Rapid I/O, or InfiniBand. In further embodiments, local busses and direct communication are mixed. For example, the main processor 11 may communicate with I/O device 13 using a local interconnect bus while communicating with I/O device 13 directly. Similar configurations may be used for any other components described herein.

Computing device 70 may further include alternative memory, such as an SD memory slot, a USB memory stick, an optical drive such as a CD-ROM drive, a CD-R/RW drive, a DVD-ROM drive or a BlueRay disc, a hard-drive or any other device that may include non-volatile memory suitable for storing data or installing software and programs. Computing device 70 may further include a storage device 27 which may include any type and form of non-volatile memory for storing an operating system (OS) which may include any type and form of Windows OS, Mac OS, Unix OS, Linux OS, Android OS, iPhone OS, mobile version of Windows OS, an embedded OS, or any other OS that may operate on the Computing Device 70. Computing device 70 may also include software 18 and/or data space 19 for storing additional data or information. In some embodiments, an alternative memory 16 may be used as the storage device 27. Additionally, OS 17 and/or the software 18 may be run from a bootable medium, for example, a flash drive, a bootable CD, such as KNOPPIX®, a bootable CD for GNU/Linux that is available as a GNU/Linux distribution from knoppix.net.

Computing device 70 may include a network interface 25 to interface to a Local Area Network (LAN), Wide Area Network (WAN) or the Internet through a variety of connections including, but not limited to, standard telephone lines, wired or wireless connections, LAN or WAN links (i.e. 802.11, T1, T3, 56 kb, X.25), broadband connections (e.g., ISDN, Frame Relay, ATM), or some combination of any or all of the above. Network interface 25 may include Bluetooth or WiFi capability. The network interface 25 may comprise a built-in network adapter, network interface card, PCMCIA network card, card bus network adapter, wireless network adapter, Bluetooth adapter, USB network adapter, modem or any other device suitable for interfacing the Computing Device 70 with any type of network capable of communication and performing the operations described herein.

Still referring to FIG. 1, I/O devices 13 may be present in various shapes and forms in the Computing Device 70. Input devices may include joysticks, keyboards, mice, trackpads, touchscreens, trackballs, microphones, drawing tablets, gloves, video game components for inputting video game data or a video camera. Output devices may include video displays, touchscreens, speakers, or transceivers for sending and receiving data. I/O devices 13 may be controlled by an I/O control 22. The I/O control 22 may control one or more I/O devices such as a keyboard 23 and a pointing device 24, e.g., a joystick, a mouse or an optical pen. I/O control 22 may also comprise an interface between an external detector, such as a video camera or a microphone and the computing device. I/O control 22 may enable any type and form of a detecting device, such as a video camera to be interfaced with other components of the Computing Device 70. Furthermore, an I/O device 13 may also provide storage 27 and/or an alternative memory 16 for the computing device. In still other embodiments, the Computing Device 70 may provide USB connections to receive handheld USB storage devices such as the USB Flash Drive line of devices manufactured by Twintech Industry, Inc. of Los Alamitos, Calif.

In some embodiments, the computing environment may comprise or be connected to multiple display devices 21. Display devices 21 may each be of the same or different type and/or form. I/O devices 13 and/or the I/O control 22 may comprise any type and/or form of suitable hardware, software, or combination of hardware and software to support, enable or provide for the connection and use of multiple display devices 21 or multiple detection devices.

In one example, Computing Device 70 may include any type and/or form of video adapter, video card, driver, and/or library to interface, communicate, connect or otherwise use the display devices 21 or any I/O devices 13 such as video camera devices. In one embodiment, a video adapter may comprise multiple connectors to interface to multiple display devices 21. In other embodiments, the Computing Device 70 may include multiple video adapters, with each video adapter connected to one or more of the display devices 21. In some embodiments, any portion of the operating system of the Computing Device 70 may be configured for using multiple displays 21. In other embodiments, one or more of the display devices 21 may be provided by one or more other computing devices, such as computing devices connected to a remote computing device via a network.

In further embodiments, an I/O device 13 may be a bridge between the system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

Computing environment on the Computing Device 70 may operate under the control of operating systems, which may control scheduling of tasks and access to system resources. The Computing Device 70 may be running any operating system including mobile device or desktop machine operating systems, including Android OS, iPhone OS, Windows 8 OS, or any other version of OS for running a computing device. For example, with respect to operating systems, the Computing Device 70 may use different releases of the Unix and Linux operating systems, any version of the Mac OS® for Macintosh computers, any embedded operating system, any real-time operating system, any open source operating system, any video gaming operating system, any proprietary operating system, any operating systems for mobile computing devices, or any other operating system capable of running on the Computing Device 70 and performing the operations described herein. Typical operating systems include: WINDOWS XP, Windows 7, Windows 8 all of which are manufactured by Microsoft Corporation of Redmond, Wash.; MacOS, iPhone OS manufactured by Apple Computer of Cupertino, Calif.; OS/2, manufactured by International Business Machines of Armonk, N.Y.; and Linux a freely-available operating system distributed by Caldera Corp. of Salt Lake City, Utah, or any type and/or form of a Unix operating system, among others. Similarly, any other operating systems by Android or Apple, can be utilized, just as those of the Microsoft. However, it is to be understood that, in addition to the traditional mobile and desktop system operating system architectures, the computing environment may operate under the control of a cloud-based operating system. In some embodiments, other aspects of Computing Device 70 may also be implemented in the cloud without departing from the spirit and scope of the disclosure. For example, in some designs, memory, storage, and/or processing elements may be hosted in the cloud.

In some designs, Computing Device 70 may comprise a mobile device such as a smartphone, wearable electronics, tablet, or laptop. For example, in some designs, computing device can comprise a desktop or a server. In some embodiments, Computing Device 70 may be implemented on multiple devices. For example, a portion of Computing Device 70 may be implemented on a mobile device and another portion may be implemented on wearable electronics.

In some embodiments, the Computing Device 70 may have any different combination of processors, operating systems, and input/output devices consistent with the device's purpose and structure. For example, the Computing Device 70 may include a Snapdragon by Qualcomm, Inc., or Tegra processors by nVidia, or any other mobile device processor or a microprocessor for a similar application. In this embodiment, the smartphone device may be operated under the control of the Android, iPhone OS, PalmOS or any other operating system of a similar purpose. The device may then also include a stylus input device as well as a five-way navigator device. In another example, the Computing Device 70 may include a Wii video game console released by Nintendo Co. operating an es operating system. In this embodiment, the I/O devices may include a video camera or an infrared camera for recording or tracking movements of a player or a participant of a Wii video game. Other I/O devices 13 may include a joystick, a keyboard or an RF wireless remote control device. Similarly, the Computing Device 70 may be tailored to any workstation, mobile or desktop computer, laptop or notebook computer, Smartphone device or tablet, server, handheld computer, gaming device, embedded device, or any other computer or computing product, or other type and form of computing or telecommunications device and that has sufficient processor power and memory capacity to perform the operations described herein.

Still referring to FIG. 1, from a perspective of a general architecture and variations of the underlying operating environment in which the features of the disclosed methods, systems and apparatuses may be implemented, the disclosed methods, systems and apparatuses are not limited to the use with the configurations shown in the figures or described in the specification, and they may find applicability in any operating, computing, communication, electronic, and/or processing environment. The environment may include various different model infrastructures such as web services, distributed computing, grid computing, cloud computing, and other infrastructures.

Various implementations of the disclosed methods, systems and apparatuses may be realized in digital electronic circuitry, integrated circuitry, specially designed application specific integrated circuits (ASICs), field programmable gate arrays (FPGAs), computer hardware, firmware, software, virtual machines, and/or combinations thereof including their structural, logical, and/or physical equivalents. The various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A computer program (also known as program, software, software application, script or code) may include machine instructions for a programmable processor, and can be implemented in a high-level procedural and/or object-oriented programming language, and/or in a low-level assembly/machine language. Any language used may be a compiled or an interpreted language. A computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (i.e. one or more scripts stored in a markup language document, etc.), in a single file dedicated to the program in question, or in multiple coordinated files (i.e. files that store one or more modules, sub programs, or portions of code, etc.). A computer program may be deployed to be executed on one computer or on multiple computers (i.e. cloud, distributed or parallel computing, etc.) at one site or distributed across multiple sites and interconnected by a communication network.

The disclosed methods, systems and apparatuses may include clients and servers. A client and server are generally remote from each other and typically interact through a communication network. The relationship of client and server arises by virtue of computer programs running on the respective computers and having a client-server relationship to each other.

A Computing Device 70 may be embedded in another device such as a tablet computer, a mobile telephone, a personal digital assistant (PDA), a media player, an audio or video player, a Global Positioning System (GPS) receiver, a game console, a portable storage device (i.e. a USB flash drive, etc.), gateway, a router, a hub, a digital video recorder, a set-top box, an automobile entertainment system, an automobile navigation system, a television device, a residential gateway, a refrigerator, a washing machine, a factory automation device, an assembly line device, a factory floor monitoring device, to name just a few. The processor and the memory may be supplemented by, or incorporated in, special purpose logic circuitry.

As used herein, the terms machine-readable medium and computer-readable medium may refer to any computer program product, apparatus and/or device used to provide machine instructions and/or data to a programmable processor, including a machine-readable medium that receives machine instructions as a machine-readable signal. The term machine-readable signal may refer to any signal used to provide machine instructions and/or data to a programmable processor. A machine-readable medium may include both a volatile and non-volatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in art.

The disclosed methods, systems and apparatuses may be implemented in a computing system that may include a back end component (i.e. a data server, etc.), or that may include a middleware component (i.e. an application server, etc.), or that may include a front end component (i.e. a client computer having a graphical user interface or a web browser through which a user may interact with an implementation of the disclosed methods, systems and apparatuses, etc.), or any combination of such back end, middleware, or front end components. The components of the system may be interconnected by any form or medium of digital data communication (i.e. a communication network, etc.). Examples of communication networks may include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, or any type of network known in art.

Any of the files shown in the figures or described in the specification may reside in any repository accessible by an embodiment of the disclosed methods, systems and apparatuses. In each instance where a specific file or file type is mentioned, other files, file types or formats may be substituted.

Where a reference to a data structure is used herein, it should be understood that any variety of data structures may be used such as, for example, array, list, linked list, doubly linked list, queue, tree, heap, graph, map, grid, matrix, multi-dimensional matrix, table, database, DBMS, file, and/or any other type or form of a data structure. A data structure may include one or more fields or data fields stored in or associated with the data structure. A field or data field may include a data, a text, an object, a data structure, or any other similar element. A field or data field may include a pointer to a data, a text, an object, a data structure, or any other similar element. A data structure may be stored in a file or any other repository.

Where a reference to an object is used herein, it should be understood that an object may include any element described herein. For example, an object may include a data structure, a DBMS, a database, a file, a system, a process, and/or any other similar element. An object may be stored in a file or object file, or any other repository.

Where a reference to a data, object, data structure, item or any other element is used herein, it should be understood that the data, object, data structure, item or any other element may include a pointer to the data, object, data structure, item or any other element stored elsewhere.

Where a reference to picture processing or image processing is used herein, it should be understood that picture processing or image processing may generally include changing pixels of a digital picture, resizing a digital picture, reshaping a digital picture, detecting patterns or shapes in a digital picture, comparing digital pictures or portions thereof, manipulating a digital picture or its pixels, transforming a digital picture or its pixels, and/or performing any other operation on a digital picture or a stream of digital pictures by utilizing functions and/or algorithms implemented with a processor (i.e. processor of Computing Device 70, etc.).

Where a reference to an interface or any other element coupled to a processor is used herein, it should be understood the interface or any other element may be operating on the processor. Also, one of ordinary skill in art will understand that an element coupled to another element may include an element in communication with (i.e. wired or wireless network communication, etc.), connected with, or in any other interactive relationship with another element. Furthermore, an element coupled to another element may be coupled to any other element in alternate implementations.

Figure 2:
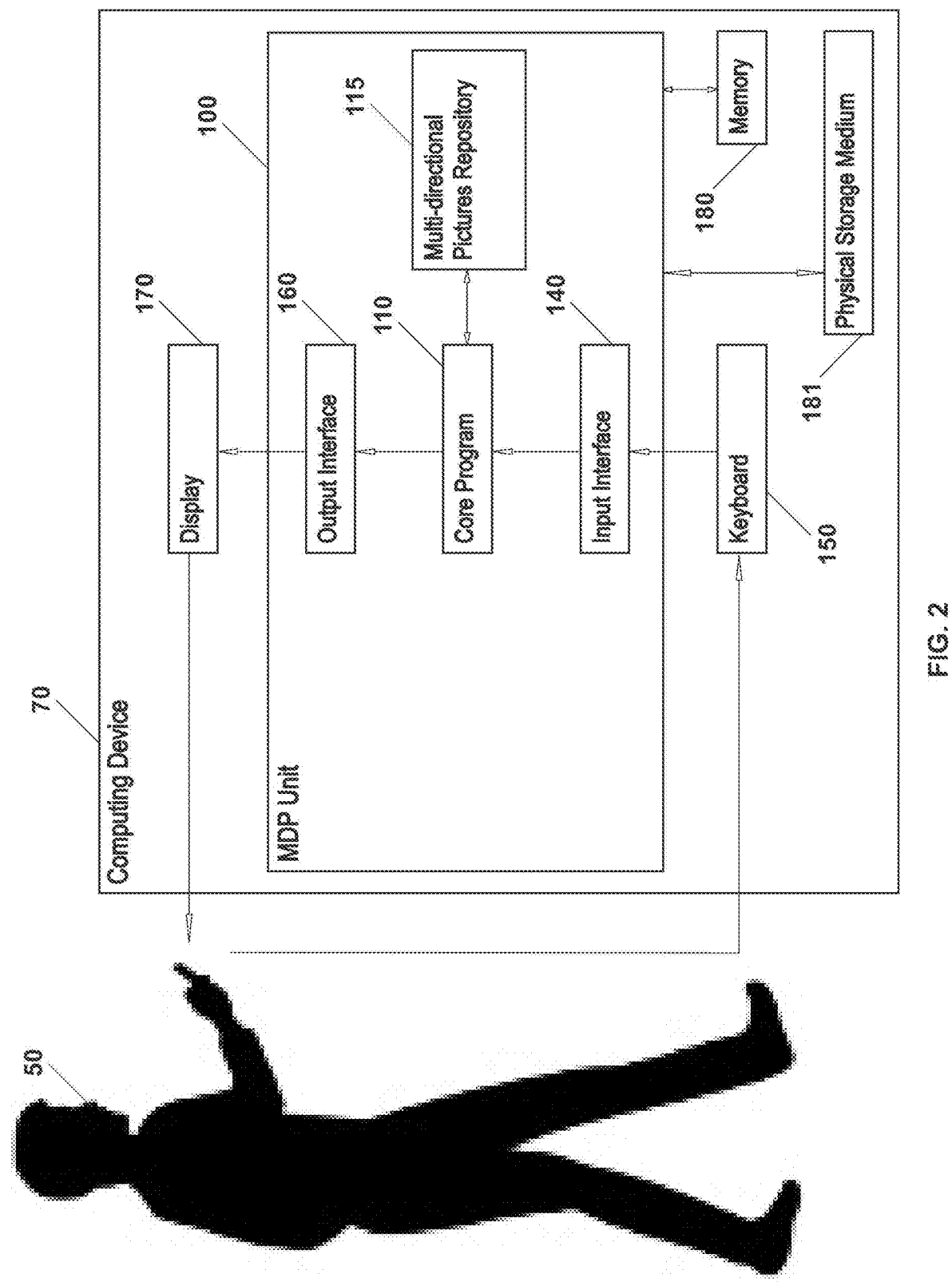
FIG. 2 is a diagram showing an embodiment of MDP Unit 100 implemented on a Computing Device 70.

Referring to FIG. 2, an embodiment of a Computing Device 70 comprising MDP Unit 100 is Illustrated. Computing Device 70 may include Core Program 110, Multi-directional Pictures Repository 115, Input Interface 140, Keyboard 150, Output Interface 160, Display 170, Memory 180, and Physical Storage Medium 181. Other additional elements may be included as needed, or some of the disclosed ones may be excluded, or a combination thereof may be utilized in alternate embodiments.

User 50 may utilize the functionalities of MDP Unit 100 implemented on a Computing Device 70. For instance, Computing Device 70 may include Core Program 110 that may receive user's operating instructions and issue corresponding instructions to access pictures in Multi-directional Pictures Repository 115. Instructions may include any computer command, instruction set, operation, Structured Query Language (SQL) statement, instruction, or any other command (these terms may be used interchangeably herein) understood by Multi-directional Pictures Repository 115. Computing Device 70 may include Multi-directional Pictures Repository 115 that may store pictures (i.e. still or motion pictures, etc.) or references thereto, any data structures (i.e. multi-directional still or motion pictures, mazes, sequences, etc.) and/or other elements. User 50 may interact with Core Program 110 through inputting operating instructions via Keyboard 150 and/or Input Interface 140, or another input device and/or its associated interface. User 50 may also interact with the Core Program 110 through viewing results via Display 170 and/or Output Interface 160, or another output device and/or its associated interface. Computing Device 70 may include Memory 180 as temporary storage and/or Physical Storage Medium 181 as permanent storage.

In some embodiments, Computing Device 70 may include any mobile computer, a mobile phone, a Smartphone (i.e. iPhone, Windows phone, Blackberry, Android phone, etc.), a tablet, a personal digital assistant (PDA), or another similar type of mobile device capable of implementing the functionalities described herein. The main processor 11 of the Computing Device 70 may include hardware and/or software for executing instructions and processing data. Main processor 11 may be directly or operatively coupled with aforementioned memory for storing the instructions and data. The memory may further include an implementation of features and functionalities discussed herein. The main processor 11 of the Computing Device 70 may access a computer-readable medium including a volatile and non-volatile medium, a removable and non-removable medium, a communication medium, a storage medium, and/or other similar type of computer-readable medium. The processor may be directly or operatively coupled with an output device such as a Liquid Crystal Display (LCD) to show information to user. An input device, such as a key pad, keyboard, and/or touch screen may also be directly or operatively coupled with the processor to enable user to input instructions. Memory may store software that can provide functionality when executed by the processor. Software may include a user interface that may enable a user to interact with the mobile device, and a mobile operating system that may provide system functionality. A modem mobile operating system combines the features of a personal computer operating system with high resolution display, touchscreen, cellular network connectivity, bluetooth, WiFi, GPS, mobile navigation, microphone, camera, video camera, voice recorder, speech recognition, music player, video player, near field communication, PDA, and other features and applications. Examples of a mobile operating system include iOS, Android, Windows Mobile, BlackBerry OS, Symbian OS, Palm OS, and other mobile operating systems.

In other embodiments, Computing Device 70 may be, or include, an embedded device, which may be any device or system with a dedicated function within a larger device or system. Embedded systems may range from the simplest ones dedicated to one task with no user interfaces to complex ones with advanced user interfaces that resemble modem desktop computer systems. Simple embedded devices may use buttons, light emitting diodes (LEDs), graphic or character LCDs with a simple menu system. More sophisticated devices may use a graphical screen with touch sensing or screen-edge buttons where the meaning of the buttons may change with the screen. Examples of devices that include an embedded device may include a gaming device, a media player, a digital still or video camera, a pager, a television device, a set-top box, a personal navigation device, a global positioning system (GPS) receiver, a digital watch, a DVD player, a printer, a microwave oven, a washing machine, a dishwasher, a thermostat, a automobile, a factory controller, a telephone, a router, a network bridge, or another similar type of device. The embedded device may include one or more elements described in the Computing Device 70 above such as the main processor 11, any of the aforementioned memory, the network interface 25, computer-readable medium, the output device, the input device, the user interface, the software, the operating system, etc. Examples of an operating system for embedded device include MicroC/OS-II, QNX, VxWorks, eCos, TinyOS, Windows Embedded, Embedded Linux, and other embedded device operating systems.

In yet other embodiments, Computing Device 70 may be, or include, any other computing device besides the aforementioned mobile and embedded devices. Other computing device may be any computing device including a traditional computer with all of its processing, storage, communication, networking, input and output interfacing, and other functionalities. Examples of traditional computing device may include a personal desktop computer, a server, a mainframe computer, gaming device, or another similar type of traditional computing device. Traditional computing device may include one or more elements described in the Computing Device 70 above such as the main processor 11, any of the aforementioned memory, the network interface 25, computer-readable medium, the output device, the input device, the user interface, the software, the operating system, etc. Examples of an operating system for a traditional computing device include Windows, MacOS, Linux, Unix, and other similar operating systems.

MDP Unit 100 may comprise any software, hardware or a combination of software and hardware for implementing multi-directional still pictures and/or multi-directional motion pictures, and/or for other functionalities described herein. MDP Unit 100 may include functions and algorithms for making, processing and/or using multi-directional still pictures and/or multi-directional motion pictures. Similarly, MDP Unit 100 may include functions and algorithms for implementing an interface for making, processing and/or using multi-directional still pictures and/or multi-directional motion pictures. In some aspects, MDP Unit 100 may include a software application or a function acting as an interface between a user and multi-directional still pictures and/or multi-directional motion pictures. For example, MDP Unit 100 may include a software application implemented by processor that may receive user's operating instructions, the processor may determine that the user may intend to access a particular picture within a particular multi-directional still picture or multi-directional motion picture, and the processor may transmit the desired picture to be presented to the user.

In some embodiments, MDP Unit 100 may be implemented as a Java Micro Edition (ME), Java Standard Edition (SE), or other Java Editions application or program (also referred to as Java or Java platforms). Java ME is specifically designed for mobile and embedded devices and it provides a robust and flexible environment for software applications with flexible user interfaces, robust security, built-in network protocols, powerful application programming interfaces, DBMS connectivity and interfacing functionalities, file manipulation capabilities, and support for networked and offline applications. Software applications based on Java ME are portable across many devices, yet leverage each device's native capabilities. The feature-reach Java SE is mainly designed for traditional computing devices, but more mobile and embedded devices continue to support it. Java SE supports the feature sets of most Smartphones and a broad range of high-end connected devices while still fitting within their resource constraints. Java platforms may include one or more basic application programming interfaces (APIs) and virtual machine features that comprise a runtime environment for software applications such as some embodiments of MDP Unit 100 that may be executed on mobile, embedded, and other computing devices. Java applications may provide a wide range of user-level functionalities that may be implemented in software applications such as some embodiments of MDP Unit 100, including, but not limited to, providing an Internet browser to a user, displaying text and graphics, playing and recording audio media, displaying and recording visual media, communicating with another mobile device, and other functionalities. In one example, MDP Unit 100 may be implemented as a Xlet within a Java platform. A Xlet may be a Java applet or application configured to execute on a mobile, embedded, and/or other computing device, that may be a part of the Java TV specification, and may use a Personal Basis Profile ("PBP") of a Connected Device Configuration ("CDC") for the Java ME platform. A Xlet may be managed by a special-purpose application-management software built into the mobile, embedded, and/or other computing device. Although, some implementations of MDP Unit 100 may include a Java program written for a Java platform, MDP Unit 100 is generally programming language, platform, and operating system independent. Programming languages that may be used additional to Java may include C, C++, Cobol, Java Script, Td, Visual Basic, Pascal, VB Script, Perl, PHP, Ruby, and/or other programming languages or functions capable of implementing the functionalities described herein.

Core Program 110 may comprise any software, hardware, or a combination of software and hardware. Core Program 110 may comprise functions and algorithms for directing and/or controlling the flow of instructions and data among the elements of MDP Unit 100. Core Program 110 may include any functionality to organize one or more pictures of an object into an interactive simulation or presentation of the object. Core Program 110 may organize a plurality of pictures, each depicting an object from a different location, a different angle or a different point of view, to enable the user to view the object from multitude of points of view in an interactive application. As such, Core Program 110 may enable a user to view all views (i.e. forward, backward, right, left, up, down, diagonal, angular, etc.) from all locations of a represented object as well as to simulate user's motion (i.e. stepping, etc.) through the represented object. Core Program 110 may be directly or operatively coupled with Multi-directional Pictures Repository 115, Input Interface 140, Output Interface 160, and/or other elements to produce desired results. Core Program 110 may be initiated by User 50 or it may be initiated automatically when Computing Device 70 turns on. Core Program 110 may run continuously as a deamon or it may run only as long as User 50 needs it.

Multi-directional Pictures Repository 115 may comprise any hardware, software or a combination of hardware and software. Multi-directional Pictures Repository 115 may include functions and algorithms for storing pictures (i.e. still or motion pictures, etc.) or references thereto, any data structures (i.e. multi-directional still or motion pictures, mazes, sequences, etc.) and/or other elements. In some embodiments, Multi-directional Pictures Repository 115 may comprise functions and algorithms for storing a data structure whose data fields may include pictures (i.e. still or motion pictures, etc.) or references thereto, any data structures (i.e. multi-directional still or motion pictures, mazes, sequences, etc.) and/or other elements. Pictures may include still or motion pictures (i.e. video, etc.), and/or any other visual content.

In some embodiments, Multi-directional Pictures Repository 115 may include a file, a data structure, an object, and/or other similar digital data repository. Core program 110 may read the Multi-directional Pictures Repository 115 by opening or connecting to the file, data structure, object, and/or other similar digital data repository, and accessing the stored pictures (i.e. still or motion pictures, etc.) or references thereto, any data structures (i.e. multi-directional still or motion pictures, mazes, sequences, etc.) and/or other elements. In some aspects, Multi-directional Pictures Repository 115 may include plurality of files, data structures, objects, and/or other similar digital data repositories. In one example, all pictures (i.e. still or motion pictures, etc.) or references thereto, any data structures (i.e. multi-directional still or motion pictures, mazes, sequences, etc.) and/or other elements may be stored in one file. In another example, some or each of the pictures (i.e. still or motion pictures, etc.) or references thereto, any data structures (i.e. multi-directional still or motion pictures, mazes, sequences, etc.) and/or other elements may be stored in a separate file.

In other embodiments, Multi-directional Pictures Repository 115 may include a database management system (DBMS), a database, a system, a process, and/or other similar digital data repository. Core program 110 may read the Multi-directional Pictures Repository 115 by opening or connecting to the DBMS, database, system, process, and/or other similar digital data repository, and accessing the stored pictures (i.e. still or motion pictures, etc.) or references thereto, any data structures (i.e. multi-directional still or motion pictures, mazes, sequences, etc.) and/or other elements. In one example, Core Program 110 may connect to a DBMS, a database, or a similar repository or system through an ODBC connection. The inter-process interaction may occur on a single mobile, embedded or other computing device, or between two or more mobile, embedded or other computing devices over a network. Other elements or types of connections such as a database API, database driver, database bridge, specialized database interface, a socket, an operating system command, a global function, a local function, a direct command, etc. may be included, or some of the disclosed ones may be excluded, or a combination thereof may be utilized in alternate implementations of the connection between the Core Program 110 and the DBMS, database, or a similar repository. Upon connecting to a database, for example, Core Program 110 may transmit to the database a command or instruction set understood by the database. Subsequently, the database may perform an operation corresponding to the command or instruction set, and the database may transmit results (i.e. picture or a reference thereto that the user wanted to view, link, etc.) to the Core Program 110 for presentation to User 50. In some embodiments, the command or instruction set used may include a SQL statement, which may be platform independent and supported by a vast majority of commercial and open-source DBMSs. It should be clear to one of ordinary skill in art that the command or instruction set (i.e. SQL statement, etc.) discussed herein as an example, may be replaced by any type or form of command, instruction set or statement in any other language or script, as needed to conform to a given DBMS or database. In one example, a single table in a database may be used as Multi-directional Pictures Repository 115. As such, a multi-directional still or motion picture may be stored within the table where each of the data fields (i.e. still or motion pictures, links, etc.) of the multi-directional still or motion picture may be a record with a common identifier that signifies the data field's association with its parent multi-directional still or motion picture. Later in the process, a simple cal to the table to read records with a specific identifier would reconstruct data fields of the multi-directional still or motion picture. In another example of a single table in a database being used as Multi-directional Pictures Repository 115, a multi-directional still or motion picture may be stored within the table where each of the data fields of the multi-directional still or motion picture may be a field (i.e. column) in a record of the table. Later in the process, a simple call to the table to read fields of the record would reconstruct data fields of the multi-directional still or motion picture. In some embodiments, separate tables or databases may be utilized for each of the data structures used such as multi-directional still or motion pictures, mazes and/or sequences. In one example, records in a table may be utilized to store data fields of multi-directional still or motion pictures, tables may be utilized to store sequences of multi-directional still or motion pictures, and/or databases may be utilized to store mazes of multi-directional still or motion pictures and/or their sequences. In some embodiments, Multi-directional Pictures Repository 115 may include an entire DBMS with all of its database and tables dedicated to Multi-directional Pictures Repository 115.

In yet other embodiments, Multi-directional Pictures Repository 115 may be embedded within the Core Program 110 (i.e. hard coded). As such, Core program 110 may have direct access to the stored pictures (i.e. still or motion pictures, etc.) or references thereto, any data structures (i.e. multi-directional still or motion pictures, mazes, sequences, etc.) and/or other elements without utilizing an element such as the Multi-directional Pictures Repository 115.

In yet other embodiments, Multi-directional Pictures Repository 115 may include a separate file, a separate data structure, a separate object, a separate DBMS, a separate database, a separate system, a separate process, and/or other separate digital data repository or system for each of the pictures (i.e. still or motion pictures, etc.) or references thereto, any data structures (i.e. multi-directional still or motion pictures, mazes, sequences, etc.) and/or other elements. In one example, Multi-directional Pictures Repository 115 may include a file comprising definitions of data structures used such as multi-directional still or motion pictures, mazes, sequences, etc., which data structures may further comprise references to picture (i.e. still or motion picture, etc.) files. As such, Core program 110 may read the Multi-directional Pictures Repository 115 by opening or connecting to the file including the definitions of multi-directional still or motion pictures, mazes, sequences, etc. and by accessing the picture (i.e. still or motion picture, etc.) files through references included in the multi-directional still or motion pictures, mazes, sequences, etc.

In yet other embodiments, Multi-directional Pictures Repository 115 may include definitions of pictures (i.e. still or motion pictures, etc.) or references thereto, any data structures (i.e. multi-directional still or motion pictures, mazes, sequences, etc.) and/or other elements. Such definitions may be embedded in other files or programs such as HTML, XML, Perl, PHP, Ruby, Java, Java Script, C++, Visual Basic, or other similar files or programs. In one example, Multi-directional Pictures Repository 115 may include a collection of definitions embedded into a HTML file. Such collection of definitions may define any data structures used (i.e. multi-directional still or motion pictures, mazes, sequences, etc.) that may further comprise references to picture (i.e. still or motion pictures, etc.) files. As such, Core program 110 may read the Multi-directional Pictures Repository 115 by opening the HTML file including the definitions of the data structures (i.e. multi-directional still or motion pictures, mazes, sequences, etc.) and by accessing picture files through the references included in the data structures (i.e. multi-directional still or motion pictures, mazes, sequences, etc.) In some embodiments, Core Program 110 itself may be embedded into HTML, XML, Perl, PHP, Ruby, Java, Java Script, Active X, C++, Visual Basic, or other similar files or programs.

Input Interface 140 may comprise any hardware, software or a combination of hardware and software. Input Interface 140 may include functions and algorithms for processing input events of the Keyboard 150 and/or other input devices for use by Core Program 110 or other elements of the disclosed methods, systems and apparatuses. Input Interface 140 may include Java keyboard listener, keypad listener, touch screen listener, mouse listener, trackball listener, any device driver (i.e. audio, video, keyboard, mouse, or other driver), speech recognizer, video recognizer, and/or any other input interface. Input Interface 140 may be or comprise any functionality of I/O control 22, keyboard 23, and/or I/O device 13.

Keyboard 150 may comprise any hardware, software or a combination of hardware and software. Keyboard 150 may include functions and algorithms for inputting letters, numbers and/or symbols into the Computing Device 70. Keyboard 150 may be suited or specialized for a mobile device, tablet or a Smartphone. Keyboard 150 may be or comprise any functionality of keyboard 23, I/O device 13 and/or I/O control 22. In some embodiments, Keyboard 150 may be an element of the disclosed methods, systems and apparatuses through which User 50 may input operating instructions by pressing keys or buttons. It should be understood by one of ordinary skill in art that other input devices for detecting user input may be utilized in place of Keyboard 150 such as keypad, touch screen, external keyboard, mouse, trackball, microphone, control wheel, remote control, video or still camera, tactile input device, and/or any other input device known in art. Keyboard 150 or any of the alternative input devices may include any press-able key of the Keyboard 150, any push-able button of the Computing Device 70 or an external input device (i.e. joystick, etc.), any touch-able areas of a touch screen, any click-able component of the Computing Device 70 or an external input device (i.e. mouse, etc.), any slide-able component of the Computing Device 70 or an external input device, or any other graphical or physical elements that may enable a user to input instructions or data.

Output Interface 160 may comprise any hardware, software or a combination of hardware and software. Output Interface 160 may include functions and algorithms for processing output from Core Program 110 or other elements of the disclosed methods, systems and apparatuses for presentation to a user. In some embodiments, Output Interface 160 may include functions and algorithms for processing results from Core Program 110 for viewing by User 50 on Display 170. Output Interface 160 may include a Java graphical user interface, an acoustical output interface, tactile output interface, any device driver (i.e. audio, video, or other driver), and/or any other output interface known in art. Output interface 160 may be or comprise any functionality of I/O control 22, display devices 21, and/or I/O device 13.

Display 170 may comprise any hardware, software or a combination of hardware and software. Display 170 may include functions and algorithms for displaying or rendering information to a user. In some embodiments, Display 170 may comprise functions and algorithms for showing results from Core Program 110 to the User 50. It should be understood by one of ordinary skill in art that other output devices for conveying information may be utilized such as a touch screen, projector, an external monitor, a speaker, tactile output device, and/or any other output device known in art. Display 170 may be or comprise any functionality of display devices 21, I/O control 22, and/or I/O device 13.

Memory 180 may comprise any hardware, software or a combination of hardware and software. Memory 180 may include functions and algorithms for electronically storing data or information. In some embodiments, Memory 180 may comprise functions and algorithms for temporarily storing programs (i.e. Core Program 110, etc.) and/or data (Multi-directional Pictures Repository 115, pictures or references thereto, any data structures, etc.) currently running on the Computing Device 70. Memory 180 may include a random access memory (RAM), and/or any other memory. Memory 180 may be or comprise any functionality of storage 27, cache 14, and/or main memory 12.

Physical Storage Medium 181 may comprise any hardware, software or a combination of hardware and software. Physical Storage Medium 181 may include functions and algorithms for electronically storing data or information. In some embodiments, Physical Storage Medium 181 may comprise functions and algorithms for permanently storing programs (i.e. Core Program 110, etc.) and/or data (Multi-directional Pictures Repository 115, pictures or references thereto, any data structures, etc.). Physical Storage Medium 181 may include a hard drive, a microSD card, a flash drive, and/or any other physical storage medium. Physical storage medium 181 may be or comprise any functionality of storage 27.

Figure 3:
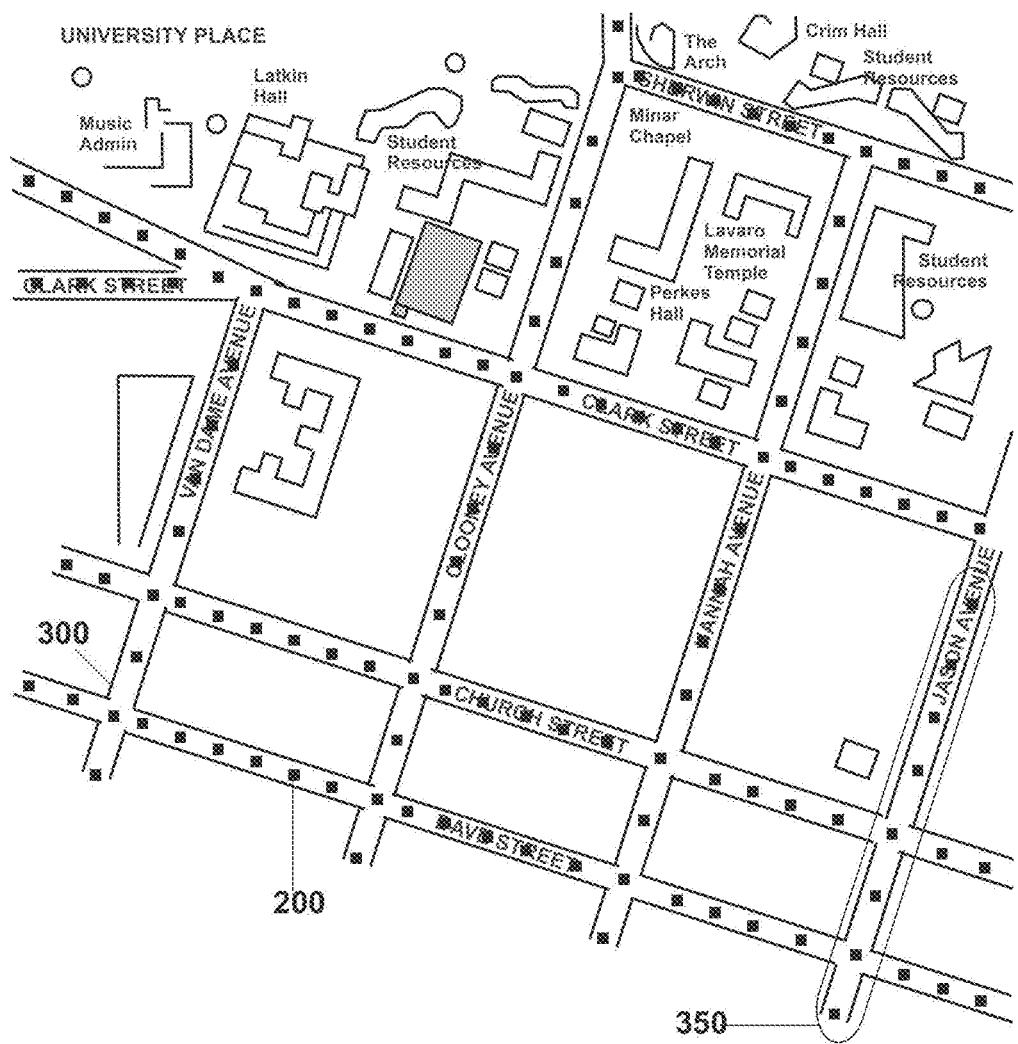
FIG. 3 shows an embodiment of MDP Unit 100 implemented to represent a park.

Referring to FIG. 3, a collection of Multi-directional Still Pictures 200 representing an object such as a park is illustrated, for example. Such collection of Multi-directional Still Pictures 200 representing an object may enable a user to visually experience the object such as a park where every step may include a view of what a user would see stepping down the park's walkways at a specific point in time. In some aspects, Multi-directional Still Pictures 200, Maze 300, and/or Multi-directional Picture Sequences 350 may be applied on the park's walkways where the park may be or include the object represented by MDP Unit 100. Multi-directional Still Pictures 200, Maze 300, and/or Multi-directional Picture Sequences 350 may be arranged and/or interconnected to correspond to the shape of the park's walkways. In some embodiments, MDP Unit 100 may be implemented to include (1) Multi-directional Still Pictures 200, and/or (2) a means for a user to move among Multi-directional Still Pictures 200. In other embodiments, MDP Unit 100 may be implemented to include (1) Multi-directional Picture Sequences 350 that may comprise Multi-directional Still Pictures 200 of each of the park's continuous walkways, and/or (2) a means for a user to connect with Multi-directional Picture Sequences 350 and/or move among Multi-directional Still Pictures 200. In yet other embodiments, MDP Unit 100 may be implemented to include (1) a Maze 300 that may comprise Multi-directional Still Pictures 200 and/or Multi-directional Picture Sequences 350, and/or (2) a means for a user to connect with Multi-directional Picture Sequences 350 and/or move among Multi-directional Still Pictures 200. Other additional elements may be included as needed, or some of the disclosed ones may be excluded, or a combination thereof may be utilized in alternate embodiments. In general, the term moving among Multi-directional Still Pictures 200 may refer to moving, connecting, linking, shifting, or switching from one Multi-directional Still Picture 200 to another. As such, moving among Multi-directional Still Pictures 200 may enable a user to experience a represented object one picture at a time in an arrangement in which they would appear in reality had the user actually been at the scene of the object. It should be understood that park, interior of a building, room and/or other objects described herein are used as examples of objects that may be represented by a MDP application. Any objects may be represented including linear objects, two dimensional objects, multi-dimensional objects, multi-directional objects, multi-leveled objects, branched objects, systems of objects, connected objects, collections of objects, and/or any other objects. Represented objects may include real world objects such as parks, streets, campuses, buildings, houses, stadiums, cities, museums, rooms, persons, vehicles, furniture, and/or any other conceivable real world objects. Represented objects may also include computer generated objects such as computer generated parks, computer generated streets, computer generated campuses, computer generated buildings, computer generated houses, computer generated stadiums, computer generated cities, computer generated museums, computer generated rooms, computer generated persons, computer generated vehicles, computer generated furniture, and/or any other conceivable computer generated objects. A represented object may include a microscopic object such as bacteria and/or any other microscopic object. A represented object may include a gigantic object such as a planet and/or any other gigantic object. A represented object may include any number of other objects within it that may also be represented by MDP application.

Multi-directional Picture Sequence 350 may comprise any software or a combination of hardware and software. Multi-directional Picture Sequence 350 may include functions and algorithms for organizing and/or storing Multi-directional Still Pictures 200. In some embodiments in which Multi-directional Picture Sequences 350 may be used, a Multi-directional Picture Sequence 350 may include Multi-directional Still Pictures 200 created in a sequential order. In other embodiments in which Multi-directional Picture Sequences 350 may be used, a Multi-directional Picture Sequence 350 may include Multi-directional Still Pictures 200 that may correspond to a branch of Maze 300 as each continuous branch of Maze 300 can be seen as a sequence. MDP Unit 100 is independent of any data structures used, and may utilize any sequence-like or other suitable data structures. These data structures may include, but are not limited to, arrays, linked lists, doubly linked lists, records in a table of a database, and/or any other suitable data structures that may enable implementation of features and functionalities described herein. In general, MDP Unit 100 may include Multi-directional Still Pictures 200 positioned in locations of a represented object where Multi-directional Still Pictures 200 may be interlinked in any conceivable manner. Therefore, each MDP application may possess its own unique data structures depending on the represented object, and/or on links defined among Multi-directional Still Pictures 200. It should not be understood that the term sequence only indicates representation of a straight lined object or a portion thereof. A Multi-directional Picture Sequence 350 may represent an object or a portion thereof with straight physical lineup (i.e. a straight lined walkway in a park, etc.), any type of curved lineup (i.e. a curved walkway in a park, a path through multiple walkways in a park, etc.), or any other type of lineup (i.e. zig-zag, etc.). In some embodiments, a Multi-directional Picture Sequence 350 may include an actual data structure used to organize and/or store Multi-directional Still Pictures 200. In other embodiments, Multi-directional Picture Sequence 350 may be conceptual used to organize Multi-directional Still Pictures 200 in user's mind in which case an actual Multi-directional Picture Sequence 350 data structure may not be used.

Maze 300 may comprise any software or a combination of hardware and software. Maze 300 may include functions and algorithms for organizing and/or storing Multi-directional Still Pictures 200 and/or Multi-directional Picture Sequences 350. MDP Unit 100 is independent of any data structures used, and may utilize any maze-like or other suitable data structures. These data structures may include, but are not limited to, multi-dimensional mazes, stacked mazes, connected mazes and/or any other suitable data structures that may enable implementation of features and functionalities described herein. In general, MDP Unit 100 may include Multi-directional Still Pictures 200 positioned in locations of a represented object where Multi-directional Still Pictures 200 may be interlinked in any conceivable manner. Therefore, each MDP Unit 100 implementation may possess its own unique data structures depending on the represented object, and/or on links defined among Multi-directional Still Pictures 200. In some embodiments, Maze 300 may be an actual data structure used to organize and/or store Multi-directional Still Pictures 200 and/or Multi-directional Picture Sequences 350. In other embodiments, Maze 300 may be conceptual used to organize Multi-directional Still Pictures 200 and/or Multi-directional Picture Sequences 350 in user's mind in which case an actual Maze 300 data structure may not be used.

Figure 4:
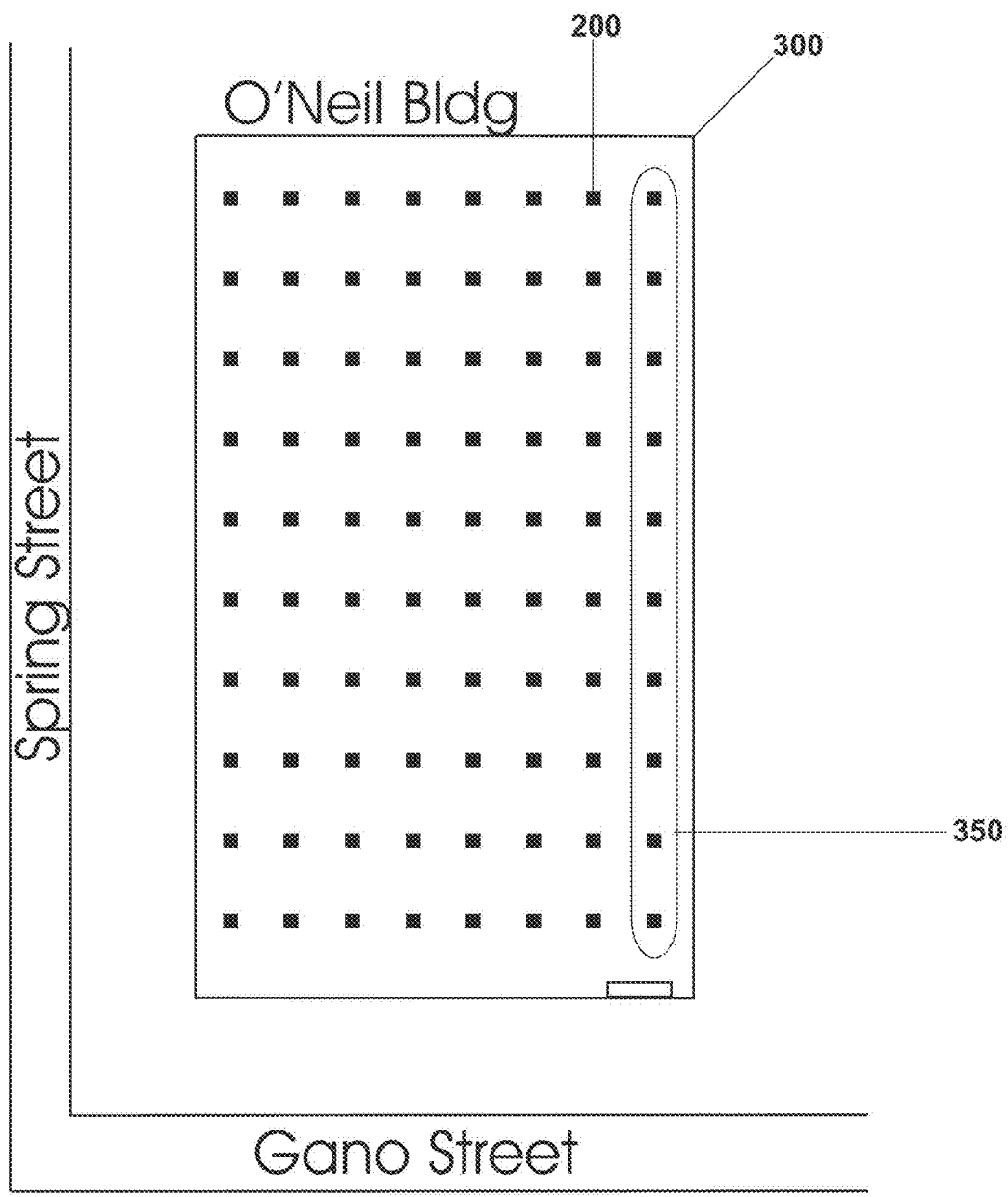
FIG. 4 shows an embodiment of MDP Unit 100 implemented to represent interior of a building.

Referring to FIG. 4, an embodiment of MDP Unit 100 implemented to represent an object such as interior of a building (i.e. room, etc.) is illustrated, for example. Such embodiment may enable a user to visually experience an object such as interior of a building where every step may contain a view of what a user would see stepping through interior of the building at a specific point in time. Any of the previously described elements such as Multi-directional Still Picture 200, Multi-directional Picture Sequence 350, Maze 300 and/or other elements may be included in any embodiments of MDP Unit 100 implemented to represent interior of a building and/or any other objects. Other additional elements may be included as needed, or some of the disclosed ones may be excluded, or a combination thereof may be utilized in alternate embodiments.

Figure 5:
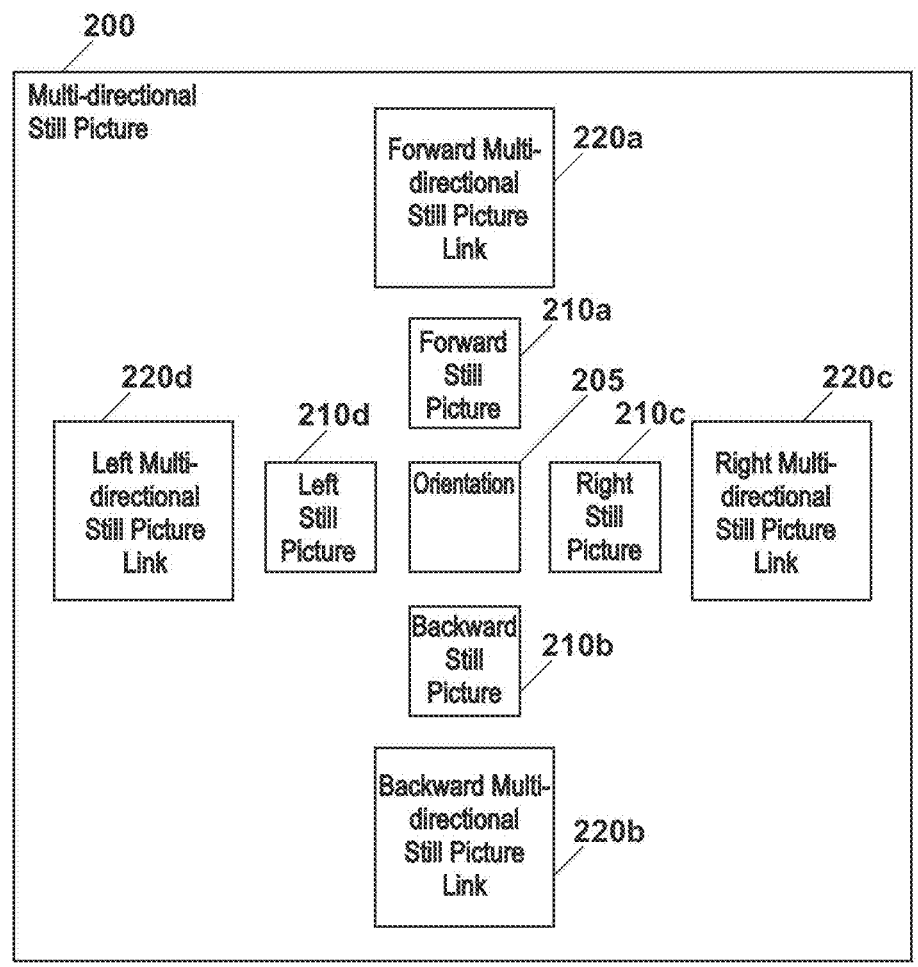
FIG. 5 is a diagram showing an embodiment of a Multi-directional Still Picture 200.

Referring to FIG. 5, Multi-directional Still Picture 200 may comprise any software or a combination of hardware and software. Multi-directional Still Picture 200 may include functions and algorithms for organizing and/or storing one or more Still Pictures 210 or references thereto, and/or one or more Multi-directional Still Picture Links 220. In some embodiments, a Multi-directional Still Picture 200 may include functions and algorithms for organizing and/or storing one or more Still Pictures 210 or references thereto, one or more Multi-directional Still Picture Links 220, and/or an Orientation 205. In other embodiments, a Multi-directional Still Picture 200 may include functions and algorithms for organizing and/or storing a data structure whose data fields may include one or more Still Pictures 210 or references thereto, one or more Multi-directional Still Picture Links 220, and/or an Orientation 205. In one example, a Multi-directional Still Picture 200 may include a data structure comprising nine data fields: (1) Forward Still Picture 210a or reference thereto, (2) Backward Still Picture 210b or reference thereto, (3) Right Still Picture 210c or reference thereto, (4) Left Still Picture 210d or reference thereto, (5) Forward Multi-directional Still Picture Link 220a, (6) Backward Multi-directional Still Picture Link 220b, (7) Right Multi-directional Still Picture Link 220c, (8) Left Multi-directional Still Picture Link 220d, and (9) Orientation 205. In general, MDP Unit 100 may enable a user to view all conceivable views or angles from a location represented by a Multi-directional Still Picture 200, and/or may enable a user to move among Multi-directional Still Pictures 200 in all conceivable directions. As such, additional Still Pictures 210 may be included, but are not limited to, up Still Picture, down Still Picture, diagonal Still Picture, behind Still Picture, turn around Still Picture, reverse Still Picture, oblique Still Picture (i.e. circular, elliptical, etc.), and/or others. Also, additional Multi-directional Still Picture Links 220 may be included, but are not limited to, up link, down link, diagonal link, behind link, turn around link, reverse link, oblique link (i.e. circular, elliptical, etc.), and/or others. Multi-directional Still Picture 200 may include some or all the features and embodiments of the later described Multi-directional Motion Picture 400.

A Still Picture 210a, 210b, 210c, 210d, etc. may comprise any software or a combination of hardware and software. Still Picture 210a, 210b, 210c, 210d, etc. may include functions and algorithms for storing a digital picture or reference thereto. While Still Pictures 210 may be referred to or illustrated as Still Pictures 210a-d, one of ordinary skill in art will understand that they may indeed include any number of Still Pictures 210a-n. Still Pictures 210a, 210b, 210c, 210d, etc. may include any format of a digital image along with any software modifying, controlling or organizing that image. In some embodiments, a Still Picture 210a, 210b, 210c, 210d, etc. may include functions and algorithms for storing a data structure whose data field may include a digital picture or reference thereto. In general, a Still Picture 210a, 210b, 210c, 210d, etc. may include or refer to a collection of digitally colored dots (i.e. pixels). Such Still Picture 210a, 210b, 210c, 210d, etc. may include a digital bitmap, a JPEG picture, a GIF picture, a TIFF picture, a PDF picture, an animated picture (i.e. animated GIF picture, etc.), any computer-generated picture (i.e. a view of a 3D game or computer-aided design [CAD]/computer-aided manufacturing [CAM] application captured as a digital picture, etc.), any other digital picture or visual content, or an outside application or process of any type that may generate digital pictures or other visual content. In some aspects, a Still Picture 210a, 210b, 210c, 210d, etc. may include a reference or pointer to a digital picture or other visual content. In some embodiments, a user may create a Still Picture 210a, 210b, 210c, 210d, etc. by utilizing a digital camera, and/or any other digital picture taking equipment (i.e. still or motion picture taking equipment, etc.). Such digital picture taking equipment may be combined with an apparatus specially constructed for digital picture creation such as a tripod, rails, wheels, slidable components, robotic arm, and/or other such apparatuses or devices. In other embodiments, a user may create a Still Picture 210a, 210b, 210c, 210d, etc. by capturing a view (i.e. picture, frame, etc.) of a computer generated object (i.e. 3D game, CAD/CAM application, etc.). In other embodiments, a user may create a Still Picture 210a, 210b, 210c, 210d, etc. in a picture editing/creation software such as Adobe's Photoshop (i.e. pixel focused), Corel's Draw (i.e. vector focused), and/or any other picture editing/creation software. In some embodiments, a Still Picture 210a, 210b, 210c, 210d, etc. may be stored in a digital file in Memory 180 or Physical Storage Medium 181 of a Computing Device 70. Core Program 110 may then access and utilize the stored Still Picture 210a, 210b, 210c, 210d, etc. to implement the features and functionalities described herein.

A Multi-directional Still Picture Link 220a, 220b, 220c, 220d, etc. may comprise any software or a combination of hardware and software. Multi-directional Still Picture Link 220a, 220b, 220c, 220d, etc. may include functions and algorithms for storing a reference or pointer to a Multi-directional Still Picture 200. While Multi-directional Still Picture Links 220 may be referred to or illustrated as Multi-directional Still Picture Links 220*a-d*, one of ordinary skill in art will understand that they may indeed include any number of Multi-directional Still Picture Links 220*a-n*. A Multi-directional Still Picture Link 220*a*, 220*b*, 220*c*, 220*d*, etc. may include functions and algorithms for storing a data structure whose data field may include a reference or pointer to a Multi-directional Still Picture 200. In some embodiments, a Multi-directional Still Picture Link 220*a*, 220*b*, 220*c*, 220*d*, etc. may be undefined, non-existent or empty indicating no reference or pointer to a Multi-directional Still Picture 200. In other embodiments, a Multi-directional Still Picture Link 220*a*, 220*b*, 220*c*, 220*d*, etc. may include a reference or pointer to an outside application or process. A Multi-directional Still Picture Link 220*a*, 220*b*, 220*c*, 220*d*, etc. may be defined or created automatically by Core Program 110 or by a user through a means such as a graphical user interface. A Multi-directional Still Picture Link 220*a*, 220*b*, 220*c*, 220*d*, etc. may also be modified by Core Program 110 or by a user through a means such as a graphical user interface.

Orientation 205 may comprise any software or a combination of hardware and software. Orientation 205 may include functions and algorithms for storing orientation of a Multi-directional Still Picture 200. In some embodiments, Orientation 205 may include functions and algorithms for storing a data structure whose data field may include orientation of a Multi-directional Still Picture 200. In some embodiments, Orientation 205 may be associated with a direction of a Still Picture 210*a*, 210*b*, 210*c*, 210*d*, etc., with a direction of a Multi-directional Still Picture Link 220*a*, 220*b*, 220*c*, 220*d*, etc. and/or with any other direction. In some aspects, Orientation 205 may include absolute or relative orientation. Absolute Orientation 205 may include a reference point such as a side of the world (i.e. north, south, east, west, northeast, northwest, southeast, southwest, or any other side of the world), a nearby tree, a nearby mountain, a nearby building, or any other reference point. In some embodiments, absolute Orientation 205 may include an association between the reference point (i.e. north, south, east, west, tree, mountain, building, etc.) and a direction such as, for example, association of north with forward direction (any other associations may be defined without limitation). In other embodiments, absolute Orientation 205 may include an association between the reference point (i.e. north, south, east, west, tree, mountain, building, etc.) and a Still Picture 210*a*, 210*b*, 210*c*, 210*d*, etc. of a Multi-directional Still Picture 200 such as, for example, association of north with Forward Still Picture 210*a* (any other associations may be defined without limitation). In yet other embodiments, absolute Orientation 205 may include an association between the reference point (i.e. north, south, east, west, tree, mountain, building, etc.) and a Multi-directional Still Picture Link 220*a*, 220*b*, 220*c*, 220*d*, etc. of a Multi-directional Still Picture 200 such as, for example, association of north with Forward Multi-directional Still Picture Link 220*a* (any other associations may be defined without limitation). Relative Orientation 205 may include any direction (i.e. forward, backward, right, left, up, down, diagonal, angular, etc.) of a Still Picture 210*a*, 210*b*, 210*c*, 210*d*, etc., of a Multi-directional Still Picture Link 220*a*, 220*b*, 220*c*, 220*d*, etc., and/or any other relative direction. In some embodiments, relative Orientation 205 may include an association between a direction (i.e. forward, backward, right, left, up, down, diagonal, angular, etc.) and a Still Picture 210*a*, 210*b*, 210*c*, 210*d*, etc. of a Multi-directional Still Picture 200 such as, for example, association of forward direction with Forward Still Picture 210*a* (any other associations may be defined without limitation). In other embodiments, relative Orientation 205 may include an association between a direction (i.e. forward, backward, right, left, up, down, diagonal, angular, etc.) and a Multi-directional Still Picture Link 220*a*, 220*b*, 220*c*, 220*d*, etc. of a Multi-directional Still Picture 200 such as, for example, association of forward direction with Forward Multi-directional Still Picture Link 220*a* (any other associations may be defined without limitation).

In some embodiments, Orientation 205 may be used to determine which Still Picture 210*a*, 210*b*, 210*c*, 210*d*, etc. may be displayed. In other embodiments, Orientation 205 may be used to determine a default Still Picture 210*a*, 210*b*, 210*c*, 210*d*, etc. to be displayed when user moves from one Multi-directional Still Picture 200 to another. In yet other embodiments, Orientation 205 may be used to determine to which Multi-directional Still Picture 200 a specific Multi-directional Still Picture Link 220*a*, 220*b*, 220*c*, 220*d*, etc. points. A user may choose to change Orientation 205 or Core Program 110 may change Orientation 205 automatically as needed. In some aspects, Core Program 110 may change Orientation 205 automatically responsive to user's use or execution of Still Pictures 210*a*, 210*b*, 210*c*, 210*d*, etc. and/or Multi-directional Still Picture Links 220*a*, 220*b*, 220*c*, 220*d*, etc. In other aspects, Orientation 205 may change by user's rotating the view of a combined picture if picture stitching (later described) is used. MDP Unit 100 may include a setting for a user to choose the circumstances under which Core Program 110 may change Orientation 205. In one example where north may be used as absolute Orientation 205 and where north may be associated with forward direction, when user indicates a right motion by executing Right Multi-directional Still Picture Link 220*c*, Core Program 110 may display Forward Still Picture 210*a* of the destination Multi-directional Still Picture 200. In another example where north may be used as absolute Orientation 205 and where north may be associated with forward direction, user may first want to change the absolute Orientation 205 to east, and then when user indicates a right motion by executing Right Multi-directional Still Picture Link 220*c*, Core Program 110 may display Right Still Picture 210*c* of the destination Multi-directional Still Picture 200. In yet another example where north may be used as absolute Orientation 205 and where north may be associated with forward direction, when user indicates a right motion by executing Right Multi-directional Still Picture Link 220*c*, Core Program 110 may automatically change the absolute Orientation 205 to east and then display Right Still Picture 210*c* of the destination Multi-directional Still Picture 200. In one example where forward relative Orientation 205 may be used, when user indicates a right motion by executing Right Multi-directional Still Picture Link 220*c*, Core Program 110 may display Forward Still Picture 210*a* of the destination Multi-directional Still Picture 200. In another example where forward relative Orientation 205 may be used, when user indicates a right motion by executing Right Multi-directional Still Picture Link 220*c*, Core Program 110 may use the direction of the last executed Multi-directional Still Picture Link (i.e. Right Multi-directional Still Picture Link 220*c* in this example) to automatically change the relative Orientation 205 to right and then display Right Still Picture 210*c* of the destination Multi-directional Still Picture 200.

In some embodiments, responsive to a change in absolute or relative Orientation 205, Core Program 110 may redefine some or all Still Pictures 210a, 210b, 210c, 210d, etc. and/or some or all Multi-directional Still Picture Links 220a, 220b, 220c, 220d, etc. of some or al Multi-directional Still Pictures 200 to correspond to a new absolute or relative Orientation 205. In one example where north may be used as absolute Orientation 205 and where north may be associated with forward direction, when user indicates right view from a location represented by the current Multi-directional Still Picture 200 by executing Right Still Picture 210c, Core Program 110 may automatically change the absolute Orientation 205 of all Multi-directional Still Pictures 200 and redefine east as the new forward direction. Core Program 110 may perform the following redefinitions of Still Pictures and Multi-directional Still Picture Links of all Multi-directional Still Pictures 200: (1) Right Still Pictures 210c may be redefined as new Forward Still Pictures 210a, (2) Backward Still Pictures 210b may be redefined as new Right Still Pictures 210c, (3) Left Still Pictures 210d may be redefined as new Backward Still Pictures 210b, (4) Forward Still Pictures 210a may be redefined as new Left Still Pictures 210d, (5) Right Multi-directional Still Picture Links 220c may be redefined as new Forward Multi-directional Still Picture Links 220a, (6) Backward Multi-directional Still Picture Links 220b may be redefined as new Right Multi-directional Still Picture Links 220c, (7) Left Multi-directional Still Picture Links 220d may be redefined as new Backward Multi-directional Still Picture Links 220b, and (8) Forward Multi-directional Still Picture Links 220a may be redefined as new Left Multi-directional Still Picture Links 220d. Once redefinitions are complete, Core Program 110 may display the new Forward Still Picture 210a (previous Right Still Picture 210c before the redefinition) of the current Multi-directional Still Picture 200. Also, if a user indicates a forward movement by executing the new Forward Multi-directional Still Picture Link 220a (previous Right Multi-directional Still Picture Link 220c before the redefinition) of the current Multi-directional Still Picture 200, Core Program 110 may display the new Forward Still Picture 210a (previous Right Still Picture 210c before the redefinition) of the destination Multi-directional Still Picture 200. In one example where forward relative Orientation 205 may be used, when user indicates right view from a location represented by the current Multi-directional Still Picture 200 by executing Right Still Picture 210c, Core Program 110 may automatically change the relative Orientation 205 of all Multi-directional Still Pictures 200 and redefine right direction as the new forward direction. Core Program 110 may perform the following redefinitions of Still Pictures and Multi-directional Still Picture Links of all Multi-directional Still Pictures 200: (1) Right Still Pictures 210c may be redefined as new Forward Still Pictures 210a, (2) Backward Still Pictures 210b may be redefined as new Right Still Pictures 210c, (3) Left Still Pictures 210d may be redefined as new Backward Still Pictures 210b, (4) Forward Still Pictures 210a may be redefined as new Left Still Pictures 210d, (5) Right Multi-directional Still Picture Links 220c may be redefined as new Forward Multi-directional Still Picture Links 220a, (6) Backward Multi-directional Still Picture Links 220b may be redefined as new Right Multi-directional Still Picture Links 220c, (7) Left Multi-directional Still Picture Links 220d may be redefined as new Backward Multi-directional Still Picture Links 220b, and (8) Forward Multi-directional Still Picture Links 220a may be redefined as new Left Multi-directional Still Picture Links 220d. Once redefinitions are complete, Core Program 110 may display the new Forward Still Picture 210a (previous Right Still Picture 210c before the redefinition) of the current Multi-directional Still Picture 200. Also, if a user indicates a forward movement by executing the new Forward Multi-directional Still Picture Link 220a (previous Right Multi-directional Still Picture Link 220c before the redefinition) of the current Multi-directional Still Picture 200, Core Program 110 may display the new Forward Still Picture 210a (previous Right Still Picture 210c before the redefinition) of the destination Multi-directional Still Picture 200. In yet other examples, a similar change of absolute or relative Orientation 205 and redefinitions of Still Pictures 210a, 210b, 210c, 210d, etc. and/or Multi-directional Still Picture Links 220a, 220b, 220c, 220d, etc. of all Multi-directional Still Pictures 200 may be triggered by user's utilizing or executing any Multi-directional Still Picture Link 220a, 220b, 220c, 220d, etc.

Figure 6:
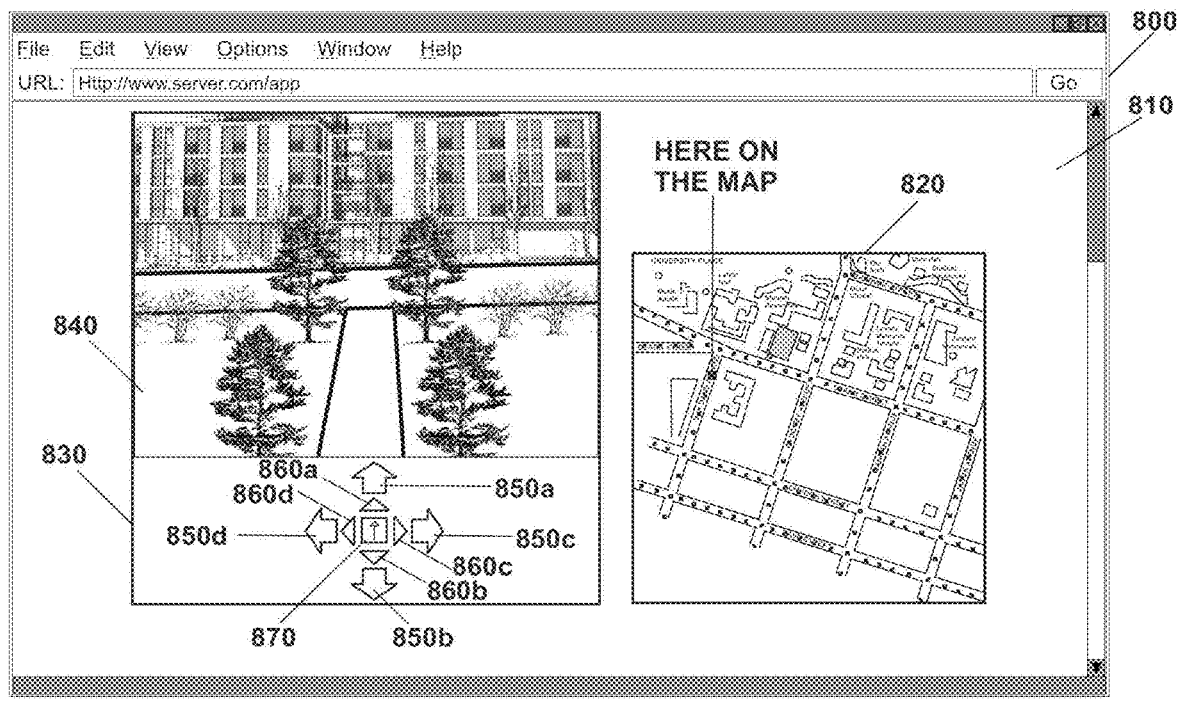
FIG. 6 shows an embodiment of MDP Unit 100 implemented in a web browser.
Figure 6:
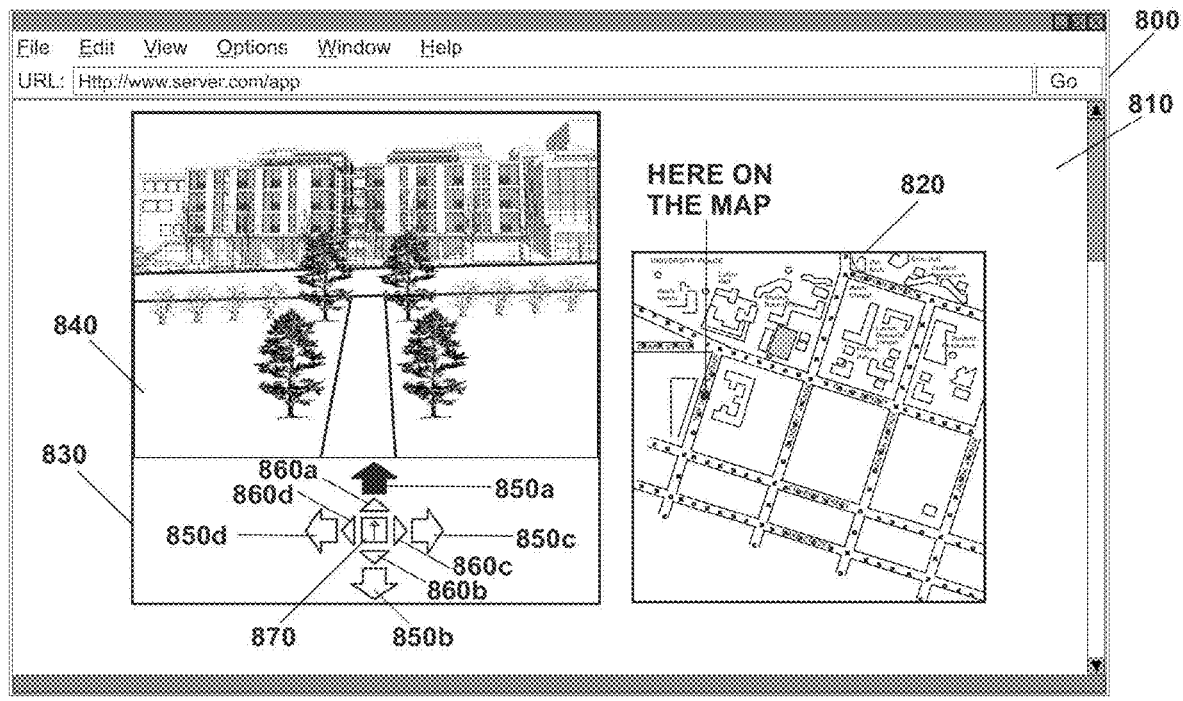

Referring to FIG. 6, an embodiment of MDP Unit 100 implemented as a web application in a web browser is illustrated. In some aspects, Core Program 110 may be implemented as an embeddable program such as a Java applet embedded into a Web Page 810 in which case Java applet may be visually represented by, or include, Window 830. In other aspects, Core Program 110 may be implemented as a standalone program such as a Java program that is not embedded into and does not use a web browser or any other application to realize the functionalities described herein. MDP Unit 100 is not limited to using a Java applet, Java program or any other programming language or platform described herein. MDP Unit 100 may be implemented using any programming language or platform including, but not limited to, HTML, XML, DHTML, Java, Java Script, C++, Visual Basic, Basic, Perl, PhP, Ruby and others. Languages and applications that MDP Unit 100 may be embedded into or implemented within include, but are not limited to, HTML, XML, DHTML, Java, Java Script, C++, Visual Basic, Basic, Pert, PhP, Ruby, web applications, activeX applications, flash applications, Microsoft applications, Lotus applications, Corel applications, Adobe applications, Netscape applications, Firefox applications, Google applications, Yahoo applications, Facebook applications, and others.

In one example where Core Program 110 may be implemented as Java applet, the following may be a statement embedded into Hypertext Markup Language (HTML) of Web Page 810 used to initiate Java applet:
<APPLET
ARCHIVE="MDP.jar"
CODE="MDP.class"
NAME="MDP"
HEIGHT=335 WIDTH=310>

In the above statement, ARCHIVE="MDP.jar" may be the name of the file where the Core Program's 110 executable code is stored. CODE="MDP.class" may be the object of the Core Program 110. NAME="MDP" may be the name of the Java applet within Web Page 810. HEIGHT=335 WIDTH=310 may be the height and width of the Java applet in pixels within Web Page 810.

Following an initiation of the Java applet, Core Program 110 may utilize Multi-directional Still Pictures 200 and/or any other data structures (i.e. sequences, maze, etc.) by accessing and reading Multi-directional Pictures Repository 115. Multi-directional Pictures Repository 115 may include data fields of Multi-directional Still Pictures 200 and/or any other data structures (i.e. sequences, maze, etc.) as well as information on which Multi-directional Still Picture 200 may be the initial one to execute. In some embodiments, Multi-directional Pictures Repository 115 and/or any information needed to utilize Multi-directional Still Pictures 200 and/or any other data structures (i.e. sequences, maze, etc.) may be embedded into HTML of Web Page 810. In one example, Multi-directional Pictures Repository 115 utilized in some embodiments may include:

<PARAM NAME=picture0 VALUE="picture0">
<PARAM NAME=forward_picture0 VALUE="Pic0.jpg">
<PARAM NAME=backward_picture0 VALUE="Pic1.jpg">
<PARAM NAME=right_picture0 VALUE="Pic2.jpg">
<PARAM NAME=left_picture0 VALUE="Pic3.jpg">
<PARAM NAME=forward_link0 VALUE="picture1">
<PARAM NAME=backward_link0 VALUE="null">
<PARAM NAME=right_link0 VALUE="null">
<PARAM NAME=left_link0 VALUE="null">
<PARAM NAME=picture1 VALUE="picture1">
<PARAM NAME=forward_picture1 VALUE="Pic4.jpg">
<PARAM NAME=backward_picture1 VALUE="Pic5.jpg">
<PARAM NAME=right_picture1 VALUE="Pic6.jpg">
<PARAM NAME=left_picture1 VALUE="Pic7.jpg">
<PARAM NAME=forward_link1 VALUE="picture2">
<PARAM NAME=backward_link1 VALUE="picture0">
<PARAM NAME=right_link1 VALUE="picture3">
<PARAM NAME=left_link1 VALUE="picture4">
. . .

The first set of definitions (first nine lines of the above code) may include an initial Multi-directional Still Picture 200 to be executed when Core Program 110 starts.

<PARAM NAME=picture0 VALUE="picture0"> may indicate that the initial Multi-directional Still Picture 200 may be a Multi-directional Still Picture 200 named "picture0".

<PARAM NAME=forward_picture0 VALUE="Pic0.jpg"> may indicate that Forward Still Picture 210*a* of the initial Multi-directional Still Picture 200 may be a digital picture named "Pic0.jpg".

<PARAM NAME=backward_picture0 VALUE="Pic1.jpg"> may indicate that Backward Still Picture 210*b* of the initial Multi-directional Still Picture 200 may be a digital picture named "Pic1.jpg".

<PARAM NAME=right_picture0 VALUE="Pic2.jpg"> may indicate that Right Still Picture 210*c* of the initial Multi-directional Still Picture 200 may be a digital picture named "Pic2.jpg".

<PARAM NAME=left_picture0 VALUE="Pic3.jpg"> may indicate that Left Still Picture 210*d* of the initial Multi-directional Still Picture 200 may be a digital picture named "Pic3.jpg".

<PARAM NAME=forward_link0 VALUE="picture1"> may indicate that Forward Multi-directional Still Picture Link 220*a* of the initial Multi-directional Still Picture 200 may point to a Multi-directional Still Picture 200 named "picture1".

<PARAM NAME=backward_link0 VALUE="null"> may indicate that Backward Multi-directional Still Picture Link 220*b* of the initial Multi-directional Still Picture 200 may be empty and may not point to a Multi-directional Still Picture 200 or to an outside application or process.

<PARAM NAME=right_link0 VALUE="null"> may indicate that Right Multi-directional Still Picture Link 220*c* of the initial Multi-directional Still Picture 200 may be empty and may not point to a Multi-directional Still Picture 200 or to an outside application or process.

<PARAM NAME=left_link0 VALUE="null"> may indicate that Left Multi-directional Still Picture Link 220*d* of the initial Multi-directional Still Picture 200 may be empty and may not point to a Multi-directional Still Picture 200 or to an outside application or process.

The second set of definitions (next nine lines of the above code) follows the same logic of utilizing a next Multi-directional Still Picture 200 based on the above-described process. " . . . " indicates that any number of additional Multi-directional Still Pictures 200 may be utilized by the same process.

Web Browser 800 may comprise any software or a combination of hardware and software. Web Browser 800 may include functions and algorithms for accessing, presenting and/or navigating information. Web Browser 800 may include functions and algorithms for accessing, presenting and/or navigating information accessible over a network. Information may include Web Pages 810, software applications, programs, databases, and/or any other information or resource. Examples of Web Browsers 800 include Mozilla Firefox, Google Chrome, Netscape Navigator, Microsoft Internet Explorer, and others.

Web Page 810 may comprise any software or a combination of hardware and software. Web Page 810 may include functions and algorithms for storing information. Web Page 810 may include functions and algorithms for storing information readable by a Web Browser 800 or by any other software application, program, device, and/or system able to read web pages. In some embodiments, Web Page 810 may be stored in a file that may reside on a Remote Computing Device 1310 (later described) accessible over a Network 1300 (later described). In other embodiments, Web Page 810 may be stored in a file that may reside on a user's Computing Device 70. In yet other embodiments, Web Page 810 may be dynamically created by a program and delivered over a network. Examples of Web Page 810 formats and/or programs that may dynamically create Web Pages 810 include HTML, XML, DHTML, Java Script, Perl, PhP, Ruby, and others.

Window 830 may comprise any hardware, software or a combination of hardware and software. Window 830 may include functions and algorithms for visual representation of an instance of MDP Unit 100. In some embodiments, Window 830 may include Picture Display 840, Forward Direction Arrow 850*a*, Backward Direction Arrow 850*b*, Right Direction Arrow 850*c*, Left Direction Arrow 850*d*, Forward Picture Arrow 860*a*, Backward Picture Arrow 860*b*, Right Picture Arrow 860*c*, Left Picture Arrow 860*d*, and/or Orientation Pointer 870. Other additional elements may be included as needed, or some of the disclosed ones may be excluded, or a combination thereof may be utilized in alternate embodiments.

Picture Display 840 may comprise any hardware, software or a combination of hardware and software. Picture Display 840 may include functions and algorithms for showing or rendering (i.e. depicting, etc.) pictures to the user. Picture Display 840 may include functions and algorithms for showing or rendering Still Pictures 210*a*, 210*b*, 210*c*, 210*d*, etc., or Motion Pictures 410*a*, 410*b*, 410*c*, 410*d*, etc. (later described). Picture Display 840 may also show or render any other visual content including visual content generated by outside applications or processes in which case the user may interact with the outside application or process through Picture Display 840. In general, Picture Display 840 may show any visual content and/or enable any interaction with an outside application or process as long as Picture Display 840 may (1) access an interpreter that may include information on how to graphically interpret a particular visual content, or (2) access an interface that may include information on how to interact with a particular outside application or process. Such interpreter or interface may include a plugin (also referred to as addin, extension, etc.) such as a plugin for Java Virtual Machine that may be installed in Web Browser 800, a Web application plugin, an ActiveX plugin, a Flash plugin, a Microsoft plugin, a Lotus plugin, a Corel plugin, a Adobe plugin, a Netscape plugin, a Firefox plugin, a Google plugin, a Yahoo plugin, a Facebook plugin, any driver, any program or file such as HTML, XML, DHTML, Java, Java Script, C++, Visual Basic, Basic, Perl, PhP, and others.

Direction Arrow 850a, 850b, 850c, 850d, etc. may comprise any hardware, software or a combination of hardware and software. Direction Arrow 850a, 850b, 850c, 850d, etc. may include functions and algorithms for referencing Multi-directional Still Picture Link 220a, 220b, 220c, 220d, etc, or Multi-directional Motion Picture Link 420a, 420b, 420c, 420d, etc. (later described). Each Direction Arrow 850a, 850b, 850c, 850d, etc. may be associated with its corresponding Multi-directional Still Picture Link 220a, 220b, 220c, 220d, etc, or Multi-directional Motion Picture Link 420a, 420b, 420c, 420d, etc. In addition to Forward Direction Arrow 850a, Backward Direction Arrow 850b, Right Direction Arrow 850c, and Left Direction Arrow 850d, any number of other Direction Arrows may be utilized including up Direction Arrow, down Direction Arrow, diagonal Direction Arrow, angular Direction Arrow, behind Direction Arrow, turn around Direction Arrow, reverse Direction Arrow, oblique Direction Arrow (i.e. circular, elliptical, etc.), and others. In general, any Direction Arrow may be utilized corresponding to its associated Multi-directional Still Picture Link or Multi-directional Motion Picture Link. In some embodiments, Direction Arrow 850a, 850b, 850c, 850d, etc. may be implemented as a push button (i.e. web form push button, etc.). In other embodiments, Direction Arrow 850a, 850b, 850c, 850d, etc. may be implemented as a picture or other visual representation of a direction sign. User may select or activate Direction Arrow 850a, 850b, 850c, 850d, etc. by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with particular Direction Arrow 850a, 850b, 850c, 850d, etc. When a user selects a Direction Arrow 850a, 850b, 850c, 850d, etc., Core Program 110 may execute a Multi-directional Still Picture Link 220a, 220b, 220c, 220d, etc, or a Multi-directional Motion Picture Link 420a, 420b, 420c, 420d, etc. associated with the selected Direction Arrow 850a, 850b, 850c, 850d, etc. In some embodiments, certain areas on the Picture Display 840 may be associated with Multi-directional Still Picture Links 220a, 220b, 220c, 220d, etc, or Multi-directional Motion Picture Links 420a, 420b, 420c, 420d, etc. in which case Direction Arrows 850a, 850b, 850c, 850d, etc. may be used as secondary input means or not used at all. In one example, a user's clicking on any part of a park's forward walkway depicted in a Still Picture 210a, 210b, 210c, 210d, etc, or Motion Picture 410a, 410b, 410c, 410d, etc. may execute Forward Multi-directional Still Picture Link 220a or Forward Multi-directional Motion Picture Link 420a without using Direction Arrows 850a, 850b, 850c, 850d, etc.

Picture Arrow 860a, 860b, 860c, 860d, etc. may comprise any hardware, software or a combination of hardware and software. Picture Arrow 860a, 860b, 860c, 860d, etc. may include functions and algorithms for referencing Still Picture 210a, 210b, 210c, 210d, etc, or Motion Picture 410a, 410b, 410c, 410d, etc. (later described). Each Picture Arrow 860a, 860b, 860c, 860d, etc. may be associated with its corresponding Still Picture 210a, 210b, 210c, 210d, etc, or Motion Picture 410a, 410b, 410c, 410d, etc. In addition to Forward Picture Arrow 860a, Backward Picture Arrow 860b, Right Picture Arrow 860c, and Left Picture Arrow 860d, any number of other Picture Arrows may be utilized including up Picture Arrow, down Picture Arrow, diagonal Picture Arrow, angular Picture Arrow, behind Picture Arrow, turn around Picture Arrow, reverse Picture Arrow, oblique Picture Arrow (i.e. circular, elliptical, etc.), and others. In general, any Picture Arrow may be utilized corresponding to its associated Still Picture or Motion Picture. In some embodiments, Picture Arrow 860a, 860b, 860c, 860d, etc. may be implemented as a push button (i.e. web form push button, etc.). In other embodiments, Picture Arrow 860a, 860b, 860c, 860d, etc. may be implemented as a picture or other visual representation of a directional sign. User may select or activate Picture Arrow 860a, 860b, 860c, 860d, etc. by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with particular Picture Arrow 860a, 860b, 860c, 860d, etc. When a user selects a Picture Arrow 860a, 860b, 860c, 860d, etc., Core Program 110 may execute a Still Picture 210a, 210b, 210c, 210d, etc, or Motion Picture 410a, 410b, 410c, 410d, etc. associated with the selected Picture Arrow 860a, 860b, 860c, 860d, etc.

Orientation Pointer 870 may comprise any hardware, software or a combination of hardware and software. Orientation Pointer 870 may include functions and algorithms for referencing Orientation 205. Orientation Pointer 870 may be associated with any absolute or relative Orientation 205 previously described such as north, south, east, west, northeast, northwest, southeast, southwest, tree, mountain, building, forward, backward, right, left, angular, and others. In some embodiments, Orientation Pointer 870 may be implemented as a push button (i.e. web form push button, etc.). In other embodiments, Orientation Pointer 870 may be implemented as a picture or other visual representation of an orientation sign. User may select or activate Orientation Pointer 870 by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with Orientation Pointer 870. Once a user selects Orientation Pointer 870, any means of changing Orientation 205 may be utilized such as selecting orientation choices (i.e. north, south, east, west, northeast, northwest, southeast, southwest, tree, mountain, building, forward, backward, right, left, angular, etc.) from a list, utilizing directional signs (i.e. arrows, pointers, etc.) representing orientation choices, utilizing x, y, and z axes and/or any coordinates representing orientation choices in 3D objects or spaces, sliding a wheel component (i.e. control wheel, etc.) of an input device in the direction of orientation choices, or any other means of changing Orientation 205. When a user selects Orientation Pointer 870 including any sub-selections, Core Program 110 may change Orientation 205. In some embodiments, responsive to a change in Orientation 205, Core Program 110 may redefine some or all Still Pictures 210a, 210b, 210c, 210d, etc. and/or some or all Multi-directional Still Picture Links 220a, 220b, 220c, 220d, etc. of some or all Multi-directional Still Pictures 200 to correspond to a new Orientation 205 as previously described. In other embodiments, responsive to a change in Orientation 205, Core Program 110 may redefine some or all Motion Pictures 410a, 410b, 410c, 410d, etc. and/or some or all Multi-directional Motion Picture Links 420a, 420b, 420c, 420d, etc. of some or all Multi-directional Motion Pictures 400 to correspond to a new Orientation 205.

Map 820 may comprise any hardware, software or a combination of hardware and software. Map 820 may include functions and algorithms for representation of an object and/or its associated Multi-directional Still Pictures 200 or Multi-directional Motion Pictures 400 in a miniaturized form. In some embodiments, Map 820 may be implemented as a digital picture comprising locations (i.e. "hot spots") that a user can click to quickly move to a specific Multi-directional Still Picture 200 or Multi-directional Motion Picture 400 of interest. In such embodiments, Map 820 may be an example of an outside application or process that may execute Multi-directional Still Pictures 200 within Core Program 110. Such execution may be implemented using one or more global functions accessible or executable by the outside application or process. Global functions are widely used in software design where applications or processes need to execute each other's internal functions. Such global functions may be available within the Java platform, the operating system, any system elements, or any elements of the Computing Device 70. Such global functions may further have access to one or more Core Program's 110 internal functions, objects, or procedures. In the case that an outside application or process may need to execute a Multi-directional Still Picture 200 or Multi-directional Motion Picture 400, it may first execute a global function including passing any parameters to the global function. The executing global function may then reference and execute a desired Multi-directional Still Picture 200 or Multi-directional Motion Picture 400 execution function, or any other internal function within the Core Program 110. In one example, an outside application or process such as the Map 820 may execute a specific Multi-directional Still Picture 200 or Multi-directional Motion Picture 400 associated with a clickable location (i.e. "hot spot") of interest on the Map 820. Clicking on a location (i.e. "hot spot") of interest may enable a user to quickly display a Multi-directional Still Picture 200 or Multi-directional Motion Picture 400 associated with the clicked location (i.e. "hot spot") of interest without having to move among other Multi-directional Still Pictures 200 or Multi-directional Motion Picture 400 to arrive at such location of interest. The outside application or process (i.e. Map 820 in this example) may execute a global function including passing to it parameters such as an identifier of the Multi-directional Still Picture 200 or Multi-directional Motion Picture 400 to be executed. The executing global function may then execute a desired Core Program's 110 internal function such as Multi-directional Still Picture 200 or Multi-directional Motion Picture 400 execution function. In some embodiments, a Core Program's internal function may be defined as a global function in which case outside applications or processes would have direct access to it. In general, an outside application or process may execute any Core Program's 110 internal function that is defined as a global function or for which there exists a global function accessible or executable by an outside application or process.

In some embodiments, a Multi-directional Still Picture Link 220a, 220b, 220c, 220d, etc, or Multi-directional Motion Picture Link 420a, 420b, 420c, 420d, etc. may include a reference or pointer to an outside application or process which the Core Program 110 may interact with or execute. In some aspects, such execution may be implemented using one or more global functions accessible or executable by Core Program 110. As previously described, global functions are widely used in software design where applications or processes need to execute each other's internal functions and, as such, global functions may enable the Core Program 110 to access one or more internal functions, objects, or procedures of outside applications or processes. In the case that Core Program 110 needs to execute an outside application or process, it may first execute a global function including passing any parameters to the global function. The executing global function may then reference and execute a desired function of the outside application or process. In one example, a Multi-directional Still Picture Link 220a, 220b, 220c, 220d, etc, or Multi-directional Motion Picture Link 420a, 420b, 420c, 420d, etc. may point to an outside application or process such as a web page that may contain information about an object or location pointed to by the Multi-directional Still Picture Link 220a, 220b, 220c, 220d, etc, or Multi-directional Motion Picture Link 420a, 420b, 420c, 420d, etc. Core Program 110 may execute the outside application or processes (i.e. open a web browser and show the web page in this example, etc.) by executing a global function including passing to it parameters such as a URL of the web page to be viewed in the web browser. The executing global function may then execute a desired internal function of the outside application or process (i.e. web browser in this example) such as a function for showing the web page. In some embodiments, an internal function of an outside application or process may be defined as a global function in which case Core Program 110 would have direct access to it. In general, Core Program 110 may execute any internal function of an outside application or process that is defined as a global function or for which there exists a global function accessible or executable by Core Program 110.

In some embodiments, an instance of MDP Unit 100 may start by Core Program's 110 executing or displaying a Still Picture 210a, 210b, 210c, 210d, etc. of an initial Multi-directional Still Picture 200. Any Multi-directional Still Picture 200 may be defined to be initial. In one example, initial Multi-directional Still Picture 200 may include a Forward Still Picture 210a with a view of a park's walkway facing one of the nearby buildings as shown in Step 1 of FIG. 6. Core Program 110 may display the Forward Still Picture 210a of the initial Multi-directional Still Picture 200 in Picture Display 840. Core Program 110 may then associate Picture Arrows 860a, 860b, 860c, 860d, etc. with Still Pictures 210a, 210b, 210c, 210d, etc. of the initial Multi-directional Still Picture 200. Core Program 110 may further associate Direction Arrows 850a, 850b, 850c, 850d, etc. with Multi-directional Still Picture Links 220a, 220b, 220c, 220d, etc. of the initial Multi-directional Still Picture 200. Core Program 110 may further associate Orientation Pointer 870 with Orientation 205 of the initial Multi-directional Still Picture 200. User may select or activate a Picture Arrow 860a, 860b, 860c, 860d, etc. responsive to which Core Program 110 may display a Still Picture 210a, 210b, 210c, 210d, etc. to which the selected Picture Arrow 860a, 860b, 860c, 860d, etc. points. This way, user may change the view from a location represented by the initial Multi-directional Still Picture 200. User may also select or activate a Direction Arrow 850a, 850b, 850c, 850d, etc. responsive to which Core Program 110 may execute Multi-directional Still Picture 200 to which Multi-directional Still Picture Link 220a, 220b, 220c, 220d, etc. associated with the selected Direction Arrow 850a, 850b, 850c, 850d, etc. points. This way, user may move from the initial to another Multi-directional Still Picture 200, which may bring user to a next location on the park's walkway such as the location depicted in Step 2 of FIG. 6. User may similarly utilize Direction Arrows 850*a*, 850*b*, 850*c*, 850*d*, etc. to move among any Multi-directional Still Pictures 200. User may also select or activate Orientation Pointer 870 responsive to which Core Program 110 may change Orientation 205. As such, MDP Unit 100 may enable a user to view all views (i.e. forward, backward, right, left, up, down, diagonal, angular, etc.) from all locations (i.e. Multi-directional Still Pictures 200) of a represented object (i.e. park in this example) as well as to simulate user's motion (i.e. stepping, flying, etc.) through the represented object (i.e. park in this example). Execution of a subsequent Multi-directional Still Picture 200 may trigger any of the described steps of executing the initial Multi-directional Still Picture 200. Any of the described steps of executing the initial Multi-directional Still Picture 200 may similarly be utilized with Multi-directional Motion Pictures 400 (later described) where Core Program 110 may display Motion Pictures 410*a*, 410*b*, 410*c*, 410*d*, etc., associate Picture Arrows 860*a*, 860*b*, 860*c*, 860*d*, etc. with Motion Pictures 410*a*, 410*b*, 410*c*, 410*d*, etc., associate Direction Arrows 850*a*, 850*b*, 850*c*, 850*d*, etc. with Multi-directional Motion Picture Links 420*a*, 420*b*, 420*c*, 420*d*, etc., associate Orientation Pointer 870 with Orientation 405, and/or perform other operations as described.

Figure 7:
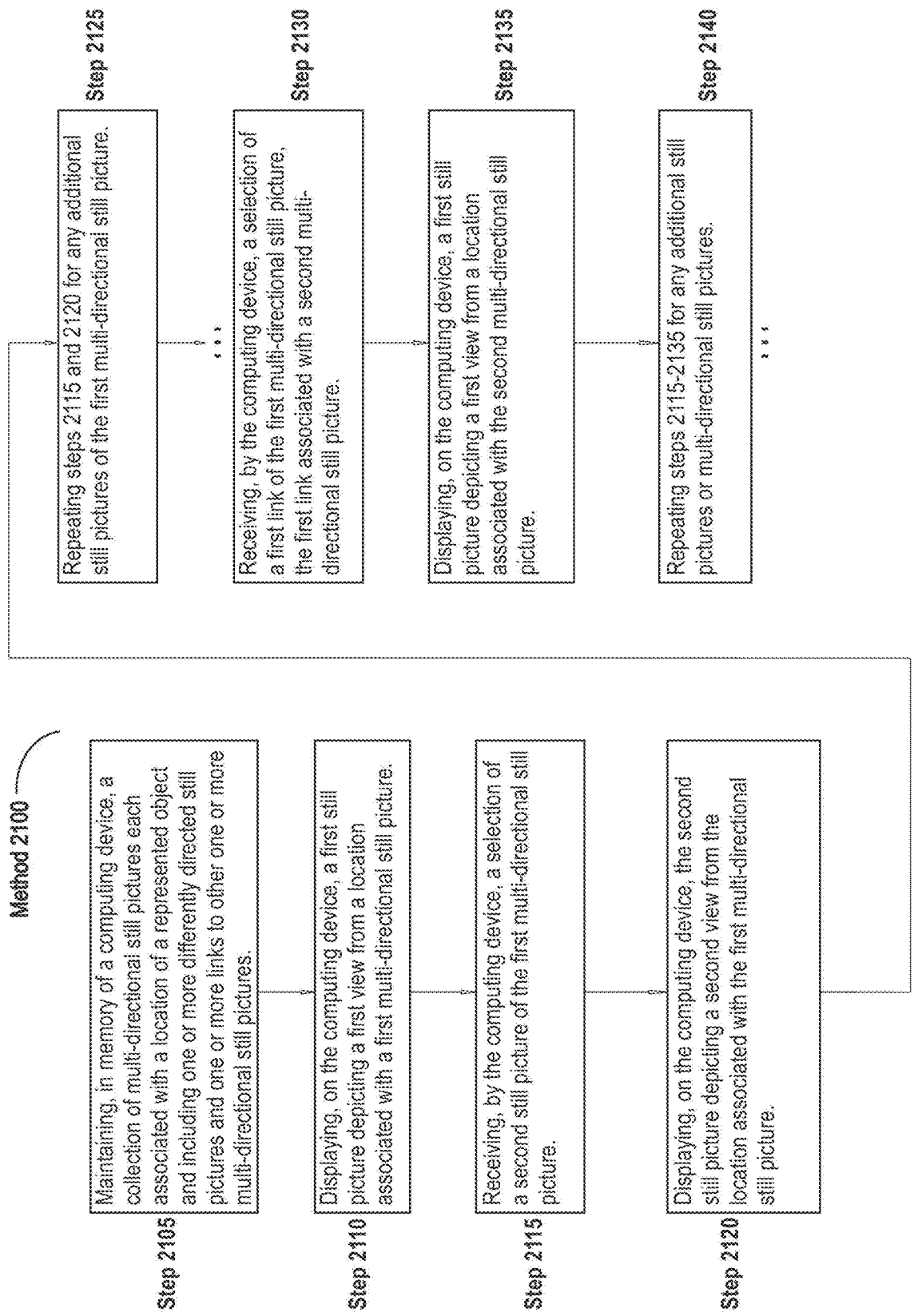
FIG. 7 illustrates a flow chart diagram of an embodiment of a method 2100 implemented by MDP Unit 100.

Referring to FIG. 7, the illustration shows an embodiment of a method 2100 for using a collection of Multi-directional Still Pictures 200 representing an object. The steps of this exemplary method may therefore be used by a user on a computing device operating an interface for MDP Unit 100 to enable the user to view all views (i.e. forward, backward, right, left, up, down, diagonal, etc.) from all locations of the represented object and enable the user to move among the multi-directional still pictures simulating motion through the represented object. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be implemented for using a collection of Multi-directional Motion Pictures 400 (later described) representing an object.

At step 2105, a collection of multi-directional still pictures each associated with a location of a represented object and including one or more differently directed still pictures and one or more links to other one or more multi-directional still pictures is maintained in memory of a computing device. MDP Unit 100 may enable interactive visual representation of objects using multi-directional still pictures associated with locations of the represented object. Any locations may be used to represent the object. In one example, steps (i.e. every two feet, etc.) in a park's walkways may be used as the locations to simulate a user's stepping through the park. In another example, evenly spaced points (i.e. points in the center of every square yard, etc.) in a building's interior may be used as the locations to simulate a user's stepping through the building. In some embodiments, a multi-directional still picture may include a data structure storing one or more differently directed still pictures and one or more links to other multi-directional still pictures. In some embodiments, multi-directional still pictures may be ordered to include a first multi-directional still picture, followed by a second multi-directional still picture, which may also be followed by a third multi-directional still picture, and so on, to complete a sequence. In other embodiments, multi-directional still pictures may be arranged in a maze that may correspond to a shape of a represented object. In yet other embodiments, multi-directional still pictures may be interlinked in any conceivable manner without using any intermediary or supporting data structures such as the sequence and/or maze. Generally, multi-directional still pictures may correspond to a shape of a represented object. In some embodiments, any number of multi-directional still pictures including still pictures pointed to any number of directions (i.e. forward, backward, right, left, up, down, diagonal, etc.) may be utilized to cover the entire represented object. In other embodiments, any number of multi-directional still pictures including still pictures pointed to any number of directions (i.e. forward, backward, right, left, up, down, diagonal, etc.) may be utilized to cover a portion of the represented object. Also, any number of links among multi-directional still pictures may be used. Such links may connect multi-directional still pictures in any conceivable direction (i.e. forward, backward, right, left, up, down, diagonal, etc.). The links may enable the user to move among multi-directional still pictures this way simulating motion through the represented object.

At step 2110, a first still picture depicting a first view from a location associated with a first multi-directional still picture is displayed on the computing device. The user may view on the display of the computing device a still picture such as the first still picture of the first multi-directional still picture. In one example, the first location may be a logical starting point such as a location near an entrance into a park or near a door of a building in which case the first still picture may depict a view from this logical starting location (i.e. a view of what a pedestrian would see entering a gate of the park, etc.). In another example, the first location may be any location of the represented object. In some embodiments, a still picture such as the first still picture of the first multi-directional still picture may be obtained from a file, a data structure, an object, and/or other similar digital data repository. In other embodiments, a still picture may be obtained from a database management system (DBMS), a database, a system, a process, and/or other similar digital data repository. In further embodiments, a still picture may be embedded within an instance of MDP Unit 100 (i.e. hard coded in the Core Program 110). In yet further embodiments, a still picture may be obtained from a separate file (i.e. object file, etc.), a separate data structure, a separate DBMS, a separate database, a separate system, a separate process, and/or other separate digital data repository or system for each of the still pictures or references thereto. In yet further embodiments, a still picture may be obtained from a collection of definitions of pictures or references thereto embedded in other files or programs. In some embodiments, a still picture may be obtained from a Multi-directional Pictures Repository 115 that may further include a file (i.e. object file, etc.), a data structure, a DBMS, a database, a system, a process, and/or other separate digital data repository or system. In some embodiments, picture processing may be implemented to insert or overlay a picture of an avatar into/onto a still picture such as the first still picture. Displaying may include any action or operation by or for a Picture Display 840.

At step 2115, the computing device receives a selection of a second still picture of the first multi-directional still picture. In some embodiments, MDP Unit 100 may include a means such as a graphical user interface (GUI) configured to show on the display of the computing device graphical pointers each associated with a specific still picture and/or specific multi-directional still picture link of a multi-directional still picture such as the first multi-directional still picture. In one example, a pointer to each of the one or more still pictures of the first multi-directional still picture and a pointer to each of the one or more links of the first multi-directional still picture may be displayed on the computing device for selection by a user. In some embodiments, a pointer in a GUI may include an arrow, a triangle, a push button (i.e. web form push button, etc.), a picture, and/or other such graphical directional signs or indicia indicating a direction of its associated still picture and/or multi-directional still picture link. In one example, an upward pointed triangle may be associated with a forward still picture and/or an upward pointed arrow may be associated with a forward multi-directional still picture link. In other embodiments, certain areas on the displayed still picture may be associated with other still pictures and/or multi-directional still picture links in which case pointers may be used as secondary input means or not used at all. In one example, a user's clicking on any part of a park's forward walkway depicted in a still picture may execute a forward multi-directional still picture link without selecting its associated pointer. A pointer may be selected through any internal or external input means of the computing device such as keyboard, mouse, touch screen, control wheel, remote control, joystick, microphone, and/or other similar input means. User may select a pointer by pressing keyboard keys, by touching touch screen buttons, by clicking mouse buttons, by pressing game controller buttons, by pressing joystick buttons, by pressing remote control buttons, by sliding a control wheel (i.e. iPod control wheel, etc.), or by using other directional means associated with particular pointer. Upon user's selection, the selected pointer may be received by the interface for a MDP Unit 100. The selected pointer may be received by the user's computing device, or by any other computing device in general. The selected pointer may be received by any component of MDP Unit 100. A pointer may include any action or operation by or for a Direction Arrow 850*a*, 850*b*, 850*c*, 850*d*, etc and/or Picture Arrow 860*a*, 860*b*, 860*c*, 860*d*, etc.

At step 2120, the second still picture depicting a second view from the location associated with the first multi-directional still picture is displayed on the computing device. When a user selects a still picture, the selected still picture may be shown on the display of the computing device. Displaying may include any action or operation by or for a Picture Display 840.

At step 2125, steps 2115 and 2120 are repeated for any additional still pictures of the first multi-directional still picture. Steps 2115 and 2120 may be performed repeatedly to display any subsequent still pictures of a multi-directional still picture such as the first multi-directional still picture. Steps 2115 and 2120 may therefore be performed to enable the user to view all views (i.e. forward, backward, right, left, up, down, diagonal, etc.) from the location associated with a multi-directional still picture such as the first multi-directional still picture.

At step 2130, the computing device receives a selection of a first link of the first multi-directional still picture, the first link associated with a second multi-directional still picture. Step 2130 may include any action or operation described in step 2115 as applicable.

At step 2135, a first still picture depicting a first view from a location associated with the second multi-directional still picture is displayed on the computing device. Step 2135 may include any action or operation described in step 2120 as applicable. In some embodiments, a pointer to each of the one or more still pictures of the second multi-directional still picture and a pointer to each of the one or more links of the second multi-directional still picture may be displayed on the computing device for selection by the user.

At step 2140, steps 2115-2135 are repeated for any additional still pictures or multi-directional still pictures. Steps 2115-2135 may be performed repeatedly to display any still pictures of any multi-directional still pictures and/or to move among any multi-directional still pictures.

In some aspects, the teaching presented by the disclosure may be implemented in a device or system for using multi-directional still pictures. The device or system may include a processor and an interface, coupled to the processor, for receiving a collection of multi-directional still pictures each multi-directional still picture associated with a location of a represented object and including one or more differently directed still pictures and one or more links to other one or more multi-directional still pictures. The device or system may further include a display, coupled to the processor, for rendering a first still picture depicting a first view from a location associated with a first multi-directional still picture. The device or system may further include an input device, coupled to the processor, for receiving a selection of a first link of the first multi-directional still picture, the first link associated with a second multi-directional still picture, wherein the processor may be programmed to cause the display to render a first still picture depicting a first view from a location associated with the second multi-directional still picture. The input device may further be configured to receive a selection of a second still picture of the second multi-directional still picture, wherein the processor may further be programmed to cause the display to render the second still picture depicting a second view from the location associated with the second multi-directional still picture. The processor, the interface, the display, the input device, and/or other elements of the device or system for using multi-directional still pictures may include any features and functionalities of Processor 11, Core Program 110, Multi-directional Pictures Repository 115, Input Interface 140, Keyboard 150 or any other input device, Output Interface 160, Display 170, and/or other disclosed elements. The device or system may also include any functionalities or steps of any disclosed methods such as, for example, method 2100. For example, Keyboard 150 and/or any other input device may provide a means for inputting a user's operating instructions on movement through and view of the represented object. Input Interface 140 may process input events of Keyboard 150 and/or other input device for use by Core Program 110 or other disclosed elements. Core Program 110 may be implemented on Processor 11 and it may read still pictures or references thereto, any data structures (i.e. multi-directional still pictures, mazes, sequences, etc.) and/or other elements from Multi-directional Pictures Repository 115 to obtain appropriate still pictures from various locations of a represented object that may correspond to user's operating instructions. Output Interface 160 may process the still pictures from Core Program 110 or other disclosed elements for viewing on Display 170 or other output device. Display 170 may render, display or show the still pictures from various locations of the represented object.

In some embodiments, MDP Unit 100 may be utilized to generate non-visual or no output. Such embodiments address any situation where a user may interact with an instance of MDP Unit 100 and non-visual output or no output is shown to the user. For example, a blind user may prefer to hear sound associated with or representing a selected Multi-directional Still Picture 200 or its elements. Therefore, a sound file may be played instead of picture shown to the blind user. Also, tactile output associated with or representing a selected Multi-directional Still Picture 200 or its elements may be presented. The blind user may input operating instructions through the above-described Picture Arrows 860a, 860b, 860c, 860d, etc., Direction Arrows 850a, 850b, 850c, 850d, etc., Orientation Pointer 870, and/or other elements coupled or associated with a tactile input device, speech recognizer, or other suitable interface. As such, MDP Unit 100 may operate and provide same or similar functionality to the blind user as the MDP Unit 100 that generates visual output for a sighted user.

In some embodiments, MDP Unit 100 may be implemented to represent a multi-leveled object such as, for example, a building with plurality of floors. As such, Multi-directional Still Pictures 200 may be positioned in locations on each floor and in locations on connecting structures such as stairs. This way, Multi-directional Still Pictures 200 on each floor may be interconnected and the entire building represented. In other embodiments, MDP Unit 100 may be implemented to represent a three dimensional space such as, for example, a museum room. As such, Multi-directional Still Pictures 200 may be positioned in locations on the floor and in locations of the room's space (i.e. in the air, etc.). This way, Multi-directional Still Pictures 200 on the floor and in the room's space (i.e. in the air, etc.) may be interconnected and the entire room's space represented.

Figure 8:
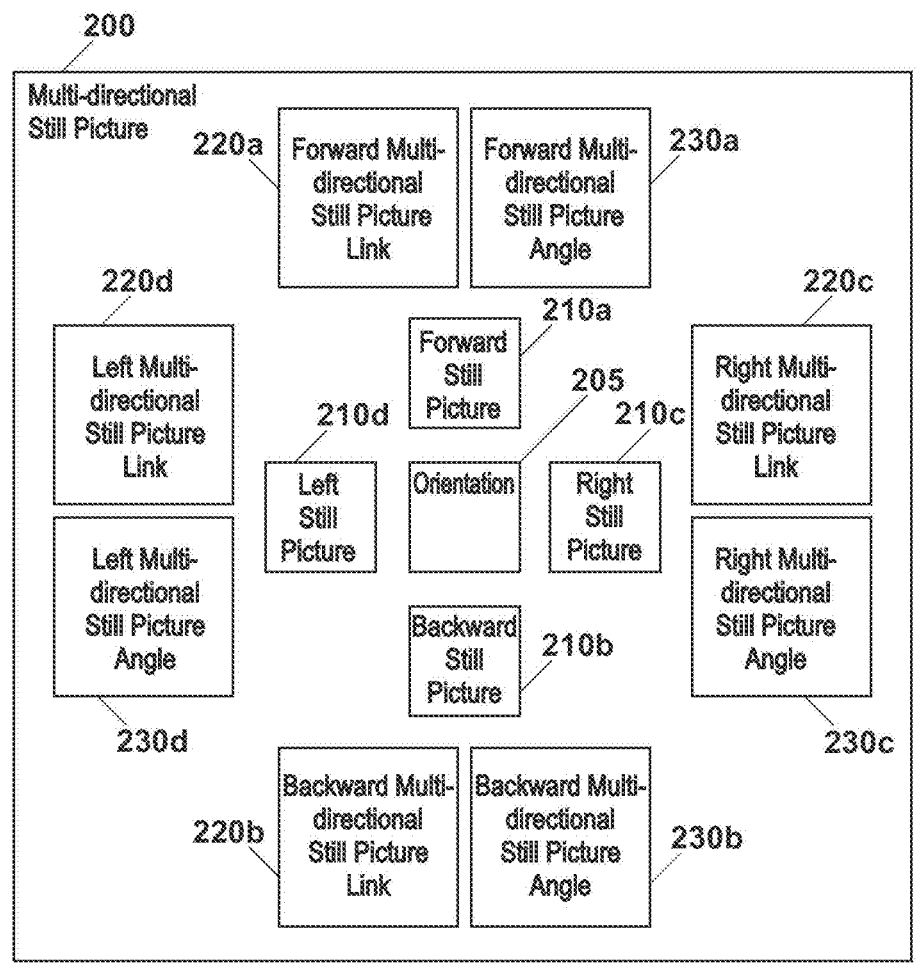
FIG. 8 is a diagram showing an embodiment of a Multi-directional Still Picture 200 including Multi-directional Still Picture Angles 230.

Referring to FIG. 8, an embodiment is illustrated in which Multi-directional Still Picture 200 may include one or more Multi-directional Still Picture Angles 230. While Multi-directional Still Picture Angles 230 may be referred to or illustrated as Multi-directional Still Picture Angles 230a-d, one of ordinary skill in art will understand that they may indeed include any number of Multi-directional Still Picture Angles 230a-n. In some embodiments, Multi-directional Still Picture 200 may include functions and algorithms for storing a data structure whose data fields may include one or more Multi-directional Still Picture Angles 230. In one example, a Multi-directional Still Picture 200 may include a data structure comprising thirteen data fields: (1) Forward Still Picture 210a, (2) Backward Still Picture 210b, (3) Right Still Picture 210c, (4) Left Still Picture 210d, (5) Forward Multi-directional Still Picture Link 220a, (6) Backward Multi-directional Still Picture Link 220b, (7) Right Multi-directional Still Picture Link 220c, (8) Left Multi-directional Still Picture Link 220d, (9) Forward Multi-directional Still Picture Angle 230a, (10) Backward Multi-directional Still Picture Angle 230b, (11) Right Multi-directional Still Picture Angle 230c, (12) Left Multi-directional Still Picture Angle 230d, and/or (13) Orientation 205. Multi-directional Still Picture Angle 230a, 230b, 230c, 230d, etc. may be utilized to indicate angle at which a Multi-directional Still Picture 200 referenced or pointed to by a specific Multi-directional Still Picture Link 220a, 220b, 220c, 220d, etc. is relative to the current Multi-directional Still Picture 200. As such, Multi-directional Still Picture Angles 230a, 230b, 230c, 230d, etc. may be utilized in representations of objects where Multi-directional Still Pictures 200 may be arranged at angles other than ninety degrees. In one example, some of a park's walkways may be constructed in a "V" shaped (i.e. fork, etc.) form. Multi-directional Still Pictures 200 including Multi-directional Still Picture Angles 230a, 230b, 230c, 230d, etc. may capture this physical feature of the represented object (i.e. park in this example). In another example, a user may want to obtain a graphical representation (i.e. a printout, map, etc.) of the represented object including a collection of Multi-directional Still Pictures 200. The graphical representation of the collection of Multi-directional Still Pictures 200 may be accurately displayed by using Multi-directional Still Picture Angles 230a, 230b, 230c, 230d, etc. Any Multi-directional Still Picture Angle 230 may be used such as, for example, 3 degree, 4 degree, 5 degree, 6 degree, 7 degree, 9 degree, degree, 11 degree, 15 degree, 23 degree, 25 degree, 28 degree, 30 degree, 35 degree, 45 degree, 47 degree, 60 degree, 66 degree, 75 degree, 88 degree, 90 degree, 113 degree, 187 degree, 256 degree, 299 degree, 315 degree, 348 degree, 360 degree, 553 degree, 1692 degree, 32884 degree, and others. In addition to degrees, units of measurement for Multi-directional Still Picture Angles 230a, 230b, 230c, 230d, etc. may include angular minutes, angular seconds, any fractions thereof, or any other units of angular measurement. All described features and embodiments of Multi-directional Still Picture Angles 230a, 230b, 230c, 230d, etc. may similarly be utilized with Multi-directional Motion Pictures 400 (later described) where they may be referred to as Multi-directional Motion Picture Angles.

Figure 9:
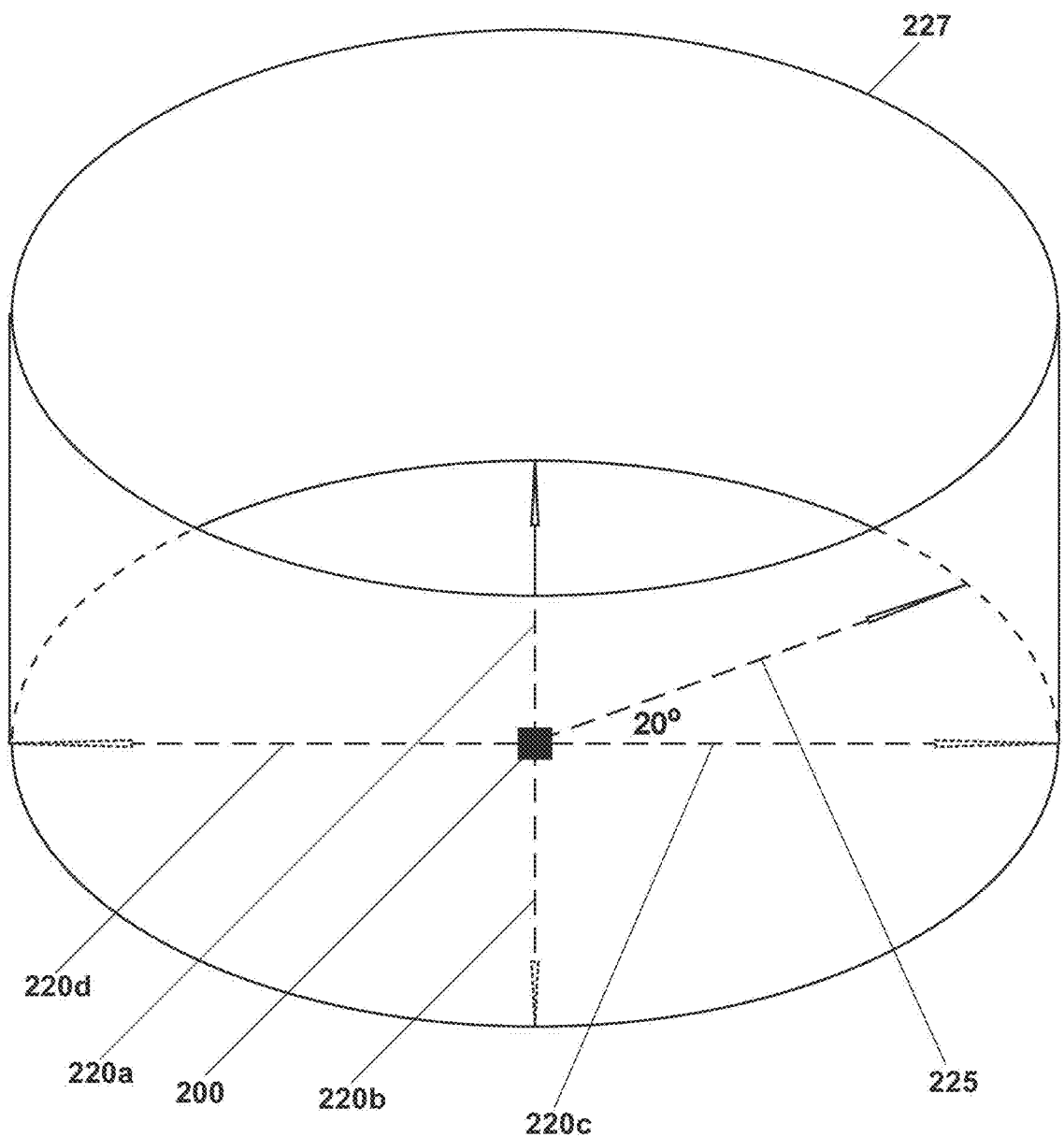
FIG. 9 shows an embodiment of MDP Unit 100 implemented to approximate Multi-directional Still Picture Link 220 based on an angle of view of a Combined Picture 227.

Referring to FIG. 9, an embodiment of MDP Unit 100 implemented to include stitching of Still Pictures 210a, 210b, 210c, 210d, etc. of a Multi-directional Still Picture 200 is illustrated. Any image stitching or picture stitching algorithms or techniques known in art may be used to combine multiple digital pictures with overlapping fields of view. Commonly performed through the use of computer software, most approaches to image stitching require nearly exact overlaps between distinct pictures. Some picture taking equipment such as high-end digital cameras may stitch digital pictures internally. Some of the known software programs and/or algorithms for picture stitching include Autostitch, Hugin, Panorama Maker, Ptgui, Panorama Tools, Microsoft Research Image Composite Editor, CleVR Stitcher, and others. Some general purpose picture editing programs may also stitch digital pictures such as Adobe Systems' Photoshop, which may include tools known as Photomerge and Auto-Blend. MDP Unit 100 may utilize stitched pictures from one of the above-mentioned programs, or may implement internal (i.e. within Core Program 110) picture stitching by utilizing one of the publicly available picture stitching algorithms. In one example in which Still Pictures 210a, 210b, 210c, 210d, etc. may include overlapping fields of view needed for picture stitching process, the resulting Combined Picture 227 may be a partial or full 360 degrees panoramic picture that may enable a user to rotate the View 225 from the location represented by a Multi-directional Still Picture 200 in all directions. As such, means of input such as a control wheel, a track ball, virtual ball (i.e. a ball shown through a graphical user interface, etc.), and/or other rotational means of input may be used instead of, or in addition to, Picture Arrows 860a, 860b, 860c, 860d, etc. In some aspects, user's rotation of View 225 of the Combined Picture 227 may be accompanied with Core Program's 100 adjustment or change of Orientation 205 to correspond to the rotation of view. In other aspects, the means of input such as control wheel, track ball, virtual ball, and/or other rotational means of input, Picture Arrows 860a, 860b, 860c, 860d, etc., and/or other elements of the disclosed methods, systems and apparatuses may themselves rotate to correspond to a change of Orientation 205 or direction as the view of Combined Picture 227 rotates.

In some embodiments in which picture stitching may be implemented, movement among Multi-directional Still Pictures 200 may be implemented by approximating which Multi-directional Still Picture Link 220a, 220b, 220c, 220d, etc. the user wanted to use in cases where the angle or direction of view of the Combined Picture 227 does not perfectly match the angle or direction of a particular Multi-directional Still Picture Link 220*a*, 220*b*, 220*c*, 220*d*, etc. Such approximation may include comparing the angle of user's View 225 of the Combined Picture 227 with Multi-directional Still Picture Angles 230*a*, 230*b*, 230*c*, 230*d*, etc. to determine the closest Multi-directional Still Picture Link 220*a*, 220*b*, 220*c*, 220*d*, etc. In one example, Right Multi-directional Still Picture Link 220*c* may be approximated from 20 degrees angle of user's View 225 of the Combined Picture 227. In another example, Left Multi-directional Still Picture Link 220*d* may be approximated from 170 degrees angle of user's View 225 of the Combined Picture 227. All described features and embodiments of stitching Still Pictures 210*a*, 210*b*, 210*c*, 210*d*, etc. and Multi-directional Still Picture Link 220*a*, 220*b*, 220*c*, 220*d*, etc. approximation may similarly be utilized with Motion Pictures 410*a*, 410*b*, 410*c*, 410*d*, etc. (later described) where the Combined Picture 227 may include combined Motion Pictures 410*a*, 410*b*, 410*c*, 410*d*, etc. In some aspects, streams of time stamped still pictures (i.e. Motion Pictures 410*a*, 410*b*, 410*c*, 410*d*, etc.) may be stitched into a combined stream of time stamped still pictures. Such stitching of streams of time stamped still pictures may include stitching of still pictures having same time stamps from each stream as previously described in still picture stitching. The combined stream of time stamped still pictures may therefore include a stream of combined still pictures depicting a panoramic view from a location of a represented object.

Figure 10:
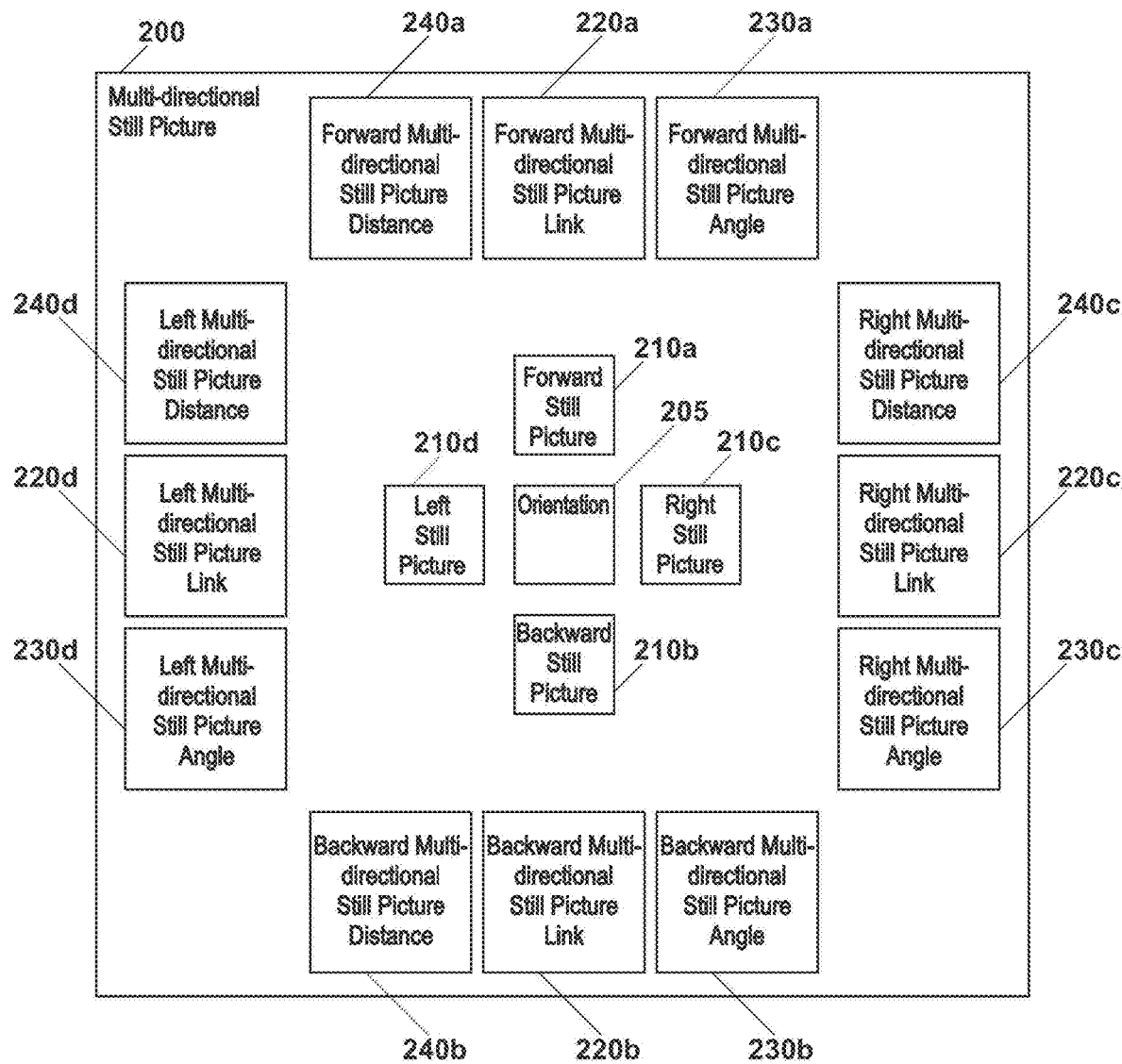
FIG. 10 is a diagram showing an embodiment of a Multi-directional Still Picture 200 including Multi-directional Still Picture Distances 240.

Referring to FIG. 10, an embodiment is illustrated in which Multi-directional Still Picture 200 may include one or more Multi-directional Still Picture Distances 240. While Multi-directional Still Picture Distances 240 may be referred to or illustrated as Multi-directional Still Picture Distances 240*a-d*, one of ordinary skill in art will understand that they may indeed include any number of Multi-directional Still Picture Distances 240*a-n*. In some embodiments, Multi-directional Still Picture 200 may include functions and algorithms for storing a data structure whose data fields may include one or more Multi-directional Still Picture Distances 240. In one example, a Multi-directional Still Picture 200 may include a data structure comprising seventeen data fields: (1) Forward Still Picture 210*a*, (2) Backward Still Picture 210*b*, (3) Right Still Picture 210*c*, (4) Left Still Picture 210*d*, (5) Forward Multi-directional Still Picture Link 220*a*, (6) Backward Multi-directional Still Picture Link 220*b*, (7) Right Multi-directional Still Picture Link 220*c*, (8) Left Multi-directional Still Picture Link 220*d*, (9) Forward Multi-directional Still Picture Angle 230*a*, (10) Backward Multi-directional Still Picture Angle 230*b*, (11) Right Multi-directional Still Picture Angle 230*c*, (12) Left Multi-directional Still Picture Angle 230*d*, (13) Forward Multi-directional Still Picture Distance 240*a*, (14) Backward Multi-directional Still Picture Distance 240*b*, (15) Right Multi-directional Still Picture Distance 240*c*, (16) Left Multi-directional Still Picture Distance 240*d*, and/or (17) Orientation 205. Multi-directional Still Picture Distance 240*a*, 240*b*, 240*c*, 240*d*, etc. may be utilized to indicate a distance between the current Multi-directional Still Picture 200 and a Multi-directional Still Picture 200 referenced or pointed to by a specific Multi-directional Still Picture Link 220*a*, 220*b*, 220*c*, 220*d*, etc. As such, Multi-directional Still Picture Distances 240*a*, 240*b*, 240*c*, 240*d*, etc. may be utilized in representations of objects where Multi-directional Still Pictures 200 may be arranged at unequal distances. In one example, some of park's walkways may be long and fewer Multi-directional Still Pictures 200 may be used to cover the distance. Multi-directional Still Pictures 200 including Multi-directional Still Picture Distances 240*a*, 240*b*, 240*c*, 240*d*, etc. may capture this physical feature of the represented object (i.e. park in this example). In another example, a user may want to obtain a graphical representation (i.e. a printout, map, etc.) of the represented object including a collection of Multi-directional Still Pictures 200. The graphical representation of the collection of Multi-directional Still Pictures 200 may be accurately displayed by using Multi-directional Still Picture Distances 240*a*, 240*b*, 240*c*, 240*d*, etc. Any Multi-directional Still Picture Distance may be used such as, for example, 1 meter, 2 meters, 3 meters, 4 meters, 5 meters, 6 meters, 7 meters, 9 meters, 10 meters, 11 meters, 15 meters, 23 meters, 25 meters, 28 meters, 30 meters, 35 meters, 45 meters, 47 meters, 60 meters, 66 meters, 75 meters, 88 meters, 90 meters, 100 meters, 1000 meters, 10000 meters, 100000 meters, and others. In addition to meters, units of measurement for Multi-directional Still Picture Distances 240*a*, 240*b*, 240*c*, 240*d*, etc. may include millimeters, centimeters, decimeters, kilometers, inches, feet, yards, any fractions thereof, or any other units of length measurement. All described features and embodiments of Multi-directional Still Picture Distances 240*a*, 240*b*, 240*c*, 240*d*, etc. may similarly be utilized with Multi-directional Motion Pictures 400 (later described) where they may be referred to as Multi-directional Motion Picture Distances.

In some embodiments, Multi-directional Pictures Repository 115 may be local (i.e. local Multi-directional Pictures Repository 115) and it may reside and/or execute on the user's Computing Device 70 as previously described. Such local Multi-directional Pictures Repository 115 may be stored in a local file, DBMS, database, system, process, data structure, and/or any other local data repository.

Figure 11:
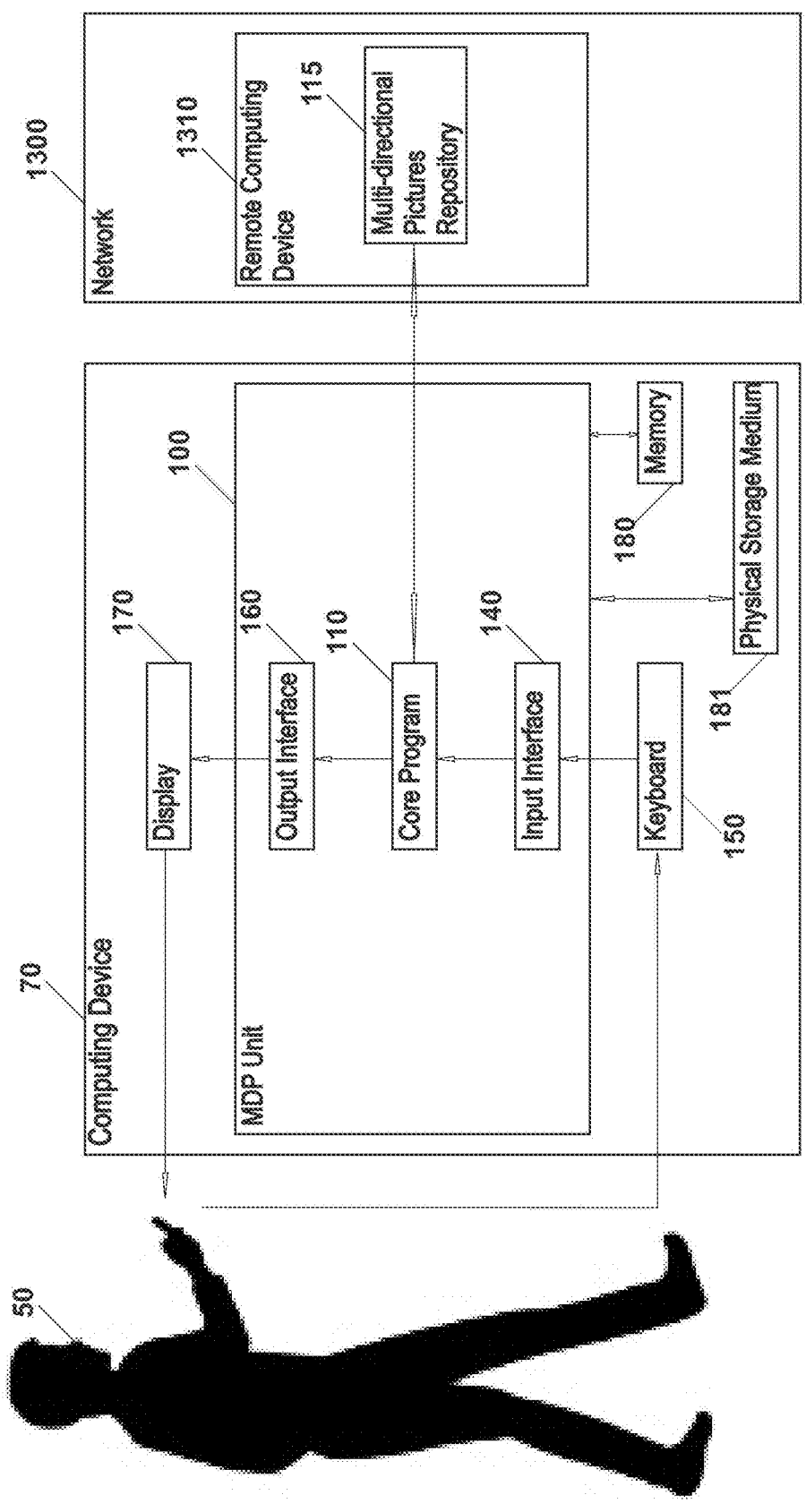
FIG. 11 is a diagram showing an embodiment of MDP Unit 100 with Multi-directional Pictures Repository 115 residing on a Remote Computing Device 1310.

Referring to FIG. 11, an embodiment is illustrated in which Multi-directional Pictures Repository 115 (i.e. remote Multi-directional Pictures Repository 115) may reside and/or execute on a Remote Computing Device 1310 (i.e. application server, cloud, etc.) accessible over a Network 1300 (i.e. corporate enterprise network, Internet, etc.). Such remote Multi-directional Pictures Repository 115 may be stored in a remote file, DBMS, database, system, process, data structure, and/or any other remote data repository. In some embodiments, a Multi-directional Pictures Repository 115 may be or include a global Multi-directional Pictures Repository 115 that may reside and/or execute on a Remote Computing Device 1310 accessible over the Internet as a network service to all the world's users who wish to utilize the global Multi-directional Pictures Repository 115 to experience visual content included within it. In other embodiments, an instance of MDP Unit 100 running on a user's Computing Device 70 may be in a peer-to-peer network or relationship with an instance of MDP Unit 100 running on another user's Computing Device 70. Such peer-to-peer network or relationship may enable both users to share with the other user Multi-directional Pictures Repositories 115 stored on their respective Computing Devices 70. In yet other embodiments, a Multi-directional Pictures Repository 115 may be one of plurality Multi-directional Pictures Repositories 115 that may have been created by administrators or users of a network service for sharing Multi-directional Pictures Repositories 115. Such Multi-directional Pictures Repositories 115 may reside in a central repository (i.e. file, DBMS, database, system, process, data structure, and/or any other data repository, etc.) accessible to users of the network service. In one example, a user may post into the central repository a Multi-directional Pictures Repository 115 representing a park near his/her workplace, another user may post a Multi-directional Pictures Repository 115 representing his/her home, and yet another user may post a Multi-directional Pictures Repository 115 representing his college campus. Such central repository may be a growing repository of user contributed Multi-directional Pictures Repositories 115 each including Multi-directional Still Pictures 200, Multi-directional Motion Pictures 400, and/or other elements representing a user selected object.

Figure 12:
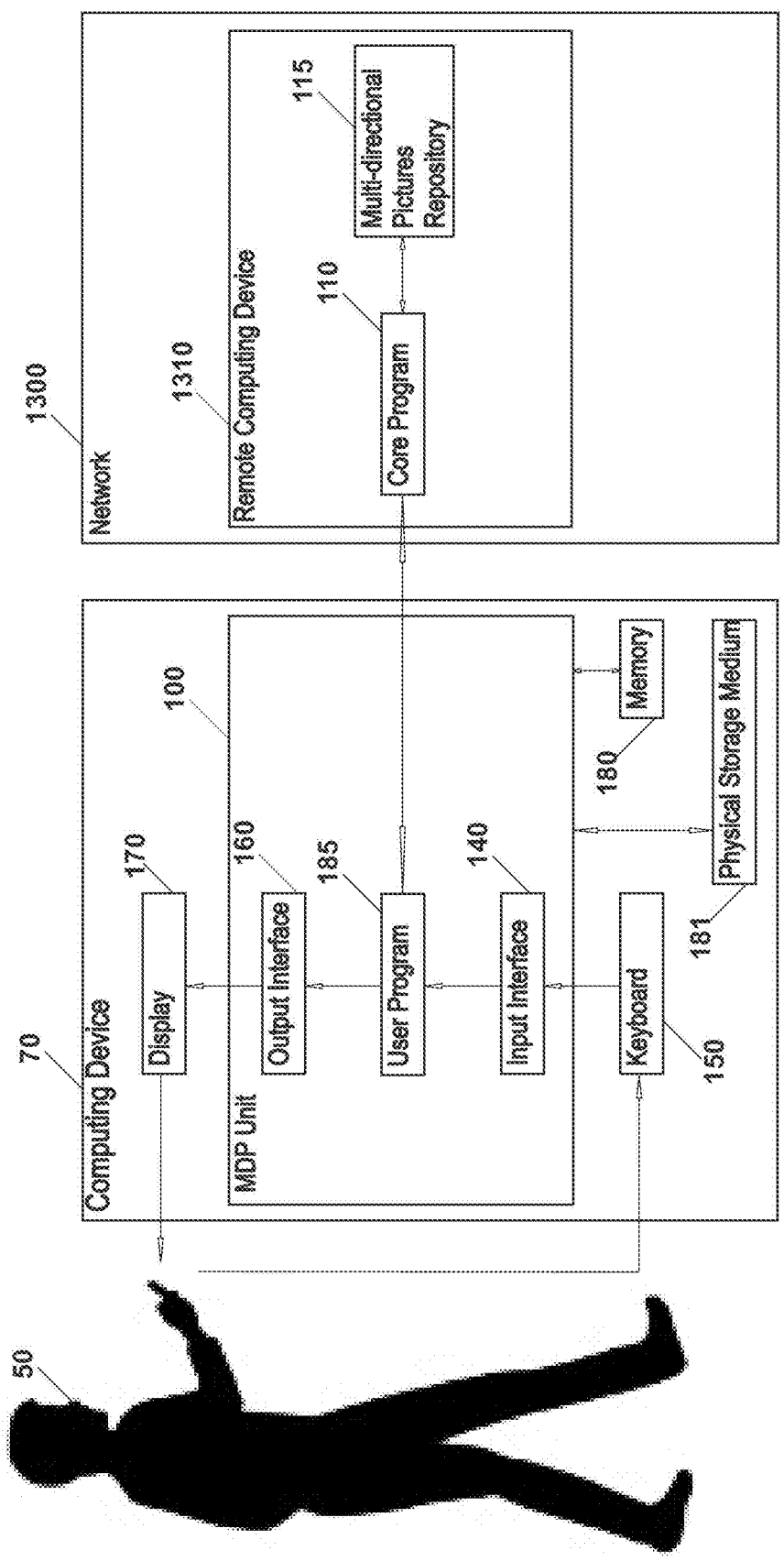
FIG. 12 is a diagram showing an embodiment of MDP Unit 100 with Core Program 110 and Multi-directional Pictures Repository 115 executing on a Remote Computing Device 1310.

Referring to FIG. 12, an embodiment is illustrated in which Core Program 110 and Multi-directional Pictures Repository 115 (i.e. remote Multi-directional Pictures Repository 115) may both reside and/or execute on a Remote Computing Device 1310 (i.e. application server, cloud, etc.) accessible over a Network 1300 (i.e. corporate enterprise network, Internet, etc.). An example of such embodiment may be the application service provider (ASP) model where computer-based services may be provided to users over a network (i.e. Network 1300, etc.) and where an application program such as the Core Program 110 and/or data such as the Multi-directional Pictures Repository 115 may reside and/or execute on a remote computing device such as an application server. In some aspects, user may utilize a User Program 185 such as a web browser on the Computing Device 70 to interact with the application server (i.e. Remote Computing Device 1310, etc.).

Figure 13:
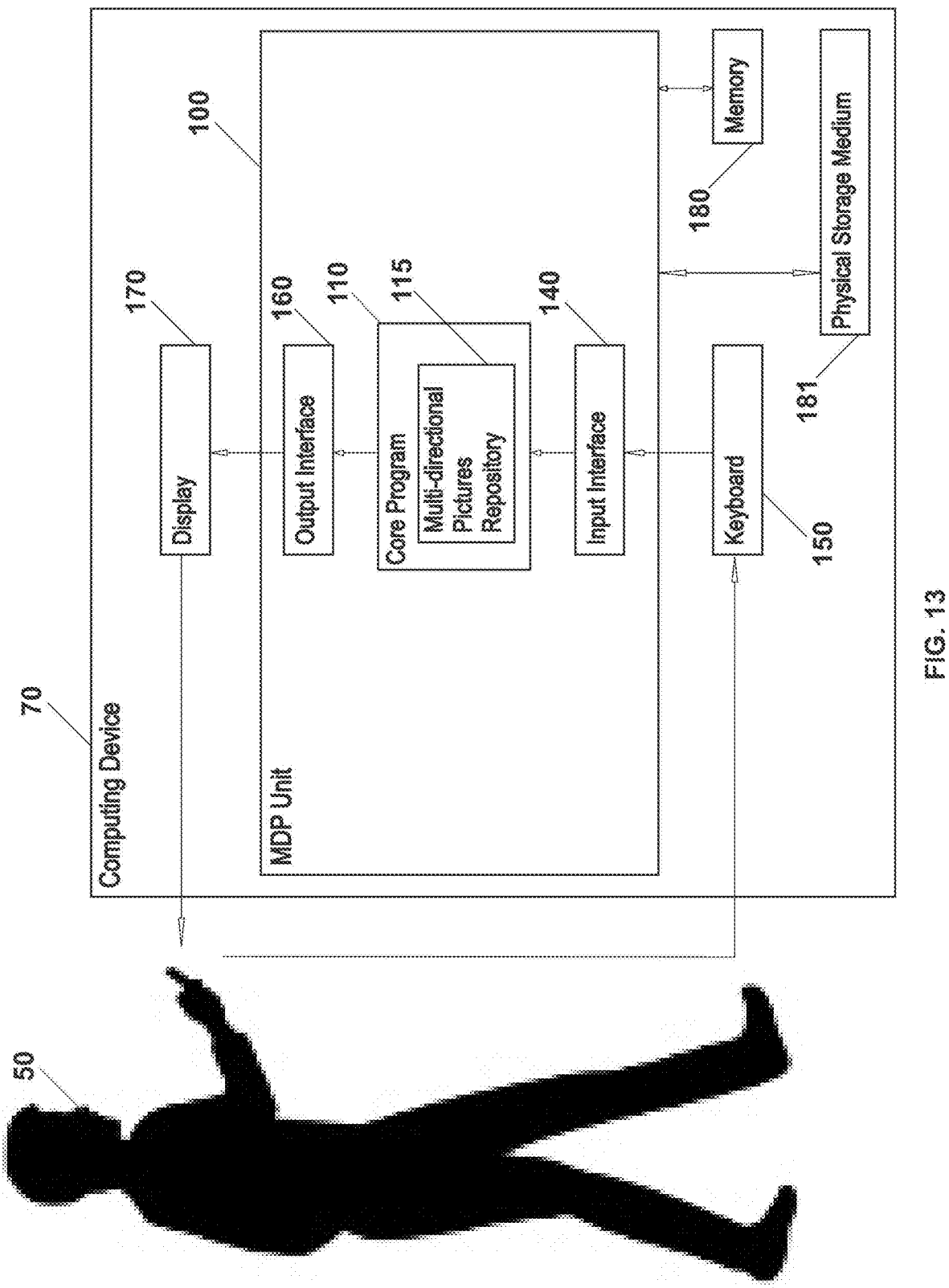
FIG. 13 is a diagram showing an embodiment of MDP Unit 100 implemented to include Multi-directional Pictures Repository 115 in Core Program 110.

Referring to FIG. 13, an embodiment is illustrated in which Core Program 110 may include Multi-directional Pictures Repository 115. In this integrated implementation, Core Program 110 may include hardcoded still or motion pictures or references thereto, any data structures (i.e. multi-directional still or motion pictures, mazes, sequences, etc.) and/or other elements in which case the use of Multi-directional Pictures Repository 115 as a distinct element may optionally be omitted.

Figure 14:
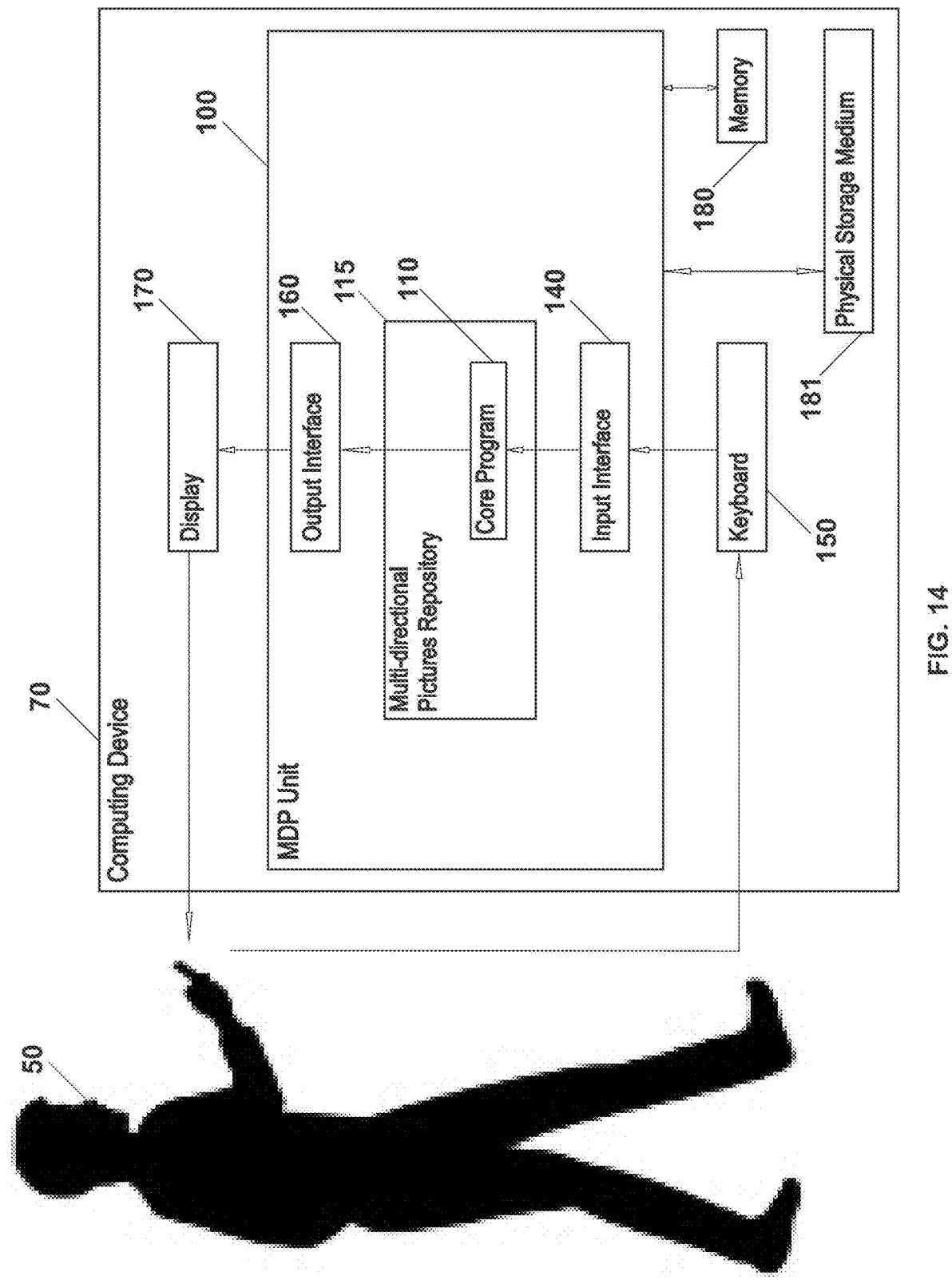
FIG. 14 is a diagram showing an embodiment of MDP Unit 100 implemented to include Core Program 110 in Multi-directional Pictures Repository 115.

Referring to FIG. 14, an embodiment is illustrated in which Multi-directional Pictures Repository 115 may include Core Program 110. In this integrated implementation, Multi-directional Pictures Repository 115 may include hardcoded Core Program 110. In some aspects, Multi-directional Pictures Repository 115 may include a data structure whose data field may include Core Program 110. In this integrated implementation, Core Program 110 may initiate or execute when Multi-directional Pictures Repository 115 is executed or opened such as, for example, when a user double-clicks to open a Multi-directional Pictures Repository 115 file including a representation of a particular object.

Figure 15:
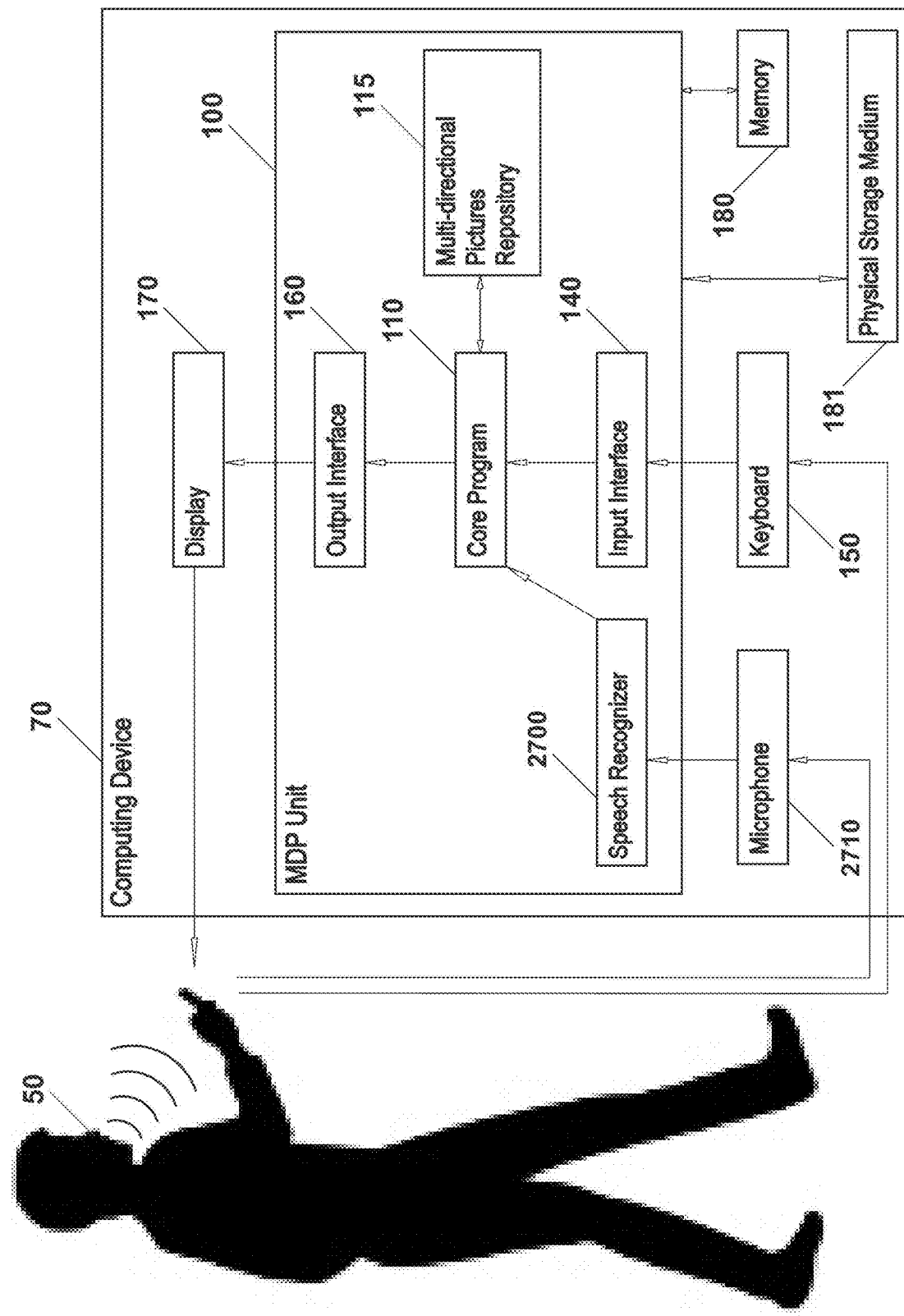
FIG. 15 is a diagram showing an embodiment of MDP Unit 100 with Speech Recognizer 2700.

Referring to FIG. 15, in some aspects, the teaching presented by the disclosure may be implemented to include speech recognition for voice input. User may use a Computing Device 70 that may include Core Program 110, Multi-directional Pictures Repository 115, Input Interface 140, Keyboard 150, Output Interface 160, Display 170, Memory 180, Physical Storage Medium 181, Speech Recognizer 2700, and/or Microphone 2710. Other additional elements may be included as needed, or some of the disclosed ones may be excluded, or a combination thereof may be utilized in alternate embodiments.

Speech Recognizer 2700 may comprise any hardware, software or a combination of hardware and software. Speech Recognizer 2700 may include functions and algorithms for processing input events of Microphone 2710 for use by Core Program 110 and/or other elements of the disclosed methods, systems and apparatuses. Speech Recognizer 2700 may include functions and algorithms for "listening" to voice events on Microphone 2710, interpreting the voice events as User's voice commands, and/or transmitting the voice commands for use by Core Program 110. Speech Recognizer 2700 may fall under the general description of the previously described Input Interface 140, and while it includes all the aforementioned embodiments, it is described separately in this embodiment to offer additional detail on its functioning. Speech Recognizer 2700 may be implemented by utilizing (1) a Computing Device 70 operating system's speech recognition functionality such as iOS's Voice Services, Siri, etc. which may come inherently as the part of the computing device or mobile device package; (2) a Java Speech API (JSAPI) or any of its implementations such as The Cloud Garden, Sphinx, etc.; and/or (3) applications or engines providing speech recognition functionality such as OpenEars, Dragon Mobile, iSpeech, CeedVocal, Flite, Julius, etc. In some aspects, a lexicon of voice commands (i.e. words, phrases, etc.) may be utilized in which each voice command may be associated with the previously described input means such as Picture Arrow 860a, 860b, 860c, 860d, etc., Direction Arrow 850a, 850b, 850c, 850d, etc., Orientation Pointer 870, and/or other input means to facilitate the input of operating instructions through voice input. In one example, a phrase "go forward" may be a voice command in the lexicon and it may be associated with a Forward Multi-directional Still Picture Link 220a or Forward Multi-directional Motion Picture Link 420a. In another example, a phrase "look right" may be a voice command in the lexicon and it may be associated with a Right Still Picture 210c or Right Motion Picture 410c. In some embodiments, MDP Unit 100 including Speech Recognizer 2700 may enable a user to utilize the functionalities described herein by issuing voice commands (i.e. words, phrases, etc.) combined with utilizing the previously described input means such as Picture Arrows 860a, 860b, 860c, 860d, etc., Direction Arrows 850a, 850b, 850c, 850d, etc., Orientation Pointer 870, and/or other input means. In other embodiments, MDP Unit 100 with Speech Recognizer 2700 may enable a user to utilize the functionalities described herein by issuing voice commands only, which voice commands may select or activate the previously described input means such as Picture Arrows 860a, 860b, 860c, 860d, etc., Direction Arrows 850a, 850b, 850c, 850d, etc., Orientation Pointer 870, and/or other input means.

Microphone 2710 may comprise any hardware, software or a combination of hardware and software. Microphone 2710 may include functions and algorithms for receiving and/or detecting User's voice events or inputs. Most modern computing and mobile devices include Microphone 2710 as one of the input devices.

In some embodiments, MDP Unit 100 may use the Computing Device 70 operating system's speech recognition functionality as the Speech Recognizer 2700. Core Program 110 may use the operating system's native speech recognition API such as the iOS Voice Services to obtain user's voice commands. In one example, Microphone 2710 may detect user's voice event; the iOS Voice Services may interpret the voice event as user's voice command and make the voice event available as data (i.e. text, instruction, instruction set, command, object, data structure, etc.) to Core Program 110; and the Core Program 110 may use the data for selecting or activating a specific input means such as Picture Arrow 860a, 860b, 860c, 860d, etc., Direction Arrow 850a, 850b, 850c, 850d, etc., Orientation Pointer 870, and/or other input means.

In other embodiments, MDP Unit 100 may use a Java Speech API (JSAPI) implementation as the Speech Recognizer 2700. Core Program 110 may use a JSAPI implementation such as The Cloud Garden to obtain user's voice commands. In one example, Microphone 2710 may detect user's voice event; the Cloud Garden JSAPI may interpret the voice event as user's voice command and make the voice event available as data (i.e. text, instruction, instruction set, command, object, data structure, etc.) to Core Program 110; and the Core Program 110 may use the data for selecting or activating a specific input means such as Picture Arrow 860a, 860b, 860c, 860d, etc., Direction Arrow 850a, 850b, 850c, 850d, etc., Orientation Pointer 870, and/or other input means.

In yet other embodiments, MDP Unit 100 may use applications or engines providing speech recognition functionality as the Speech Recognizer 2700. Core Program 110 may use an application or engine such as the OpenEars Software Development Kit (SDK) to obtain user's voice commands. In one example, Microphone 2710 may detect user's voice event; the OpenEars SDK may interpret the voice event as user's voice command and make the voice event available as data (i.e. text, instruction, instruction set, command, object, data structure, etc.) to Core Program 110; and the Core Program 110 may use the data for selecting or activating a specific input means such as Picture Arrow 860a, 860b, 860c, 860d, etc., Direction Arrow 850a, 850b, 850c, 850d, etc., Orientation Pointer 870, and/or other input means.

Depending on resource availability Speech Recognizer 2700 may be implemented as keyword spotting or as full speech recognition. Keyword spotting may attempt to find only a select group of words and/or phrases, and because of this limited lexicon it consumes fewer resources. In the case of keyword spotting implementation, words or phrases such as "forward", "go forward", "backward", "go backward", "right", "go right", "left", "go left", "forward picture", "look forward", "backward picture", "look backward", "right picture", "look right", "left picture", "look left", "north orientation", "south orientation", "east orientation", "west orientation", "forward orientation", "backward orientation", "right orientation", "left orientation" and/or other words or phrases may define the select group of words and/or phrases to be searched. Full speech recognition may attempt to find all words and/or phrases that have been spoken, and because of this broader lexicon it consumes significant resources. In the case of full speech recognition implementation, the broadness of words and/or phrases would by definition include all words or phrases needed for MDP Unit 100. In some embodiments, both keyword spotting and full speech recognition implementations may include a file or database of words and/or phrases located locally on the Computing Device 70 or remotely on a Remote Computing Device 1310 accessible over a Network 1300.

Figure 16:
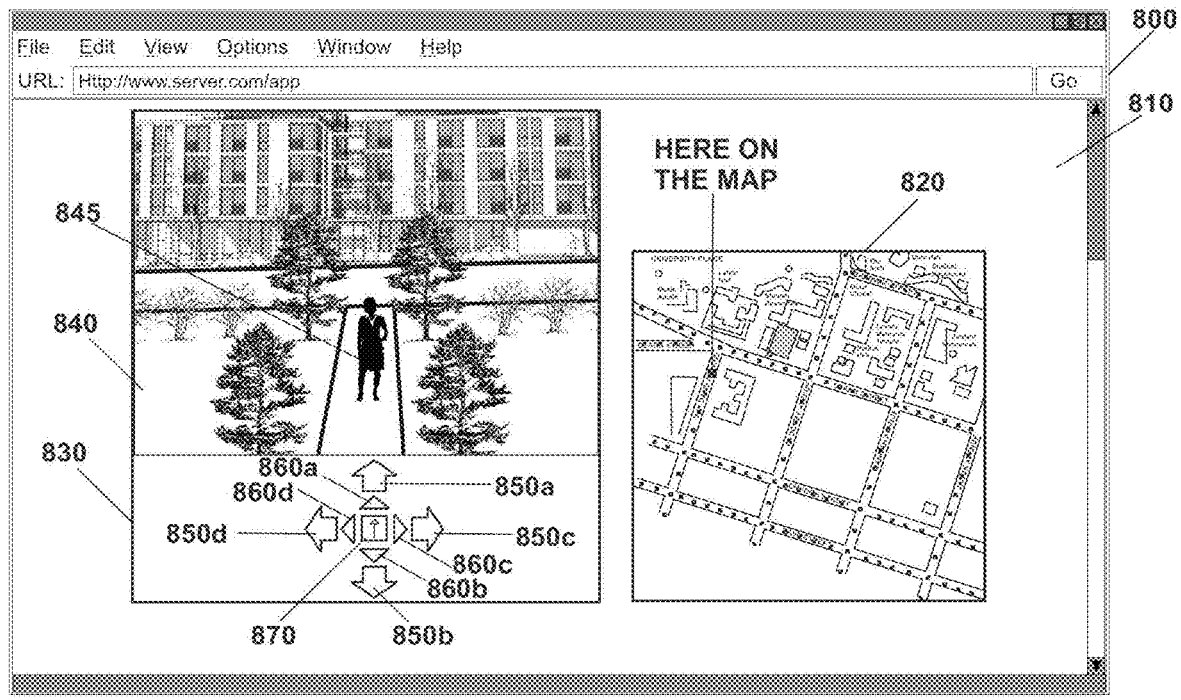
FIG. 16 shows an embodiment of a multi-user MDP Unit 100 implemented in a web browser.
Figure 16:
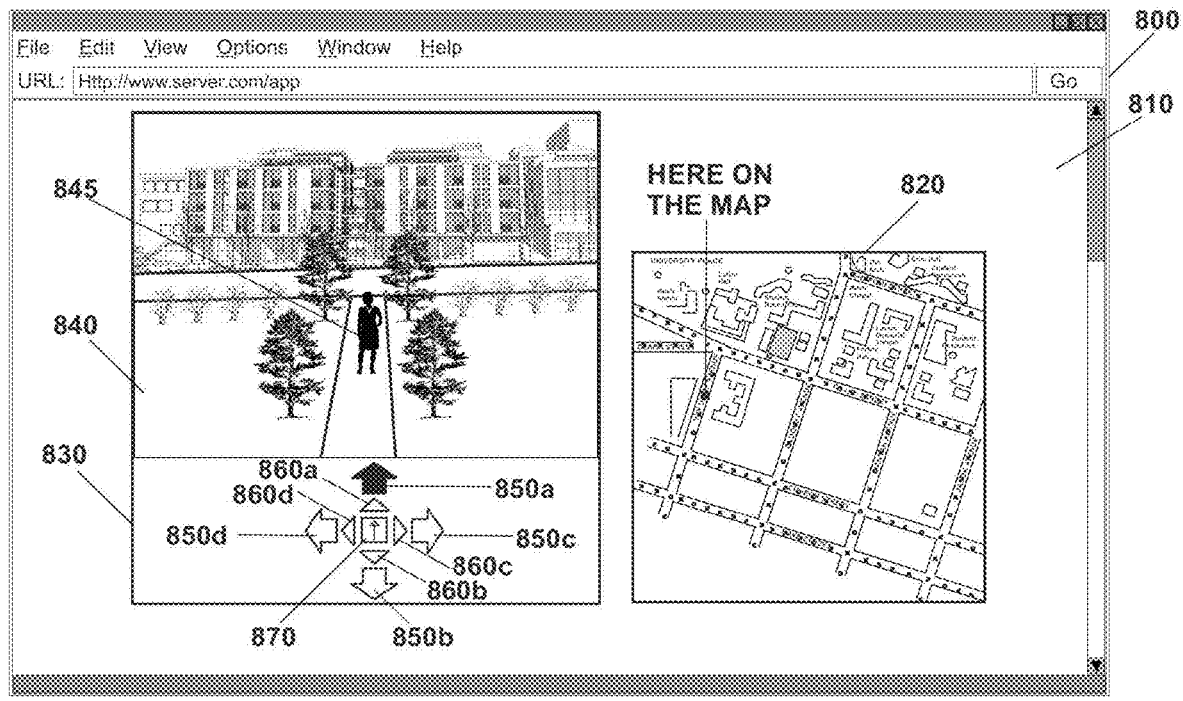

Referring to FIG. 16, the illustration shows an embodiment of MDP Unit 100 implemented to include multi-user functionality (also referred to as multi-user MDP Unit 100 or MDP application). Multi-user MDP Unit 100 may enable multiple users to see and/or interact with each other within a MDP application. In some aspects, each user of a multi-user MDP application may be represented and/or shown by his/her Avatar 845. A user may see other users' Avatars 845 through Display Window 840 as the user moves among Multi-directional Still Pictures 200 and views Still Pictures 220a, 220b, 220c, 220d, etc. In some embodiments, an instance of multi-user MDP Unit 100 may execute or run on a Remote Computing Device 1310 (i.e. application server, cloud, etc.) to which users may connect over a Network 1300 (i.e. corporate enterprise network, Internet, etc.). Users may be remote from each other (i.e. in different buildings, in different cities, in different parts of the world, etc.) and may use their Computing Devices' 70 networking functionalities to connect to a Remote Computing Device 1310 (i.e. application server, cloud, etc.) running an instance of multi-user MDP Unit 100. As such, multi-user MDP Unit 100 may be implemented as a network service for all the world's users who wish to experience seeing and/or interacting with each other in a MDP application. In some aspects, multi-user functionality may be implemented to create or define a virtual world where users may see and/or interact with each other. Users may be offered a variety of types or forms of Avatars 845 from which to choose. For example, a female user may prefer a female-looking Avatar 845 wearing a long skirt whereas a male user may prefer a muscular-looking Avatar 845 wearing a t-shirt. Each Avatar 845 may be associated with a Multi-directional Still Picture 200 of the Avatar's 845 user's location within a multi-user MDP application. Association of a user's Avatar 845 and a Multi-directional Still Picture 200 may include Avatar's 845 identifier and Multi-directional Still Picture's 200 identifier. Associations of users' Avatars 845 and Multi-directional Still Pictures 200 may be tracked and/or stored in Multi-directional Pictures Repository 115, and/or any file, object, data structure, DBMS, database, system, process, or other repository. Once associated with a Multi-directional Still Picture 200 of the user's location in a represented object, an Avatar 845 may be shown at that location. In some embodiments, showing an Avatar 845 may include inserting Avatar's 845 picture into one or more Still Pictures 210a, 210b, 210c, 210d, etc. of one or more Multi-directional Still Pictures 200. As a user moves from one Multi-directional Still Picture 200 to another, his/her Avatar's 845 picture may be deleted from Still Pictures 210a, 210b, 210c, 210d, etc. where it was previously inserted and his/her Avatar's 845 picture may be inserted into new Still Pictures 210a, 210b, 210c, 210d, etc. to correspond to user's new location. In other embodiments, showing an Avatar 845 may include superimposing or overlying Avatar's 845 picture onto one or more Still Pictures 210a, 210b, 210c, 210d, etc. of one or more Multi-directional Still Pictures 200. In some aspects, superimposing or overlying an Avatar's 845 picture onto one or more Still Pictures 210a, 210b, 210c, 210d, etc. of one or more Multi-directional Still Pictures 200 may include a layer (i.e. digital picture layer, etc.) comprising the Avatar's 845 picture. As a user moves from one Multi-directional Still Picture 200 to another, his/her Avatar's 845 picture may be removed from Still Pictures 210a, 210b, 210c, 210d, etc. where it was previously superimposed and his/her Avatar's 845 picture may be superimposed onto new Still Pictures 210a, 210b, 210c, 210d, etc. to correspond to user's location. In yet other embodiments, an Avatar's 845 picture may be dynamically (i.e. as needed, etc.) inserted into or superimposed onto one or more Still Pictures 210a, 210b, 210c, 210d, etc. of one or more Multi-directional Still Pictures 200 if Avatar 845 is located within another user's field of view or line of sight. Avatar's 845 picture may include any digital picture, any animated picture (i.e. animated GIF picture, etc.), any computer generated object (i.e. 3D object, etc.), any vector graphics, any video, and/or any other representation of a user's Avatar 845. Avatar's 845 picture may be animated to display various behaviors and/or emotions such as, for example, laughing, crying, jumping, pointing finger, walking back and forth in a specific location, and/or any other behaviors and/or emotions. A user may turn his/her Avatar 845 in various directions in a specific location (i.e. Multi-directional Still Picture 200) of a represented object. In some aspects, an Avatar 845 (i.e. avatar's face and frontal side) may be turned in the direction of his/her user's view or selection of Still Picture 210a, 210b, 210c, 210d, etc. For example, if Avatar's 845 user is viewing a Forward Still Picture 210a including a view of a building, the Avatar's 845 face and frontal side may be directed toward the building. As such, pictures of variously directed versions of the same Avatar 845 may be maintained and inserted into or superimposed onto Still Pictures 210a, 210b, 210c, 210d, etc. based on Avatar's 845 user's direction of view. In some embodiments, Avatar's 845 direction may be associated with Orientation 205. In other embodiments, Avatar's 845 direction may be unassociated with user's direction of view and/or Orientation 205 in which case user may control his/her Avatar's 845 direction by utilizing input means on the Computing Device 70 such as arrows or other directional signs indicating Avatar's 845 direction. A user may move his/her Avatar 845 into various locations by moving among Multi-directional Still Pictures 200 (i.e. locations of a represented object). Generally, Avatar's 845 location may correspond to Avatar's 845 user's location (i.e. Multi-directional Still Picture 200 representing the location) in a represented object and Avatar's 845 movement may correspond to Avatar's 845 user's movement among Multi-directional Still Pictures 200. However, in some embodiments, Avatar's 845 movement may be unassociated with his/her user's movement among Multi-directional Still Pictures 200 in which case user may control his/her Avatar's 845 movement by utilizing input means on the Computing Device 70 such as arrows or other directional signs indicating Avatar's 845 movement.

In some embodiments, multi-user MDP Unit 100 may enable a user to experience first-person perspective or view. First-person perspective may show other users' Avatars 845, but may not typically show user's own Avatar 845. In some implementations of first-person perspective, user may be able to see his/her Avatar's 845 hands, feet, other body parts, and/or objects that Avatar 845 may be holding. In other embodiments, multi-user MDP Unit 100 may enable a user to experience third-person perspective where user may see his/her own Avatar 845 as well as other users' Avatars 845. In some aspects, third-person perspective may be achieved by inserting or superimposing user's own Avatar's 845 picture into/onto a Still Picture 210a, 210b, 210c, 210d, etc. of a Multi-directional Still Picture 200 representing user's location in a collection of Multi-directional Still Pictures 200. In other aspects, third-person perspective may be achieved by inserting or superimposing user's own Avatar's 845 picture into/onto a Still Picture 210a, 210b, 210c, 210d, etc. of a nearby Multi-directional Still Picture 200 and displaying the Still Picture 210a, 210b, 210c, 210d, etc. of the nearby Multi-directional Still Picture 200 comprising Avatar's 845 picture. In some embodiments, positional audio may be implemented where ambient sounds may vary depending on Avatar's 845 location in a represented object. In other embodiments, audio conversation among proximal Avatars 845 may be implemented via their user's network interconnected Computing Devices 70 and their respective sound input and output devices (i.e. microphones, speakers, etc.) and interfaces (i.e. Input Interfaces 140, Output Interfaces 160, etc.). In one example, a user may view a Forward Still Picture 210a including a view of a park's walkway facing a nearby building where another user's Avatar 845 may stand as shown in Step 1 of FIG. 16. Picture Display 840 may show Forward Still Picture 210a including inserted or superimposed picture of the other user's Avatar 845. User may select or activate Forward Direction Arrow 850a and move from current to a next Multi-directional Still Picture 200, which may bring user to a next location on park's walkway such as location depicted in Step 2 of FIG. 16. Such movement may bring user and/or his/her Avatar 845 closer to the other user's Avatar 845. User may then interact with the other user and/or his/her Avatar 845 including communication (i.e. verbal communication, signs communication, body language, gestures, etc.), physical contact of the two Avatars 845 (i.e. shaking hands, dancing, fighting, etc.), and/or any other type or form of interaction. As such, multi-user MDP Unit 100 may enable a user to view all views (i.e. forward, backward, right, left, up, down, diagonal, angular, etc.) from all locations (i.e. Multi-directional Still Pictures 200) of a represented object (i.e. park in this example) as well as to simulate user's motion through the represented object (i.e. park in this example) including seeing and/or interacting with other users' Avatars 845. In some embodiments, each Avatar's 845 location and/or identification (i.e. name of user or user's avatar, etc.) may be shown on Map 820. This functionality may enable a user to instantly visit a Multi-directional Still Picture 200 (i.e. location of a represented object) associated with another user's Avatar 845 by clicking on Map's 820 spot indicating the other user's Avatar 845.

In some embodiments, movement, appearance, behavior, and/or other features and/or aspects of an Avatar 845 may be controlled by a program or algorithm. Such program or algorithm may include a collection of references to Multi-directional Still Pictures 200 defining a path of movement of Avatar 845. Such program or algorithm may include Avatar's 845 picture defining appearance of Avatar 845. Such program or algorithm may include a set of instructions defining Avatar's 845 behaviors and/or emotions such as, for example, behaviors and/or emotions in proximity to other Avatars 845 or objects. Such program or algorithm may include functionality to control or define any other features or aspects of Avatar 845. In one example, Avatar 845 may be programmed to circle a building in a college campus (i.e. represented object) at night. The program or algorithm controlling Avatar 845 may include a collection of references to Multi-directional Still Pictures 200 representing locations around the building. The program or algorithm controlling Avatar 845 may include a picture of a security guard as Avatar's 845 picture. The program or algorithm controlling Avatar 845 may include a set of instructions that may cause Avatar 845 to display certain behaviors or emotions in specific situations. Using the collection of references to Multi-directional Still Pictures 200, Avatar 845 may move among the referenced Multi-directional Still Pictures 200. A period of time may be defined to be spent by Avatar 845 in each Multi-directional Still Picture 200 before moving to a next Multi-directional Still Picture 200 in the collection. Users of a multi-user MDP Unit 100 may see the security guard picture of Avatar 845 and interact with the Avatar 845. If a user-controlled Avatar 845 approaches the "guarded" building, the program or algorithm may cause the program-controlled Avatar 845 to position itself in front of the incoming user's Avatar 845 and issue audible warning (i.e. "access to this building is restricted at night", etc.) for example. Any other movements, appearances, behaviors, and/or other features and/or aspects of an Avatar 845 may similarly be implemented by a program or algorithm. In some embodiments, program-controlled Avatars 845 may interact with each other and/or objects in a MDP application as if they were user-controlled Avatars 845. Such functionality may enable implementation of an evolving virtual world with various and/or unforeseen scenarios based on program-controlled Avatars' 845 interactions. Human users may enter and experience this evolving virtual world and interact with program-controlled Avatars 845 as previously described.

Figure 17:
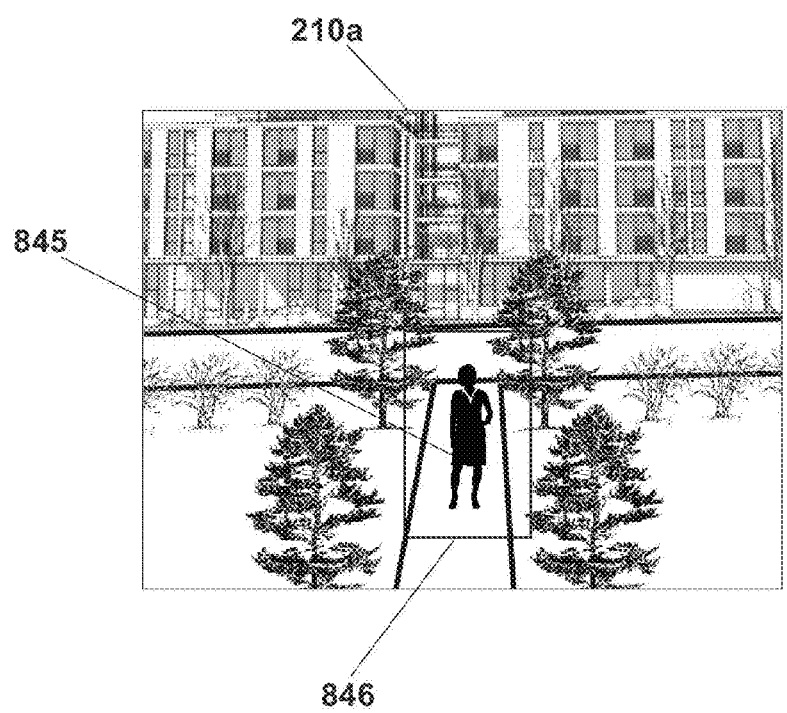
FIG. 17 shows an embodiment of multi-user MDP Unit 100 implemented to show Avatar 845 in a Still Picture 210a, 210b, 210c, 210d, etc.

Referring to FIG. 17, the illustration shows an embodiment of multi-user MDP Unit 100 implemented to show Avatar 845. In one example, a Forward Still Picture 210*a* may include a view from a location of a represented object. Another user's Avatar 845 may be within field of view or line of sight, and the Avatar's 845 picture may be shown in the Forward Still Picture 210*a*. In some embodiments, Avatar's 845 picture may be inserted into Forward Still Picture 210*a* by replacing pixels of the Forward Still Picture 210*a* with Avatar's 845 picture's pixels through picture processing. Additional picture processing may also be performed on Forward Still Picture 210*a* such as, for example, adding a shadow by darkening pixels near Avatar's 845 picture, smoothing pixels around the edges of Avatar's 845 picture for a finer blending into the background of Forward Still Picture 210*a*, and/or any other picture processing to enhance appearance of Avatar 845. In other embodiments, Avatar's 845 picture may be superimposed or overlayed onto Forward Still Picture 210*a*. In some aspects, superimposing or overlying Avatar's 845 picture onto Forward Still Picture 210*a* may include creating or defining a new layer (i.e. digital picture layer, etc.) comprising Avatar's 845 picture's pixels for Avatar's appearance and/or transparent pixels for the background (i.e. Forward Still Picture 210*a*, etc.). Examples of types of digital pictures including layer and/or transparency functionalities include Portable Document Format (PDF), Graphics Interchange Format (GIF), Photoshop Document (PSD), and/or other types or formats of digital pictures. In yet other embodiments, Avatar's 845 picture may be inserted into or superimposed onto a copy (i.e. copy in memory, temporary copy, etc.) of Forward Still Picture 210*a* without altering the original Forward Still Picture 210*a*.

In some embodiments, picture processing may be implemented on a Computing Device 70 to find Still Pictures 210*a*, 210*b*, 210*c*, 210*d*, etc. that may be within a line of sight from an Avatar's 845 location. Avatar's 845 picture may then be inserted into or superimposed onto the found Still Pictures 210*a*, 210*b*, 210*c*, 210*d*, etc. for users of a multi-user MDP Unit 100 to see the Avatar 845 from various locations and/or distances within a line of sight. Finding Still Pictures 210*a*, 210*b*, 210*c*, 210*d*, etc. that may be within a line of sight from an Avatar's 845 location may include identifying a Region 846 around a position where Avatar's 845 picture may be inserted into or superimposed onto a Still Picture 210*a*, 210*b*, 210*c*, 210*d*, etc. In some aspects, finding Still Pictures 210*a*, 210*b*, 210*c*, 210*d*, etc. that may be within a line of sight from an Avatar's 845 location may include identifying a Region 846 around a position where Avatar's 845 picture may be inserted into or superimposed onto a Still Picture 210*a*, 210*b*, 210*c*, 210*d*, etc. of a Multi-directional Still Picture 200 associated with Avatar 845 (i.e. Avatar's 845 location). Region 846 may include any portion, subset, or area of the Still Picture 210*a*, 210*b*, 210*c*, 210*d*, etc. from which it originates. Region 846 may be of any shape or size such as, for example, a Region 846 shaped as Avatar's 845 picture, a Region 846 larger or smaller than Avatar's 845 picture, a Region 846 partially shaped as Avatar's 845 picture, a rectangular Region 846 around Avatar's 845 picture, a round Region 846 around Avatar's 845 picture, an odd-shaped Region 846 around Avatar's 845 picture, and/or any other Region 846 around a position where Avatar's 845 picture may be inserted or superimposed. Finding Still Pictures 210*a*, 210*b*, 210*c*, 210*d*, etc. that may be within a line of sight from an Avatar's 845 location may include comparing the identified Region 846 with another Still Picture 210*a*, 210*b*, 210*c*, 210*d*, etc. (i.e. comparative picture) to determine if the Still Picture 210*a*, 210*b*, 210*c*, 210*d*, etc. (i.e. comparative picture) may include all or a portion of Region 846. Finding a Still Picture 210*a*, 210*b*, 210*c*, 210*d*, etc. (i.e. comparative picture) that may include all or a portion of Region 846 may indicate that the Still Picture 210*a*, 210*b*, 210*c*, 210*d*, etc. (i.e. comparative picture) may belong to a same line of sight as a Still Picture 210*a*, 210*b*, 210*c*, 210*d*, etc. from which the identified Region 846 originates. This indication may be derived from a premise that if one digital picture (i.e. comparative picture, etc.) may include all or a portion of a region of another digital picture, the two digital pictures may be portraying the same line of sight. In some aspects, comparing digital pictures to determine if one may include all or a portion of a region (i.e. Region 846) of another picture may be performed by determining if a region of pixels of one picture (i.e. comparative picture) may match a region (i.e. Region 846) of pixels of another picture. The threshold for similarity in each of the pixels required for a match may be adjustable by a user or automatically adjustable as needed. Such threshold may include exact match such as 100% match, nearly exact match such as 90% or 80% match, mostly match such as 70% or 60%, half match such as 50%, low match such as 40% or 30% match, or any other match. The threshold for the number of pixels required for a match may similarly be adjustable. In other aspects, comparing digital pictures to determine if one may include all or a portion of a region (i.e. Region 846) of another picture may be performed by determining if a region of pixels of one picture (i.e. comparative picture) may match a resized (i.e. downsized, upsized, etc.) region (i.e. Region 846) of pixels of another picture. Any of the publically available or other digital picture resizing algorithms or techniques may be used. Resizing of Region 846 may be performed incrementally (i.e. resizing by one pixel at a time in length or width keeping aspect ratio constant, etc.) to reduce or increase the size (i.e. number of pixels, etc.) of Region 846. Each incrementally resized Region 846 or a copy thereof may then be compared with all regions of a comparative picture. A comparative picture whose region may be found to match Region 846 may be a Still Picture 210*a*, 210*b*, 210*c*, 210*d*, etc. within a same line of sight as a Still Picture 210*a*, 210*b*, 210*c*, 210*d*, etc. from which Region 846 originates. If a match is not found between any regions of a comparative picture and any of the incrementally resized Regions 846 or copies thereof, the comparison may be performed between regions of other Still Pictures 210*a*, 210*b*, 210*c*, 210*d*, etc. (i.e. comparative pictures) in a MDP application and resized Regions 846 or copies thereof. As such, regions of al Still Pictures 210*a*, 210*b*, 210*c*, 210*d*, etc. in a MDP application may be compared with resized Regions 846 or copies thereof to find all Still Pictures 210*a*, 210*b*, 210*c*, 210*d*, etc. that may include all or a portion of Region 846. Avatar's 845 picture may then be inserted into or superimposed onto these Still Pictures 210*a*, 210*b*, 210*c*, 210*d*, etc. In some aspects, inserting or superimposing Avatar's 845 picture into/onto Still Pictures 210*a*, 210*b*, 21 *c*, 210*d*, etc. found to be within a line of sight may include inserting or superimposing Avatar's 845 picture in position where a resized Region 846 is found in each of the Still Pictures 210*a*, 210*b*, 210*c*, 210*d*, etc. In other aspects, Avatar's 845 picture or a copy thereof may be resized and then inserted into or superimposed onto Still Pictures 210*a*, 210*b*, 210*c*, 210*d*, etc. to show a view of the Avatar 845 in perspective as later described.

In one example, Avatar 845 may be associated with a Multi-directional Still Picture 200 on a park's walkway near a building as shown in FIG. 17. Avatar's 845 picture may be inserted into or superimposed onto Forward Still Picture 210a of the Multi-directional Still Picture 200 associated with the Avatar 845. This way, Avatar's 845 picture may be shown to users of a multi-user MDP application at Avatar's 845 location. Picture processing may be implemented on a Computing Device 70 to find Still Pictures 210a, 210b, 210c, 210d, etc. that may be within a line of sight from Avatar's 845 location (i.e. Multi-directional Still Picture 200 associated with Avatar 845). Region 846 may be identified around the position where Avatar's 845 picture may be inserted into or superimposed onto Forward Still Picture 210a. Such Region 846 may include a selection of pixels such as, for example, a rectangular selection of pixels that may be larger than the Avatar's 845 picture. Still Pictures 210a, 210b, 210c, 210d, etc. that may be within a line of sight from Avatar's 845 location may then be detected by finding Still Pictures 210a, 210b, 210c, 210d, etc. of any Multi-directional Still Pictures 200 that may include all or a portion of the identified Region 846. A first Still Picture 210a, 210b, 210c, 210d, etc. (i.e. comparative picture) may be compared with Region 846 to determine if a region of pixels of the first Still Picture 210a, 210b, 210c, 210d, etc. (i.e. comparative picture) may match all or a portion of pixels of Region 846. Such comparison may include incrementally downsizing Region 846 by one pixel at a time in length or width keeping aspect ratio constant (i.e. reducing the size from 40×120 pixels to 39×117 pixels, etc.) and comparing the downsized Region 846 with all regions of the first Still Picture 210a, 210b, 210c, 210d, etc. to find a region of the first Still Picture 210a, 210b, 210c, 210d, etc. that may match all or a portion of pixels of the downsized Region 846. The downsized Region 846 may first be compared with a same sized (i.e. 39×117 pixels in this example, etc.) initial region of the first Still Picture 210a, 210b, 210c, 210d, etc. starting at pixel [1,1]. If a match is not found, the downsized Region 846 may then be compared with a same sized (i.e. 39×117 pixels in this example, etc.) region of the first Still Picture 210a, 210b, 210c, 210d, etc. starting at pixel [2,1]. If a match is still not found, the downsized Region 846 may then be compared with same sized (i.e. 39×117 pixels in this example, etc.) regions of the first Still Picture 210a, 210b, 210c, 210d, etc. each starting at remaining pixels in y line 1 (i.e. [3,1], [4,1], [5,1], . . . ). If a match is still not found, the downsized Region 846 may then be compared with same sized (i.e. 39×117 pixels in this example, etc.) regions of the first Still Picture 210a, 210b, 210c, 210d, etc. each starting at remaining pixels in y lines 2 (i.e. [1,2], [2,2], [3,2], . . . ), 3, 4, and so on until the last pixel of the first Still Picture 210a, 210b, 210c, 210d, etc. (pixel coordinates in a digital picture and an example of a searching pattern are later described in more detail). The comparison may include any initial region of the first Still Picture 210a, 210b, 210c, 210d, etc. such as, for example, region in the middle of first Still Picture 210a, 210b, 210c, 210d, etc., region at the end of first Still Picture 210a, 210b, 210c, 210d, etc., region at right of first Still Picture 210a, 210b, 210c, 210d, etc., region at left of first Still Picture 210a, 210b, 210c, 210d, etc., and/or any other initial region. Also, the comparison may include any search pattern for regions of the first Still Picture 210a, 210b, 210c, 210d, etc. such as, for example, linear searching in any direction, outward searching from a middle region, forward searching from a region in the beginning, backward searching from a region at the end, and/or any other search pattern. If a match is not found between any region of the first Still Picture 210a, 210b, 210c, 210d, etc. and the downsized Region 846, Region 846 may be downsized to a next smaller size. All regions of the first Still Picture 210a, 210b, 210c, 210d, etc. may then be compared with the new downsized Region 846 to find a region of the first Still Picture 210a, 210b, 210c, 210d, etc. that may match all or a portion of the new downsized Region 846. Incrementally downsizing Region 846 and comparing regions of the first Still Picture 210a, 210b, 210c, 210d, etc. with downsized Regions 846 may be repeated until a match is found. If any region of the first Still Picture 210a, 210b, 210c, 210d, etc. is found to match all or a portion of any downsized Region 846, the first Still Picture 210a, 210b, 210c, 210d, etc. may be within a same line of sight as a Still Picture 210a, 210b, 210c, 210d, etc. from which Region 846 originates. Any of the described steps for comparing regions of the first Still Picture 210a, 210b, 210c, 210d, etc. with downsized Regions 846 may be performed with all Still Pictures 210a, 210b, 210c, 210d, etc. in a MDP application to find Still Pictures 210a, 210b, 210c, 210d, etc. within a same line of sight as Still Picture 210a, 210b, 210c, 210d, etc. from which Region 846 originates. Avatar's 845 picture may then be inserted into or superimposed onto these Still Pictures 210a, 210b, 210c, 210d, etc. in position where Region 846 is found in each of the Still Pictures 210a, 210b, 210c, 210d, etc. This way, users of a multi-user MDP application may see Avatar 845 from various locations and/or distances within a line of sight. In some aspects, Avatar's 845 picture may be shown in perspective (i.e. larger as the distance from the observer decreases and smaller as the distance from the observer increases). Showing Avatar's 845 picture in perspective may include inserting or superimposing increased size Avatar's 845 picture into/onto Still Pictures 210a, 210b, 210c, 210d, etc. as user approaches the Avatar 845 or decreased size Avatar's 845 picture as user retreats from the Avatar 845. In some embodiments, a line of sight may be identified as same direction Still Pictures 210a, 210b, 210c, 210d, etc. of any Multi-directional Still Pictures 200 positioned in a straight line. In one example, Forward Still Pictures 210a of any Multi-directional Still Pictures 200 on a straight walkway in a park may be within a line of sight. In some aspects, previously described Multi-directional Still Picture Angles 230a, 230b, 230c, 230d, etc. may be utilized to identify Multi-directional Still Pictures 200 on a straight walkway in a park. For example, Multi-directional Still Pictures 200 with a same Forward Multi-directional Still Picture Angle 230a starting from a specific Multi-directional Still Picture 200 may be on a straight walkway in a park.

All described features and embodiments of multi-user MDP Unit 100 may similarly be utilized with Multi-directional Motion Pictures 400 (later described) where Avatar 845 may be inserted into streams of still pictures. In some embodiments, insertion of Avatar 845 may be performed as previously described into each still picture in a stream of still pictures (i.e. motion picture, etc.). Also, finding Motion Pictures 410a, 410b, 410c, 410d, etc. that may be within a line of sight from an Avatar's 845 location may be performed as previously described where processing or comparisons may be performed for each still picture in a stream of still pictures (i.e. motion picture, etc.) to find a match. Therefore, additional cycles of processing or comparisons may be performed. In some embodiments, still pictures from different streams having same time stamps may be processed or compared. In other embodiments, still pictures from different streams having similar time stamps may be processed or compared in which case a threshold may be defined by user or automatically to control how far before or after a specific still picture (i.e. frame, etc.) a search may go to find a matching still picture or a portion thereof.

Figure 18:
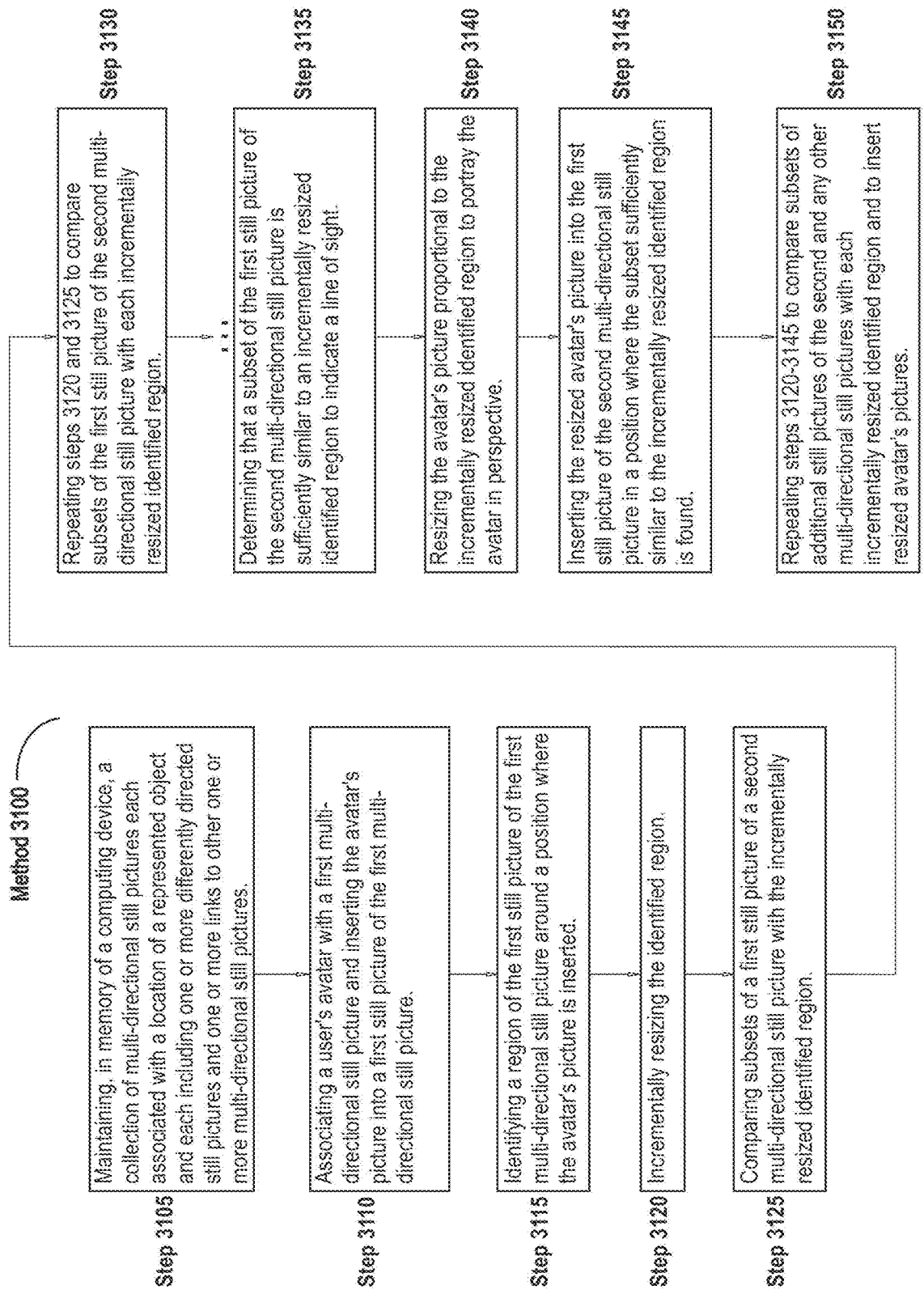
FIG. 18 illustrates a flow chart diagram of an embodiment of a method 3100 implemented by MDP Unit 100.

Referring to FIG. 18, the illustration shows an embodiment of a method 3100 for finding Still Pictures 210*a*, 210*b*, 210*c*, 210*d*, etc. that may be within a line of sight from an Avatar's 845 location and inserting Avatar's 845 picture in the found Still Pictures 210*a*, 210*b*, 210*c*, 210*d*, etc. The steps of this exemplary method may therefore be used to show a user's Avatar 845 in still pictures of any multi-directional still pictures from various locations and/or distances within a line of sight. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be utilized for finding Motion Pictures 410*a*, 410*b*, 410*c*, 410*d*, etc. (later described) that may be within a line of sight from an Avatar's 845 location and inserting Avatar's 845 picture in the found Motion Pictures 410*a*, 410*b*, 410*c*, 410*d*, etc.

At step 3105, a collection of multi-directional still pictures each associated with a location of a represented object and each including one or more differently directed still pictures and one or more links to other one or more multi-directional still pictures is maintained in memory of a computing device. At step 3110, a user's avatar is associated with a first multi-directional still picture and the avatar's picture is inserted into a first still picture of the first multi-directional still picture. At step 3115, a region of the first still picture of the first multi-directional still picture is identified around a position where the avatar's picture is inserted. At step 3120, the identified region is incrementally resized. At step 3125, subsets of a first still picture of a second multi-directional still picture are compared with the incrementally resized identified region. At step 3130, steps 3120 and 3125 are repeated to compare subsets of the first still picture of the second multi-directional still picture with each incrementally resized identified region. At step 3135, a determination is made that a subset of the first still picture of the second multi-directional still picture is sufficiently similar to an incrementally resized identified region to indicate a line of sight. At step 3140, the avatar's picture is resized proportional to the incrementally resized identified region to portray the avatar in perspective. At step 3145, the resized avatar's picture is inserted into the first still picture of the second multi-directional still picture in a position where the subset sufficiently similar to the incrementally resized identified region is found. At step 3150, steps 3120-3145 are repeated to compare subsets of additional still pictures of the second and any other multi-directional still pictures with each incrementally resized identified region and to insert resized avatar's pictures.

In some aspects, the teaching presented by the disclosure may be implemented in a device or system for inserting an avatar into still pictures. The device or system may include a processor and an interface, coupled to the processor, for receiving a collection of multi-directional still pictures each multi-directional still picture associated with a location of a represented object and including one or more differently directed still pictures and one or more links to other one or more multi-directional still pictures. The processor may be programmed to: associate a user's avatar with a first multi-directional still picture and insert the avatar's picture into a first still picture of the first multi-directional still picture. The device or system may further include a comparator, coupled to the processor, for identifying a region of the first still picture of the first multi-directional still picture around a position where the avatar's picture is inserted, and incrementally resizing the identified region. The comparator may further be configured to compare subsets of a first still picture of a second multi-directional still picture with the incrementally resized identified region, and determine that a subset of the first still picture of the second multi-directional still picture is sufficiently similar to an incrementally resized identified region to indicate a line of sight. The processor may further be programmed to: resize the avatar's picture proportional to the incrementally resized identified region to portray the avatar in perspective, and insert the resized avatar's picture into the first still picture of the second multi-directional still picture in a position where the subset sufficiently similar to the incrementally resized identified region is found. The processor, the interface, the comparator, and/or other elements of the device or system for inserting an avatar into still pictures may include any features and functionalities of Processor 11, Core Program 110, Multi-directional Pictures Repository 115, and/or other disclosed elements. The device or system may also include any functionalities or steps of any disclosed methods such as, for example, method 3100. For example, Core Program 110 may be implemented on Processor 11 and it may read still pictures or references thereto, any data structures (i.e. multi-directional still pictures, mazes, sequences, etc.) and/or other elements from Multi-directional Pictures Repository 115. As a user moves among multi-directional still pictures, Core Program 110 may insert or show the user's own avatar at a location associated with the user's current multi-directional still picture. Comparator may be implemented on Processor 11 and it may perform the described picture processing to find still pictures of any multi-directional still pictures that may be within a line of sight from the avatar's location. Core Program 110 may then insert or show the user's own avatar in the found still pictures for other users to see the avatar from various locations and/or distances within a line of sight from the user's location. Comparator may be included in Core Program 110, it may be a separate program implemented on Processor 11, it may be a hardware component or a separate processor dedicated to its assigned functionalities, or a combination thereof.

Figure 19:
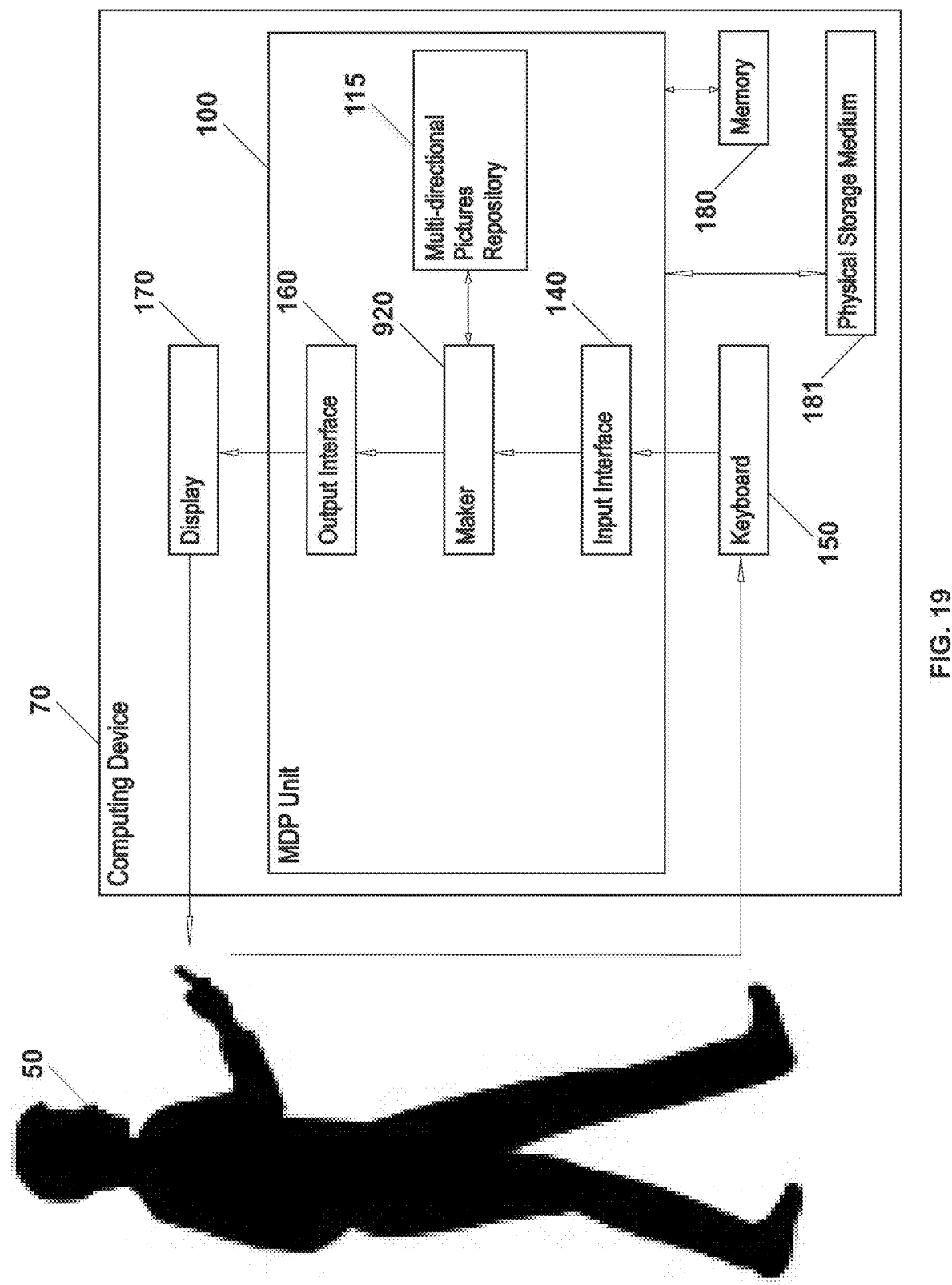
FIG. 19 is a diagram showing an embodiment of MDP Unit 100 with Maker 920.

Referring to FIG. 19, in some aspects, the teaching presented by the disclosure may be implemented to include methods, systems and apparatuses for creating, by or for a non-technical user, collections of Multi-directional Still Pictures 200 representing an object. While a collection of Multi-directional Still Pictures 200 representing an object may be created by a sophisticated computer programmer or complex specialized equipment by following the conceptual description above, Maker 920 may enable a non-technical user (also referred to as Designer 915) to create collections of Multi-directional Still Pictures 200 representing an object through a guided point and click process. As shown for example in FIG. 19, Designer 915 may operate a Computing Device 70 including Maker 920, Multi-directional Pictures Repository 115, Input Interface 140, Keyboard 150, Output Interface 160, Display 170, Memory 180, and/or Physical Storage Medium 181. Other additional elements may be included as needed, or some of the disclosed ones may be excluded, or a combination thereof may be utilized in alternate embodiments.

Maker 920 may comprise any software, hardware, or a combination of software and hardware. Maker 920 may include functions and algorithms for creating collections of Multi-directional Still Pictures 200 representing an object. Maker 920 may include functions and algorithms for guiding a Designer 915 in creating collections of Multi-directional Still Pictures 200 representing an object. Maker 920 may include functions and algorithms for guiding a Designer 915 in capturing Still Pictures 210a, 210b, 210c, 210d, etc. and in generating any data structures such as Multi-directional Still Pictures 200, Maze 300, and/or Multi-directional Picture Sequences 350. Maker 920 may also include functions and algorithms for generating and/or storing a Multi-directional Digital Pictures Repository 115, which may include Still Pictures 210a, 210b, 210c, 210d, etc. and/or any data structures such as Multi-directional Still Pictures 200, Maze 300, and/or Multi-directional Picture Sequences 350. Maker 920 may be, directly or operatively, connected to Input Interface 140, Output Interface 160, Multi-directional Digital Pictures Repository 115 and/or other elements to facilitate the overall system operation and implement the functionalities described herein.

Figure 20:
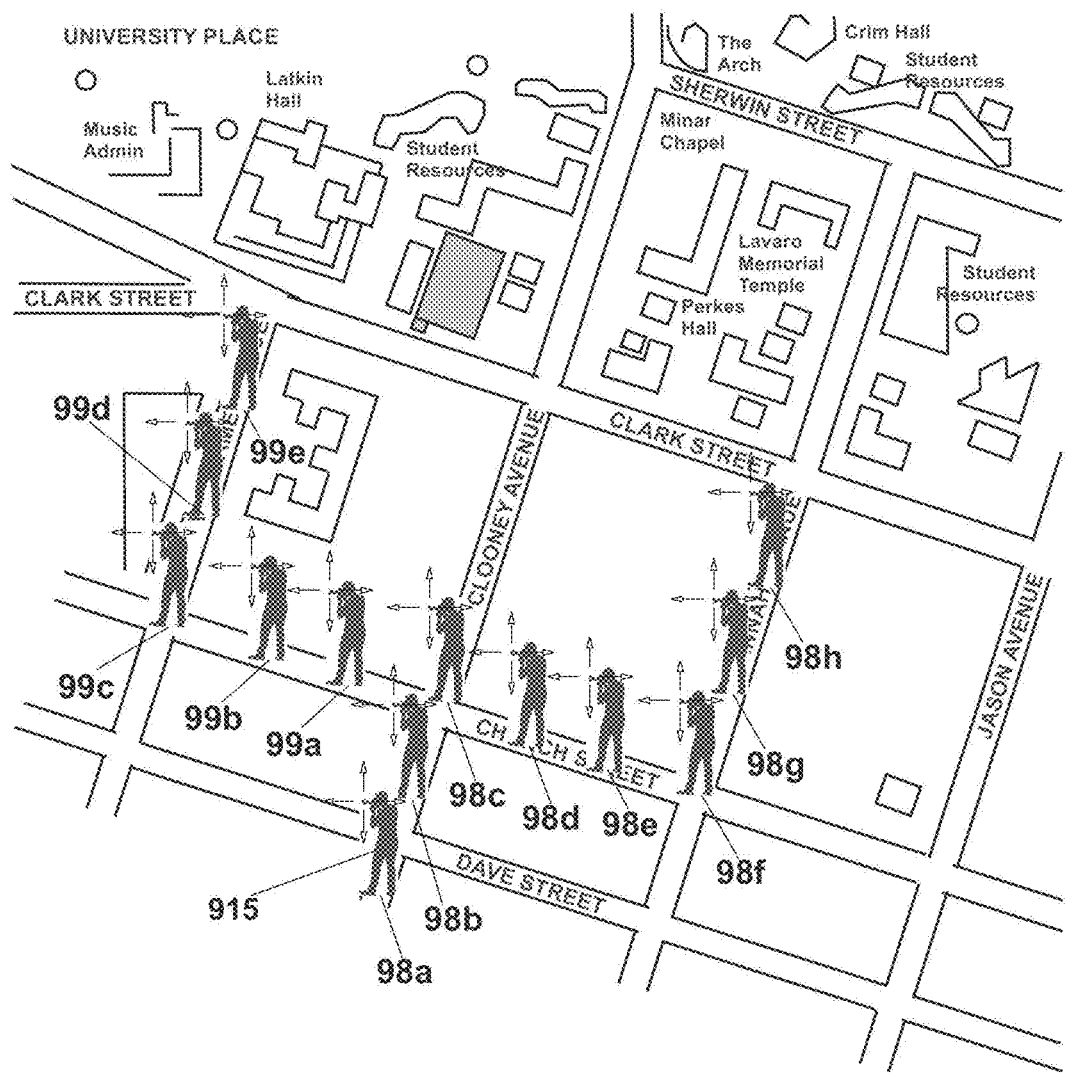
FIG. 20 shows an embodiment of MDP Unit 100 with Designer 915 creating Multi-directional Still Pictures 200 in curved paths.

Referring to FIG. 20, an embodiment is illustrated where Designer 915 may prefer to generate Multi-directional Still Pictures 200 in curved paths, for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 may run Maker 920 (i.e. an installed program, a web application, etc.) on the Computing Device 70.

STEP 3: Designer 915 may choose a path within the park such as, for example, the path with Locations 98a, 98b, 98c, 98d, 98e, 98f, 98g, 98h, etc. Designer 915 may also choose an initial location of the path such as, for example, Location 98a.

STEP 4: Maker 920 may ask Designer 915 to move into a location such as the initial Location 98a. Maker 920 may guide Designer 915 in generating a Multi-directional Still Picture 200 of Designer's 915 current location by asking him/her to capture Forward Still Picture 210a, Backward Still Picture 210b, Right Still Picture 210c, Left Still Picture 210d, and any additional Still Pictures from Designer's 915 current location using a built-in camera of the Computing Device 70, digital camera, or any other digital picture-taking equipment. Maker 920 may then generate a Multi-directional Still Picture 200 of a current location such as Location 98a including the captured Still Pictures 210a, 210b, 210c, 210d, etc.

STEP 5: Maker 920 may then ask Designer 915 whether he/she wishes to make a step in forward, backward, right, left or another direction (i.e. up, down, diagonal, angular, etc.). In one example, Designer 915 may indicate a forward direction to a next location such as Location 98b. Maker 920 may then guide Designer 915 in generating a Multi-directional Still Picture 200 of Designer's 915 current location by asking him/her to capture Forward Still Picture 210a, Backward Still Picture 210b, Right Still Picture 210c, Left Still Picture 210d, and any additional Still Pictures from Designer's 915 current location using a built-in camera of the Computing Device 70, digital camera, or any other digital picture-taking equipment. Maker 920 may then generate a Multi-directional Still Picture 200 of a current location such as Location 98b including the captured Still Pictures 210a, 210b, 210c, 210d, etc. Maker 920 may then automatically add a Backward Multi-directional Still Picture Link 220b to the current Multi-directional Still Picture 200 (i.e. of Location 98b, etc.), such Backward Multi-directional Still Picture Link 220b may point to a previously generated Multi-directional Still Picture 200 (i.e. of Location 98a, etc.). Maker 920 may also automatically add a Forward Multi-directional Still Picture Link 220a to a previously generated Multi-directional Still Picture 200 (i.e. of Location 98a, etc.), such Forward Multi-directional Still Picture Link 220a may point to a current Multi-directional Still Picture 200 (i.e. of Location 98b, etc.).

STEP 6: Designer 915 may repeat STEP 5 for subsequent Locations 98c, 98d, 98e, 98f, 98g, 98h, etc. until he/she reaches the end of the current path. Representation of the path may be complete when Still Pictures 210a, 210b, 210c, 210d, etc. are captured from al Locations 98a, 98b, 98c, 98d, 98e, 98f, 98g, 98h, etc. and Multi-directional Still Picture Links 220a, 220b, 220c, 220d, etc. are added for adjacent Multi-directional Still Pictures 200 that may need to be linked.

STEP 7: Designer 915 may repeat STEP 3, STEP 4, STEP 5, and STEP 6 for any other paths within the park such as the path with Locations 99a, 99b, 99c, 99d, 99e, etc.

STEP 8: In order to connect Multi-directional Still Pictures 200 and/or completed paths in all needed directions beyond the above described automatic linking, Maker 920 may include an editor, graphical user interface (GUI), or other means through which Designer 915 may add or modify individual data fields of any of the Multi-directional Still Pictures 200. In one example, Multi-directional Still Pictures 200 on the path of Locations 98a, 98b, 98c, 98d, 98e, 98f, 98g, 98h, etc. may be connected with Multi-directional Still Pictures 200 on the path of Locations 99a, 99b, 99c, 99d, 99e, etc. by adding, for example, Left Multi-directional Still Picture Link 220d to Multi-directional Still Picture 200 of Location 98c to point to Multi-directional Still Picture 200 of Location 99a. Designer 915 may also add, for example, Right Multi-directional Still Picture Link 220c to Multi-directional Still Picture 200 of Location 99a to point to Multi-directional Still Picture 200 of Location 98c. This way, Multi-directional Still Pictures 200 on the path of Locations 98a, 98b, 98c, 98d, 98e, 98f, 98g, 98h, etc. and Multi-directional Still Pictures 200 on the path of Locations 99a, 99b, 99c, 99d, 99e, etc. may be connected in both directions.

STEP 9: Maker 920 may define and/or store in memory a Multi-directional Pictures Repository 115 including previously generated Multi-directional Still Pictures 200, and/or other elements. In some embodiments, Multi-directional Pictures Repository 115 may be posted as one of plurality Multi-directional Pictures Repositories 115 that may have been created by administrators or users of a network service for sharing Multi-directional Pictures Repositories 115. Such Multi-directional Pictures Repositories 115 may be posted into a central repository (i.e. file, DBMS, database, system, process, data structure, and/or any other data repository, etc.) accessible to users of the network service as previously described. Multi-directional Pictures Repository 115 may later be accessed and read by Core Program 110 to implement the functionalities described herein.

Other additional steps may be included as needed, or some of the disclosed ones may be excluded, reordered or modified, or a combination thereof may be utilized in alternate embodiments.

Figure 21:
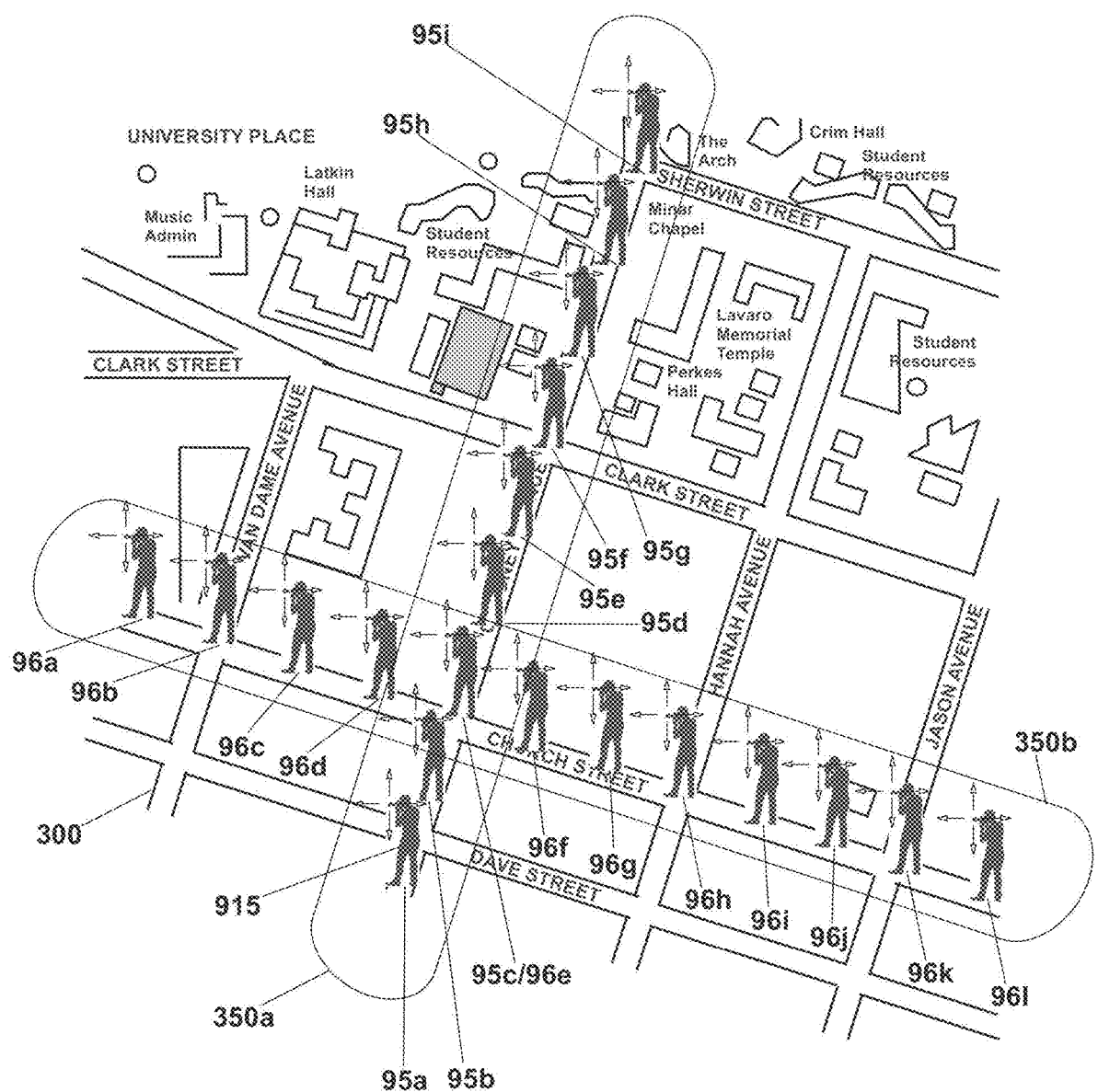
FIG. 21 shows an embodiment of MDP Unit 100 with Designer 915 creating Multi-directional Still Pictures 200 in straight paths.

Referring to FIG. 21, an embodiment is illustrated where Designer 915 may prefer to generate Multi-directional Still Pictures 200 in straight paths using Multi-directional Picture Sequences 350, for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 may run Maker 920 (i.e. an installed program, web application, etc.) on the Computing Device 70.

STEP 3: Designer 915 may choose a path within the park such as, for example, the path with Locations 95*a*, 95*b*, 95*c*, 95*d*, 95*e*, 95*f*, 95*g*, 95*h*, 95*i*, etc. in effect defining a Multi-directional Picture Sequence 350*a* of locations (i.e. steps, etc.) on the path. Designer 915 may also choose an initial location of the path such as, for example, Location 95*a*. A Multi-directional Picture Sequence 350 such as Multi-directional Picture Sequence 350*a* may be conceptual in Designer's 915 mind or an actual data structure utilized to store Multi-directional Still Pictures 200 each representing a location (i.e. step, etc.) on the path.

STEP 4: Maker 920 may ask Designer 915 to move into a location such as the initial Location 95*a*. Maker 920 may guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, or any other digital picture-taking equipment. Maker 920 may then generate a Multi-directional Still Picture 200 of a current location such as Location 95*a* including the captured Still Pictures 210*a*, 210*b*, 210*c*, 210*d*, etc.

STEP 5: Maker 920 may then ask Designer 915 whether he/she wishes to make a step in forward, backward, right, left or another direction (i.e. up, down, diagonal, angular, etc.). In one example, Designer 915 may indicate a forward direction to a next location such as Location 95*b*. Maker 920 may then guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, or any other digital picture-taking equipment. Maker 920 may then generate a Multi-directional Still Picture 200 of a current location such as Location 95*b* including the captured Still Pictures 210*a*, 210*b*, 210*c*, 210*d*, etc. Maker 920 may then automatically add a Backward Multi-directional Still Picture Link 220*b* to the current Multi-directional Still Picture 200 (i.e. of Location 95*b*, etc.), such Backward Multi-directional Still Picture Link 220*b* may point to a previously generated Multi-directional Still Picture 200 (i.e. of Location 95*a*, etc.). Maker 920 may also automatically add a Forward Multi-directional Still Picture Link 220*a* to a previously generated Multi-directional Still Picture 200 (i.e. of Location 95*a*, etc.), such Forward Multi-directional Still Picture Link 220*a* may point to a current Multi-directional Still Picture 200 (i.e. of Location 95*b*, etc.).

STEP 6: Designer 915 may repeat STEP 5 for subsequent Locations 95*c*, 95*d*, 95*e*, 95*f*, 95*g*, 95*h*, 95*i*, etc. until he/she reaches the end of the current path. Representation of the path may be complete when Still Pictures 210*a*, 210*b*, 210*c*, 210*d*, etc. are captured from all Locations 95*a*, 95*b*, 95*c*, 95*d*, 95*e*, 95*f*, 95*g*, 95*h*, 95*i*, etc. and Multi-directional Still Picture Links 220*a*, 220*b*, 220*c*, 220*d*, etc. are added for adjacent Multi-directional Still Pictures 200 that may need to be linked.

STEP 7: Designer 915 may repeat STEP 3, STEP 4, STEP 5, and STEP 6 for any other paths within the park such as the path with Locations 96*a*, 96*b*, 96*c*, 96*d*, 96*e*, 96*f*, 96*g*, 96*h*, 96*i*, 96*j*, 96*k*, 961 etc.

STEP 8: In order to connect Multi-directional Still Pictures 200 and/or completed paths in all needed directions beyond the above described automatic linking, Maker 920 may include an editor, graphical user interface (GUI), or other means through which Designer 915 may intersect any Multi-directional Picture Sequences 350 at specific Multi-directional Still Pictures 200. Selecting any of the Multi-directional Still Pictures 200 from each Multi-directional Picture Sequence 350 as common Multi-directional Still Pictures 200 may intersect the two Multi-directional Picture Sequences 350. In one example, Multi-directional Picture Sequence 350*a* may be intersected with Multi-directional Picture Sequence 350*b* by selecting Multi-directional Still Picture 200 of Location 95*c* and Multi-directional Still Picture 200 of Location 96*e* as common Multi-directional Still Pictures 200 for Multi-directional Picture Sequences 350*a* and 350*b*. Once common Multi-directional Still Pictures 200 are known, Maker 920 may discard Multi-directional Still Pictures 200 of Locations 95*c* and 96*e*, and generate a new Multi-directional Still Picture 200 of both Locations 95*c* and 96*e* (also referred to as Location 95*c*/96*e*). Maker 920 may also automatically add Still Pictures 210*a*, 210*b*, 210*c*, 210*d*, etc. from any or both Multi-directional Still Pictures 200 of Locations 95*c* and 96*e* to the new Multi-directional Still Picture 200. Maker 920 may also automatically add Multi-directional Still Picture Links 220*a*, 220*b*, 220*c*, 220*d*, etc. to the new Multi-directional Still Picture 200 to point to adjacent Multi-directional Still Pictures 200 such as, in this example, Multi-directional Still Pictures 200 of Locations 95*b*, 95*d*, 96*d* and 96*f*. Maker 920 may also automatically add or modify Multi-directional Still Picture Links 220*a*, 220*b*, 220*c*, 220*d*, etc. of adjacent Multi-directional Still Pictures 200 to point to the new Multi-directional Still Picture 200. In another example, Maker 920 may combine Multi-directional Still Picture Links 220*a*, 220*b*, 220*c*, 220*d*, etc. of Multi-directional Still Pictures 200 of Locations 95*c* and 96*e*. Particularly, the new Multi-directional Still Picture 200 may include (1) Multi-directional Still Picture Links 220*a* and 220*b* of Multi-directional Still Picture 200 of Location 95*c*, and (2) Multi-directional Still Picture Links 220*c* and 220*d* of Multi-directional Still Picture 200 of Location 96*e*. Maker 920 may also add or modify Multi-directional Still Picture Links 220*a*, 220*b*, 220*c*, 220*d*, etc. of the surrounding Multi-directional Still Pictures 200 by reverse linking them with the new Multi-directional Still Picture 200 of Location 95*c*/96*e* as previously described. As such, Multi-directional Picture Sequences 350*a* and 350*b* may be intersected and/or interlinked in all needed directions. In some embodiments, instead of discarding them, any or both of Multi-directional Still Pictures 200 of Locations 95*c* and 96*e* may continue to be used in addition to the new Multi-directional Still Picture 200 of Location 95*c*/96*e* in which case the three Multi-directional Still Pictures 200 may be interlinked.

STEP 9: Maker 920 may define and/or store in memory a Multi-directional Pictures Repository 115 including Multi-directional Picture Sequences 350*a* and 350*b*, previously generated Multi-directional Still Pictures 200, and/or other elements. In some embodiments, Multi-directional Pictures Repository 115 may be posted as one of plurality Multi-directional Pictures Repositories 115 that may have been created by administrators or users of a network service for sharing Multi-directional Pictures Repositories 115. Such Multi-directional Pictures Repositories 115 may be posted into a central repository (i.e. file, DBMS, database, system, process, data structure, and/or any other data repository, etc.) accessible to users of the network service as previously described. Multi-directional Pictures Repository 115 may later be accessed and read by Core Program 110 to implement the functionalities described herein.

Other additional steps may be included as needed, or some of the disclosed ones may be excluded, reordered or modified, or a combination thereof may be utilized in alternate embodiments.

Still referring to FIG. 21, in some embodiments Designer 915 may prefer to capture Still Pictures 210a, 210b, 210c, 210d, etc. from all locations of a represented object, store them in memory of Computing Device 70, and generate Multi-directional Still Pictures 200 from the stored Still Pictures 210a, 210b, 210c, 210d, etc., for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 may choose paths within the park such as, for example, the path with Locations 95a, 95b, 95c, 95d, 95e, 95f, 95g, 95h, 95i, etc. and path with Locations 96a, 96b, 96c, 96d, 96e, 96f, 96g, 96h, 96i, 96j, 96k, 96l etc. in effect defining a Maze 300 of locations (i.e. steps, etc.) in the park. Designer 915 may also choose an initial location such as, for example, Location 95a. A Maze 300 may be conceptual in Designer's 915 mind or an actual data structure utilized to store (1) Multi-directional Still Pictures 200 each representing a location (i.e. step, etc.) in the park, and/or (2) Multi-directional Picture Sequences 350 each representing a walkway in the park.

STEP 3: Designer 915 may move into a location such as Location 95a and capture Forward Still Picture 210a, Backward Still Picture 210b, Right Still Picture 210c, Left Still Picture 210d, and/or any additional Still Pictures from Designer's 915 current location using a built-in camera of the Computing Device 70, digital camera, or any other digital picture-taking equipment. The captured Still Pictures 210a, 210b, 210c, 210d, etc. may be stored as digital pictures (i.e. digital picture files, etc.) in Memory 180 or Physical Storage Medium 181 of the Computing Device 70, or of a built-in camera of the Computing Device 70, digital camera, or any other digital picture-taking equipment. In some embodiments, a classic analog photo camera may be used and pictures scanned into digital format later. In other embodiments, a video camera may be used and frames of the video may be captured as Still Pictures 210a, 210b, 210c, 210d, etc. In yet other embodiments in which picture stitching may be implemented, Still Pictures 210a, 210b, 210c, 210d, etc. with overlapping fields of view may be captured to facilitate picture stitching as previously described.

STEP 4: Designer 915 may repeat STEP 3 for subsequent Locations 95b, 95c, 95d, 95e, 95f, 95g, 95h, 95i, etc. until he/she reaches the end of the current path.

STEP 5: Designer 915 may repeat STEP 3 and STEP 4 for any other paths within the park such as the path with Locations 96a, 96b, 96c, 96d, 96e, 96f, 96g, 96h, 96i, 96j, 96k, 96l etc.

STEP 6: Designer 915 may run Maker 920 (i.e. an installed program, web application, etc.) on the Computing Device 70.

Figure 22:
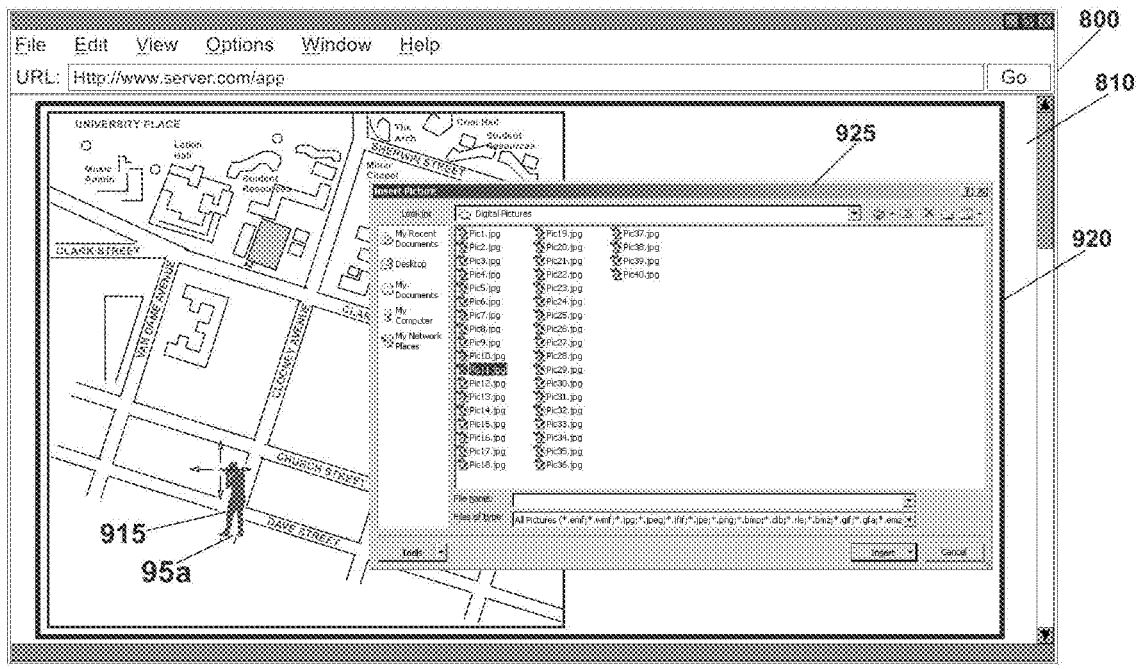
FIG. 22 shows an embodiment of Maker 920 with Designer 915 assigning a Still Picture 210 of a Multi-directional Still Picture 200.

STEP 7: As shown in FIG. 22, Maker 920 may guide Designer 915 in defining a Multi-directional Still Picture 200 such as the Multi-directional Still Picture 200 of Location 95a by asking him/her to add Forward Still Picture 210a, Backward Still Picture 210b, Right Still Picture 210c, Left Still Picture 210d, and/or any additional Still Pictures through a Still Picture Selection Window 925. Designer 915 may add Still Pictures 210a, 210b, 210c, 210d, etc. to the current Multi-directional Still Picture 200 by selecting from a list of previously stored Still Pictures 210a, 210b, 210c, 210d, etc. displayed in the Still Picture Selection Window 925. In some embodiments, Still Picture Selection Window 925 may display Still Pictures 210a, 210b, 210c, 210d, etc. each stored in a separate file in Memory 180 or Physical Storage Medium 181.

Figure 23:
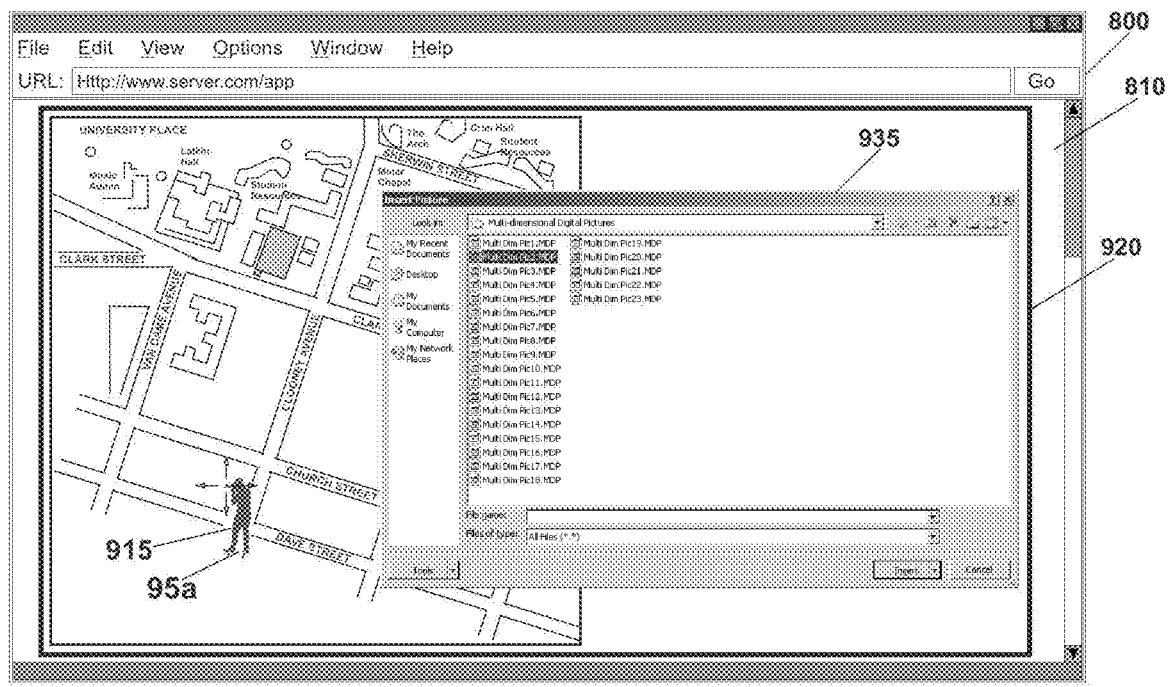
FIG. 23 shows an embodiment of Maker 920 with Designer 915 assigning a Multi-directional Still Picture Link 220 of a Multi-directional Still Picture 200.

STEP 8: As shown in FIG. 23, Maker 920 may guide Designer 915 in further defining a Multi-directional Still Picture 200 such as the Multi-directional Still Picture 200 of Location 95a by asking him/her to add Forward Multi-directional Still Picture Link 220a, Backward Multi-directional Still Picture Link 220b, Right Multi-directional Still Picture Link 220c, Left Multi-directional Still Picture Link 220d, and/or any additional Multi-directional Still Picture Links through a Multi-directional Still Picture Selection Window 935. Designer 915 may add Multi-directional Still Picture Links 220a, 220b, 220c, 220d, etc. to the current Multi-directional Still Picture 200 by selecting from a list of previously stored Multi-directional Still Pictures 200 displayed in the Multi-directional Still Picture Selection Window 935. In some embodiments, Multi-directional Still Picture Selection Window 935 may display Multi-directional Still Pictures 200 each stored in a separate object file in Memory 180 or Physical Storage Medium 181.

STEP 9: Maker 920 may ask Designer 915 to assign an identifier (i.e. name, etc.) to the current Multi-directional Still Picture 200 or Maker 920 may automatically assign a suitable identifier (i.e. a unique name that may include date and time including seconds or milliseconds, etc.). Maker 920 may then generate the Multi-directional Still Picture 200 including the added Still Pictures 210a, 210b, 210c, 210d, etc., Multi-directional Still Picture Links 220a, 220b, 220c, 220d, etc., and/or any other elements.

STEP 10: Designer 915 may repeat STEP 7, STEP 8 and STEP 9 to generate any additional Multi-directional Still Pictures 200 each representing a location of a represented object (i.e. park in this example).

STEP 11: In order to connect Multi-directional Still Pictures 200 and/or Multi-directional Picture Sequences 350 (i.e. paths) in all needed directions, Maker 920 may include an editor, graphical user interface (GUI), or other means through which Designer 915 may add or modify individual Multi-directional Still Picture Links 220a, 220b, 220c, 220d, etc. of any of the Multi-directional Still Pictures 200 as previously described. Alternatively, Maker 920 may include an editor, graphical user interface (GUI), or other means through which Designer 915 may intersect any Multi-directional Picture Sequences 350 at specific Multi-directional Still Pictures 200 as previously described.

STEP 12: Maker 920 may define and/or store in memory a Multi-directional Pictures Repository 115 including Multi-directional Picture Sequences 350a and 350b, previously generated Multi-directional Still Pictures 200, and/or other elements. In some embodiments, Multi-directional Pictures Repository 115 may be posted as one of plurality Multi-directional Pictures Repositories 115 that may have been created by administrators or users of a network service for sharing Multi-directional Pictures Repositories 115. Such Multi-directional Pictures Repositories 115 may be posted into a central repository (i.e. file, DBMS, database, system, process, data structure, and/or any other data repository, etc.) accessible to users of the network service as previously described. Multi-directional Pictures Repository 115 may later be accessed and read by Core Program 110 to implement the functionalities described herein.

Other additional steps may be included as needed, or some of the disclosed ones may be excluded, reordered or modified, or a combination thereof may be utilized in alternate embodiments.

In some embodiments, any method, system, or apparatus for creating a collection of Multi-directional Still Pictures 200 representing an object may include searching digital pictures in any Multi directional Pictures Repository 115, any picture database, any picture repository, or any collection of pictures to find same or similar picture that a user may need or want to capture. Such picture may have been captured previously by the same or another user. If found, such picture may eliminate the need to capture the same or similar picture again saving the user time. For example, public places such as Arlington National Cemetery, Library of Congress, public streets, public parks, and/or other public places may have pictures captured from their various locations and stored in a picture repository that may be accessed by Maker 920. As such, Maker 920 may include functions and/or algorithms for detecting pictures needed for creating collections of Multi-directional Still Pictures 200 representing an object. Such functions and/or algorithms may include any of the previously or later described techniques or steps thereof such as finding Still Pictures 210*a*, 210*b*, 210*c*, 210*d*, etc. that may be within a line of sight from a specific location, automatically detecting Still Pictures 210*a*, 210*b*, 210*c*, 210*d*, etc. from a collection of digital pictures (later described), automatically detecting Multi-directional Still Picture Links 220*a*, 220*b*, 220*c*, 220*d*, etc. (later described), and/or any other techniques or algorithms known in art for detecting digital pictures having specific patterns. As digital pictures may be captured by various users at various times of day or night, Maker 920 may include functions or algorithms for lighting and/or color adjustment or correction in digital pictures. Any techniques or algorithms known in art may be used for lighting and/or color adjustment or correction. Lighting and/or color adjustment or correction (also referred to as gray balance, neutral balance, white balance, etc.) may generally represent rebalancing of the intensities of the colors (typically red, green, and blue primary colors if RGB color model is used) with a goal to render specific colors correctly or differently for reproduction, comparison, processing or any other purpose. Color rebalancing techniques or algorithms known in art usually directly manipulate red, green, and blue pixel values of a digital picture. Maker 920 may therefore utilize these techniques or algorithms to adjust or correct lighting and/or colors of a digital picture captured at a different time of day or night before comparing it with a reference picture, before detecting any needed patterns, or before conducting any other picture processing. In some embodiments, Maker 920 may incrementally adjust (i.e. increase or decrease by one the red, green, and blue pixel values in each cycle of comparisons, etc.) or correct lighting and/or colors of a digital picture before comparing the incrementally adjusted or corrected picture with a reference picture, before detecting any needed patterns, or before conducting any other picture processing. The threshold for similarity in each of the pixels required for a match may be adjustable by a user or automatically adjustable as needed. Such threshold may include exact match such as 100% match, nearly exact match such as 90% or 80% match, mostly match such as 70% or 60%, half match such as 50%, low match such as 40% or 30% match, or any other match. The threshold for the number of pixels required for a match may similarly be adjustable.

Figure 24:
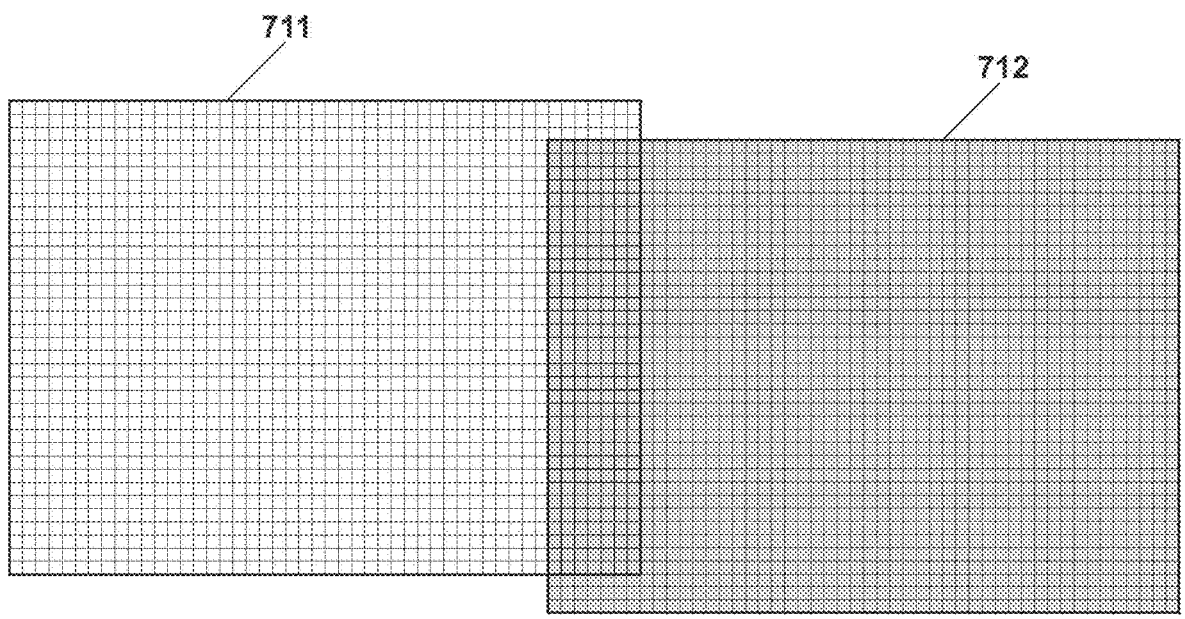
FIG. 24 shows an embodiment of Maker 920 including automatic detection of Still Pictures 210a, 210b, 210c, 210d, etc.

Referring to FIG. 24, the illustration shows an embodiment of Maker 920 including automatic detection of Still Pictures 210*a*, 210*b*, 210*c*, 210*d*, etc. from a collection of digital pictures. Maker 920 may include picture processing implemented on a Computing Device 70 to automatically detect Still Pictures 210*a*, 210*b*, 210*c*, 210*d*, etc. to aid a user in creating a collection of Multi-directional Still Pictures 200 representing an object. In some embodiments, creating a collection of Multi-directional Still Pictures 200 representing an object may include automatic detection of Still Pictures 210*a*, 210*b*, 210*c*, 210*d*, etc., and generation of Multi-directional Still Pictures 200 including the detected Still Pictures 210*a*, 210*b*, 210*c*, 210*d*, etc. In other embodiments, creating a collection of Multi-directional Still Pictures 200 representing an object may include automatic detection of Still Pictures 210*a*, 210*b*, 210*c*, 210*d*, etc. of an initial Multi-directional Still Picture 200, generation of the initial Multi-directional Still Picture 200 including the detected Still Pictures 210*a*, 210*b*, 210*c*, 210*d*, etc., automatic detection of links (later described) with, and generation of, adjacent Multi-directional Still Pictures 200 including their automatically detected Still Pictures 210*a*, 210*b*, 210*c*, 210*d*, etc., and so on. In some embodiments, automatic detection of Still Pictures 210*a*, 210*b*, 210*c*, 210*d*, etc. of a Multi-directional Still Picture 200 may include comparing pictures in a collection of digital pictures to determine if one picture may include an overlapping field of view of another picture. Finding a picture that may include an overlapping field of view of another picture may indicate that the two pictures may have been captured from the same location of a represented object in different directions and that the two pictures may belong to a same Multi-directional Still Picture 200. In some aspects, comparing digital pictures to determine if one may include an overlapping field of view of another picture may be performed by determining if a subset of pixels of one picture (i.e. comparative picture) may match a subset of pixels of another picture (i.e. reference picture). In other aspects, comparing digital pictures to determine if one may include an overlapping field of view of another picture may be performed by determining if a subset of pixels of one picture (i.e. comparative picture) may match a subset of pixels of another picture (i.e. reference picture) near opposite edges of the compared pictures. The threshold for similarity in each of the pixels required for a match may be adjustable by a user or automatically adjustable as needed. Such threshold may include exact match such as 100% match, nearly exact match such as 90% or 80% match, mostly match such as 70% or 60%, half match such as 50%, low match such as 40% or 30% match, or any other match. The threshold for the number of pixels required for a match may similarity be adjustable. Any of the publically available or other functions or algorithms for detecting overlapping fields of view such as an algorithm used in digital picture stitching may be used in such comparisons. Pictures found to include matching subsets of pixels (i.e. overlapping fields of view from a same location of a represented object) may be included as Still Pictures 210*a*, 210*b*, 210*c*, 210*d*, etc. of a same Multi-directional Still Picture 200. If matching subsets of pixels (i.e. overlapping fields of view) are not found in a reference picture and a comparative picture, the comparison may be performed between the reference picture and all other pictures (i.e. comparative pictures) in a collection of digital pictures. When the comparison is complete between one reference picture and all comparative pictures, another picture in the collection of digital pictures may then be used as a new reference picture with which all other pictures (i.e. comparative pictures) may be compared until all pictures in the collection are compared. As such, all pictures in the collection of digital pictures may be compared with all other pictures in the collection to find all pictures with overlapping fields of view.

In one example, picture processing may be implemented on a Computing Device 70 to find Still Pictures 210$a$, 210$b$, 210$c$, 210$d$, etc. of a Multi-directional Still Picture 200 in a collection of digital pictures. The collection of digital pictures may include Pictures 711 and 712 as shown in FIG. 24. Picture 711 may be a reference picture with which all other pictures (i.e. comparative pictures) in a collection of digital pictures may be compared in one cycle of comparisons. Picture 712 may be a comparative picture and it may be one of the pictures in the collection of digital pictures that may be compared with Picture 711. Picture 711 and Picture 712 may be compared to determine if a subset of pixels near one edge of Picture 711 may match a subset of pixels near the opposite edge of Picture 712. If a subset of pixels of Picture 711 is found to match a subset of pixels of Picture 712, Pictures 711 and 712 may be Still Pictures (i.e. Forward Still Picture 210$a$ and Right Still Picture 210$c$ for example, etc.) of a same Multi-directional Still Picture 200. Any of the described steps for comparing Picture 711 and Picture 712 may be performed with all other pictures in the collection of digital pictures to find all pictures that may belong to same Multi-directional Still Pictures 200. In some embodiments, a user may utilize a wide lens camera to capture digital pictures with overlapping fields of view needed for automatic detection of Still Pictures 210$a$, 210$b$, 210$c$, 210$d$, etc. In other embodiments, a user may utilize a standard lens camera to capture an increased number of digital pictures to ensure overlapping fields of view needed for automatic detection of Still Pictures 210$a$, 210$b$, 210$c$, 210$d$, etc. In some aspects, Maker 920 may include an editor, graphical user interface or other means through which a user may access any Multi-directional Still Picture 200 and add to it a new Still Picture 210$a$, 210$b$, 210$c$, 210$d$, etc. (i.e. still picture that the automatic detection may have missed, etc.) or modify its existing Still Picture 210$a$, 210$b$, 210$c$, 210$d$, etc. (i.e. still picture that the automatic detection may have included erroneously, etc.). In some embodiments, Still Pictures 210$a$, 210$b$, 210$c$, 210$d$, etc. with overlapping fields of view from a same location of a represented object may be stitched into a Combined Picture 227 through the previously described picture stitching process.

In some embodiments, Maker 920 may be implemented to include automatic detection of Still Pictures 210$a$, 210$b$, 210$c$, 210$d$, etc. from a collection of digital pictures stored in a picture database. A picture database may include one or more files, one or more DBMSs, one or more databases, one or more data structures, one or more systems, one or more processes, and/or one or more any other data repositories. A picture database may include a local picture database stored on Computing Device 70. A picture database may also include a remote picture database stored on a Remote Computing Device 1310 (i.e. application server, cloud, etc.) accessible over a Network 1300 (i.e. corporate enterprise network, Internet, etc.). A picture database may include pictures of a represented object captured by a number of users. In some aspects, a remote picture database may be publically available such as, for example, Yahoo Images, Google Images, and/or other publically available picture databases. In other aspects, a remote picture database may be available to subscribers or members of an image sharing service such as, for example, flickr.com, tinypic.com, imgur.com, postimage.org, photobucket.com, and/or other image sharing services. In yet other aspects, a remote picture database may be available to subscribers or members of social media that may include picture sharing functionality such as Facebook, Twitter, and/or other social media. In one example, a picture database may include digital pictures of an object such as Arlington National Cemetery in Virginia, Library of Congress in Washington D.C., and/or any other object of which a number of users may have captured digital pictures from various locations. In another example, a picture database may include digital pictures of various objects (i.e. Facebook picture database including pictures of all objects captured by all Facebook users, etc.) and a filter may be implemented to seek pictures of the object to be represented in a specific collection of Multi-directional Still Pictures 200. The filter may seek pictures having "Arlington National Cemetery" included in the picture name, for example. Once pictures of a desired object are found in a picture database, creating a collection of Multi-directional Still Pictures 200 representing an object may include any of the previously described steps or techniques using Maker 920 to manually or automatically generate Multi-directional Still Pictures 200 of the represented object (i.e. Arlington National Cemetery, Library of Congress, etc.).

The described techniques for automatic detection of Still Pictures 210$a$, 210$b$, 210$c$, 210$d$, etc. of Multi-directional Still Pictures 200 may similarly be utilized with Multi-directional Motion Pictures 400 (later described) where automatic detection and/or other operations as described may be performed in streams of still pictures. In some embodiments, automatic detection of Motion Pictures 410$a$, 410$b$, 410$c$, 410$d$, etc. may be performed as previously described where processing or comparisons may be performed for each still picture in a stream of still pictures (i.e. motion picture, etc.) to find a match. Therefore, additional cycles of processing or comparisons may be performed. In some embodiments, still pictures from different streams having same time stamps may be processed or compared. In other embodiments, still pictures from different streams having similar time stamps may be processed or compared in which case a threshold may be defined by user or automatically to control how far before or after a specific still picture (i.e. frame, etc.) a search may go to find a matching still picture or a portion thereof.

Figure 25:
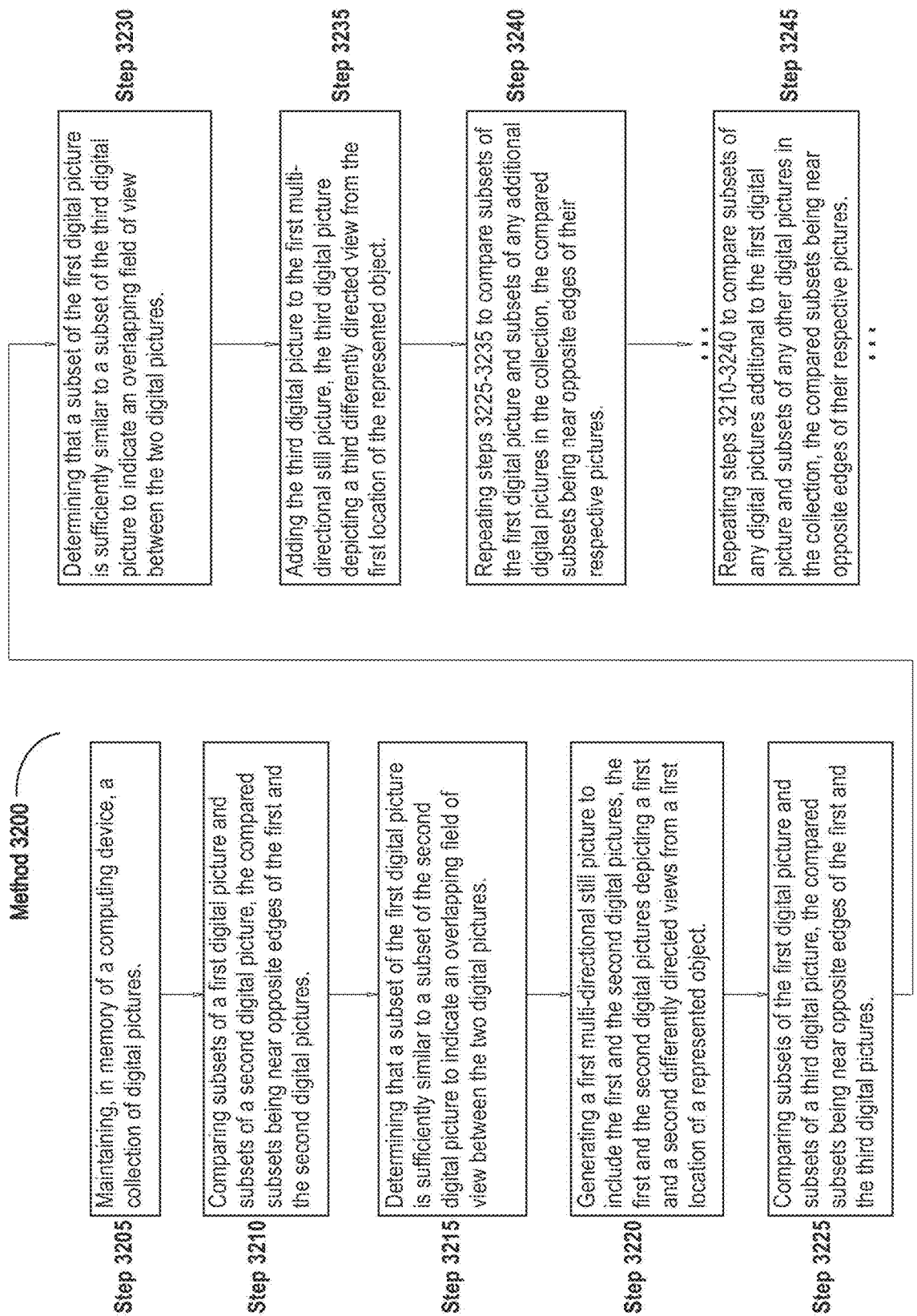
FIG. 25 illustrates a flow chart diagram of an embodiment of a method 3200 implemented by MDP Unit 100.

Referring to FIG. 25, the illustration shows an embodiment of a method 3200 for automatically detecting Still Pictures 210$a$, 210$b$, 210$c$, 210$d$, etc. from a collection of digital pictures. The steps of this exemplary method may therefore be used by a user on a computing device operating an interface for a MDP Unit 100 to enable the user to create a collection of multi-directional still pictures representing an object in a user-friendly process. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be utilized for automatically detecting Motion Pictures 410$a$, 410$b$, 410$c$, 410$d$, etc. (later described) from a collection of motion pictures (i.e. streams of still pictures).

At step 3205, a collection of digital pictures is maintained in memory of a computing device. At step 3210, subsets of a first digital picture and subsets of a second digital picture are compared, the compared subsets being near opposite edges of the first and the second digital pictures. At step 3215, a determination is made that a subset of the first digital picture is sufficiently similar to a subset of the second digital picture to indicate an overlapping field of view between the two digital pictures. At step 3220, a first multi-directional still picture is generated to include the first and the second digital pictures, the first and the second digital pictures depicting a first and a second differently directed views from a first location of a represented object. At step 3225, subsets of the first digital picture and subsets of a third digital picture are compared, the compared subsets being near opposite edges of the first and the third digital pictures. At step 3230, a determination is made that a subset of the first digital picture is sufficiently similar to a subset of the third digital picture to indicate an overlapping field of view between the two digital pictures. At step 3235, the third digital picture is added to the first multi-directional still picture, the third digital picture depicting a third differently directed view from the first location of the represented object. At step 3240, steps 3225-3235 are repeated to compare subsets of the first digital picture and subsets of any additional digital pictures in the collection, the compared subsets being near opposite edges of their respective pictures. At step 3245, steps 3210-3240 are repeated to compare subsets of any digital pictures additional to the first digital picture and subsets of any other digital pictures in the collection, the compared subsets being near opposite edges of their respective pictures.

In some aspects, the teaching presented by the disclosure may be implemented in a device or system for detecting still pictures. The device or system may include a processor and an interface, coupled to the processor, for receiving a collection of still pictures. The device or system may further include a comparator, coupled to the processor, for comparing subsets of a first still picture and subsets of a second still picture, the compared subsets being near opposite edges of the first and the second still pictures, and determining that a subset of the first still picture is sufficiently similar to a subset of the second still picture to indicate an overlapping field of view between the two still pictures. The device or system may further include an assembler, coupled to the processor, for generating a first multi-directional still picture to include the first and the second still pictures, the first and the second still pictures depicting a first and a second differently directed views from a first location of a represented object. The comparator may further be configured to: compare subsets of the first still picture and subsets of a third still picture, the compared subsets being near opposite edges of the first and the third still pictures, and determine that a subset of the first still picture is sufficiently similar to a subset of the third still picture to indicate an overlapping field of view between the two still pictures, wherein the assembler may further be configured to add the third still picture to the first multi-directional still picture, the third still picture depicting a third differently directed view from the first location of the represented object. The processor, the interface, the comparator, the assembler and/or other elements of the device or system for detecting still pictures may include any features and functionalities of Processor 11, Maker 920, Multi-directional Pictures Repository 115, and/or other disclosed elements. The device or system may also include any functionalities or steps of any disclosed methods such as, for example, method 3200. For example, Maker 920 may be implemented on Processor 11 and it may read a collection of still pictures from a source such as, for example, a picture database. Comparator may be implemented on Processor 11 and it may perform the described picture processing to find still pictures having overlapping fields of view in the collection. Assembler may be implemented on Processor 11 and it may organize the still pictures found to have overlapping fields of view into multi-directional still pictures. Assembler may also store the still pictures or references thereto, any data structures (i.e. multi-directional still pictures, mazes, sequences, etc.) and/or other elements in Multi-directional Pictures Repository 115. Comparator and assembler may be included in Maker 920, they may be separate programs implemented on Processor 11, they may be hardware components or separate processors dedicated to their assigned functionalities, or a combination thereof.

Figure 26:
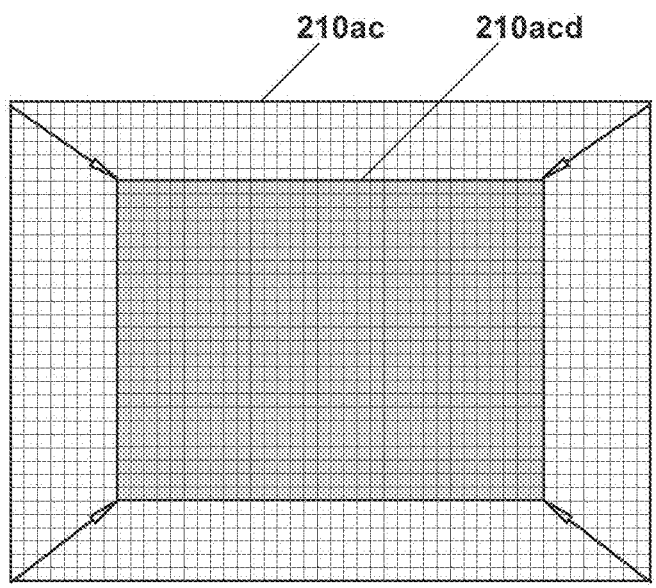
FIG. 26 shows an embodiment of Maker 920 including automatic detection of links among Multi-directional Still Pictures 200.
Figure 26:
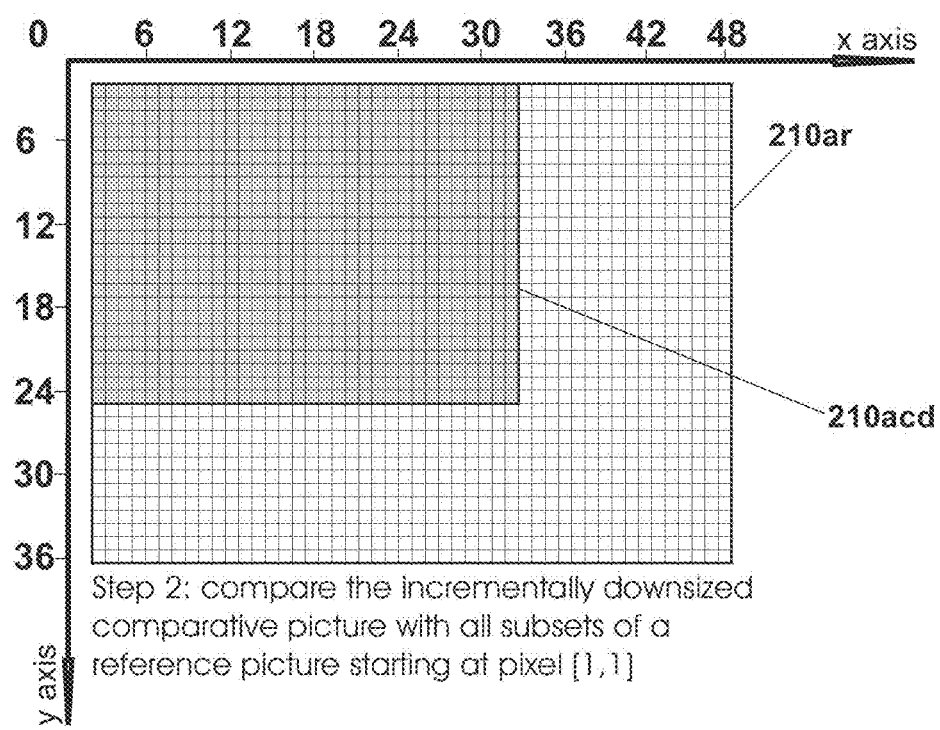

Referring to FIG. 26, the illustration shows an embodiment of Maker 920 including automatic detection of links among Multi-directional Still Pictures 200. Maker 920 may include picture processing implemented on a Computing Device 70 to automatically detect links among Multi-directional Still Pictures 200 to aid a user in creating a collection of Multi-directional Still Pictures 200 representing an object. In some embodiments, creating a collection of Multi-directional Still Pictures 200 representing an object may include automatic detection of Multi-directional Still Picture Links 220a, 220b, 220c, 220d, etc. among Multi-directional Still Pictures 200. In other embodiments, creating a collection of Multi-directional Still Pictures 200 representing an object may include automatic detection of Multi-directional Still Picture Links 220a, 220b, 220c, 220d, etc. of an initial Multi-directional Still Picture 200, automatic detection of Multi-directional Still Picture Links 220a, 220b, 220c, 220d, etc. of Multi-directional Still Pictures 200 adjacent to the initial Multi-directional Still Pictures 200, and so on. In some embodiments, automatic detection of links among Multi-directional Still Pictures 200 may include comparing a Still Picture 210a, 210b, 210c, 210d, etc. of one Multi-directional Still Picture 200 with a Still Picture 210a, 210b, 210c, 210d, etc. of another Multi-directional Still Picture 200 to determine if a subset of one Still Picture 210a, 210b, 210c, 210d, etc. may include all or a portion of another Still Picture 210a, 210b, 210c, 210d, etc. Finding a Still Picture 210a, 210b, 210c, 210d, etc. of one Multi-directional Still Picture 200 whose subset may include all or a portion of a Still Picture 210a, 210b, 210c, 210d, etc. of another Multi-directional Still Picture 200 may indicate a link between the two Multi-directional Still Pictures 200. This indication may be derived from a premise that if a portion (i.e. subset, etc.) of a field of view of one digital picture (i.e. reference picture, etc.) may include all or a portion of a field of view of another digital picture (i.e. comparative picture, etc.), the two digital pictures may be portraying the same line of view in perspective, which may indicate views (i.e. still pictures) of adjacent Multi-directional Still Pictures 200. In some aspects, comparing digital pictures to determine if a subset of one may include all or a portion of another picture may be performed by determining if a subset of pixels of one picture (i.e. reference picture, etc.) may match all or a portion of pixels of another picture (i.e. comparative picture, etc.). The threshold for similarity in each of the pixels required for a match may be adjustable by a user or automatically adjustable as needed. Such threshold may include exact match such as 100% match, nearly exact match such as 90% or 80% match, mostly match such as 70% or 60%, half match such as 50%, low match such as 40% or 30% match, or any other match. The threshold for the number of pixels required for a match may similarly be adjustable. In other aspects, comparing digital pictures to determine if a subset of one may include all or a portion of another picture may be performed by determining if a subset of pixels of one picture (i.e. reference picture, etc.) may match all or a portion of pixels of a resized (i.e. downsized, upsized, etc.) another picture (i.e. comparative picture, etc.). Any of the publically available or other digital picture resizing algorithms or techniques may be used. Resizing of a comparative picture may be performed incrementally (i.e. resizing by one pixel at a time in length or width keeping aspect ratio constant, etc.) to reduce or increase the size (i.e. number of pixels, etc.) of the comparative picture. Each incrementally resized comparative picture or a copy thereof may then be compared with all subsets of a reference picture. A comparative picture whose resized copy may be found to match a largest subset of a reference picture may be a Still Picture 210a, 210b, 210c, 210d, etc. of an adjacent Multi-directional Still Picture 200 with which a link may be added. If a match is not found between any subsets of a reference picture and any of the incrementally resized comparative pictures or copies thereof, the comparison may be performed between subsets of the reference picture and resized other Still Pictures 210a, 210b, 210c, 210d, etc. (i.e. comparative pictures) or copies thereof in a MDP application. When the comparison is complete between all subsets of one reference picture and all resized comparative pictures or copies thereof, another Still Picture 210a, 210b, 210c, 210d, etc. of any Multi-directional Still Picture 200 may be used as a new reference picture whose subsets may be compared with resized other Still Pictures 210a, 210b, 210c, 210d, etc. (i.e. comparative pictures) or copies thereof in a MDP application until al Still Pictures 210a, 210b, 210c, 210d, etc. are compared. As such, subsets of all Still Pictures 210a, 210b, 210c, 210d, etc. in a MDP application may be compared with all other Still Pictures 210a, 210b, 210c, 210d, etc. (i.e. resized other Still Pictures 210a, 210b, 210c, 210d, etc.) or copies thereof to find all Still Pictures 210a, 210b, 210c, 210d, etc. whose subsets may include all or a portion of other Still Pictures 210a, 210b, 210c, 210d, etc.

In one example, picture processing may be implemented on a Computing Device 70 to find a link between two Multi-directional Still Pictures 200 one of which may include a Forward Still Picture 210ar and the other Multi-directional Still Picture 200 may include a Forward Still Picture 210ac. Forward Still Picture 210ar may be a reference picture with which all other Still Pictures 210a, 210b, 210c, 210d, etc. (i.e. comparative pictures) in a MDP application may be compared in one cycle of comparisons. Forward Still Picture 210ac may be a comparative picture and it may be one of the Still Pictures 210a, 210b, 210c, 210d, etc. that may be compared with Forward Still Picture 210ar. Forward Still Picture 210ar and Forward Still Picture 210ac may be compared to determine if a subset of pixels of Forward Still Picture 210ar may match all or a portion of pixels of Forward Still Picture 210ac. Such comparison may include incrementally downsizing Forward Still Picture 210ac by one pixel at a time in length or width keeping aspect ratio constant (i.e. reducing the size from 48×36 pixels to 47×35 pixels, etc.) to derive a Downsized Forward Still Picture 210acd as shown in Step 1 in FIG. 26. The Downsized Forward Still Picture 210acd may then be compared to all subsets of Forward Still Picture 210ar to find a subset of Forward Still Picture 210ar that may match all or a portion of pixels of the Downsized Forward Still Picture 210acd. The Downsized Forward Still Picture 21acd may first be compared with a same sized (i.e. 47×35 pixels in this example, etc.) initial subset of Forward Still Picture 210ar starting at pixel [1,1] as shown in Step 2 in FIG. 26. If a match is not found, the Downsized Forward Still Picture 210acd may then be compared with a same sized (i.e. 47/35 pixels in this example, etc.) subset of Forward Still Picture 210ar starting at pixel [2,1]. If a match is still not found, the Downsized Forward Still Picture 210acd may then be compared with same sized (i.e. 47/35 pixels in this example, etc.) subsets of Forward Still Picture 210ar each starting at remaining pixels in y line 1 (i.e. [3,1], [4,1], [5,1], . . . [48,1]). If a match is still not found, the Downsized Forward Still Picture 210acd may then be compared with same sized (i.e. 47/35 pixels in this example, etc.) subsets of Forward Still Picture 210ar each starting at remaining pixels in y lines 2 (i.e. [1,2], [2,2], [3,2], . . . [48,2]), 3, 4, and so on until the last pixel of Forward Still Picture 210ar. The comparison may include any initial subset of Forward Still Picture 210ar such as, for example, a subset in the middle of Forward Still Picture 210ar, subset at the end of Forward Still Picture 210ar, subset at right of Forward Still Picture 210ar, subset at left of Forward Still Picture 210ar, and/or any other initial subset. Also, the comparison may include any search pattern for subsets of Forward Still Picture 210ar such as, for example, linear searching in any direction, outward searching from a middle subset, forward searching from a region in the beginning, backward searching from a region at the end, and/or any other search pattern. If a match is not found between the Downsized Forward Still Picture 210acd and any subset of Forward Still Picture 210ar, Forward Still Picture 210ac may be downsized to a next smaller size. The new Downsized Forward Still Picture 210acd may then be compared to all subsets of Forward Still Picture 210ar to find a subset of Forward Still Picture 210ar that may match all or a portion of the new Downsized Forward Still Picture 210acd. Incrementally downsizing Forward Still Picture 210ac and comparing the Downsized Forward Still Pictures 210acd with subsets of Forward Still Picture 210ar may be repeated until a match is found. If any subset of Forward Still Picture 210ar is found to match all or a portion of any Downsized Forward Still Picture 21acd, Forward Still Picture 210ac may be a Still Picture of an adjacent Multi-directional Still Picture 200 with which a Forward Multi-directional Still Picture Link 220a may be added. Any of the described steps for comparing subsets of Forward Still Picture 210ar with Downsized Forward Still Pictures 210acd may be performed with all Still Pictures 210a, 210b, 210c, 210d, etc. in a MDP application to find links among all Multi-directional Still Pictures 200. In some aspects, Maker 920 may include an editor, graphical user interface or other means through which a user may access any Multi-directional Still Picture 200 and add to it a new Multi-directional Still Picture Link 220a, 220b, 220c, 220d, etc. (i.e. a link that the automatic detection may have missed, etc.) and/or modify its existing Multi-directional Still Picture Link 220a, 220b, 220c, 220d, etc. (i.e. a link that the automatic detection may have included erroneously, etc.). The described techniques for automatic detection of links among Multi-directional Still Pictures 200 may similarly be utilized with Multi-directional Motion Pictures 400 (later described) where automatic detection and/or other operations as described may be performed in streams of still pictures. In some embodiments, automatic detection of links among Motion Pictures 410a, 410b, 410c, 410d, etc. may be performed as previously described where processing or comparisons may be performed for each still picture in a stream of still pictures (i.e. motion picture, etc.) to find a match. Therefore, additional cycles of processing or comparisons may be performed. In some embodiments, still pictures from different streams having same time stamps may be processed or compared. In other embodiments, still pictures from different streams having similar time stamps may be processed or compared in which case a threshold may be defined by user or automatically to control how far before or after a specific still picture (i.e. frame, etc.) a search may go to find a matching still picture or a portion thereof.

Figure 27:
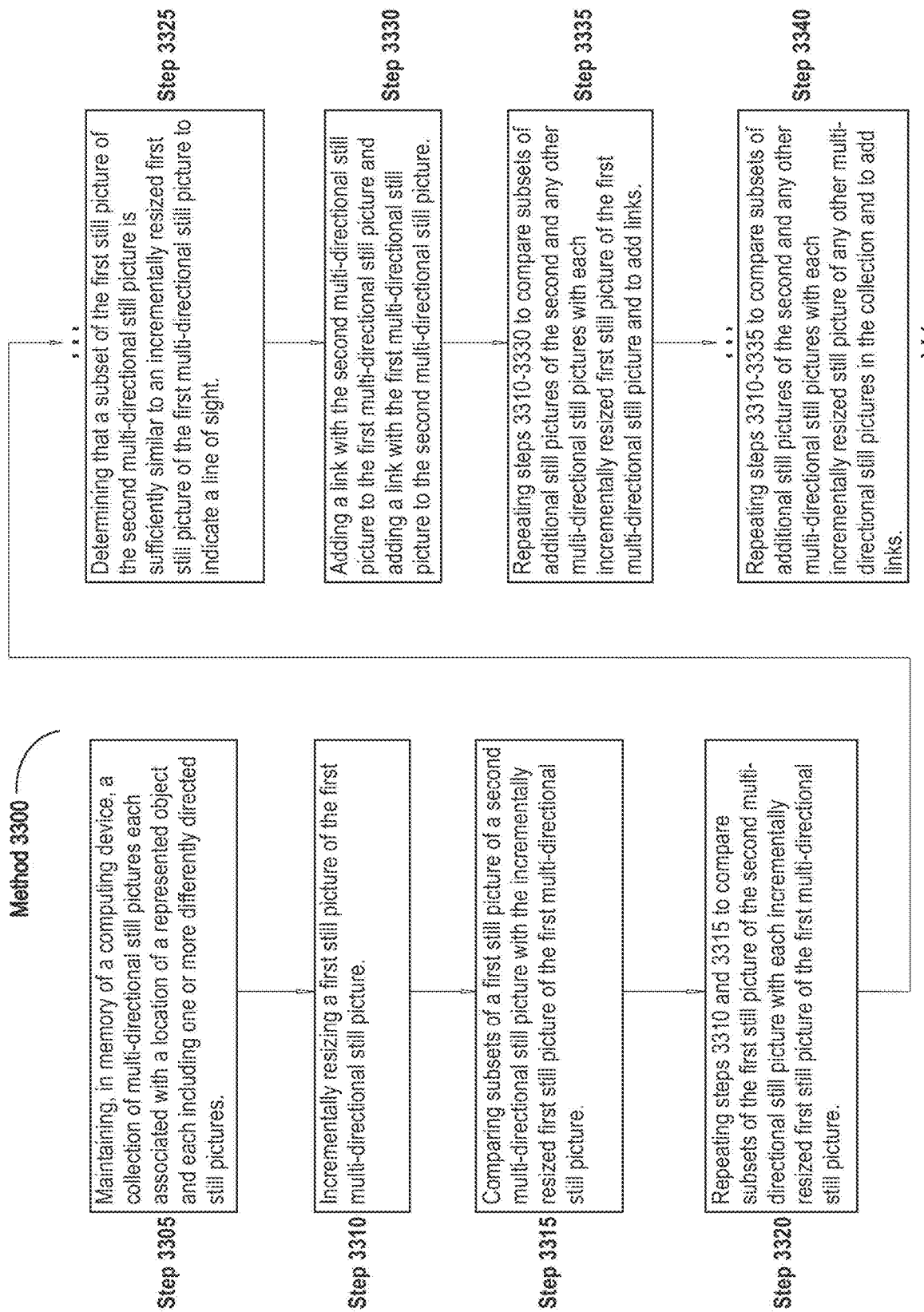
FIG. 27 illustrates a flow chart diagram of an embodiment of a method 3300 implemented by MDP Unit 100.

Referring to FIG. 27, the illustration shows an embodiment of a method 3300 for automatically detecting Multi-directional Still Picture Links 220a, 220b, 220c, 220d, etc. from a collection of Multi-directional Still Pictures 200. The steps of this exemplary method may therefore be used by a user on a computing device operating an interface for a MDP Unit 100 to enable a user to create a collection of Multi-directional Still Pictures 200 representing an object in a user-friendly process. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be utilized for automatically detecting Multi-directional Motion Picture Links 420a, 420b, 420c, 420d, etc. from a collection of Multi-directional Motion Pictures 400. In some embodiments, the steps of this method may be used in combination with the steps of method 3200 that automatically detects Still Pictures 210a, 210b, 210c, 210d, etc. from a collection of digital pictures and creates a collection of multi-directional still pictures.

At step 3305, a collection of multi-directional still pictures each associated with a location of a represented object and each including one or more differently directed still pictures is maintained in memory of a computing device. At step 3310, a first still picture of the first multi-directional still picture is incrementally resized. At step 3315, subsets of a first still picture of a second multi-directional still picture are compared with the incrementally resized first still picture of the first multi-directional still picture. At step 3320, steps 3310 and 3315 are repeated to compare subsets of the first still picture of the second multi-directional still picture with each incrementally resized first still picture of the first multi-directional still picture. At step 3325, a determination is made that a subset of the first still picture of the second multi-directional still picture is sufficiently similar to an incrementally resized first still picture of the first multi-directional still picture to indicate a line of sight. At step 3330, a link with the second multi-directional still picture is added to the first multi-directional still picture and a link with the first multi-directional still picture is added to the second multi-directional still picture. At step 3335, steps 3310-3330 are repeated to compare subsets of additional still pictures of the second and any other multi-directional still pictures with each incrementally resized first still picture of the first multi-directional still picture and to add links. At step 3340, steps 3310-3335 are repeated to compare subsets of additional still pictures of the second and any other multi-directional still pictures with each incrementally resized still picture of any other multi-directional still pictures in the collection and to add links.

In some aspects, the teaching presented by the disclosure may be implemented in a device or system for detecting links among multi-directional still pictures. The device or system may include a processor and an interface, coupled to the processor, for receiving a collection of multi-directional still pictures each multi-directional still picture associated with a location of a represented object and including one or more differently directed still pictures. The device or system may further include a comparator, coupled to the processor, for incrementally resizing a first still picture of the first multi-directional still picture, comparing subsets of a first still picture of a second multi-directional still picture with the incrementally resized first still picture of the first multi-directional still picture, and determining that a subset of the first still picture of the second multi-directional still picture is sufficiently similar to an incrementally resized first still picture of the first multi-directional still picture to indicate a line of sight. The device or system may further include an assembler, coupled to the processor, for adding a link with the second multi-directional still picture to the first multi-directional still picture and adding a link with the first multi-directional still picture to the second multi-directional still picture. The processor, the interface, the comparator, the assembler and/or other elements of the device or system for detecting links among multi-directional still pictures may include any features and functionalities of Processor 11, Maker 920, Multi-directional Pictures Repository 115, and/or other disclosed elements. The device or system may also include any functionalities or steps of any disclosed methods such as, for example, method 3300. For example, Maker 920 may be implemented on Processor 11 and it may read still pictures or references thereto, any data structures (i.e. multi-directional still pictures, mazes, sequences, etc.) and/or other elements from Multi-directional Pictures Repository 115. Comparator may be implemented on Processor 11 and it may perform the described picture processing to find still pictures of any multi-directional still pictures that may be within a line of sight. Assembler may be implemented on Processor 11 and it may add links to or modify links of multi-directional still pictures whose still pictures are found to be within a line of sight. Assembler may also store the still pictures or references thereto, any data structures (i.e. multi-directional still pictures, mazes, sequences, etc.) and/or other elements in Multi-directional Pictures Repository 115. Comparator and assembler may be included in Maker 920, they may be separate programs implemented on Processor 11, they may be hardware components or separate processors dedicated to their assigned functionalities, or a combination thereof.

Figure 28:
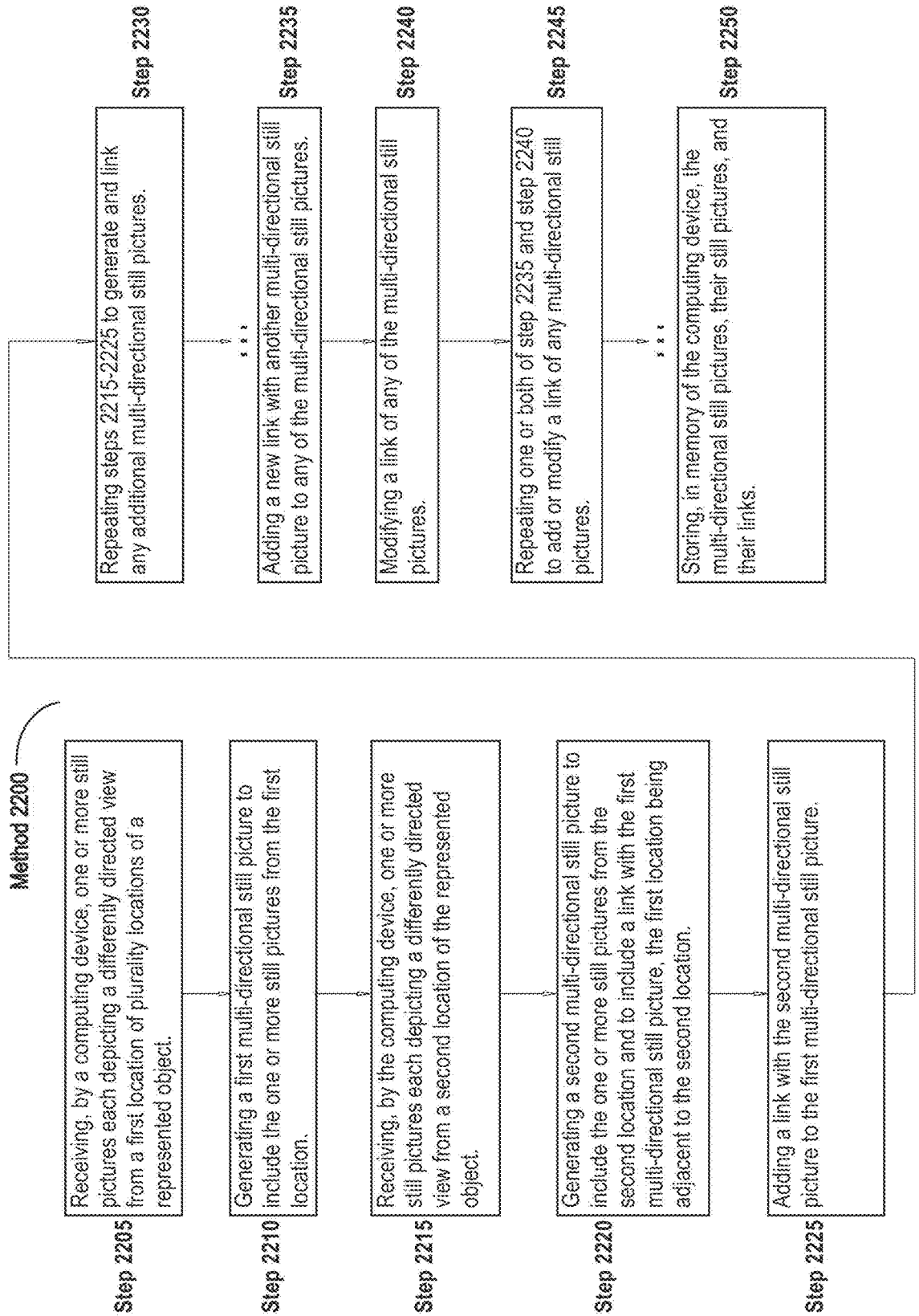
FIG. 28 illustrates a flow chart diagram of an embodiment of a method 2200 implemented by MDP Unit 100.

Referring to FIG. 28, the illustration shows an embodiment of a method 2200 for generating a collection of Multi-directional Still Pictures 200 representing an object. The steps of this exemplary method may therefore be used by a user on a computing device operating an interface for MDP Unit 100 to enable a user to generate Multi-directional Still Pictures 200 in a user-friendly process. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be utilized with Multi-directional Motion Pictures 400 (later described) for generating a collection of Multi-directional Motion Pictures 400 representing an object. In some embodiments, the steps of this method may be used in combination with the steps of methods 3200 for automatic detecting Still Pictures 210a, 210b, 210c, 210d, etc. from a collection of digital pictures and/or method 3300 for automatic detection of Multi-directional Still Picture Links 220a, 220b, 220c, 220d, etc. in a collection of Multi-directional Still Pictures 200.

At step 2205, one or more still pictures each depicting a differently directed view from a first location of plurality locations of a represented object are received by a computing device. MDP Unit 100 may enable interactive visual representation of objects using multi-directional still pictures positioned in locations of the represented object. Any locations may be used to represent the object. In one example, steps (i.e. every two feet, etc.) in a park's walkways may be used as locations to simulate a user's stepping through the park. In another example, evenly spaced points (i.e. points in the center of every square yard, etc.) in a building's interior may be used as locations to simulate a user's stepping through the building. In one example, the first location may be a logical starting point such as near an entrance into a park or near a door to a building. In another example, the first location may be any location of the represented object. A user may capture, using a digital camera for example, one or more still pictures each including a differently directed view from a location such as the first location and the one or more still pictures may be received by a computing device from the digital camera. The digital camera may be built into a computing device running an instance of MDP Unit 100 in which case the captured one or more still pictures may be received from the digital camera through an internal connection or storage means such as, for example, bus, memory, hard drive, or any other direct or operative internal connection or storage means. In one example, the digital camera may store a still picture in a file on a hard drive of the computing or mobile device where an instance of MDP Unit 100 may access the file to facilitate the functionalities described herein. The digital camera may be separate from the computing device running an instance of MDP Unit 100 in which case the captured one or more still pictures may be received from the digital camera through external connection or storage means such as, for example, bus, flash drive, network, or any other direct or operative external connection or storage means. In one example, the digital camera may store a still picture in a file on a network to which the computing device may connect and on which an instance of MDP Unit 100 may access the file to facilitate the functionalities described herein. The user may capture views of any directions (forward, backward, right, left, up, down, diagonal, etc.) from a location such as the first location.

At step 2210, a first multi-directional still picture is generated to include the one or more still pictures from the first location. Each location of the represented object such as the first location may be associated with a multi-directional still picture that may comprise one or more differently directed still pictures and one or more links to other multi-directional still pictures. In some embodiments, a multi-directional still picture may include a data structure storing one or more differently directed still pictures and one or more links to other multi-directional still pictures. Multi-directional still pictures may enable the user to view all views (i.e. forward, backward, right, left, up, down, diagonal, etc.) from all locations of the represented object and enable the user to move among the multi-directional still pictures simulating motion through the represented object. In some embodiments, multi-directional still pictures may be ordered to include a first multi-directional still picture, followed by a second multi-directional still picture, which may also be followed by a third multi-directional still picture, and so on, to complete a sequence. In other embodiments, multi-directional still pictures may be organized in a maze that may correspond to a shape of the represented object. In yet other embodiments, multi-directional still pictures may be interlinked in any conceivable manner without using any intermediary or supporting data structures such as the sequence and/or maze. Generally, multi-directional still pictures may correspond to a shape of a represented object. Since there are no other multi-directional still pictures to which it can be linked, the first multi-directional still picture may be generated to include the still pictures captured from the first location. In some embodiments, picture processing may be implemented to automatically detect still pictures with overlapping fields of view from a specific location of a represented object such as the first location, and to add the detected still pictures to multi-directional still picture representing the location. Generating may include any action or operation by or for Maker 920.

At step 2215, one or more still pictures each depicting a differently directed view from a second location of the represented object are received by the computing device. Step 2215 may include any action or operation described in step 2205 as applicable.

At step 2220, a second multi-directional still picture is generated to include the one or more still pictures from the second location and to include a link with the first multi-directional still picture, the first location being adjacent to the second location. Step 2220 may include any action or operation described in Step 2210 as applicable. Additionally, a link with a prior multi-directional still picture such as the first multi-directional still picture may be included within a current multi-directional still picture such as the second multi-directional still picture. The link may enable the user to move from the second multi-directional still picture to first multi-directional still picture this way simulating motion through the represented object. In some embodiments, picture processing may be implemented to automatically detect a link between multi-directional still pictures and to add the detected link to a multi-directional still picture.

At step 2225, a link with the second multi-directional still picture is added to the first multi-directional still picture. In addition to the previously included still pictures, a link with a current multi-directional still picture such as the second multi-directional still picture may be added to a prior multi-directional still picture such as the first multi-directional still picture. The link may enable the user to move from the first multi-directional still picture to the second multi-directional still picture this way simulating motion through the represented object. Adding a link may include any action or operation by or for Maker 920.

At step 2230, steps 2215-2225 are repeated to generate and link any additional multi-directional still pictures. Steps 2215-2225 may be performed repeatedly to generate any additional multi-directional still pictures in user's discretion. Any number of multi-directional still pictures associated with any locations may be generated. In some embodiments, any number of multi-directional still pictures associated with any locations may be generated to cover the entire represented object. In other embodiments, any number of multi-directional still pictures associated with any locations may be generated to cover a portion of the represented object.

At step 2235, a new link with another multi-directional still picture is added to any of the multi-directional still pictures. MDP Unit 100 may include a means through which the user may access any of the multi-directional still pictures and add to it an additional link with any other multi-directional still picture. In some embodiments in which multi-directional still picture may include a data structure, such means may include an editor or graphical user interface configured to ask the user to indicate a link with a specific multi-directional still picture and to add a new data field including the new link to the data structure. In other embodiments in which multi-directional still picture may include a data structure, such means may use picture processing to automatically detect a new link with a multi-directional still picture and add a new data field including the new link to the data structure. Adding a link may include any action or operation by or for Maker 920.

At step 2240, a link of any of the multi-directional still pictures is modified. MDP Unit 100 may include a means through which the user may access any of the multi-directional still pictures and modify any of its links. In some embodiments in which multi-directional still picture may include a data structure, such means may include an editor or graphical user interface configured to read a data field including a link, ask the user to indicate a link with another multi-directional still picture, and replace the previous link with the updated link in the data field. In some embodiments in which multi-directional still picture may include a data structure, such means may read a data field including a link, use picture processing to automatically detect a link with another multi-directional still picture, and replace the previous link with the updated link in the data field. Modifying may include any action or operation by or for Maker 920.

At step 2245, one or both of step 2235 and step 2240 are repeated to add or modify a link of any multi-directional still pictures. Step 2245 may include any action or operation described in step 2235 and/or step 2240 as applicable. Any number of links among multi-directional still pictures may be used in user's discretion. Such links may connect multi-directional still pictures in any conceivable direction (i.e. forward, backward, right, left, up, down, diagonal, etc.). The links may enable the user to move among multi-directional still pictures this way simulating motion through the represented object. In one example, links may connect multi-directional still pictures associated with locations (i.e. steps, etc.) on a park's walkways. In another example, links may connect multi-directional still pictures associated with evenly spaced locations (i.e. locations in the center of every square yard, etc.) in a room.

At step 2250, the multi-directional still pictures, their still pictures, and their links, are stored in memory of the computing device. Multi-directional still pictures may be stored, maintained, and/or organized in various arrangements including files, data structures, objects, tables, databases, DBMSs, memory structures, and/or other similar arrangements and/or data repositories. In some embodiments, still pictures or references thereto, links, and/or any data structures (i.e. multi-directional still pictures, mazes, sequences, etc.) may be stored in a Multi-directional Pictures Repository 115. In some embodiments, Multi-directional Pictures Repository 115 may include a file, a data structure, and/or other similar digital data repository. In other embodiments, Multi-directional Pictures Repository 115 may include a database management system (DBMS), a database, a system, a process, and/or other similar digital data repository. In further embodiments, Multi-directional Pictures Repository 115 may be embedded within an instance of MDP Unit 100 (i.e. hard coded in the Core Program 220). In yet further embodiments, Multi-directional Pictures Repository 115 may include a separate file (i.e. object file, etc.), a separate data structure, a separate DBMS, a separate database, a separate system, a separate process, and/or other separate digital data repository or system for each of the still pictures or references thereto, for each of the links, and/or for each of the data structures (i.e. multi-directional still pictures, mazes, sequences, etc.). In yet further embodiments, Multi-directional Pictures Repository 115 may include a collection of definitions of pictures or references thereto, links, and/or any data structures (i.e. multi-directional still or motion pictures, mazes, sequences, etc.) that may be embedded in other files or programs. Storing may include any action or operation by or for Maker 920.

Embodiments involving any still picture or multi-directional still picture functionalities may include any features or embodiments involving any motion picture or multi-directional motion picture functionalities as later described.

In some aspects, the teaching presented by the disclosure may be implemented in a device or system for generating multi-directional still pictures. The device or system may include a processor and an interface, coupled to the processor, for receiving one or more still pictures each still picture depicting a differently directed view from a first location of plurality locations of a represented object. The device or system may further include an assembler, coupled to the processor, for generating a first multi-directional still picture to include the one or more still pictures from the first location. The interface may further be configured to receive one or more still pictures each depicting a differently directed view from a second location of the represented object, and the assembler may further be configured to: generate a second multi-directional still picture to include the one or more still pictures from the second location and to include a link with the first multi-directional still picture, the first location being adjacent to the second location, and add a link with the second multi-directional still picture to the first multi-directional still picture. The processor, the interface, the assembler and/or other elements of the device or system for generating multi-directional still pictures may include any features and functionalities of Processor 11, Maker 920, Multi-directional Pictures Repository 115, Input Interface 140, Keyboard 150 or any other input device, and/or other disclosed elements. The device or system may also include any functionalities or steps of any disclosed methods such as, for example, method 2200. For example, an input device such as a digital camera may provide a means for capturing still pictures from locations of a represented object. Input Interface 140 may process the captured still pictures for use by Maker 920 or other disclosed elements. Assembler may be implemented on Processor 11 and it may organize and/or store the captured still pictures or references thereto, any data structures (i.e. multi-directional still pictures, mazes, sequences, etc.) and/or other elements in Multi-directional Pictures Repository 115. Assembler may be included in Maker 920, it may be a separate program implemented on Processor 11, it may be a hardware component or a separate processor dedicated to its assigned functionalities, or a combination thereof.

Figure 29:
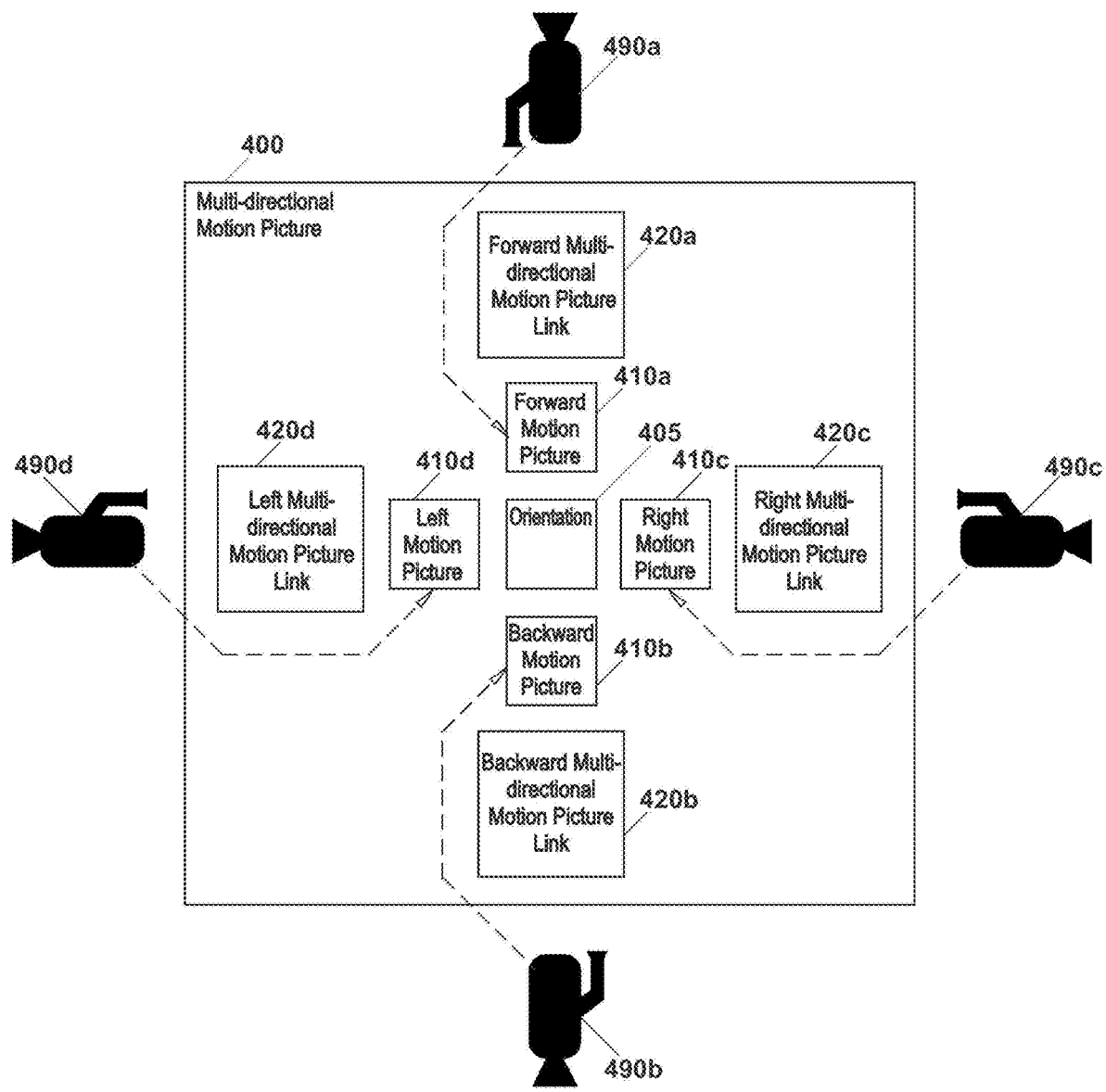
FIG. 29 is a diagram showing an embodiment of a Multi-directional Motion Picture 400.

Referring to FIG. 29, in some aspects, the teaching presented by the disclosure may be implemented to include streams of pictures (i.e. motion pictures, etc.). In some embodiments, such stream of pictures may include pictures (i.e. frames) such as the previously described Forward Still Pictures 210*a*, Backward Still Pictures 210*b*, Right Still Pictures 210*c*, Left Still Pictures 210*d*, and/or any additional Still Pictures. Such pictures (i.e. frames) in a stream of pictures may be time stamped or time sequenced. In some aspects, each still picture in a stream of time stamped still pictures may include or be associated with an incremental time stamp indicating its position in a time continuum. In other aspects, each still picture in a stream of time stamped still pictures may not include or be associated with a time stamp or any reference to its position in a time continuum. In yet other aspects, each still picture in a stream of time stamped still pictures may be sequentially ordered indicating its sequential position in the stream. In yet other aspects, a time stamp of each still picture in a stream of time stamped still pictures may be determined or computed using a formula such as a frame rate formula known in art. A frame rate formula may indicate a number of pictures (i.e. frames) to be processed in a period of time (i.e. second, etc.). A frame rate formula may include a constant or variable frame rate. Embodiments including streams of pictures may find applicability in any environment where an object may need to be represented over a period of time. Some examples of such environments may include representations of objects that change over time or objects that may include an action scene (i.e. other moving objects or persons, etc.). Some embodiments that may utilize streams of pictures may be included in entertainment videos (i.e. Hollywood movies, etc.), documentaries, sporting events videos, learning videos, simulations, and other similar materials.

MDP Unit 100 may enable a user to visually experience an object over time. In some embodiments, MDP Unit 100 may be implemented to include (1) Multi-directional Motion Pictures 400, and/or (2) a means to move among Multi-directional Motion Pictures 400 in a time continuum. In other embodiments, MDP Unit 100 may be implemented to include (1) a Maze 300 and/or Multi-directional Picture Sequences 350 that may comprise Multi-directional Motion Pictures 400, and/or (2) a means to move among Multi-directional Motion Pictures 400 in a time continuum. Other additional elements may be included as needed, or some of the disclosed ones may be excluded, or a combination thereof may be utilized in alternate embodiments.

Multi-directional Motion Picture 400 may comprise any software or a combination of hardware and software. Multi-directional Motion Picture 400 may include functions and algorithms for storing one or more Motion Pictures 410 or references thereto, and/or one or more Multi-directional Motion Picture Links 420. In some embodiments, a Multi-directional Motion Picture 400 may include functions and algorithms for storing one or more Motion Pictures 410 or references thereto, one or more Multi-directional Motion Picture Links 420, and/or Orientation 405. In other embodiments, a Multi-directional Motion Picture 400 may include functions and algorithms for storing a data structure whose data fields may include one or more Motion Pictures 410 or references thereto, one or more Multi-directional Motion Picture Links 420, and/or Orientation 405. In one example, a Multi-directional Motion Picture 400 may include a data structure comprising nine data fields: (1) Forward Motion Picture 410*a*, (2) Backward Motion Picture 410*b*, (3) Right Motion Picture 410*c*, (4) Left Motion Picture 410*d*, (5) Forward Multi-directional Motion Picture Link 420*a*, (6) Backward Multi-directional Motion Picture Link 420*b*, (7) Right Multi-directional Motion Picture Link 420*c*, (8) Left Multi-directional Motion Picture Link 420*d*, and/or (9) Orientation 405. In general, MDP Unit 100 may enable a user to view all conceivable views or angles in a Multi-directional Motion Picture 400, and/or may enable a user to move among Multi-directional Motion Pictures 400 in all conceivable directions. As such, additional Motion Pictures may be included, but are not limited to, up Motion Picture, down Motion Picture, diagonal Motion Picture, angular Motion Picture, behind Motion Picture, turn around Motion Picture, reverse Motion Picture, oblique Motion Picture (i.e. circular, elliptical, etc.), and others. Also, additional Multi-directional Motion Picture Links may be included, but are not limited to, up link, down link, diagonal link, angular link, behind link, turn around link, reverse link, oblique link (i.e. circular, elliptical, etc.), and others. Multi-directional Motion Picture 400 may include some or all the features and embodiments of the previously described Multi-directional Still Picture 200. Also, Multi-directional Motion Picture 400 and/or any of its embodiments and/or elements may include or be combined with some or al the features and embodiments of any of the previously described elements such as, for example, Multi-directional Still Picture 200, Still Picture 210*a*, 210*b*, 210*c*, 210*d*, etc., Multi-directional Still Picture Link 220*a*, 220*b*, 220*c*, 220*d*, etc., Orientation 205, Web Browser 800, Web Page 810, Map 820, Window 830, Picture Display 840, Picture Arrow 860*a*, 860*b*, 860*c*, 860*d*, etc., Direction Arrow 850*a*, 850*b*, 850*c*, 850*d*, etc., Orientation Pointer 870, Multi-directional Still Picture Angle 230*a*, 230*b*, 230*c*, 230*d*, etc., Multi-directional Still Picture Distance 240*a*, 240*b*, 240*c*, 240*d*, etc., and/or any other features or elements.

Motion Picture 410*a*, 410*b*, 410*c*, 410*d*, etc. may comprise any software or a combination of hardware and software. Motion Picture 410*a*, 410*b*, 410*c*, 410*d*, etc. may include functions and algorithms for storing a stream of digital pictures or reference thereto. While Motion Pictures 410 may be referred to or illustrated as Motion Pictures 410*a-d*, one of ordinary skill in art will understand that they may indeed include any number of Motion Pictures 410*a-n*. In some embodiments, a Motion Picture 410*a*, 410*b*, 410*c*, 410*d*, etc. may include functions and algorithms for storing a data structure whose data field may include a stream of digital pictures or reference thereto. In general, a Motion Picture 410*a*, 410*b*, 410*c*, 410*d*, etc. may include a collection of time stamped or time sequenced still pictures (i.e. frames, etc.) such as, for example, Still Pictures 210*a*, 210*b*, 210*c*, 210*d*, etc. Such Motion Picture 410*a*, 410*b*, 410*c*, 410*d*, etc. may include digital bitmaps, JPEG pictures, GIF pictures, TIFF pictures, PDF pictures, any computer-generated pictures (i.e. views of a 3D game or CAD/CAM application captured as digital pictures, etc.), digital video such as MPEG, AVI, FLV, MOV, RM, SWF, WMV, DivX etc., any other digital pictures, video or visual content, or an outside application or process of any type that may generate digital pictures, video or other visual content. In some aspects, a Motion Picture 410*a*, 410*b*, 410*c*, 410*d*, etc. may include a reference or pointer to a stream of digital pictures or other visual content. In some embodiments, a user may create a Motion Picture 410*a*, 410*b*, 410*c*, 410*d*, etc. by utilizing a digital or video camera, a Motion Picture Camera 490*a*, 490*b*, 490*c*, 490*d*, etc., and/or any other motion picture taking equipment. Such motion picture taking equipment may be combined with an apparatus specially constructed for motion picture creation such as a tripod, rails, wheels, slidable components, robotic arm, and/or other such apparatuses or devices. In some embodiments, specific pictures (i.e. frames in equal intervals such as 0.04 seconds, etc.) of a stream of pictures from motion picture taking equipment may be captured as a Motion Picture 410*a*, 410*b*, 410*c*, 410*d*, etc. In other embodiments, all pictures (i.e. frames) of a stream of pictures from motion picture taking equipment may be captured as a Motion Picture 410*a*, 410*b*, 410*c*, 410*d*, etc. In yet other embodiments, a user may create a Motion Picture 410*a*, 410*b*, 410*c*, 410*d*, etc. by capturing views (i.e. pictures, frames, etc.) of a computer generated object (i.e. 3D game, CAD/CAM application, etc.) through processing. In some embodiments, a Motion Picture 410*a*, 410*b*, 410*c*, 410*d*, etc. may be stored in a digital file in Memory 180 or Physical Storage Medium 181 of a Computing Device 70. As such, Core Program 110 may access and utilize the stored Motion Pictures 410*a*, 410*b*, 410*c*, 410*d*, etc. to implement the features and functionalities described herein. In other embodiments, a Motion Picture 410*a*, 410*b*, 410*c*, 410*d*, etc. may include a live feed that may not be stored. As such, Core Program 110 may receive and utilize the live feeds of Motion Pictures 410*a*, 410*b*, 410*c*, 410*d*, etc. to implement the features and functionalities described herein. Motion Pictures 410*a*, 410*b*, 410*c*, 410*d*, etc. may include some or all the features and embodiments of the previously described Still Pictures 210*a*, 210*b*, 210*c*, 210*d*, etc.

A Multi-directional Motion Picture Link 420*a*, 420*b*, 420*c*, 420*d*, etc. may comprise any software or a combination of hardware and software. Multi-directional Motion Picture Link 420*a*, 420*b*, 420*c*, 420*d*, etc. may include functions and algorithms for storing a reference or pointer to a Multi-directional Motion Picture 400. While Multi-directional Motion Picture Links 410 may be referred to or illustrated as Multi-directional Motion Picture Links 410*a-d*, one of ordinary skill in art will understand that they may indeed include any number of Multi-directional Motion Picture Links 410*a-n*. A Multi-directional Motion Picture Link 420*a*, 420*b*, 420*c*, 420*d*, etc. may include functions and algorithms for storing a data structure whose data field may include a reference or pointer to a Multi-directional Motion Picture 400. In some embodiments, a Multi-directional Motion Picture Link 420*a*, 420*b*, 420*c*, 420*d*, etc. may be undefined, non-existent or empty indicating no reference or pointer to a Multi-directional Motion Picture 400. In other embodiments, a Multi-directional Motion Picture Link 420*a*, 420*b*, 420*c*, 420*d*, etc. may include a reference or pointer to an outside application or process. A Multi-directional Motion Picture Link 420*a*, 420*b*, 420*c*, 420*d*, etc. may be defined or created automatically by Core Program 110 or by a user through a means such as a graphical user interface. A Multi-directional Motion Picture Link 420*a*, 420*b*, 420*c*, 420*d*, etc. may also be modified by Core Program 110 or by a user through a means such as a graphical user interface. Multi-directional Motion Picture Links 420*a*, 420*b*, 420*c*, 420*d*, etc. may include some or all the features and embodiments of the previously described Multi-directional Still Picture Links 220*a*, 220*b*, 220*c*, 220*d*, etc.

Orientation 405 may comprise any software or a combination of hardware and software. Orientation 405 may include functions and algorithms for storing orientation of a Multi-directional Motion Picture 400. In some embodiments, Orientation 405 may include functions and algorithms for storing a data structure whose data field may include orientation of a Multi-directional Motion Picture 400. In some embodiments, Orientation 405 may be associated with a direction of a Motion Picture 410*a*, 410*b*, 410*c*, 410*d*, etc., with a direction of a Multi-directional Motion Picture Link 420*a*, 420*b*, 420*c*, 420*d*, etc. and/or with any other direction as previously described. In some aspects, Orientation 405 may include absolute or relative orientation as previously described. Orientation 405 may include some or all the features and embodiments of the previously described Orientation 205.

Figure 30:
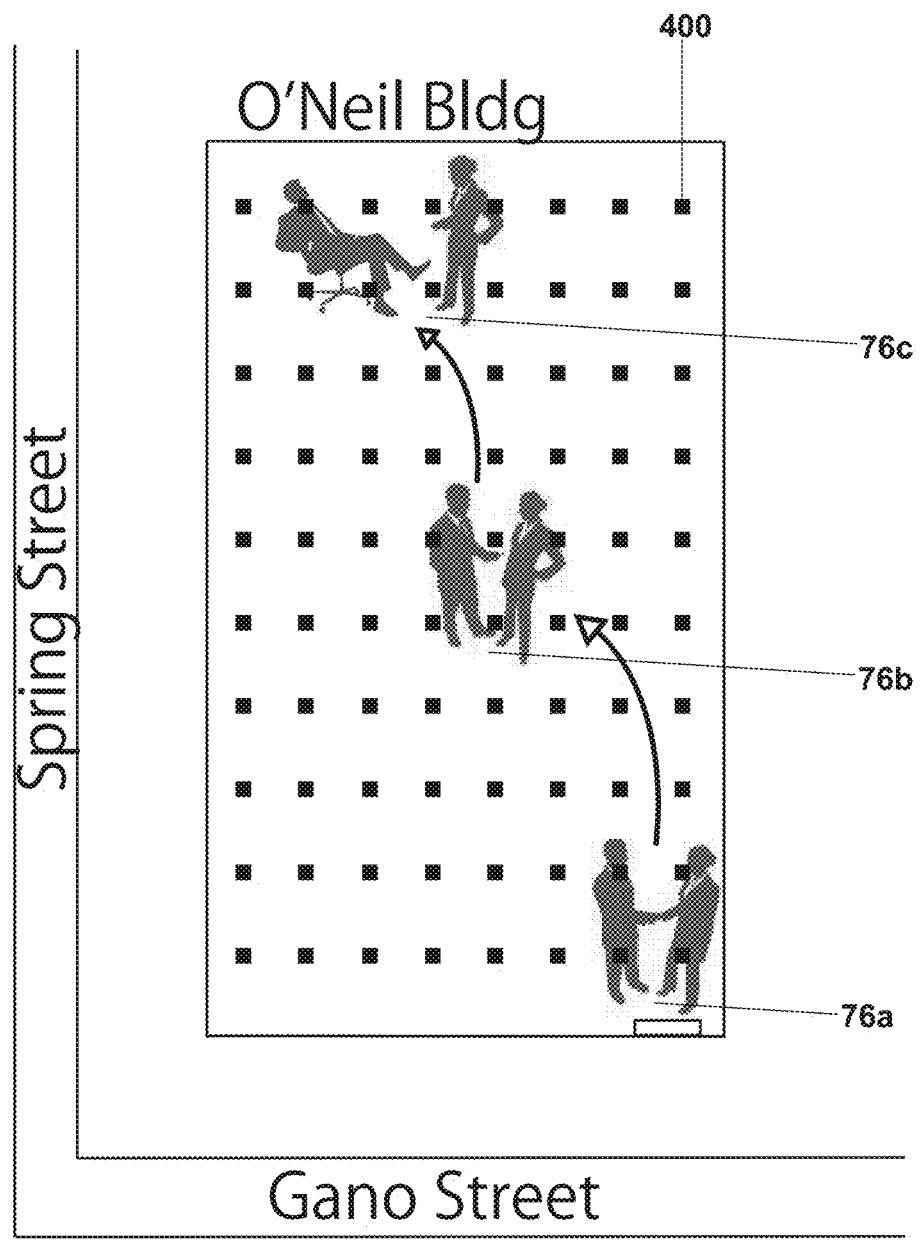
FIG. 30 shows an embodiment of MDP Unit 100 implemented to represent interior of a building with an action scene.

Referring to FIG. 30, an embodiment of MDP Unit 100 implemented to represent an object such as, for example, interior of a building with an action scene is illustrated. As such, MDP Unit 100 may enable a user to visually experience interior of a building with an action scene where every step may contain a view of what a user would see stepping through interior of the building in a time continuum. In some embodiments, Multi-directional Motion Pictures 400 may be applied in the interior of the building where Multi-directional Motion Pictures 400 may be interconnected in such an arrangement to correspond to a shape (i.e. context, etc.) of the interior of the building. In other embodiments, MDP Unit 100 may be implemented to include (1) Multi-directional Motion Pictures 400 arranged to correspond to a shape of a represented object (i.e. interior of a building for example, etc.), and/or (2) a means for a user to move among Multi-directional Motion Pictures 400 in a time continuum. In yet other embodiments, MDP Unit 100 may be implemented to include (1) Multi-directional Picture Sequences 350 that may comprise Multi-directional Motion Pictures 400 representing paths (i.e. straight-lined paths, curved paths, etc.) in a represented object (i.e. interior of a building for example, etc.), and/or (2) a means for a user to connect with Multi-directional Picture Sequences 350 and/or move among Multi-directional Motion Pictures 400 in a time continuum. In yet other embodiments, MDP Unit 100 may be implemented to include (1) a Maze 300 that may comprise Multi-directional Motion Pictures 400 and/or Multi-directional Picture Sequences 350, and/or (2) a means for a user to connect with Multi-directional Picture Sequences 350 and/or Multi-directional Motion Pictures 400 in a time continuum. Other additional elements may be included as needed, or some of the disclosed ones may be excluded, or a combination thereof may be utilized in alternate embodiments. In one example, Multi-directional Motion Pictures 400 may be positioned in the center of every full square yard of a represented room with an action scene. The action scene may include a man and a woman standing at a door of a building greeting each other with a hand shake in the Action Location 76*a*, the man and woman conversing and walking away from the door toward the middle of the building in the Action Location 76*b*, and man sitting on a chair while the woman is talking with him in the corner of the building in the Action Location 76*c*. In general, an action scene may include action figures and/or objects (i.e. man, woman, chair, etc. in this example), explicit Action Locations 76*a*, 76*b*, 76*c* and implied action locations in between the explicit Action Locations 76*a*, 76*b*, 76*c* (i.e. locations where man and woman moved and/or where action occurred, etc.), and/or any other items relevant to the action scene or the represented object. MDP Unit 100 may enable a user to view all views (i.e. forward, backward, right, left, up, down, diagonal, angular, etc.) from all locations (Multi-directional Motion Pictures 400) of a represented object (i.e. room in this example, etc.) including an action scene in a time continuum and move among Multi-directional Motion Pictures 400 simulating motion through the represented object including an action scene in a time continuum.

Figure 31:
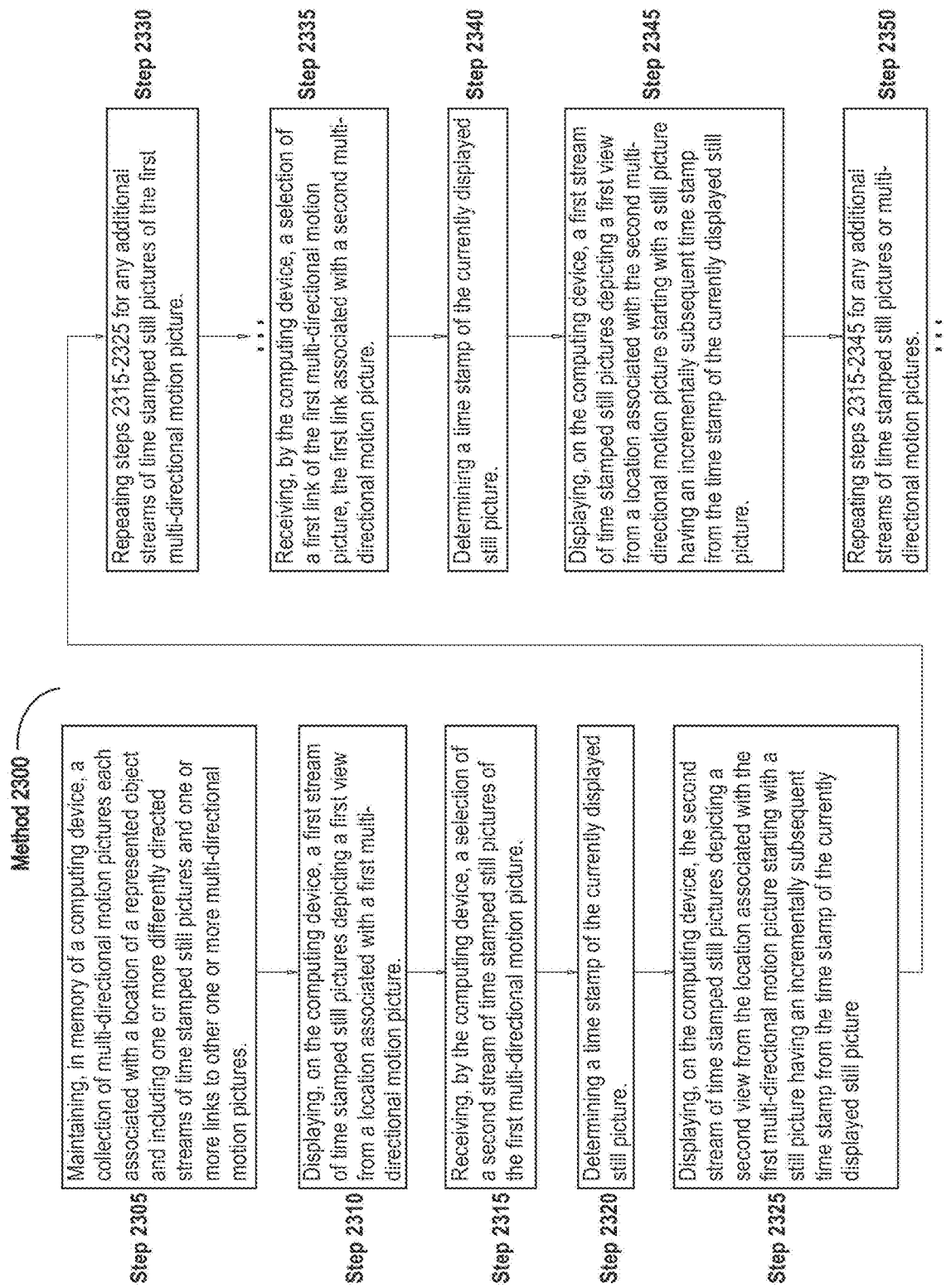
FIG. 31 illustrates a flow chart diagram of an embodiment of a method 2300 implemented by MDP Unit 100.

Referring to FIG. 31, the illustration shows an embodiment of a method 2300 for using a collection of Multi-directional Motion Pictures 400 representing an object. The steps of this exemplary method may therefore be used by a user on a computing device operating an interface for MDP Unit 100 to enable the user to view all views (i.e. forward, backward, right, left, up, down, diagonal, etc.) from all locations of the represented object over time and enable the user to move among the multi-directional motion pictures this way simulating motion through the represented object over time. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be implemented for using a collection of Multi-directional Still Pictures 200 representing an object.

At step 2305, a collection of multi-directional motion pictures each associated with a location of a represented object and including one or more differently directed streams of time stamped still pictures and one or more links to other one or more multi-directional motion pictures is maintained in memory of a computing device. MDP Unit 100 may enable interactive visual representation of objects over time using multi-directional motion pictures associated with locations of a represented object. Any locations may be used to represent the object. In one example, steps (i.e. every two feet, etc.) in a park's walkways may be used as the locations to simulate a user's stepping through the park. In another example, evenly spaced points (i.e. points in the center of every square yard, etc.) in a building's interior may be used as the locations to simulate a user's stepping through the building. In some embodiments, a multi-directional motion picture may include a data structure storing one or more differently directed streams of time stamped still pictures (i.e. motion picture, video, etc.) and one or more links to other multi-directional motion pictures. In some embodiments, multi-directional motion pictures may be ordered to include a first multi-directional motion picture, followed by a second multi-directional motion picture, which may also be followed by a third multi-directional motion picture, and so on, to complete a sequence. In other embodiments, multi-directional motion pictures may be arranged in a maze that may correspond to a shape of the represented object. In yet other embodiments, multi-directional motion pictures may be interlinked in any conceivable manner without using any intermediary or supporting data structures such as the sequence and/or maze. Generally, multi-directional motion pictures may correspond to a shape of a represented object. In some embodiments, any number of multi-directional motion pictures including differently directed (i.e. forward, backward, right, left, up, down, diagonal, etc.) streams of time stamped still pictures (i.e. motion picture, video, etc.) may be utilized to cover the entire represented object. In other embodiments, any number of multi-directional motion pictures including differently directed (i.e. forward, backward, right, left, up, down, diagonal, etc.) streams of time stamped still pictures (i.e. motion picture, video, etc.) may be utilized to cover a portion of the represented object. Also, any number of links among multi-directional motion pictures may be used. Such links may connect multi-directional motion pictures in any conceivable direction (i.e. forward, backward, right, left, up, down, diagonal, etc.). The links may enable the user to move among multi-directional motion pictures this way simulating motion through the represented object in a time continuum.

At step 2310, a first stream of time stamped still pictures depicting a first view from a location associated with a first multi-directional motion picture is displayed on the computing device. The user may view on the display of the computing device a stream of time stamped still pictures (i.e. motion picture, video, etc.) such as the first stream of time stamped still pictures of the first multi-directional motion picture. In one example, the first location may be a logical starting point such as a location near an entrance into a park or near a door of a building in which case the first stream of time stamped still pictures (i.e. motion picture, video, etc.) may include a view from this logical starting location (i.e. a view of what a pedestrian would see entering a gate of the park, etc.). In another example, the first location may be any location of the represented object. In some embodiments, a stream of time stamped still pictures (i.e. motion picture, video, etc.) such as the first stream of time stamped still pictures of the first multi-directional motion picture may be obtained from a file, a data structure, an object, and/or other similar digital data repository. In other embodiments, a stream of time stamped still pictures (i.e. motion picture, video, etc.) may be obtained from a database management system (DBMS), a database, a system, a process, and/or other similar digital data repository. In further embodiments, a stream of time stamped still pictures (i.e. motion picture, video, etc.) may be embedded within an instance of MDP Unit 100 (i.e. hard coded in the Core Program 110). In yet further embodiments, a stream of time stamped still pictures (i.e. motion picture, video, etc.) may be obtained from a separate file (i.e. object file, etc.), a separate data structure, a separate DBMS, a separate database, a separate system, a separate process, and/or other separate digital data repository or system for each of the streams of still pictures or references thereto. In yet further embodiments, a stream of time stamped still pictures (i.e. motion picture, video, etc.) may be obtained from a collection of definitions of streams of time stamped still pictures or references thereto embedded in other files or programs. In some embodiments, a stream of time stamped still pictures (i.e. motion picture, video, etc.) may be obtained from a live feed of a motion picture camera or any other motion picture talking equipment. In some embodiments, a stream of time stamped still pictures (i.e. motion picture, video, etc.) may be obtained from a Multi-directional Pictures Repository 115 that may further include a file (i.e. object file, etc.), a data structure, a DBMS, a database, a system, a process, and/or other separate digital data repository or system. In some embodiments, picture processing may be implemented to insert or overlay a picture of an avatar into/onto a stream of time stamped still pictures such as the first stream of time stamped still pictures. Displaying may include any action or operation by or for a Picture Display 840.

At step 2315, the computing device receives a selection of a second stream of time stamped still pictures of the first multi-directional motion picture. In some embodiments, MDP Unit 100 may include a means such as a graphical user interface (GUI) configured to show on the display of the computing device graphical pointers each associated with a specific stream of time stamped still pictures (i.e. motion picture, video, etc.) and/or specific multi-directional motion picture link of a multi-directional motion picture such as the first multi-directional motion picture. In one example, a pointer to each of the one or more streams of time stamped still pictures of the first multi-directional motion picture and a pointer to each of the one or more links of the first multi-directional motion picture may be displayed on the computing device for selection by a user. In some embodiments, a pointer in a GUI may include an arrow, a triangle, a push button (i.e. web form push button, etc.), a picture, and/or other such directional signs or indicia indicating a direction of its associated stream of time stamped still pictures (i.e. motion picture, video, etc.) and/or multi-directional motion picture link. In one example, an upward pointed triangle may be associated with a forward stream of time stamped still pictures (i.e. motion picture, video, etc.) and/or an upward pointed arrow may be associated with a forward multi-directional motion picture link. In other embodiments, certain areas on the displayed stream of time stamped still pictures may be associated with other streams of time stamped still pictures (i.e. motion picture, video, etc.) and/or multi-directional motion picture links in which case pointers may be used as secondary input means or not used at all. In one example, a user's clicking on any part of a park's forward walkway depicted in a stream of time stamped still pictures (i.e. motion picture, video, etc.) may execute a forward multi-directional motion picture link without selecting its associated pointer. A pointer may be selected through any internal or external input means of the computing device such as keyboard, mouse, touch screen, control wheel, remote control, joystick, microphone, and/or other similar input means. User may select a pointer by pressing keyboard keys, by touching touch screen buttons, by clicking mouse buttons, by pressing game controller buttons, by pressing joystick buttons, by pressing remote control buttons, by sliding a control wheel (i.e. iPod control wheel, etc.), or by using other directional means associated with particular pointer. Upon user's selection, the selected pointer may be received by an interface for MDP Unit 100. The selected pointer may be received by the user's computing device or by any other computing device in general. The selected pointer may be received by any component of MDP Unit 100. A pointer may include any action or operation by or for a Direction Arrow 850*a*, 850*b*, 850*c*, 850*d*, etc. and/or Picture Arrow 860*a*, 860*b*, 860*c*, 860*d*, etc.

At step 2320, a time stamp of the currently displayed still picture is determined. Each still picture (i.e. frame) in a stream of time stamped still pictures (i.e. motion picture, video, etc.) may include or be associated with a time stamp. In some embodiments, multi-directional motion picture may comprise a data structure whose data fields may include a time stamp of each of the still pictures (i.e. frames) of a stream of time stamped still pictures (i.e. motion picture, video, etc.). In other embodiments, a stream of time stamped still pictures may include or store time stamps of its own still pictures (i.e. frames) internally. In yet other embodiments, a stream of time stamped still pictures (i.e. motion picture, video, etc.) may include still pictures (i.e. frames) each stored in its own file where time stamp may be stored in the name of the file. In yet other embodiments, time stamp of each still picture in a stream of time stamped still pictures may be determined or computed using a formula such as a frame rate formula. Time stamp of the currently displayed still picture may be determined by reading the time stamp included or associated with a currently displayed still picture (i.e. frame) of a stream of time stamped still pictures. Time stamp of the currently displayed still picture may also be determined by using a formula to compute the time stamp of a currently displayed still picture (i.e. frame) of a stream of time stamped still pictures.

At step 2325, the second stream of time stamped still pictures depicting a second view from the location associated with the first multi-directional motion picture is displayed on the computing device starting with a still picture having an incrementally subsequent time stamp from the time stamp of the currently displayed still picture. When user selects a pointer associated with a stream of time stamped still pictures (i.e. motion picture, video, etc.), the associated stream of time stamped still pictures may be displayed. Time stamp may be utilized for each of the still pictures (i.e. frames) within each of the streams of time stamped still pictures to enable coordinated transition among multi-directional motion pictures in a time continuum. As such, when a user chooses to view another stream of time stamped still pictures, Core Program 110 may look for appropriate still picture (i.e. frame) having an incrementally subsequent time stamp within a destination stream of time stamped still pictures (i.e. motion picture, video, etc.). A stream of still pictures (i.e. frames) within the destination stream of time stamped still pictures may be displayed on the computing device starting with a still picture (i.e. frame) having an incrementally subsequent time stamp. Displaying may include any action or operation by or for a Picture Display 840.

At step 2330, steps 2315-2325 are repeated for any additional streams of time stamped still pictures of the first multi-directional motion picture. Steps 2315-2325 may be performed repeatedly to display any subsequent streams of time stamped still pictures (i.e. motion picture, video, etc.) of a multi-directional motion picture such as the first multi-directional motion picture. Step 2330 may therefore be performed to enable the user to view all views (i.e. forward, backward, right, left, up, down, diagonal, etc.) from a location associated with a multi-directional motion picture such as the first multi-directional motion picture in a time continuum.

At step 2335, the computing device receives a selection of a first link of the first multi-directional motion picture, the first link associated with a second multi-directional motion picture. Step 2335 may include any action or operation described in step 2315 as applicable.

At step 2340, a time stamp of the currently displayed still picture is determined. Step 2340 may include any action or operation described in step 2320 as applicable.

At step 2345, a first stream of time stamped still pictures depicting a first view from a location associated with the second multi-directional motion picture is displayed on the computing device starting with a still picture having an incrementally subsequent time stamp from the time stamp of the currently displayed still picture. Step 2345 may include any action or operation described in step 2325 as applicable. In some embodiments, a pointer to each of the one or more streams of time stamped still pictures of the second multi-directional motion picture and a pointer to each of the one or more links of the second multi-directional motion picture may be displayed on the computing device for selection by the user.

At step 2350, steps 2315-2345 are repeated for any additional streams of time stamped still pictures or multi-directional motion pictures. Steps 2315-2345 may be performed repeatedly to display any streams of time stamped still pictures (i.e. motion pictures, videos, etc.) of any multi-directional motion pictures and/or to move among any multi-directional motion pictures.

In some aspects, the teaching presented by the disclosure may be implemented in a device or system for using multi-directional motion pictures. The device or system may include a processor and an interface, coupled to the processor, for receiving a collection of multi-directional motion pictures each multi-directional motion picture associated with a location of a represented object and including one or more differently directed streams of time stamped still pictures and one or more links to other one or more multi-directional motion pictures. The device or system may further include a display, coupled to the processor, for rendering a first stream of time stamped still pictures of a first multi-directional motion picture. The device or system may further include an input device, coupled to the processor, for receiving a selection of a first link of the first multi-directional motion picture, the first link associated with a second multi-directional motion picture. The device or system may further include a tracker, coupled to the processor, for determining a time stamp of a currently displayed still picture, wherein the processor may be programmed to cause the display to render a first stream of time stamped still pictures of the second multi-directional motion picture starting with a still picture having an incrementally subsequent time stamp from the time stamp of the currently displayed still picture. The input device may further be configured to receive a selection of a second stream of time stamped still pictures of the second multi-directional motion picture, wherein the tracker may be configured to determine a time stamp of a currently displayed still picture, and the processor may further be programmed to cause the display to render the second stream of time stamped still pictures of the second multi-directional motion picture starting with a still picture having an incrementally subsequent time stamp from the time stamp of the currently displayed still picture. The processor, the interface, the display, the input device, the tracker and/or other elements of the device or system for using multi-directional motion pictures may include any features and functionalities of Processor 11, Core Program 110, Multi-directional Pictures Repository 115, Input Interface 140, Keyboard 150 or any other input device, Output Interface 160, Display 170, and/or other disclosed elements. The device or system may also include any functionalities or steps of any disclosed methods such as, for example, method 2300. For example, Keyboard 150 and/or any other input device may provide a means for inputting a user's operating instructions on movement through and view of the represented object. Input Interface 140 may process input events of Keyboard 150 and/or other input device for use by Core Program 110 or other disclosed elements. Core Program 110 may be implemented on Processor 11 and it may read streams of time stamped still pictures or references thereto, any data structures (i.e. multi-directional motion pictures, mazes, sequences, etc.) and/or other elements from Multi-directional Pictures Repository 115 to obtain appropriate streams of time stamped still pictures from various locations of a represented object that may correspond to user's operating instructions. The tracker may be included in Core Program 110, it may be a separate program implemented on Processor 11, it may be a hardware component or a separate processor dedicated to its assigned functionalities, or a combination thereof. Output Interface 160 may process the streams of time stamped still pictures from Core Program 110 or other disclosed elements for viewing on Display 170 or other output device. Display 170 may render, display or show the streams of time stamped still pictures from various locations of the represented object.

Figure 32:
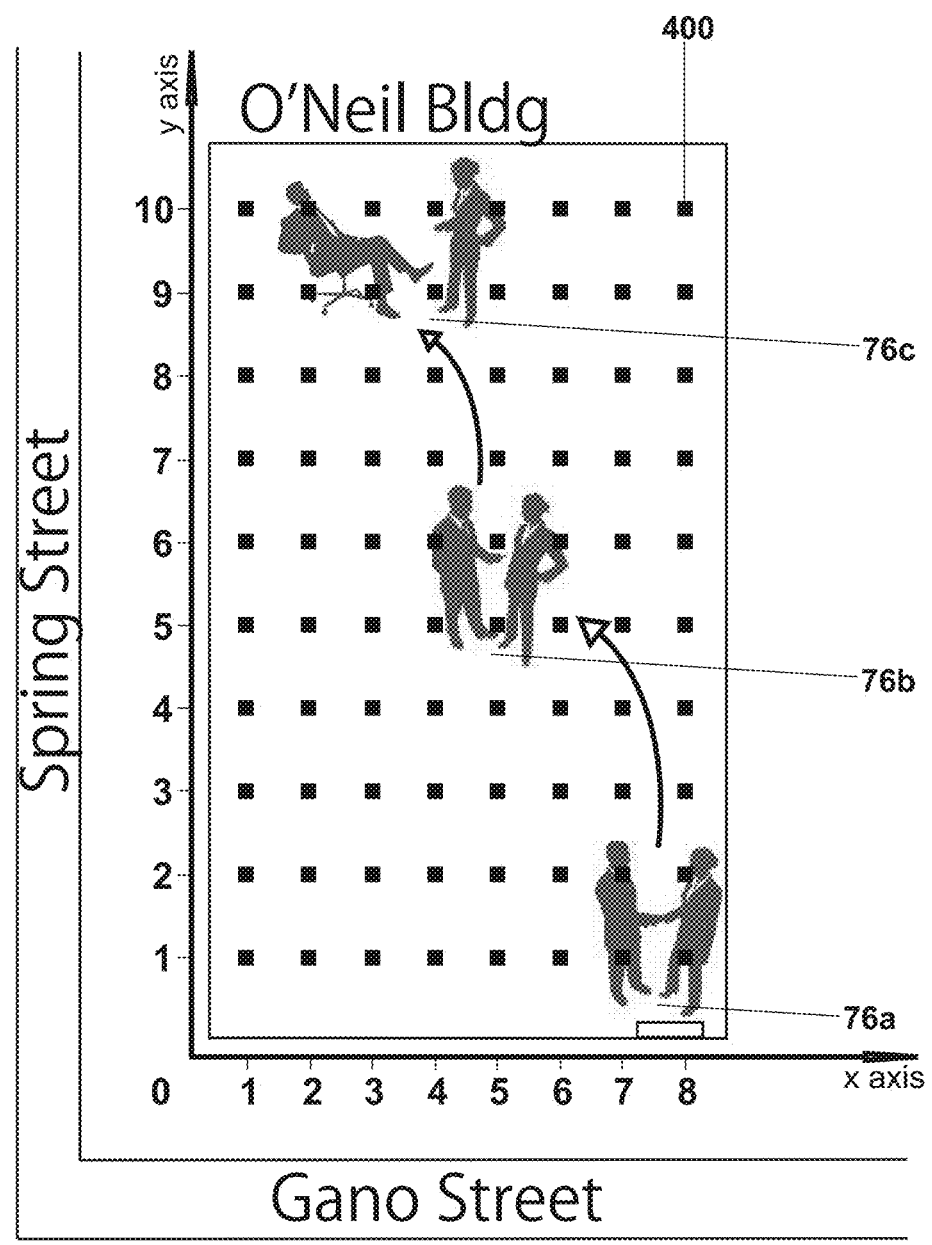
FIG. 32 shows an embodiment of MDP Unit 100 in which Multi-directional Motion Picture 400 may include coordinates.

Referring to FIG. 32, an embodiment is illustrated in which Multi-directional Motion Pictures 400 may include coordinates. In some embodiments, a Multi-directional Motion Picture 400 may include coordinates of a location represented by the Multi-directional Motion Picture 400. In other embodiments, a Multi-directional Motion Picture 400 may include a data structure whose data field may include coordinates of a location represented by the Multi-directional Motion Picture 400. Such coordinates may include x and y coordinates such as, for example, coordinates (5,5) of a Multi-directional Motion Picture 400 at Action Location 76*b*. Other systems of coordinates may be used including x, y, and z coordinates of 3D objects or spaces, system of coordinates using angle and distance from a reference point, system of coordinates using intersecting angles from various reference points, and/or any other systems of coordinates.

Figure 33:
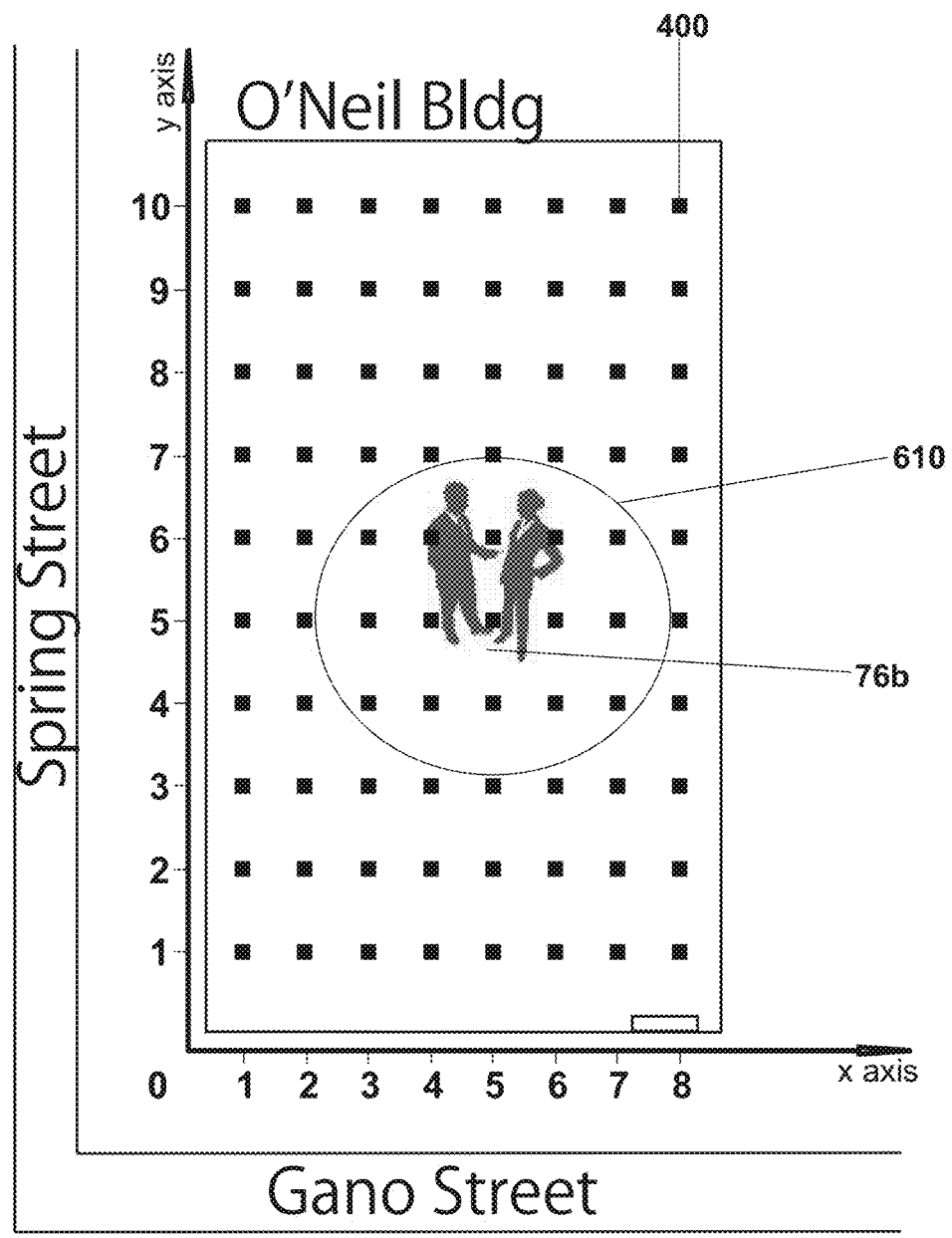
FIG. 33 shows an embodiment of MDP Unit 100 implemented to include automatic pattern of movement among Multi-directional Motion Pictures 400.

Referring to FIG. 33, an embodiment is illustrated where MDP Unit 100 may include automatic patterns of movement among Multi-directional Motion Pictures 400. In some embodiments, a pattern of movement among Multi-directional Motion Pictures 400 may include a sequence of references to Multi-directional Motion Pictures 400 that Core Program 110 may execute to simulate motion among Multi-directional Motion Pictures 400 as if a user were manually moving among the Multi-directional Motion Pictures 400. In other embodiments, a pattern of movement among Multi-directional Motion Pictures 400 may include a sequence of Multi-directional Motion Picture 400 coordinates that Core Program 110 may execute to simulate motion among Multi-directional Motion Pictures 400. Any pattern of movement may be utilized including up, down, diagonal, angular, approaching, retreating, zoom-in, zoom-out, straight, curved, oblique, circular, elliptical, squared, rectangular, triangular, random, and others. A pattern of movement among Multi-directional Motion Pictures 400 may include absolute or relative pattern of movement. An absolute pattern of movement may move among Multi-directional Motion Pictures 400 based on a determined sequence of coordinates regardless of motion of any action scene or object. In one example, an absolute pattern of movement among Multi-directional Motion Pictures 400 may include a sequence of coordinates located along the perimeter of a room regardless of where the action scene may be at any particular time. Such absolute pattern of movement among Multi-directional Motion Pictures 400 may include a sequence of coordinates such as, for example: (1, 1), (1, 2), (1, 3), (1,4), (1, 5), (1, 6), (1, 7), (1, 8), (1, 9), (1, 10), (2, 10), (3, 10), (4, 10), (5, 10), (6, 10), (7, 10), (8,10), (8, 9), (8, 8), (8, 7), (8, 6), (8, 5), (8, 4), (8, 3), (8, 2), (8, 1), (7, 1), (6, 1), (5, 1), (4, 1), (3, 1), (2, 1), (1, 1). A relative pattern of movement may enable movement among Multi-directional Motion Pictures 400 based on a sequence of coordinates relative to coordinates of a reference point such as an action scene. A relative pattern of movement may, therefore, change with movement of the reference point (i.e. action scene). In one example, a relative pattern of movement among Multi-directional Motion Pictures 400 may include a sequence of coordinates located on a conceptual Circle 610 having a fixed distance (i.e. two Multi-directional Motion Pictures 400 away, 10 feet away, etc.) from the center of an action scene such as, for example, Action Location 76*b*. Any distances used from the reference point (i.e. action scene, etc.) may be fixed or variable (i.e. changeable by user or automatically, etc.), and measured using absolute measurements such as length (i.e. meters, decimeters, millimeters, kilometers, yards, feet, inches, miles, etc.) or relative measurements such as a number of Multi-directional Motion Picture 400 distances. Any of the Multi-directional Motion Pictures 400 on or near Circle 610 may be used in the relative pattern of movement, and if near Circle 610, a function to approximate the nearest Multi-directional Motion Pictures 400 may be utilized. Such function to approximate the nearest Multi-directional Motion Pictures 400 may calculate differences between x and y coordinates of points on Circle 610 and x and y coordinates of nearby Multi-directional Motion Pictures 400. Multi-directional Motion Pictures 400 having coordinates with the smallest differences or the smallest absolute differences in x and y values from points on Circle 610 may be included in the relative pattern of movement associated with or represented by Circle 610. In some embodiments, a band around (inside, outside, or both) Circle 610 may be defined and Multi-directional Motion Pictures 400 having coordinates with differences or absolute differences in x and y values from points on Circle 610 that fall within the band may be included in the relative pattern of movement associated with or represented by Circle 610. In some embodiments, sequence of coordinates of a relative pattern of movement may be recalculated to correspond to movement of an action scene (i.e. follow the movement of the action scene, etc.). In one example, an action scene may move from Action Location 76*b* with coordinates (5, 5) to Action Location with coordinates (5, 6). Such movement of action scene may cause the center of Circle 610 associated with the action scene to also move to the location with coordinates (5, 6). In some aspects, coordinates of Multi-directional Motion Pictures 400 in the relative pattern of movement associated or represented by Circle 610 may be recalculated to correspond to the movement of the center of Circle 610. Such recalculation in this example may include increasing by 1 the y value of coordinates of Multi-directional Motion Pictures 400 or references thereto of the relative pattern of movement. In other aspects, coordinates of Circle 610 may be recalculated to correspond to the movement of the center of Circle 610. Such recalculation in this example may include increasing by 1 the y value of coordinates of points on Circle 610 associated with or representing the relative pattern of movement. After Circle's 610 recalculation, a function to approximate new nearest Multi-directional Motion Pictures 400 may be utilized as previously described.

Patterns of movement among Multi-directional Motion Pictures 400 may include a designer's preferred patterns (i.e. movie director's preferred camera patterns, etc.), user recorded or preferred patterns (i.e. patterns that user may have used previously in subject or other MDP applications), shaped patterns (i.e. still, linear, curved, oblique, circular, squared, rectangular, triangular, approaching, retreating, etc.), commonly used patterns (i.e. patterns used or preferred by other users, etc.), any patterns of movement toward, away, and/or around an action scene, and/or any other conceivable patterns. In the case of user preferred patterns, MDP Unit 100 may include a process of recording and/or storing a sequence of coordinates of user's movements among Multi-directional Motion Pictures 400. In some aspects, patterns of movement among Multi-directional Motion Pictures 400 and/or their coordinates may be stored in Multi-directional Pictures Repository 115, or in any external file (i.e. object file, etc.), data structure, DBMS, database, system, process, and/or any other storage or data repository. In one example, coordinates of a Multi-directional Motion Picture 400 in a pattern may be stored in a data field of the Multi-directional Motion Picture 400 data structure. In another example, coordinates of a Multi-directional Motion Picture 400 in a pattern may be stored in a data field of the pattern data structure and/or associated with the Multi-directional Motion Picture 400.

In some embodiments, a pattern of movement among Multi-directional Motion Pictures 400 may include time periods (i.e. delays, etc.) to measure the length of stay on a particular Multi-directional Motion Picture 400 before moving to a next Multi-directional Motion Picture 400 in the pattern. Any time periods measured in any time units may be used such as, for example, 21 milliseconds, 5 seconds, 113 seconds, 17 minutes, 49 hours, 2 months, 1 year, etc. Time periods may be used to control and/or adjust the speed of movement among Multi-directional Motion Pictures 400 in a pattern. As such, user may manually or Core Program 110 may automatically adjust time periods of any or all Multi-directional Motion Pictures 400 at any time before, during, and/or after a pattern's execution. In some aspects, time periods may be stored in Multi-directional Pictures Repository 115, or in any external file (i.e. object file, etc.), data structure, DBMS, database, system, process, and/or any other storage or data repository. In one example, a time period of a Multi-directional Motion Picture 400 in a pattern may be stored in a data field of the Multi-directional Motion Picture 400 data structure. In another example, a time period of a Multi-directional Motion Picture 400 in a pattern may be stored in a data field of the pattern data structure and/or associated with the Multi-directional Motion Picture 400.

In some embodiments, MDP Unit 100 may include motion detection in streams of pictures (i.e. motion pictures). Motion detection functions and algorithms may be implemented for detecting action scenes or moving objects in Motion Pictures 410*a*, 410*b*, 410*c*, 410*d*, etc. Any algorithms or techniques for motion detection in streams of digital pictures known in art may be used. Motion detection in streams of digital pictures may generally compare a current picture with a reference picture (i.e. previous picture, following picture, background picture, etc.) by counting the number of different pixels. The threshold for the number of different pixels may be adjustable by a user or automatically adjustable as needed. Also, the threshold for a difference in each of the pixels may be adjustable as well. Motion detection algorithms may detect moving objects as well as their direction of movement through picture processing. Examples of motion detection algorithms and programs include AForge.NET, Rise Sun, Pryme, Motion Hunter, Motion Detector Pro, and others.

In some embodiments, Motion Picture Cameras 490*a*, 490*b*, 490*c*, 490*d*, etc., or other motion picture taking equipment may be installed above an action scene such as, for example on a ceiling of a room. As such, detection of an action scene or any moving objects may be achieved by detecting motion in Motion Pictures 410*a*, 410*b*, 410*c*, 410*d*, etc. of all Multi-directional Motion Pictures 400. Coordinates of the action scene may be determined or estimated in a Multi-directional Motion Picture 400 where no motion is detected. In one example, Multi-directional Motion Picture 400 with coordinates (5,5) where motion is not detected may be location of the action scene as the action scene may be in the blind spot of Motion Picture Cameras 490*a*, 490*b*, 490*c*, 490*d*, etc., or other motion picture taking equipment whose fields of view may be directed away from the action scene (i.e. forward, backward, right, left, etc.).

Figure 34:
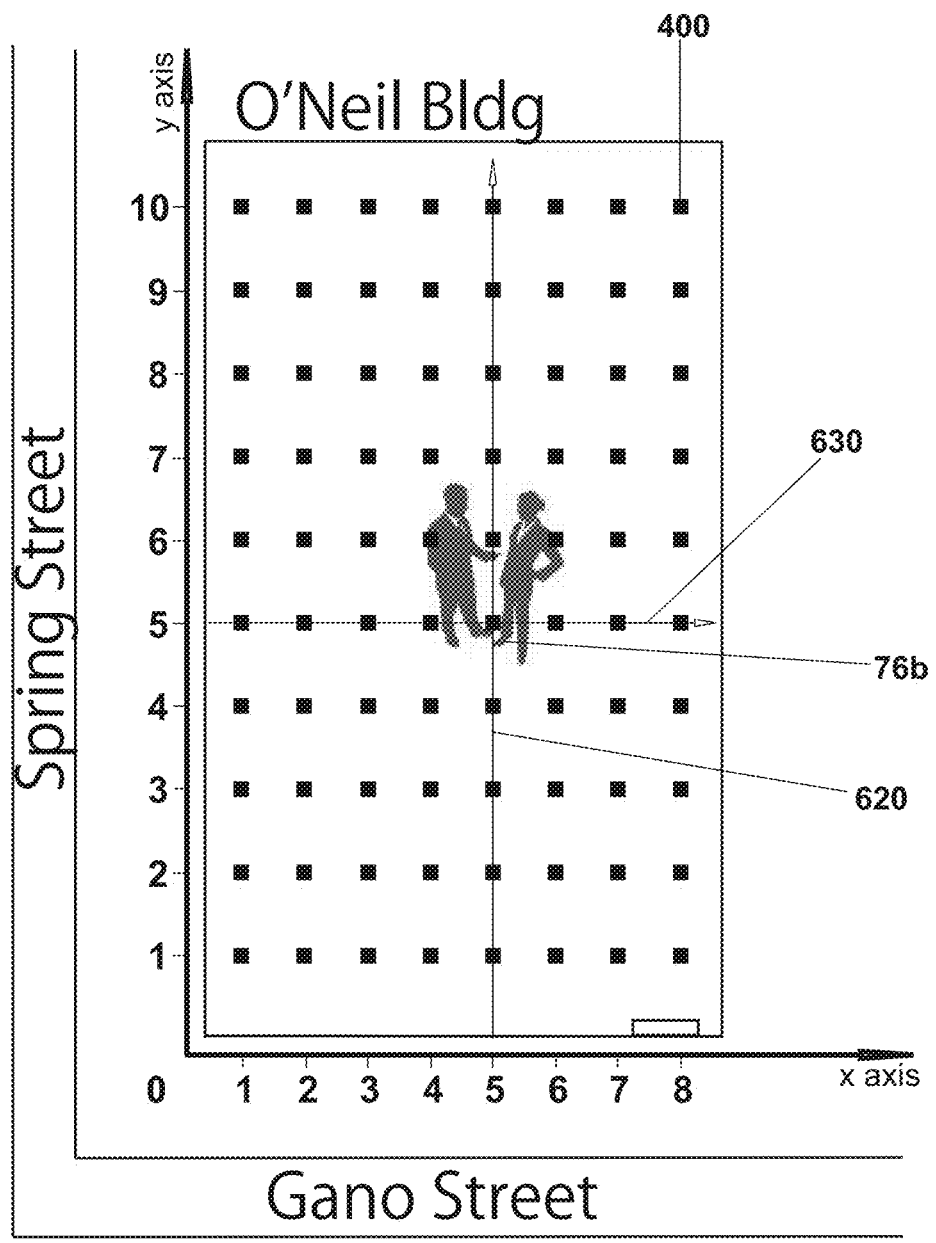
FIG. 34 shows an embodiment of MDP Unit 100 implemented to include detection of an action scene using lines of Multi-directional Motion Pictures 400 aligned with reference points (i.e. x and y axes, etc.) of a represented object.

Referring to FIG. 34, an embodiment is illustrated where detection of an action scene may be achieved by detecting motion in lines of Multi-directional Motion Pictures 400 aligned with reference points (i.e. corners of buildings, points along walls representing x, y, or z axes, center of a represented object, etc.) of a represented object. In one example, an action scene may be located near the center of a rectangular room such as the Action Location 76*b* with coordinates (5,5). As such, a Motion Picture 410*a*, 410*b*, 410*c*, 410*d*, etc. of a Multi-directional Motion Picture 400 located near one of the walls such as the Multi-directional Motion Picture 400 with coordinates (5,1) may be used to detect the action scene. Once action scene is detected in, for example, Forward Motion Picture 410*a* of the Multi-directional Motion Picture 400 with coordinates (5,1), detection of the action scene may be performed in Forward Motion Pictures 410*a* of Multi-directional Motion Pictures 400 with coordinates (5,2), (5,3), (5,4), (5,5), (5,6), (5,7), (5,8), (5,9), and (5,10) located on Reference Line 620. As such, y coordinate of the action scene may be determined or estimated in y coordinate of the first Multi-directional Motion Picture 400 on Reference Line 620 with Forward Motion Picture 410*a* that did not detect the action scene such as in this example Multi-directional Motion Picture 400 with coordinates (5,5). Similar steps may be used to determine or estimate x coordinate of the action scene by detecting action scene in, for example, all Right Motion Pictures 410*c* of Multi-directional Motion Pictures 400 located on Reference Line 630 starting with Multi-directional Motion Picture 400 with coordinates (1,5). Any Multi-directional Motion Picture 400 may be used as a reference point and/or starting point of a reference line. Also, any Motion Picture 410*a*, 410*b*, 410*c*, 410*d*, etc. of any Multi-directional Motion Picture 400 may be used to detect the action scene or any moving objects.

In some embodiments, Motion Picture Cameras 490*a*, 490*b*, 490*c*, 490*d*, etc., or other motion picture taking equipment used for capturing Motion Pictures 410*a*, 410*b*, 410*c*, 410*d*, etc. may include a means of detecting motion, a means of aligning itself toward a detected moving object (i.e. action scene, etc.), and/or a means of focusing on the detected object (i.e. action scene, etc.). Detecting motion, aligning and focusing may be performed automatically by the motion picture taking equipment. Detecting motion may be accomplished by utilizing any motion sensing technologies known in art such as infrared (i.e. passive or active sensors, etc.), optics (i.e. video or camera systems, etc.), radio frequency energy (i.e. radar, microwave or tomographic, etc.), sound (i.e. microphones or acoustic sensors, etc.), vibration (i.e. triboelectric, seismic, or inertia-switch sensors, etc.), magnetism (i.e. magnetic sensors or magnetometers, etc.), and others. Once motion is detected by a motion sensor, electric motors may be used to align the field of view of the motion picture taking equipment or lens thereof toward the detected moving object (i.e. action scene, etc.). Focusing may be accomplished through adjusting the position of a lens of the motion picture taking equipment. Automatic motion detecting, aligning and focusing on the detected action scene may enhance user experience of moving among Multi-directional Motion Pictures 400 as user would not need to perform these actions him/herself. In some embodiments, motion detecting, aligning and/or focusing functionalities that may be built into motion picture taking equipment may be used to determine or estimate coordinates of a moving object (i.e. action scene, etc.). In one example, any triangulation techniques known in art may be used to determine or estimate coordinates of an action scene by utilizing known coordinates of any three locations (i.e. Multi-directional Motion Pictures 400, etc.) with the described motion picture taking equipment installed.

Figure 35:
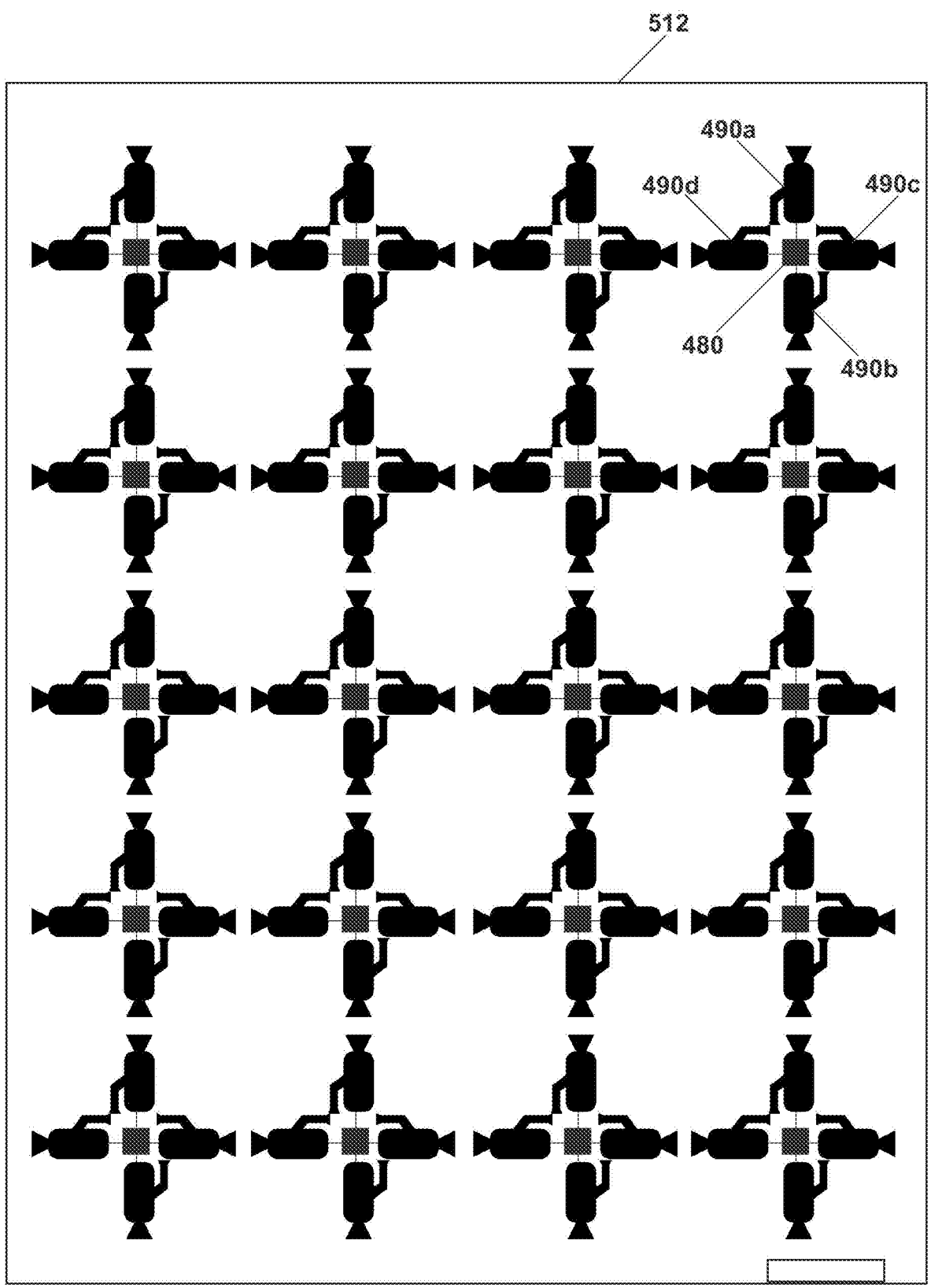
FIG. 35 shows an embodiment of Motion Picture Taking Devices 480 for creating collections of multi-directional motion pictures representing an object.

Referring to FIG. 35, in some aspects, the teaching presented by the disclosure may be implemented to include methods, systems and apparatuses for creating collections of Multi-directional Motion Pictures 400 representing an object. In some embodiments, such methods, systems and apparatuses may include motion picture taking equipment such as motion picture cameras individually arranged to simultaneously capture motion pictures (i.e. streams of pictures) in various directions (i.e. forward, backward, right, left, up, down, diagonal, etc.). In other embodiments, such methods, systems and apparatuses for creating collections of Multi-directional Motion Pictures 400 representing an object may include Multi-directional Motion Picture Taking Devices 480. A Multi-directional Motion Picture Taking Device 480 may comprise any hardware, software or a combination of hardware and software. Multi-directional Motion Picture Taking Device 480 may include functions and algorithms for simultaneously capturing motion pictures (i.e. streams of pictures) in various directions (i.e. forward, backward, right, left, up, down, diagonal, etc.). Such Multi-directional Motion Picture Taking Device 480 may include motion picture taking equipment such as Motion Picture Cameras 490 arranged to point in various directions (i.e. forward, backward, right, left, up, down, diagonal, angular, etc.). In one example, Multi-directional Motion Picture Taking Device 480 may include Forward Motion Picture Camera 490*a*, Backward Motion Picture Camera 490*b*, Right Motion Picture Camera 490*c*, Left Motion Picture Camera 490*d*, and/or any other Motion Picture Cameras. Other additional elements may be included as needed, or some of the disclosed ones may be excluded, or a combination thereof may be utilized in alternate embodiments. Furthermore, such Multi-directional Motion Picture Taking Device 480 may be included in an integrated and/or standardized casing. The casing may include a means such as clips, screws, adhesive elements, or other means to easily attach or mount the casing on ceilings, floors, walls, polls, fences, or other surfaces or items. Such Multi-directional Motion Picture Taking Device 480 may also include a means such as cable, wireless connection, or other connection means to connect the motion picture taking equipment such as Motion Picture Cameras 490*a*, 490*b*, 490*c*, 490*d*, etc. with a Computing Device 70. As shown for example in FIG. 35, Multi-directional Motion Picture Taking Devices 480 or individually arranged motion picture taking equipment may be positioned in the center of every full square yard of a represented object such as Room 512 to cover the entire Room 512. Once positioned in their locations, Multi-directional Motion Picture Taking Devices 480 or individually arranged motion picture taking equipment may capture Motion Pictures 410*a*, 410*b*, 410*c*, 410*d*, etc. from each location simultaneously. Each Motion Picture 410*a*, 410*b*, 410*c*, 410*d*, etc. may be transferred via the connection means (i.e. cable, wireless connection, etc.) to a program running on Computing Device 70. In some embodiments where Multi-directional Motion Picture Taking Devices 480 may be used, the program may associate each Multi-directional Motion Picture Taking Device 480 with a corresponding Multi-directional Motion Picture 400 and associate each Motion Picture Camera 490*a*, 490*b*, 490*c*, 490*d*, etc. of the Multi-directional Motion Picture Taking Device 480 with a corresponding Motion Picture 410*a*, 410*b*, 410*c*, 410*d*, etc. In other embodiments where individually arranged motion picture taking equipment such as Motion Picture Cameras 490*a*, 490*b*, 490*c*, 490*d*, etc. may be used, the program may associate each set of Motion Picture Cameras 490*a*, 490*b*, 490*c*, 490*d*, etc. from a particular location with a corresponding Multi-directional Motion Picture 400 and associate each Motion Picture Camera 490*a*, 490*b*, 490*c*, 490*d*, etc. with a corresponding Motion Picture 410*a*, 410*b*, 410*c*, 410*d*, etc.

If an action scene (i.e. moving persons and/or objects, etc.) is caused to enter an object such as Room 512 having the described Multi-directional Motion Picture Taking Devices 480 or individually arranged motion picture taking equipment installed, all views or angles of the action scene including all views or angles of the object (i.e. Room 512, etc.) may simultaneously be captured from all locations of the object (i.e. Room 512, etc.) for the duration of the motion pictures. User may use an instance of MDP Unit 100 on his/her Computing Device 70 to move the view of the action scene and/or the represented object (i.e. Room 512, etc.) in all directions while the action may be progressing as previously described. In order to avoid collisions between action figures (i.e. moving persons and/or objects in the action scene) and motion picture taking equipment, the motion picture taking equipment may be installed to hang from the ceiling, to hang from walls, to be raised from the floor, or to be positioned in other suitable locations. In one example, motion picture taking equipment may be installed to hang from the ceiling in which case the motion picture taking equipment or lenses thereof may be angled downward toward the action scene. In another example, motion picture taking equipment may be installed on the floor in which case the motion picture taking equipment or lenses thereof may be angled upward toward the action scene. In yet another example, motion picture taking equipment may be installed on the walls in which case the motion picture taking equipment or lenses thereof may be leveled toward the action scene. In general, motion picture taking equipment or lenses thereof may be angled in any suitable direction. In a case of exterior of an object or exterior open space (i.e. outside of a building, park, street, etc.) with an action scene, any suitable object and/or surface able to hold the motion picture taking equipment may be utilized including, but not limited to, tree, lighting pole, electric pole, fence, building, wall, and/or other suitable object or surface. In some embodiments, specially made holding equipment may be utilized such as, for example, specially made cable maze or metal grid elevated to hold the motion picture taking equipment above the action scene.

In some embodiments, a time stamp may be assigned or associated with each of the pictures (i.e. frames) of Motion Pictures 410*a*, 410*b*, 410*c*, 410*d*, etc. to coordinate movement among Multi-directional Motion Pictures 400 and/or Motion Pictures 410*a*, 410*b*, 410*c*, 410*d*, etc. in a time continuum. In one example, when a user chooses to move his/her view of a represented object or an action scene by switching from one Motion Picture 410*a*, 410*b*, 410*c*, 410*d*, etc. to another within the same Multi-directional Motion Picture 400, Core Program 110 may look in the destination Motion Picture 410*a*, 410*b*, 410*c*, 410*d*, etc. for an appropriate picture (i.e. frame) having an incrementally subsequent time stamp. Core Program 110 may then show through Picture Display 840 a stream of pictures (i.e. frames) of the destination Motion Picture 410*a*, 410*b*, 410*c*, 410*d*, etc. starting with the incrementally subsequent time stamp. In another example, when a user chooses to move his/her view of a represented object or an action scene by moving from one Multi-directional Motion Picture 400 to another, Core Program 110 may look in the destination Motion Picture 410*a*, 410*b*, 410*c*, 410*d*, etc. of the destination Multi-directional Motion Picture 400 for an appropriate picture (i.e. frame) having an incrementally subsequent time stamp. Core Program 110 may then show through Picture Display 840 a stream of pictures (i.e. frames) of the destination Motion Picture 410*a*, 410*b*, 410*c*, 410*d*, etc. starting with the incrementally subsequent time stamp. In some embodiments, Multi-directional Motion Picture 400 may comprise a data structure whose data fields may include time stamp of each of the pictures (i.e. frames) of Motion Picture 410*a*, 410*b*, 410*c*, 410*d*, etc. In other embodiments, Motion Picture 410*a*, 410*b*, 410*c*, 410*d*, etc. may include or store time stamps of its own pictures (i.e. frames) internally (i.e. internally stored time stamps in a digital video file, etc.). In yet other embodiments, a time stamp may be assigned or associated with each of the pictures (i.e. frames) of Motion Pictures 410*a*, 410*b*, 410*c*, 410*d*, etc. based on a frame rate formula or any other formula or algorithm for computing time stamps in streams of pictures (i.e. motion pictures, etc.) known in art. In yet other embodiments, Motion Picture 410*a*, 410*b*, 410*c*, 410*d*, etc. may include a stream of pictures (i.e. frames) where each picture may be stored in its own file and where time stamp may be stored in the name of the file. In the following example, time stamps may be stored in names of files and may include 0.04 second increments consistent with digital quality video of 25 frames per second.

<PARAM NAME=picture0 VALUE="picture0">
<PARAM NAME=forward_picture0_1 VALUE="Pic0_1_20120803_09:43:22:040.jpg">
<PARAM NAME=forward_picture0_2 VALUE="Pic0_2_20120803_09:43:22:080.jpg">
<PARAM NAME=forward_picture0_3 VALUE="Pic0_3_20120803_09:43:22:120.jpg">
<PARAM NAME=backward_picture0_1 VALUE="Pic1_1_20120803_09:43:22:040.jpg">
<PARAM NAME=backward_picture0_2 VALUE="Pic1_2_20120803_09:43:22:080.jpg">
<PARAM NAME=backward_picture0_3 VALUE="Pic1_3_20120803_09:43:22:120.jpg">
<PARAM NAME=right_picture0_1 VALUE="Pic2_1_20120803_09:43:22:040.jpg">
<PARAM NAME=right_picture0_2 VALUE="Pic2_2_20120803_09:43:22:080.jpg">
<PARAM NAME=right_picture0_3 VALUE="Pic2_3_20120803_09:43:22:120.jpg">
<PARAM NAME=left_picture0_1 VALUE="Pic3_1_20120803_09:43:22:040.jpg">
<PARAM NAME=left-picture0_2 VALUE="Pic3_2_20120803_09:43:22:080.jpg">
<PARAM NAME=left_picture0_3 VALUE="Pic3_3_20120803_09:43:22:120.jpg">
<PARAM NAME=forward_link0 VALUE="picture1">
<PARAM NAME=backward_link0 VALUE="null">
<PARAM NAME=right_link0 VALUE="null">
<PARAM NAME=left_link0 VALUE="null">
<PARAM NAME=picture1 VALUE="picture1">
<PARAM NAME=forward_picture1_1 VALUE="Pic4_1_20120803_09:43:22:040.jpg">
<PARAM NAME=forward_picture1_2 VALUE="Pic4_2_20120803_09:43:22:080.jpg">
<PARAM NAME=forward_picture1_3 VALUE="Pic4_3_20120803_09:43:22:120.jpg">
<PARAM NAME=backward_picture1_1 VALUE="Pic5_1_20120803_09:43:22:040.jpg">
<PARAM NAME=backward_picture1_2 VALUE="Pic5_2_20120803_09:43:22:080.jpg">
<PARAM NAME=backward_picture1_3 VALUE="Pic5_3_20120803_09:43:22:120.jpg">
<PARAM NAME=right_picture1_1 VALUE="Pic6_1_20120803_09:43:22:040.jpg">
<PARAM NAME=right_picture1_2 VALUE="Pic6_2_20120803_09:43:22:080.jpg">
<PARAM NAME=right_picture1_3 VALUE="Pic6_3_20120803_09:43:22:120.jpg">
<PARAM NAME=left_picture1_1 VALUE="Pic7_1_20120803_09:43:22:040.jpg">
<PARAM NAME=left_picture1_2 VALUE="Pic7_2_20120803_09:43:22:080.jpg">
<PARAM NAME=left_picture1_3 VALUE="Pic7_3_20120803_09:43:22:120.jpg">
<PARAM NAME=forward_link1 VALUE="picture2">
<PARAM NAME=backward_link1 VALUE="picture0">
<PARAM NAME=right_link1 VALUE="picture3">
<PARAM NAME=left_link1 VALUE="picture4">

Figure 36:
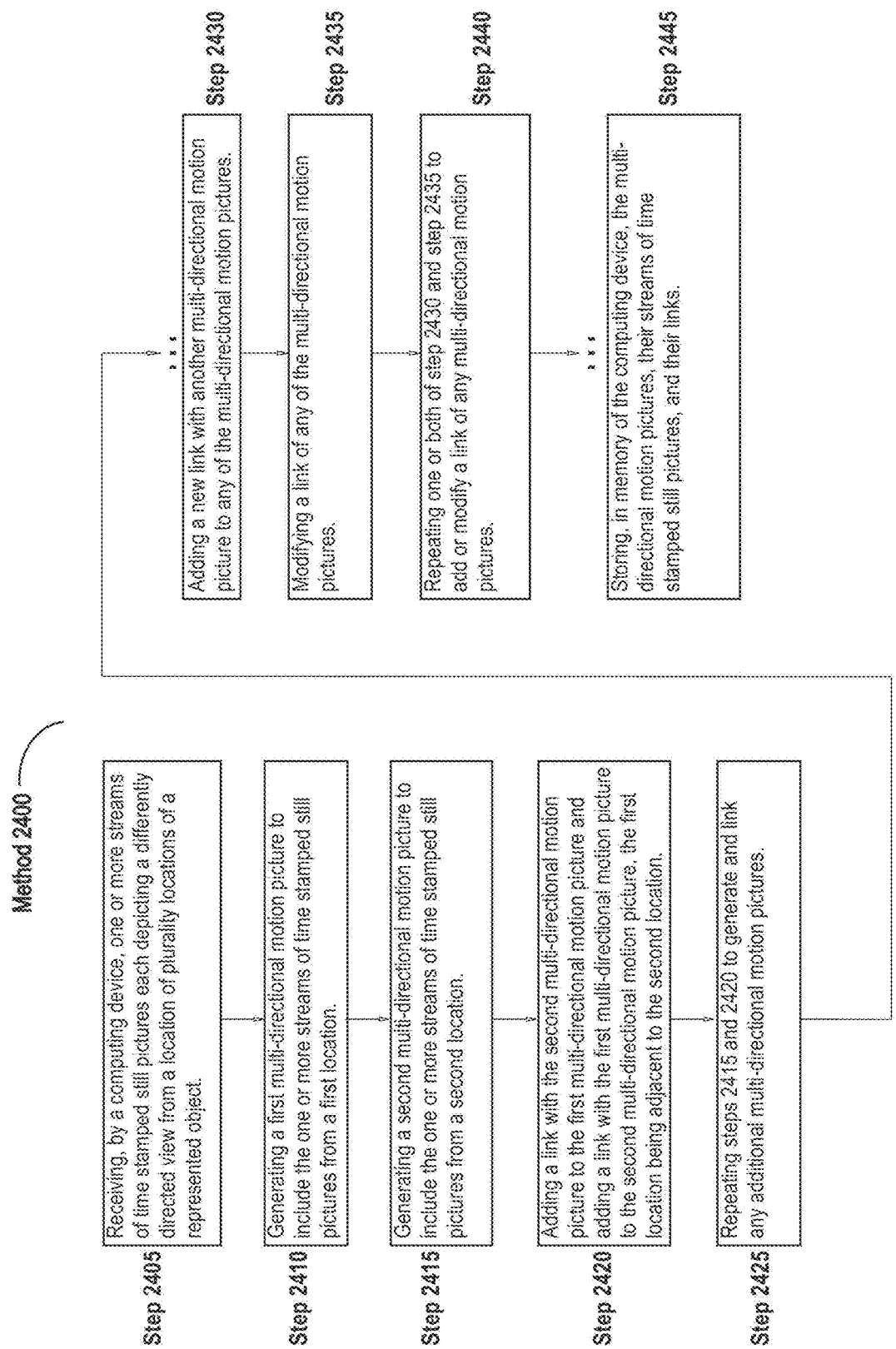
FIG. 36 illustrates a flow chart diagram of an embodiment of a method 2400 implemented by MDP Unit 100.

Referring to FIG. 36, the illustration shows an embodiment of a method 2400 for generating a collection of Multi-directional Motion Pictures 400 representing an object. The steps of this exemplary method may therefore be used by a user on a computing device operating an interface for a MDP Unit 100 to enable a user to generate Multi-directional Motion Pictures 400 in a user-friendly process. One of ordinary skill in art will understand that some or all steps of this method may be reordered, and that other additional steps may be included as needed, or some of the disclosed ones may be excluded, or a combination thereof may be utilized in alternate embodiments. Some or all steps of this method may similarly be utilized for generating a collection of Multi-directional Still Pictures 200 representing an object.

At step 2405, one or more streams of time stamped still pictures each depicting a differently directed view from a location of plurality locations of a represented object are received by a computing device. MDP Unit 100 may enable interactive visual representation of objects over time using multi-directional motion pictures positioned in locations of the represented object. Any locations may be used to represent the object. In one example, steps (i.e. every two feet, etc.) in a park's walkways may be used as the locations to simulate a user's stepping through the park in time continuum. In another example, evenly spaced locations (i.e. locations in the center of every square yard, etc.) in a room may be used as locations to simulate a user's stepping through the room in a time continuum. In one example, a first location may be a logical starting point such as a location near an entrance into a park or near a door to a room. In another example, the first location may be any location of the represented object. In some embodiments, a set of individually arranged motion picture taking equipment such as motion picture cameras and/or any other motion picture taking equipment may be used to simultaneously capture streams of time stamped still pictures (i.e. motion pictures, videos, etc.) in various directions (i.e. forward, backward, right, left, up, down, diagonal, etc.). In other embodiments, a set of integrated motion picture taking equipment such as motion picture cameras and/or any other motion picture taking equipment may be used to simultaneously capture streams of time stamped still pictures (i.e. motion pictures, videos, etc.) in various directions (i.e. forward, backward, right, left, up, down, diagonal, etc.). Such set of integrated motion picture cameras and/or any other motion picture taking equipment may be included in an integrated and/or standardized casing. Such casing may further include a means such as clips, screws, adhesive elements, etc. to easily attach or mount the casing on ceilings, floors, walls, polls, fences, etc. Any number of sets of differently directed motion picture cameras and/or any other motion picture taking equipment may be placed in any number of locations of the represented object. In some embodiments, any number of sets of differently directed motion picture cameras and/or any other motion picture taking equipment may be placed in locations to cover the entire represented object or a portion thereof. In one example, if an action scene (i.e. moving persons or objects, etc.) is caused to enter an object (i.e. park, interior of a building, etc.) with the described motion picture cameras and/or any other motion picture taking equipment installed, all views or angles of the action scene including all views or angles of the represented object may simultaneously be captured for the duration of the streams of time stamped still pictures (i.e. motion pictures, videos, etc.). A computing device may receive the captured streams of time stamped still pictures (i.e. motion pictures, videos, etc.) via a connection means. Such connection means may be utilized to facilitate transfer of streams of time stamped still pictures (i.e. motion pictures, videos, etc.) from each of the motion picture cameras and/or any other motion picture taking equipment to an instance of MDP Unit 100 running on the computing device. Such connection means may include a cable, a network, a wireless connection, and/or any other connection means. Such connection means may be included or attached to the motion picture camera and/or any other motion picture taking equipment for user's convenience. In some embodiments, an instance of MDP Unit 100 running on the computing device may associate a motion picture camera and/or any other motion picture taking equipment with a corresponding multi-directional motion picture using the connection means to identify a specific motion picture camera and/or any other motion picture taking equipment. In some embodiments, the streams of time stamped still pictures (i.e. motion pictures, videos, etc.) may be received from a motion picture camera and/or any other motion picture taking equipment and directed to an instance of MDP Unit 100 through the computing device's internal connection or storage means such as bus, hard drive, memory, or any other directly or operatively connected internal connection or storage means. In one example, a motion picture camera and/or any other motion picture taking equipment may transfer a stream of time stamped still pictures in a file over a network to which the computing device may connect and on which an instance of MDP Unit 100 may access the file. In another example, a motion picture camera and/or any other motion picture taking equipment may store a stream of time stamped still pictures in a file on a hard drive of the computing device where an instance of MDP Unit 100 may access the file. A set of differently directed motion picture cameras and/or any other motion picture taking equipment may include any action or operation by or for Motion Picture Camera 490*a*, 490*b*, 490*c*, 490*d*, etc. and/or Multi-directional Motion Picture Taking Device 480.

At step 2410, a first multi-directional motion picture is generated to include the one or more streams of time stamped still pictures from a first location. Each location of the represented object such as the first location may be associated with a multi-directional motion picture. In some embodiments, a multi-directional motion picture may include a data structure organizing and/or storing one or more differently directed streams of time stamped still pictures and one or more links to other multi-directional motion pictures. Multi-directional motion pictures may enable a user to view all views (i.e. forward, backward, right, left, up, down, diagonal, etc.) from all locations of a represented object over time and enable the user to move among the multi-directional motion pictures this way simulating motion through the represented object over time. Each still picture (i.e. frame) in a stream of time stamped still pictures (i.e. motion picture, video, etc.) may include or be associated with a time stamp. In some embodiments, multi-directional motion picture may comprise a data structure whose data fields may include a time stamp of each of the still pictures (i.e. frames) of a stream of time stamped still pictures (i.e. motion picture, video, etc.). In other embodiments, a stream of time stamped still pictures (i.e. motion picture, video, etc.) may include or store time stamps of its own still pictures (i.e. frames) internally. In yet other embodiments, a stream of time stamped still pictures (i.e. motion picture, video, etc.) may include still pictures (i.e. frames) each stored in its own file where the time stamp may be stored in the name of the file. In yet other embodiments, time stamp of each of the still pictures in a stream of time stamped still pictures may be determined or calculated based on a frame rate or other formula. Time stamp may be utilized for each of the still pictures (i.e. frames) within each of the streams of time stamped still pictures (i.e. motion picture, video, etc.) in order to enable coordination of movement among multi-directional motion pictures in a time continuum. A time stamp may include any time increments measured in any unit of time such as nanoseconds, milliseconds, seconds, minutes, hours, months, years, and/or any other units of time. In one example, 0.04 second increments may be used for each still picture (i.e. frame) consistent with digital quality video of 25 frames per second. In some embodiments, an instance of MDP Unit 100 may assign a time stamp (i.e. from system clock, etc.) to each still picture of a stream of still pictures (i.e. motion picture, video, etc.). In other embodiments, motion picture cameras and/or any other motion picture taking equipment may assign a time stamp (i.e. from system clock, etc.) to each still picture of a stream of still pictures (i.e. motion picture, video, etc.). Time stamps may be used to transition among streams of time stamped still pictures (i.e. motion picture, video, etc.) where an instance of MDP Unit 100 may look for an appropriate still picture (i.e. frame) having an incrementally subsequent time stamp within a destination stream of time stamped still pictures (i.e. motion picture, video, etc.) in order to make a proper transition. In some embodiments, multi-directional motion pictures may be ordered to include a first multi-directional motion picture, followed by a second multi-directional motion picture, which may also be followed by a third multi-directional motion picture, and so on, to complete a sequence. In other embodiments, multi-directional motion pictures may be arranged in a maze that may correspond to a shape of the represented object. In yet other embodiments, multi-directional motion pictures may be interlinked in any conceivable manner without using any intermediary or supporting data structures such as the sequence and/or maze. Generally, multi-directional motion pictures may correspond to a shape of a represented object. In some embodiments, picture processing may be implemented to automatically detect streams of time stamped still pictures with overlapping fields of view from a specific location of the represented object such as the first location, and to add the detected streams of time stamped still pictures to multi-directional motion picture representing the location. Generating may include any action or operation by or for a Maker 920.

At step 2415, a second multi-directional motion picture is generated to include the one or more streams of time stamped still pictures from a second location. Step 2415 may include any action or operation described in step 2410 as applicable.

At step 2420, a link with the second multi-directional motion picture is added to the first multi-directional motion picture and a link with the first multi-directional motion picture is added to the second multi-directional motion picture, the first location being adjacent to the second location. MDP Unit 100 may include a means through which a user may add bidirectional links to any two adjacent multi-directional motion pictures. In some embodiments in which multi-directional motion picture may include a data structure, such means may include an editor or graphical user interface configured to ask the user to indicate a link with a specific multi-directional motion picture and to add a new data field including the new link to the data structure. In other embodiments in which multi-directional motion picture may include a data structure, such means may use picture processing to automatically detect a new link with a multi-directional motion picture and add a new data field including the new link to the data structure. In general, adding bidirectional links between any two adjacent multi-directional motion pictures such as the first and second multi-directional motion pictures may enable the user to move between the two multi-directional motion pictures. In some embodiments, links may be added individually to their respective multi-directional motion pictures instead of adding bidirectional links in one process step. Adding a link may include any action or operation by or for a Maker 920.

At step 2425, steps 2415 and 2420 are repeated to generate and link any additional multi-directional motion pictures. Step 2425 may include any action or operation described in steps 2415 or 2420 as applicable.

At step 2430, a new link with another multi-directional motion picture is added to any of the multi-directional motion pictures. MDP Unit 100 may include a means through which a user may access any of the multi-directional motion pictures and add to it an additional link with any other multi-directional motion picture. In some embodiments in which multi-directional motion picture may include a data structure, such means may include an editor or graphical user interface configured to ask the user to indicate a link with a specific multi-directional motion picture and to add a new data field including the new link to the data structure. In other embodiments in which multi-directional motion picture may include a data structure, such means may use picture processing to automatically detect a new link with a multi-directional motion picture and add a new data field including the new link to the data structure. Adding a link may include any action or operation by or for a Maker 920.

At step 2435, a link of any of the multi-directional motion pictures is modified. MDP Unit 100 may include a means through which a user may access any of the multi-directional motion pictures and modify any of its links. In some embodiments in which multi-directional motion picture may include a data structure, such means may include an editor or graphical user interface configured to read a data field including a link, ask the user to indicate a link with another multi-directional motion picture, and replace the previous link with the updated link in the data field. In some embodiments in which multi-directional motion picture may include a data structure, such means may read a data field including a link, use picture processing to automatically detect a link with another multi-directional motion picture, and replace the previous link with the updated link in the data field. Modifying a link may include any action or operation by or for a Maker 920.

At step 2440, one or both of step 2430 and step 2435 are repeated to add or modify a link of any multi-directional motion pictures. Step 2440 may include any action or operation described in step 2430 and/or step 2435 as applicable. Any number of links among multi-directional motion pictures may be used in user's discretion. Such links may connect multi-directional motion pictures in any conceivable direction (i.e. forward, backward, right, left, up, down, diagonal, etc.). The links may enable the user to move among multi-directional motion pictures this way simulating motion through the represented object. In one example, links may connect multi-directional motion pictures associated with locations (i.e. steps, etc.) on a parks walkways. In another example, links may connect multi-directional motion pictures associated with evenly spaced locations (i.e. locations in the center of every square yard, etc.) in a room. Generally, links among multi-directional motion pictures may correspond to a shape of a represented object.

At step 2445, the multi-directional motion pictures, their streams of time stamped still pictures, and their links are stored in memory of the computing device. Multi-directional motion pictures may be stored, maintained, and/or organized in various arrangements including files, data structures, objects, tables, databases, DBMSs, memory structures, and/or other similar arrangements and/or data repositories. In some embodiments, streams of time stamped still pictures or references thereto, links, and/or any data structures (i.e. multi-directional motion pictures, mazes, sequences, etc.) may be stored in a Multi-directional Pictures Repository 115. In some embodiments, Multi-directional Pictures Repository 115 may include a file, a data structure, and/or other similar digital data repository. In other embodiments, Multi-directional Pictures Repository 115 may include a database management system (DBMS), a database, a system, a process, and/or other similar digital data repository. In further embodiments, Multi-directional Pictures Repository 115 may be embedded within an instance of MDP Unit 100

(i.e. hard coded in the Core Program 110). In yet further embodiments, Multi-directional Pictures Repository 115 may include a separate file (i.e. object file, etc.), a separate data structure, a separate DBMS, a separate database, a separate system, a separate process, and/or other separate digital data repository or system for each of the streams of time stamped still pictures (i.e. motion pictures, videos, etc.) or references thereto, for each of the links, and/or for each of the data structures (i.e. multi-directional motion pictures, mazes, sequences, etc.). In yet further embodiments, Multi-directional Pictures Repository 115 may include a collection of definitions of streams of time stamped still pictures or references thereto, links, and/or any data structures (i.e. multi-directional motion pictures, mazes, sequences, etc.) that may be embedded in other files or programs. Storing may include any action or operation by or for a Maker 920.

Embodiments involving any motion picture or multi-directional motion picture functionalities may include any features or embodiments involving any still picture or multi-directional still picture functionalities as previously described.

In some aspects, the teaching presented by the disclosure may be implemented in a device or system for generating multi-directional motion pictures. The device or system may include a processor and an interface, coupled to the processor, for receiving one or more streams of time stamped still pictures each stream of time stamped still pictures depicting a differently directed view from a location of plurality locations of a represented object. The device or system may further include an assembler, coupled to the interface, for generating a first multi-directional motion picture to include the one or more streams of time stamped still pictures from a first location and a second multi-directional motion picture to include the one or more streams of time stamped still pictures from a second location, and adding a link with the second multi-directional motion picture to the first multi-directional motion picture and adding a link with the first multi-directional motion picture to the second multi-directional motion picture, the first location being adjacent to the second location. The processor, the interface, the assembler and/or other elements of the device or system for generating multi-directional motion pictures may include any features and functionalities of Processor 11, Maker 920, Multi-directional Pictures Repository 115, Input Interface 140, Keyboard 150 or any other input device, and/or other disclosed elements. The device or system may also include any functionalities or steps of any disclosed methods such as, for example, method 2400. For example, an input device such as a motion picture camera may provide a means for capturing streams of time stamped still pictures from locations of a represented object. Input Interface 140 may process the captured streams of time stamped still pictures for use by Maker 920 or other disclosed elements. Assembler may be implemented on Processor 11 and it may organize and/or store the captured streams of time stamped still pictures or references thereto, any data structures (i.e. multi-directional motion pictures, mazes, sequences, etc.) and/or other elements in Multi-directional Pictures Repository 115. Assembler may be included in Maker 920, it may be a separate program implemented on Processor 11, it may be a hardware component or a separate processor dedicated to its assigned functionalities, or a combination thereof.

A number of embodiments have been described herein. While this specification contains many specific implementation details, these should not be construed as limitations on the scope of any inventions or of what may be claimed, but rather as descriptions of features specific to particular embodiments. It will be understood that various modifications may be made without departing from the spirit and scope of the invention. The logic flows depicted in the figures do not require the particular order shown, or sequential order, to achieve desired results. In addition, other steps may be provided, or steps may be eliminated, from the described flows, and other components may be added to, or removed from, the disclosed methods, systems and apparatuses. Further, various aspects of the disclosed methods, systems and apparatuses can be combined in whole or in part with each other to produce additional implementations. Moreover, the separation of various components in the embodiments described herein should not be understood as requiring such separation in all embodiments, and it should be understood that the described components may generally be integrated together in a single software product or packaged into multiple software products. Accordingly, other embodiments are within the scope of the following claims.

The invention claimed is:

1. A system comprising:
  one or more processors;
  a memory that stores at least a plurality of multi-directional pictures, wherein a first multi-directional picture of the plurality of multi-directional pictures includes one or more pictures captured from a first location of a represented object, and wherein a second multi-directional picture of the plurality of multi-directional pictures includes one or more pictures captured from a second location of the represented object, and wherein the one or more processors are configured to perform at least:
  adding one or more links between the first multi-directional picture and the second multi-directional picture at least in response to determining a line of sight that passes through a picture of the one or more pictures of the first multi-directional picture and a picture of the one or more pictures of the second multi-directional picture; and
  causing the memory or another memory to store the one or more links between the first multi-directional picture and the second multi-directional picture, wherein the one or more pictures of the first multi-directional picture are used on one or more display devices to depict one or more views from the first location of the represented object, and wherein the one or more pictures of the second multi-directional picture are used on the one or more display devices or on another one or more display devices to depict one or more views from the second location of the represented object.

2. The system of claim 1, wherein the determining the line of sight that passes through the picture of the one or more pictures of the first multi-directional picture and the picture of the one or more pictures of the second multi-directional picture includes determining that at least a subset of the picture of the one or more pictures of the first multi-directional picture at least partially matches at least a subset of a resized the picture of the one or more pictures of the second multi-directional picture.

3. The system of claim 1, wherein: a view depicted by a first picture of the one or more pictures of the first multi-directional picture overlaps a view depicted by a second picture of the one or more pictures of the first multi-directional picture, a view depicted by a first picture of the one or more pictures of the first multi-directional picture adjoins a view depicted by a second picture of the one or more pictures of the first multi-directional picture, or a view depicted by a first picture of the one or more pictures of the first multi-directional picture disjoins a view depicted by a second picture of the one or more pictures of the first multi-directional picture, and wherein: a view depicted by a first picture of the one or more pictures of the second multi-directional picture overlaps a view depicted by a second picture of the one or more pictures of the second multi-directional picture, a view depicted by a first picture of the one or more pictures of the second multi-directional picture adjoins a view depicted by a second picture of the one or more pictures of the second multi-directional picture, or a view depicted by a first picture of the one or more pictures of the second multi-directional picture disjoins a view depicted by a second picture of the one or more pictures of the second multi-directional picture.

4. The system of claim 1, wherein the one or more pictures of the first multi-directional picture are simultaneously captured by: a multi-directional still picture taking device that includes one or more still picture taking devices, or a multi-directional motion picture taking device that includes one or more motion picture taking devices, and wherein the one or more pictures of the second multi-directional picture are simultaneously captured by: the multi-directional still picture taking device, the multi-directional motion picture taking device, another multi-directional still picture taking device that includes another one or more still picture taking devices, or another multi-directional motion picture taking device that includes another one or more motion picture taking devices.

5. The system of claim 1, wherein the one or more pictures of the first multi-directional picture are captured at a first time as part of capturing a video, and wherein the one or more pictures of the second multi-directional picture are captured at a second time as part of the capturing the video, wherein the video includes: a less than 360 degree video, a 360 degree video, or another video.

6. The system of claim 2, wherein the resized the picture of the one or more pictures of the second multi-directional picture is incrementally resized.

7. The system of claim 2, wherein the determining that the at least the subset of the picture of the one or more pictures of the first multi-directional picture at least partially matches the at least the subset of the resized the picture of the one or more pictures of the second multi-directional picture includes:
  traversing the picture of the one or more pictures of the first multi-directional picture to find the at least the subset of the picture of the one or more pictures of the first multi-directional picture that at least partially matches the at least the subset of the resized the picture of the one or more pictures of the second multi-directional picture, or
  traversing the resized the picture of the one or more pictures of the second multi-directional picture to find the at least the subset of the resized the picture of the one or more pictures of the second multi-directional picture that at least partially matches the at least the subset of the picture of the one or more pictures of the first multi-directional picture.

8. The system of claim 1, wherein the one or more processors or another one or more processors are configured to perform at least:
  guiding, via a human designer guiding interface, a human designer to capture the one or more pictures from the second location of the represented object using: one or more still picture taking devices, one or more motion picture taking devices, a multi-directional still picture taking device that includes one or more still picture taking devices, or a multi-directional motion picture taking device that includes one or more motion picture taking devices.

9. The system of claim 1, wherein the first multi-directional picture includes a first combined picture, the first combined picture including: the one or more pictures of the first multi-directional picture, or one or more portions of the one or more pictures of the first multi-directional picture, and wherein the second multi-directional picture includes a second combined picture, the second combined picture including: the one or more pictures of the second multi-directional picture, or one or more portions of the one or more pictures of the second multi-directional picture.

10. The system of claim 1, wherein the one or more processors or another one or more processors are configured to perform at least:
  causing the one or more display devices or the another one or more display devices to display an object in or on a picture of the one or more pictures of the first multi-directional picture.

11. The system of claim 1, wherein the one or more processors or another one or more processors are configured to perform at least:
  causing the one or more display devices or the another one or more display devices to display an object in or on another one or more pictures, and wherein the causing the one or more display devices or the another one or more display devices to display the object in or on the another one or more pictures is performed using: at least a portion of at least one picture of the one or more pictures of the first multi-directional picture, or an information related to at least a portion of at least one picture of the one or more pictures of the first multi-directional picture.

12. The system of claim 1, wherein the one or more links between the first multi-directional picture and the second multi-directional picture include:
  (a) a first link included in the first multi-directional picture, wherein the first link of (a) points to the second multi-directional picture,
  (b) a second link included in the second multi-directional picture, wherein the second link of (b) points to the first multi-directional picture,
  (c) a first link included in the first multi-directional picture and a second link included in the second multi-directional picture, wherein the first link of (c) points to the second multi-directional picture, and wherein the second link of (c) points to the first multi-directional picture, or
  (d) a third link not included in the first multi-directional picture and not included in the second multi-directional picture.

13. The system of claim 1, wherein the determining the line of sight that passes through the picture of the one or more pictures of the first multi-directional picture and the picture of the one or more pictures of the second multi-directional picture includes determining that at least a subset of the picture of the one or more pictures of the first multi-directional picture at least partially matches at least a subset of the picture of the one or more pictures of the second multi-directional picture.

14. The system of claim 1, wherein the one or more processors or another one or more processors are configured to perform at least:
  deleting the one or more links between the first multi-directional picture and the second multi-directional picture at least in response to receiving, via an interface for deleting links among multi-directional pictures, a human designer's manual selection to delete the one or more links between the first multi-directional picture and the second multi-directional picture.

15. The system of claim 1, wherein the adding the one or more links between the first multi-directional picture and the second multi-directional picture is performed using:
   a location information included in or associated with the first multi-directional picture,
   a location information included in or associated with the second multi-directional picture, or
   a location information included in or associated with the first multi-directional picture and a location information included in or associated with the second multi-directional picture.

16. The system of claim 1, wherein the one or more links between the first multi-directional picture and the second multi-directional picture are used to:
   move from the first multi-directional picture to the second multi-directional picture, or
   move from the second multi-directional picture to the first multi-directional picture.

17. The system of claim 1, wherein the memory or the another memory further stores at least: a link between the first multi-directional picture and a content other than a multi-directional picture, and wherein selecting the link between the first multi-directional picture and the content causes accessing the content.

18. The system of claim 1, wherein the first multi-directional picture is: a multi-directional still picture whose the one or more pictures include one or more still pictures, or a multi-directional motion picture whose the one or more pictures include one or more motion pictures, and wherein the second multi-directional picture is: a multi-directional still picture whose the one or more pictures include one or more still pictures, or a multi-directional motion picture whose the one or more pictures include one or more motion pictures, and wherein the represented object includes: a physical object, or a computer generated object.

19. A system comprising:
   a memory that stores at least a plurality of multi-directional pictures, wherein a first multi-directional picture of the plurality of multi-directional pictures includes one or more pictures captured from a first location of a represented object, and wherein a second multi-directional picture of the plurality of multi-directional pictures includes one or more pictures captured from a second location of the represented object;
   means for adding one or more links between the first multi-directional picture and the second multi-directional picture at least in response to determining a line of sight that passes through a picture of the one or more pictures of the first multi-directional picture and a picture of the one or more pictures of the second multi-directional picture; and
   means for causing the memory or another memory to store the one or more links between the first multi-directional picture and the second multi-directional picture, wherein the one or more pictures of the first multi-directional picture are used on one or more display devices to depict one or more views from the first location of the represented object, and wherein the one or more pictures of the second multi-directional picture are used on the one or more display devices or on another one or more display devices to depict one or more views from the second location of the represented object.

20. A method implemented using a computing system that includes one or more processors, the method comprising:
   accessing a memory that stores at least a plurality of multi-directional pictures, wherein a first multi-directional picture of the plurality of multi-directional pictures includes one or more pictures captured from a first location of a represented object, and wherein a second multi-directional picture of the plurality of multi-directional pictures includes one or more pictures captured from a second location of the represented object;
   adding one or more links between the first multi-directional picture and the second multi-directional picture at least in response to determining a line of sight that passes through a picture of the one or more pictures of the first multi-directional picture and a picture of the one or more pictures of the second multi-directional picture; and
   storing, in the memory or in another memory, the one or more links between the first multi-directional picture and the second multi-directional picture, wherein the one or more pictures of the first multi-directional picture are used on one or more display devices to depict one or more views from the first location of the represented object, and wherein the one or more pictures of the second multi-directional picture are used on the one or more display devices or on another one or more display devices to depict one or more views from the second location of the represented object.

* * * * *